US012638076B2

(12) United States Patent
Davis et al.

(10) Patent No.: US 12,638,076 B2
(45) Date of Patent: May 26, 2026

(54) OFF-HIGHWAY RECREATIONAL VEHICLE

(71) Applicant: Textron Inc., Providence, RI (US)

(72) Inventors: Hunter Davis, Orlando, FL (US);
Nathan Lundstrom, Augusta, GA
(US); Logan Bastian, Augusta, GA
(US); Stephen Deck, Augusta, GA
(US); Judson Houston, Evans, GA
(US); Russell Conine, Augusta, GA
(US); Deanna Mock, Evans, GA (US);
John Stocks, Graniteville, SC (US);
David Horne, Evans, GA (US);
Matthew Fields, Annandale, MN (US)

(73) Assignee: Textron Innovations Inc., Providence,
RI (US)

( * ) Notice: Subject to any disclaimer, the term of this
patent is extended or adjusted under 35
U.S.C. 154(b) by 0 days.

(21) Appl. No.: 19/051,623

(22) Filed: Feb. 12, 2025

(65) Prior Publication Data

US 2025/0230868 A1     Jul. 17, 2025

Related U.S. Application Data

(63) Continuation of application No. 17/945,687, filed on
Sep. 15, 2022, now Pat. No. 12,270,467, which is a
(Continued)

(51) Int. Cl.
B60R 21/13         (2006.01)
B60R 21/18         (2006.01)
(Continued)

(52) U.S. Cl.
CPC ......... F16H 57/0489 (2013.01); B60R 21/13
(2013.01); B62D 21/18 (2013.01);
(Continued)

(58) Field of Classification Search
CPC .. F16H 37/084; F16H 37/086; F16H 57/0416;
F16H 57/0489; F16H 61/0021;
(Continued)

(56) References Cited

U.S. PATENT DOCUMENTS 8,944,449 B2    2/2015  Hurd et al.
9,217,501 B2   12/2015  Deckard et al.
(Continued)

FOREIGN PATENT DOCUMENTS

CN         110254526 B   * 10/2023   ........... B62D 23/005
WO     WO-2014130611 A2 *  8/2014   ........... B62D 23/005
WO         2017187411 A1    11/2017

*Primary Examiner* — Jason D Shanske
*Assistant Examiner* — Daniel M. Keck
(74) *Attorney, Agent, or Firm* — Billion & Armitage

(57)          ABSTRACT
An off-highway recreational vehicle includes side-by-side
passenger and driver seats held within a chassis. The seats sit
low in the chassis and are covered by a roll-over protection
system (ROPS), The vehicle is powered by an engine
rearward of the seats that utilizes a continuously variable
transmission (CVT) to provide power to the ground engag-
ing members, wherein the CVT is cooled via air captured by
a CVT intake body located adjacent the driver-side seat,
between the frame and external panels of the utility vehicle.

17 Claims, 109 Drawing Sheets

Related U.S. Application Data continuation of application No. 16/245,498, filed on Jan. 11, 2019, now Pat. No. 11,448,311.

(60) Provisional application No. 62/616,243, filed on Jan. 11, 2018.

(51) Int. Cl.

| | |
|---|---|
| *B62D 21/18* | (2006.01) |
| *B62D 24/00* | (2006.01) |
| *F16H 57/04* | (2010.01) |
| *F16H 61/662* | (2006.01) |
| *B60R 21/00* | (2006.01) |
| *F16H 37/08* | (2006.01) |
| *F16H 61/00* | (2006.01) |

(52) U.S. Cl.
CPC ........... *B62D 21/183* (2013.01); *B62D 24/00* (2013.01); *F16H 57/0416* (2013.01); *F16H 61/662* (2013.01); *B60R 2021/0018* (2013.01); *B60Y 2200/124* (2013.01); *B60Y 2200/20* (2013.01); *F16H 37/086* (2013.01); *F16H 61/0021* (2013.01); *F16H 2061/0037* (2013.01)

(58) Field of Classification Search
CPC .......... F16H 61/662; F16H 2061/0037; B60R 21/13; B60R 2021/0018; B60Y 2200/124; B60Y 2200/20; B62D 21/18; B62D 21/183; B62D 23/005; B62D 24/00

USPC ............................................ 280/756; 474/93
See application file for complete search history.

(56) References Cited

U.S. PATENT DOCUMENTS

| | | | | |
|---|---|---|---|---|
| 9,884,647 | B2 | 2/2018 | Peterson et al. | |
| 10,723,398 | B2 | 7/2020 | Spindler et al. | |
| 11,643,035 | B2 | 5/2023 | Kotrla et al. | |
| 11,787,279 | B2 | 10/2023 | Ward et al. | |
| 2012/0031688 | A1* | 2/2012 | Safranski | B60K 17/34 |
| | | | | 280/124.135 |
| 2012/0031694 | A1* | 2/2012 | Deckard | F16H 57/0489 |
| | | | | 29/402.03 |
| 2015/0259011 | A1 | 9/2015 | Deckard et al. | |
| 2016/0288686 | A1 | 10/2016 | Reed et al. | |
| 2016/0347350 | A1 | 12/2016 | Heon et al. | |
| 2017/0274935 | A1 | 9/2017 | Deckard et al. | |
| 2018/0178677 | A1 | 6/2018 | Swain et al. | |
| 2018/0215223 | A1 | 8/2018 | Mailhot et al. | |
| 2018/0326843 | A1 | 11/2018 | Danielson et al. | |
| 2019/0186620 | A1 | 6/2019 | Quinn | |
| 2019/0210668 | A1 | 7/2019 | Endrizzi et al. | |
| 2021/0079985 | A1 | 3/2021 | Oyama et al. | |
| 2021/0094627 | A1 | 4/2021 | Clark et al. | |
| 2021/0207704 | A1 | 7/2021 | Allicock | |
| 2021/0268863 | A1* | 9/2021 | Deckard | B60G 3/20 |

* cited by examiner

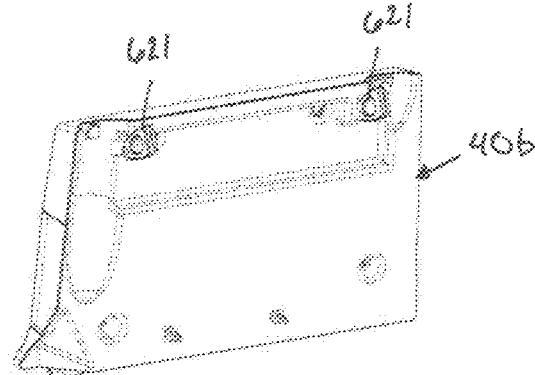
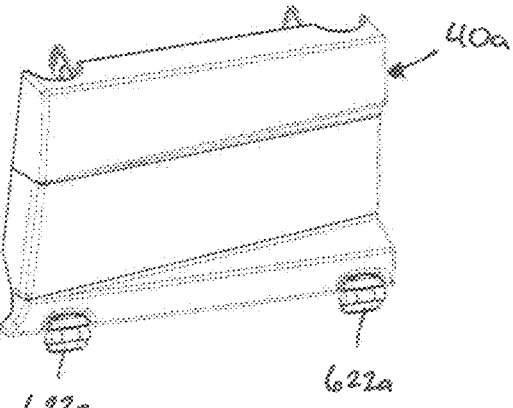
FIG. 102

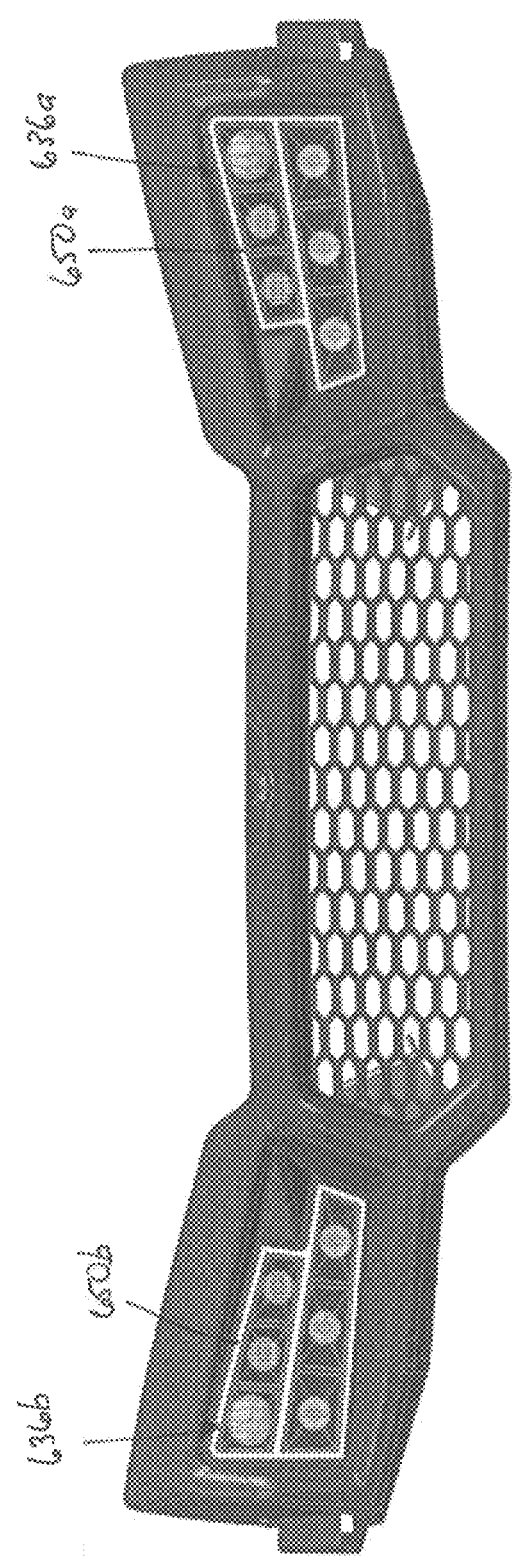

OFF-HIGHWAY RECREATIONAL VEHICLE

CROSS-REFERENCE TO RELATED APPLICATIONS

This application is a continuation of U.S. patent application Ser. No. 17/945,687, titled "OFF-HIGHWAY RECREATIONAL VEHICLE", filed Sep. 15, 2022, which is a continuation of U.S. patent application Ser. No. 16/245,498, titled "OFF-HIGHWAY RECREATIONAL VEHICLE", filed Jan. 11, 2019, which claims priority and the benefit of U.S. provisional patent application 62/616,243, titled "OFF-HIGHWAY RECREATIONAL VEHICLE", FILED Jan. 11, 2018, the contents of which are incorporated by reference herein.

TECHNICAL FIELD

This invention relates generally to recreational vehicles, and in particular to side-by-side off-highway recreational vehicles.

BACKGROUND

Side-by-side recreational off-highway vehicles ("ROVs") are quite capable in a wide variety of riding environments and situations, whether for sport or utility purposes. The ability of the vehicles to carry multiple occupants in a side-by-side seating arrangement makes them socially enjoyable to ride as well. The vehicles can be easy to enter and exit and easy to operate with controls and ergonomics somewhat similar to automobiles. However, unlike most automobiles, ROVs can be driven on harsh off-road terrain. The extent to which such terrain can be accessed depends on multiple factors, including the vehicle width, suspension, turning radius, under-carriage clearance, wheelbase, center of gravity, and power. The arrangement of these aspects and their interrelations can be important in determining the occupant ride characteristics, reliability, ease of maintenance, and terrain and cargo capabilities of the ROV.

SUMMARY

In some embodiments, an off-road vehicle includes a frame, a plurality of body panels connected to the frame, a plurality of ground engaging members, a seating area including one or more seats, an engine located rearward of the one or more seats, and a continuously variable transmission (CVT) connected to communicate mechanical power from the engine to one or more of the ground engaging members. The off-road vehicle further includes a CVT cooling system having a CVT intake configured to provide airflow to the CVT, wherein the CVT intake is positioned between the frame and one of the plurality of body panels.

In some embodiments, an off-road vehicle includes a frame, a plurality of body panels connected to the frame, a plurality of ground engaging members, a seating area including one or more seats, an engine located rearward of the one or more seats, and a roll-over protection system (ROPS). The ROPS may include at least first and second forward side members, first and second rear side members, at least one forward cross member and at least one rear cross member. The first and second forward side members are connected to the frame by forward frame mounting brackets, and first and second rear side members are connected to the first and second forward side members on a first end and to the first and second forward side members on a first end and to the frame by rear frame mounting brackets on a second end. The rear frame mounting brackets are located laterally inward of the forward frame mounting brackets.

BRIEF DESCRIPTION OF THE DRAWINGS

FIG. 102 is a side view of left and right cab door panels according to some embodiments.

FIG. 108 is an exploded view illustrating the connection of headlights within the front fascia according to some embodiments.

FIG. 111 is a front view of the front fascia with headlight assemblies installed according to some embodiments.

DETAILED DESCRIPTION

Figure 1:
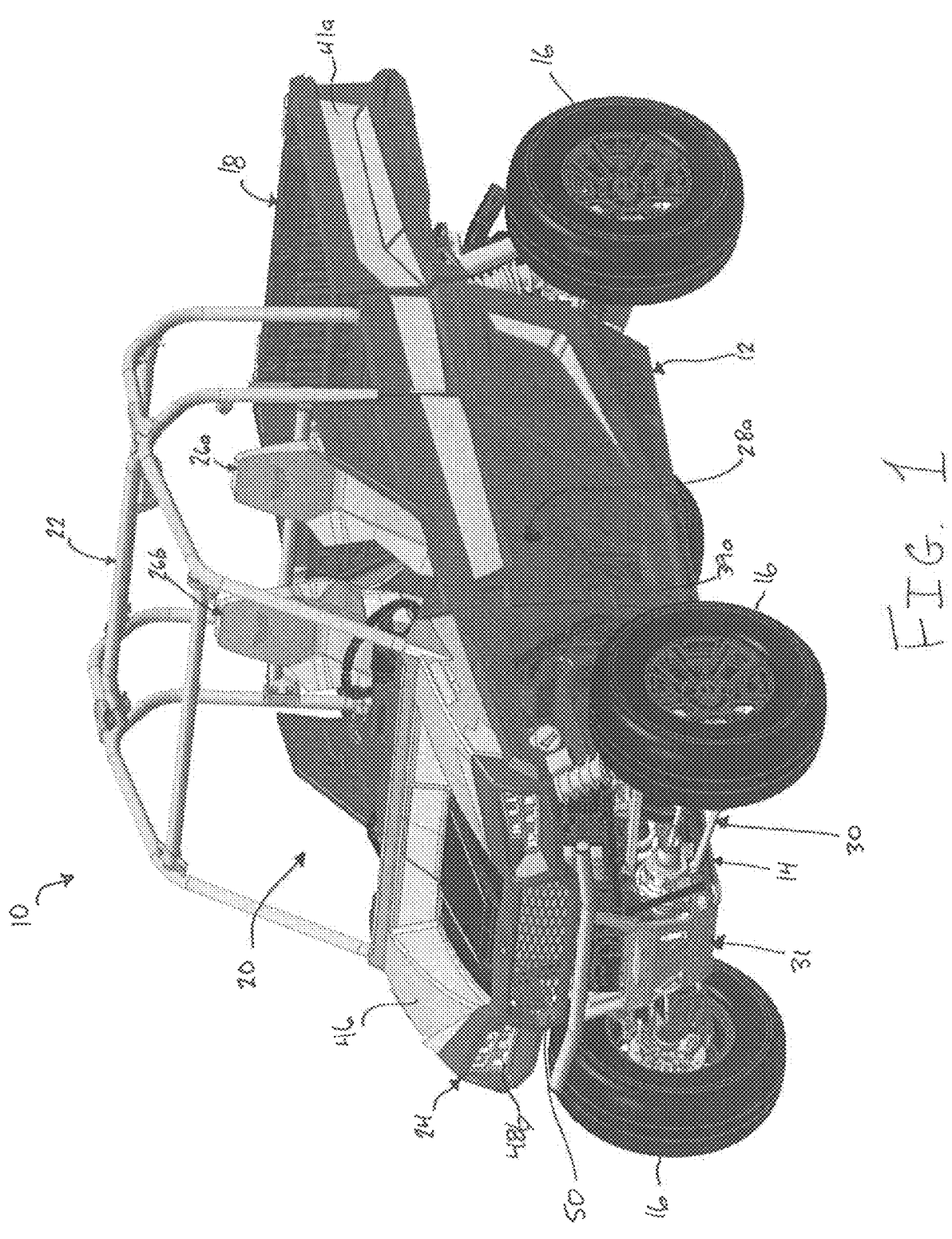
FIG. 1 is an orthogonal view of the utility vehicle according to some embodiments.
Figure 2:
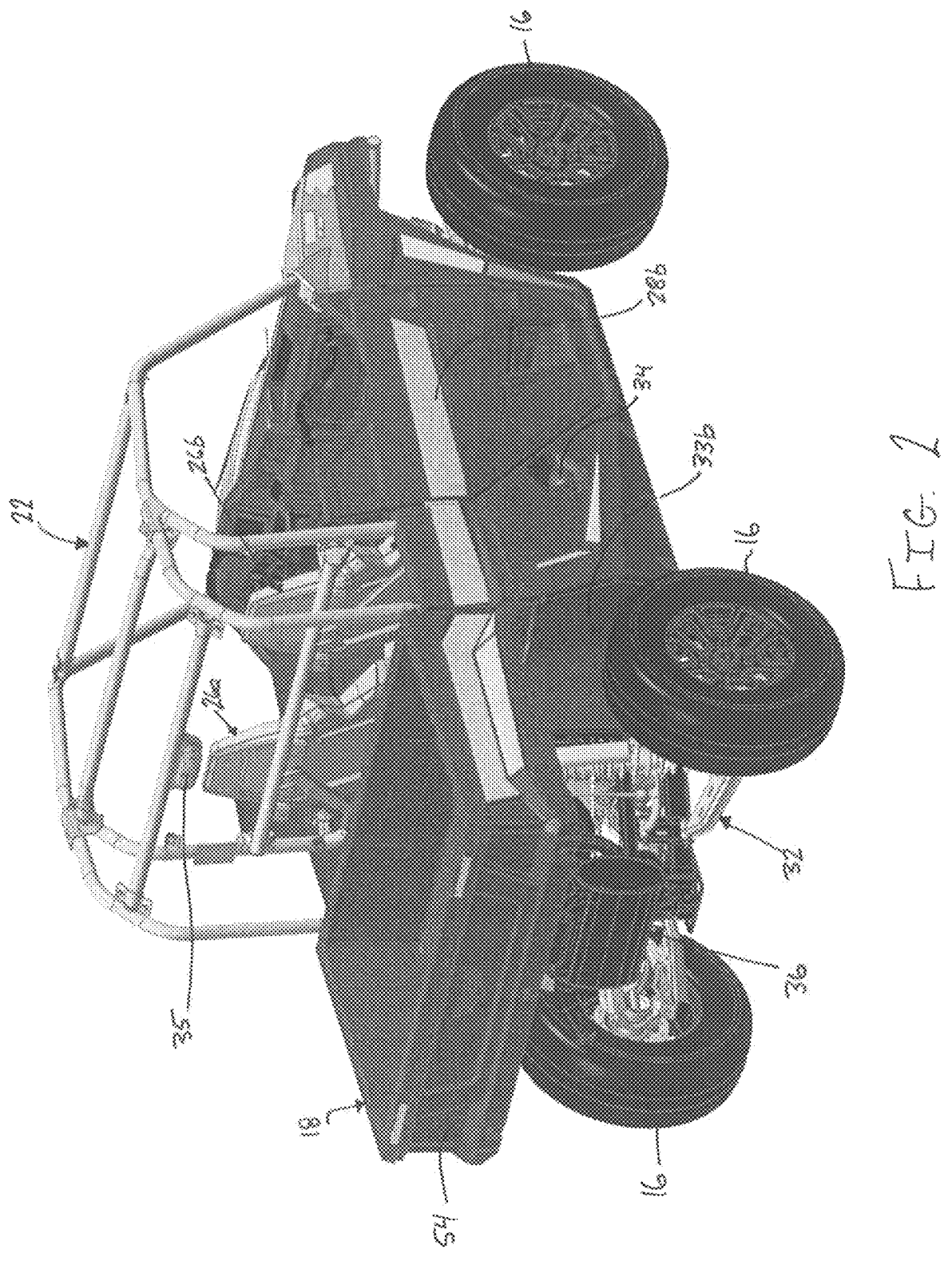
FIG. 2 is an orthogonal view of the utility vehicle according to some embodiments.
Figure 3:
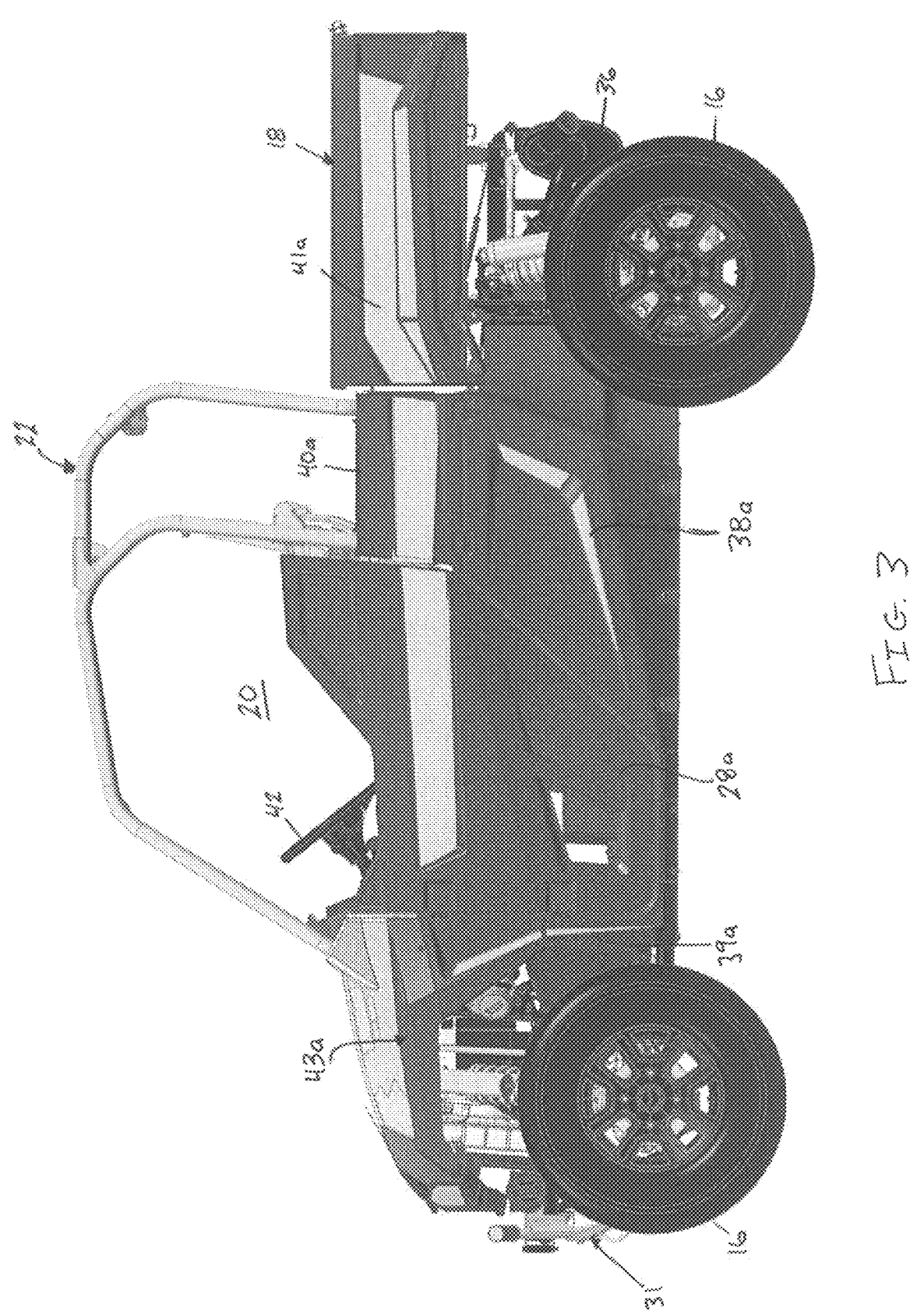
FIG. 3 is a side view of the utility vehicle according to some embodiments.
Figure 4:
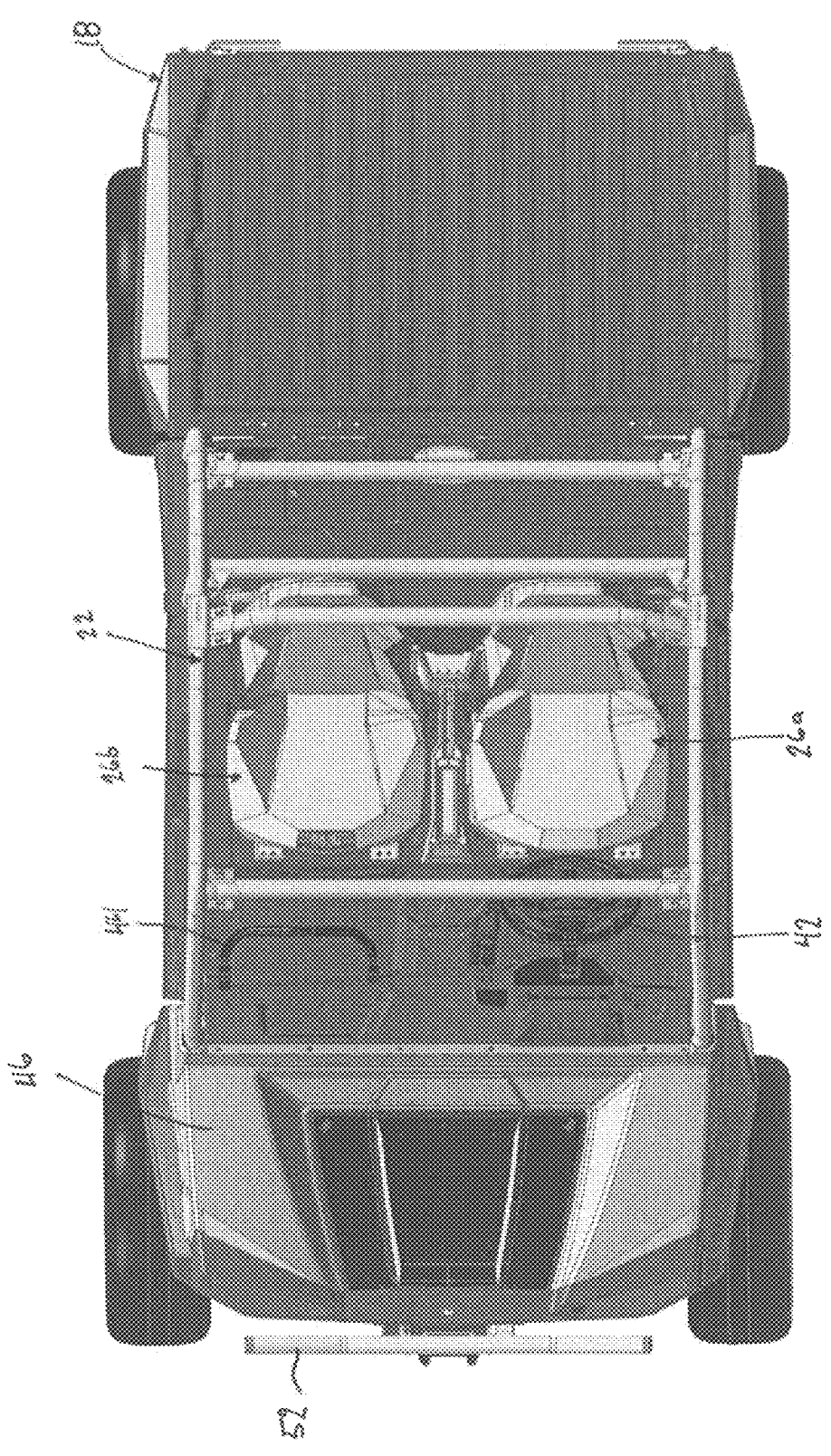
FIG. 4 is a top view of the utility vehicle according to some embodiments.
Figure 5:
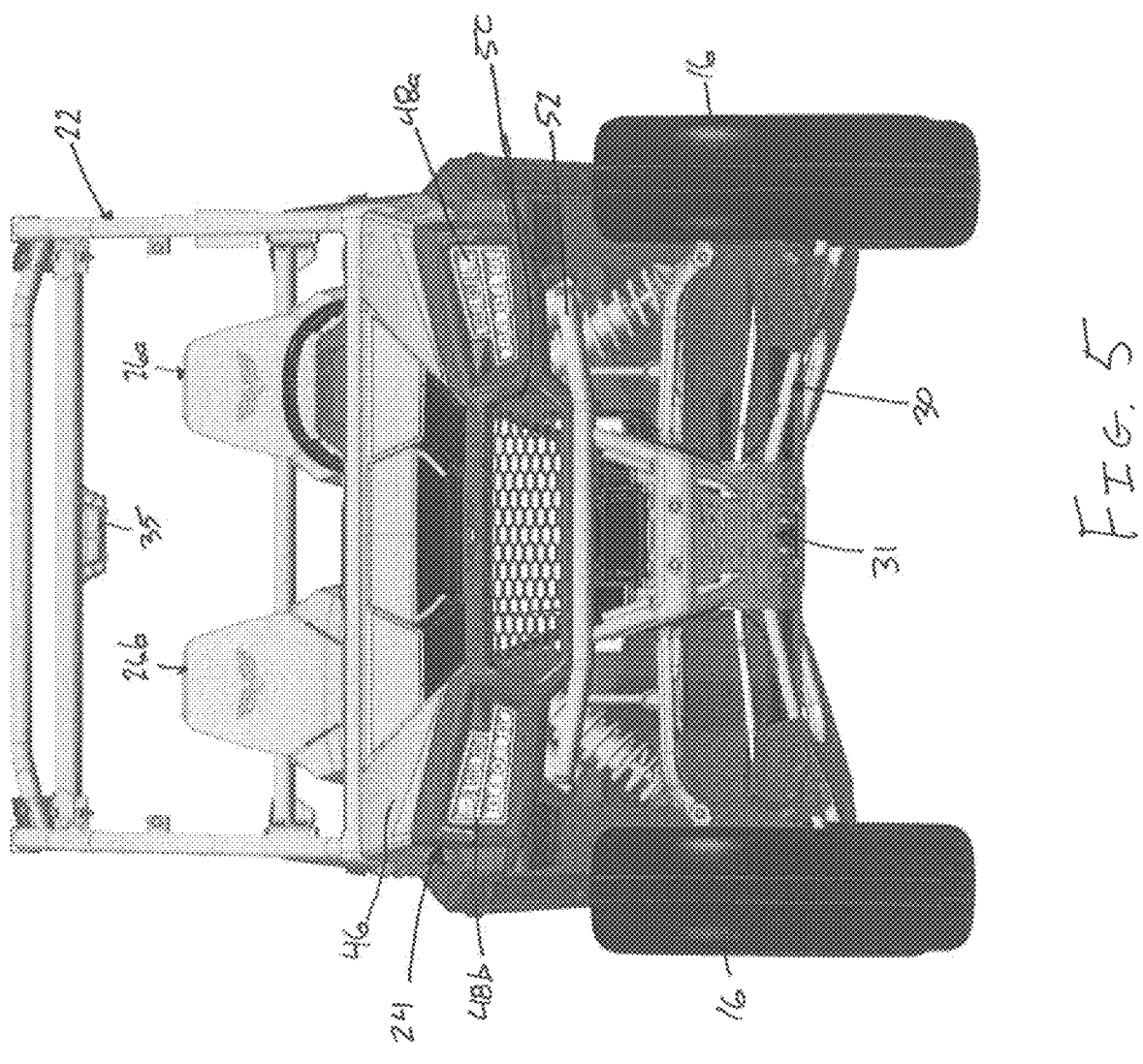
FIG. 5 is a front view of the utility vehicle according to some embodiments.
Figure 6:
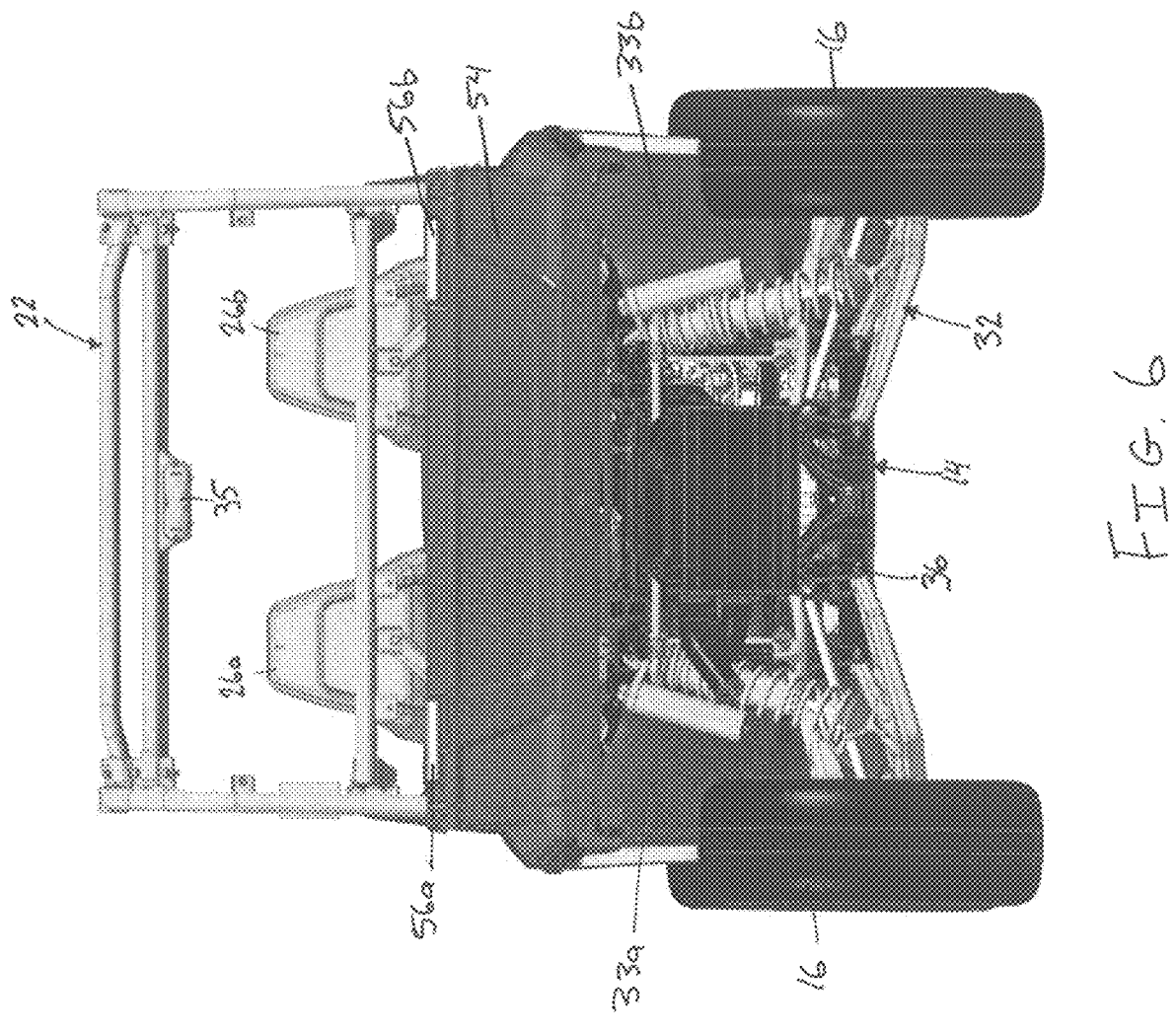
FIG. 6 is a back view of the utility vehicle according to some embodiments.
Figure 7:
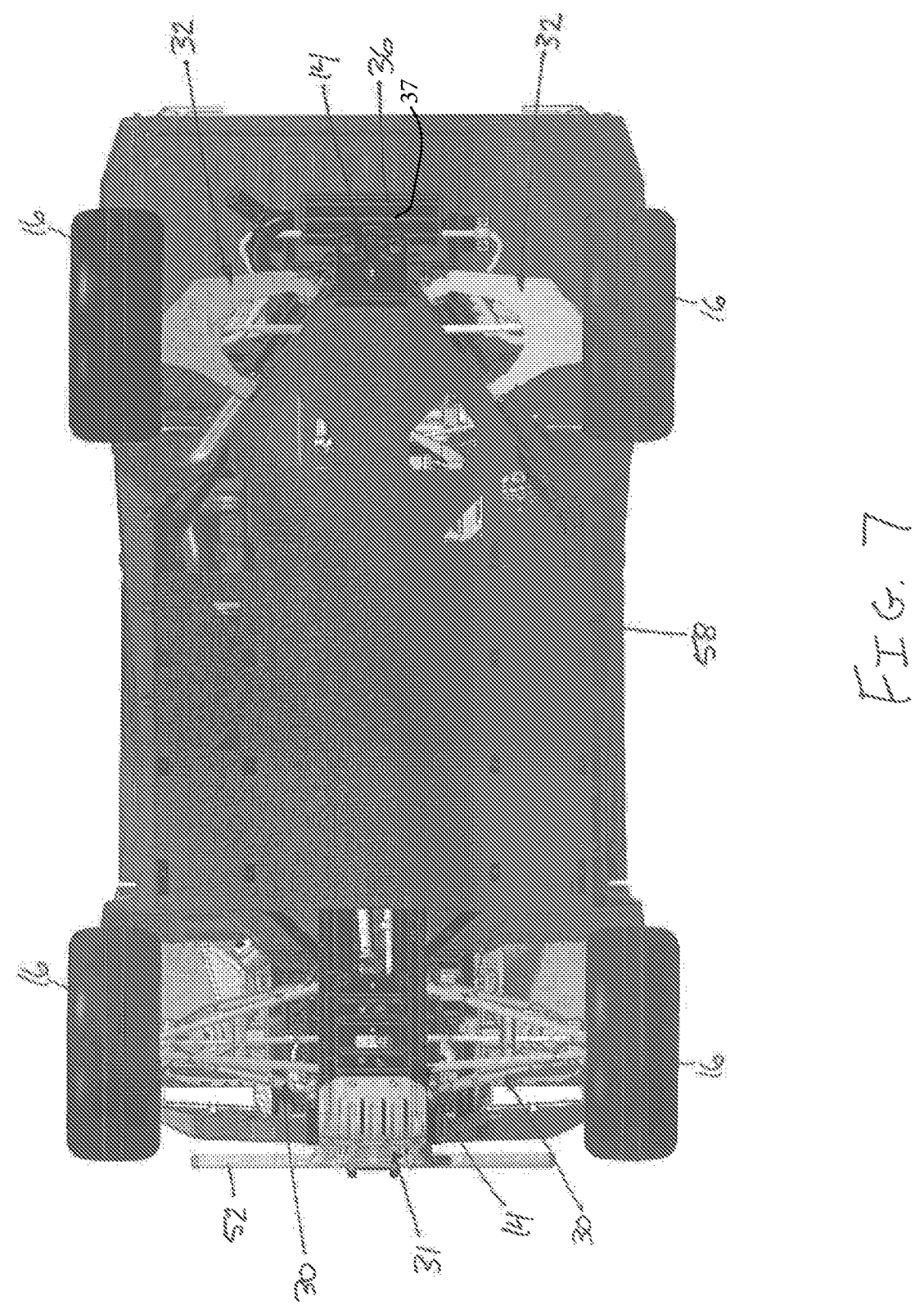
FIG. 7 is a bottom view of the utility vehicle according to some embodiments.

FIGS. 1-7 include perspective, side, top, front, back, and bottom views of the utility vehicle according to some embodiments. In particular, FIG. 1 is a front perspective view of the utility vehicle 10, FIG. 2 is a back perspective view of the utility vehicle 10, FIG. 3 is a right side view of utility vehicle 10, FIG. 4 is a top view of utility vehicle 10, FIG. 5 is a front view of utility vehicle 10, FIG. 6 is a back view of utility vehicle 10, and FIG. 7 is a bottom view of utility vehicle 10. Reference is made to FIGS. 1-7 in describing the various features visible in these views. Like reference numbers are used throughout. For those components that include an identical or nearly identical (e.g., mirrored) component located on both side of utility vehicle 10, the suffix 'a' is utilized for components located on the driver side and the suffix 'b' is utilized for components located on the passenger side.

As shown in FIGS. 1-7, utility vehicle 10 is comprises body 12, frame 14, ground-engaging members 16, cargo box 18, seating area 20, roll-over protection system (ROPS) 22, front fascia 24, bucket-type seats 26a and 26b, door panels 28a, 28b, front suspension 30, bumper assembly 31, rear suspension 32, rear wheel well panels 33a, 33b, gas cap 34, brake light 35, rear lower body panels 38a, 38b, front fenders 39a, 39b, extended cab door 40, cargo box side panel 41, steering wheel 42, fender flare 43, passenger bar 44, hood panel 46, headlights 48, grill 50, bumper bar 52, cargo box tailgate 54, tailgate handles 56a, 56b, and undercarriage guard 58.

As shown in FIGS. 1-7, utility vehicle 10 has body 12, frame 14, and a plurality of ground engaging members 16 (e.g., tires, tracks). In at least some embodiments, utility vehicle 10 includes a cargo carrying portion such as a cargo box 18. As shown in FIGS. 1-4, cargo box 18 is rearward of seating area 20. Body 12 is supported by frame 14, which includes a plurality of structural members (described in more detail with respect to FIGS. 28 and 31). Structural members comprising frame 14 may be tubular steel or aluminum, stamped sheet metal (e.g., steel, aluminum), hydroformed, cast, forged, or formed in any other suitable manner. The utility vehicle 10 may be 2-wheel or 4-wheel drive. Further, it can have any suitable drive system. In some embodiments, utility vehicle 10 is 4-wheel drive and includes a differential in both the front end and rear end as shown in FIGS. 35-48. The differentials can include optional locking differentials or they can be open differentials, which can be manually selectable by an operator or engaged automatically in response to terrain conditions (e.g., wheel slip). In some embodiments, the vehicle has a limited slip differential (e.g., clutch pack, Quaife, Torsen) or any other suitable configuration (e.g., spool).

In the embodiment shown in FIGS. 1-6 seating area 20 includes one or more seats 26a, 26b arranged in a side-by-side configuration. The seats 26a and 26b can include bench seating or bucket seating such as that illustrated in FIGS. 1-6. In other embodiments, however, seating area 20 may utilize a bench seat in a three-abreast configuration, or may be arranged in a 60/40 arrangement. Further, in some embodiments, one or more of the seat bottoms and/or seat backs is adjustable. In some embodiments, the driver's seat 26a is adjustable (e.g., forward and back) and one or more of the passenger seats 26*b* is not adjustable. In some embodiments, both the driver's seat 26*a* and passenger seat 26*b* are adjustable. In some embodiments, one or more of the seat bases (shown in FIGS. 67-73) are adjustable, for example vertically, horizontally, and/or laterally. In some embodiments one or more of the seat back (shown in FIGS. 67-73) are adjustable, for example vertically, horizontally, and/or laterally. In some embodiments, the seat bases are adjustable, in other embodiments the seat backs, and in other embodiments both the seat bases and the seat backs.

As shown in FIGS. 1 and 5, utility vehicle 10 includes front fascia 24, which includes headlights 48 and grill 50. In some embodiments, headlights 48 are comprised of a plurality of light-emitting diodes (LEDs). For example, in the embodiment shown in FIG. 5, each set of headlights 48 (i.e., right and left) include a top row comprised of a plurality of LEDs and a bottom row comprised of a plurality of LEDs. The plurality of LEDS utilized in headlights 48 may be separately controllable. For example, in some embodiments the top row of LEDs can be controlled to be ON while the bottom row of LEDs remains off, and vice versa. In addition to be selectively turned ON and OFF, in luminesce of the LEDs may vary depending on the application. For example one row of LEDs may include higher power LEDs utilized to provide high-intensity beams, while the other row of LEDs may include lower power LEDs utilized to provide low-intensity beams. As discussed in more detail with respect to FIGS. 102-110, accent lights may be provided around at least a portion of the headlights. In some embodiments, the accent lights are On only when the headlights are Off. Utility vehicle 10 may include a combination of fog lamps, hazard lights, high and low beam lights, light bars, integrated reflectors, etc., as desired. Any lights and reflectors can be placed in any suitable location, including on the front and rear of the utility vehicle 10.

Figure 104:
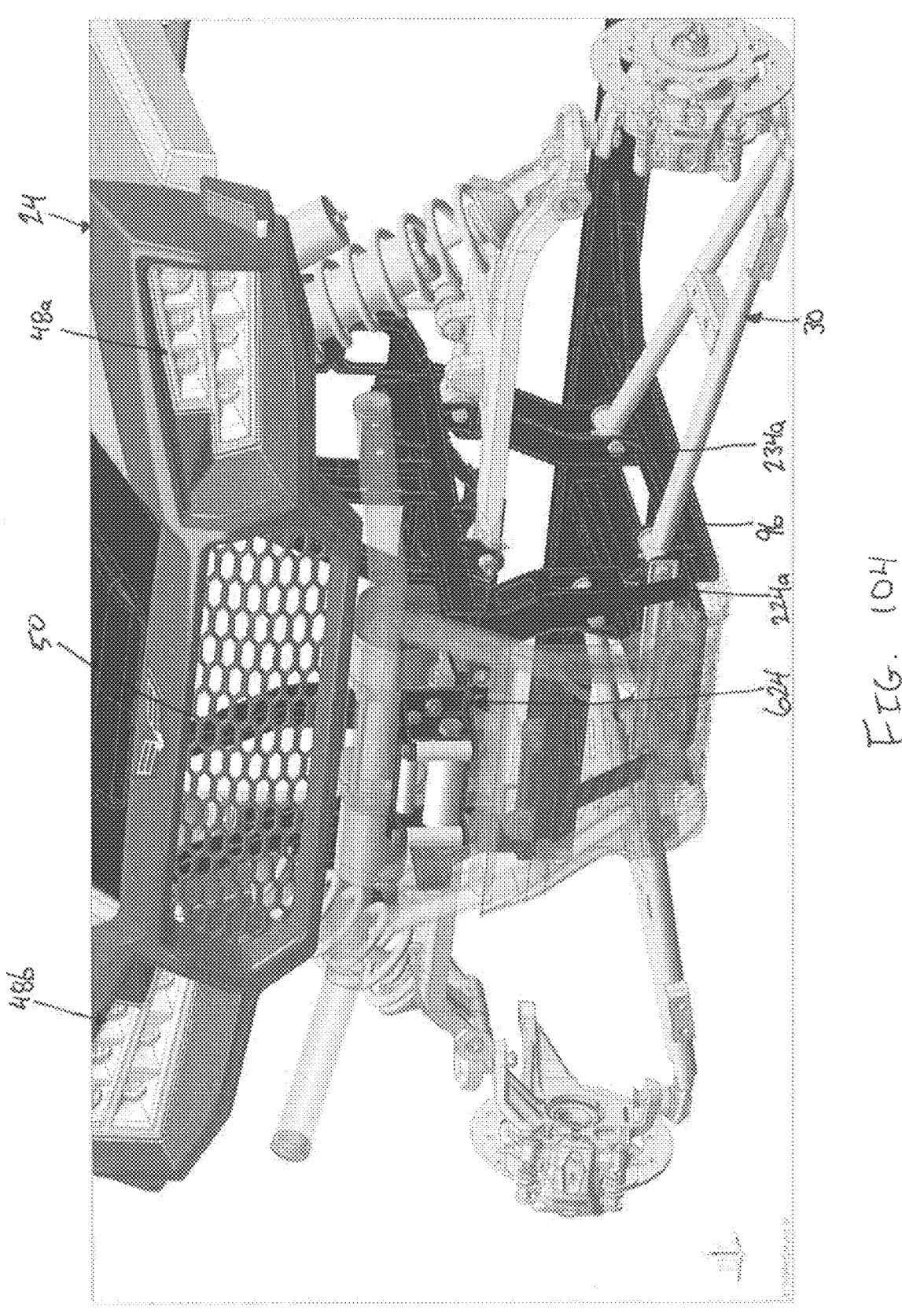
FIG. 104 is an orthogonal view of the front fascia and underlying front frame members according to some embodiments.
Figure 105:
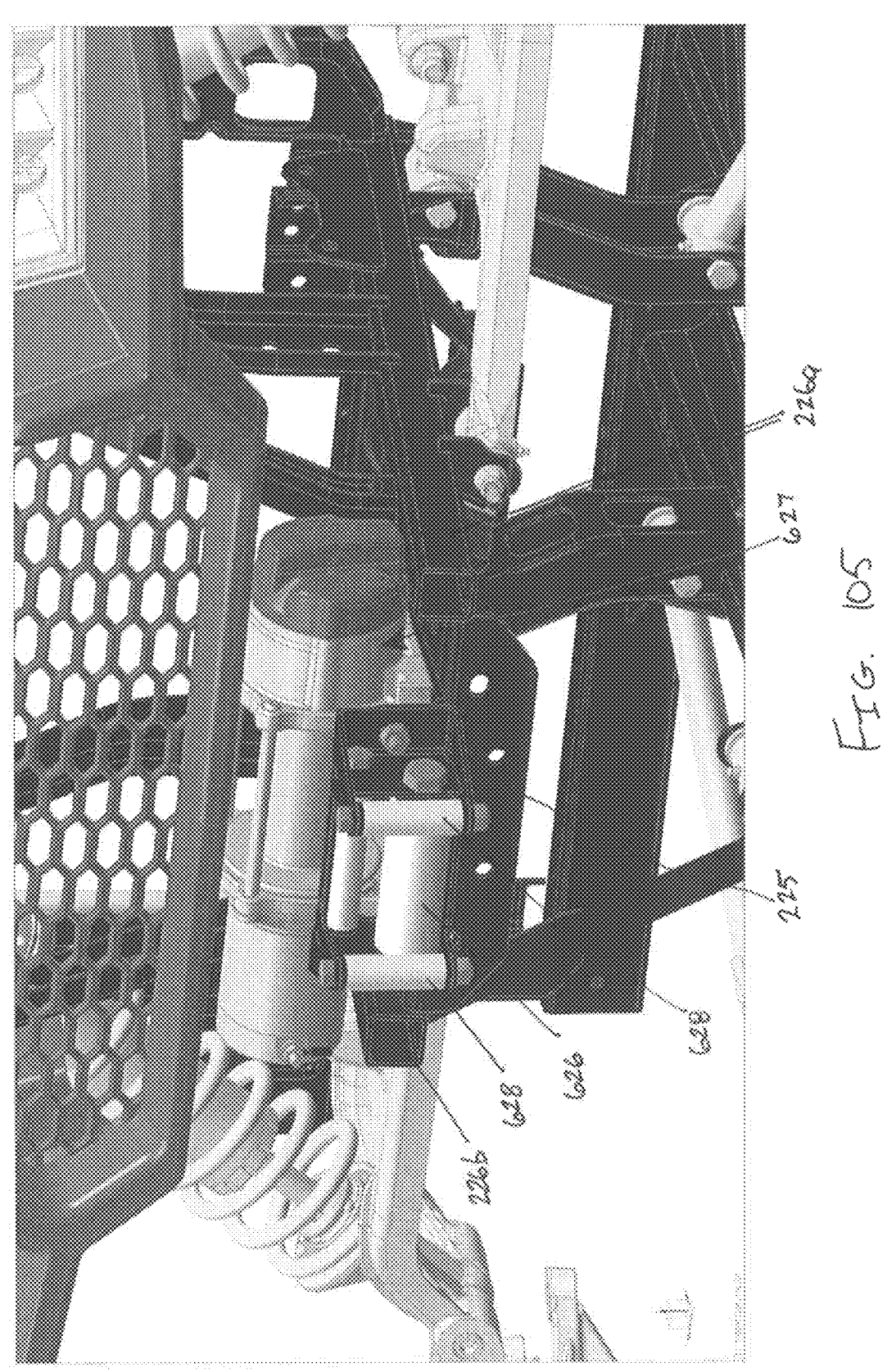
FIG. 105 is an orthogonal view of the winch assembly according to some embodiments.

Also shown in FIGS. 1 and 5 is bumper assembly 31, which includes bumper bar 52. Bumper assembly 31 is attached or otherwise affixed and supported by frame 14. Bumper assembly supports bumper bar 52, which as shown in FIG. 3 is positioned forward of front ground engaging members 16 and front fascia 24 in order to act as a guard/bumper to utility vehicle 10. In addition, as shown in FIGS. 104 and 105, a winch assembly may be located adjacent to bumper bar 52.

Seating area 20 is enclosed on the sides by panels such as door panels 28*a* and 28*b*, as well as roll-over protection system (ROPS) 22, which consists of a plurality of structural members (described in more detail with respect to FIGS. 15-27). Structural member comprising ROPS 22 may be tubular steel or aluminum, stamped sheet metal, hydroformed, cast, forged, or formed in any other suitable manner. As the name suggests, ROPS 22 is configured to protect occupants seated in seats 26*a* and 26*b* in the event utility vehicle 10 rolls over. In addition, in some embodiments at least a portion of ROPS 22 extends rearward of seats 26*a* and 26*b* to provide roll-over protection for occupants seated rearward of seats 26*a* and 26*b*. As shown in FIG. 3, seating area 20 also includes a steering wheel 42 positioned forward of seat 26*a*, and as shown in FIG. 4, seating area 20 includes passenger bar 44 positioned forward of seat 26*b*. Passenger bar 44 is connected to frame 14 to provide passenger with a stable structural member to hold onto.

As shown in FIGS. 1 and 6, cargo box 18 is located rearward of seats 26*a* and 26*b*, and includes a tailgate 54 and tailgate handles 56*a*, 56*b* that allow tailgate 54 to be opened. In one embodiment, a pair of handles 56*a* and 56*b* are located on opposite ends of tailgate 54, wherein both handles are required to be operated to allow tailgate 54 to be opened. In other embodiments, a single handle 56 may be utilized and operated to open tailgate 54. As described in more detail with respect to FIGS. 80-94, in at least some embodiments, cargo box 18 is capable of being pivoted to tilt cargo box 18 toward the rear of the vehicle. As shown FIG. 3, in some embodiments, cargo box 18 is positioned above rear frame components to provide sufficient room for cargo box 18 to be tilted downward.

As shown in FIGS. 1-6, the body 12 of utility vehicle 10 includes a plurality of panels, including door panel 28*a*, 28*b*, rear wheel well 33*a*, 33*b*, rear lower body panel 38*a*, 38*b*, front fender 39*a*, 39*b*, extended cab doors 40*a*, 40*b*, fender flare 43*a*, 43*b*, cargo box side panel 41*a*, 41*b*, and hood panel 46. Panels may be high-strength steel, aluminum, composite, plastic, or any other suitable material. In some embodiment, utility vehicle 10 has one or more (e.g., one on each side) door panels 28*a*, 28*b*. The doors can be of any desirable configuration. In some embodiments, one or more of the doors extends upwardly approximately equal to or above the height of the seats 26*a* and 26*b*. In some embodiments, door panels 28*a* and 28*b* include hinges located on the forward portion of the door to allow opening of the doors. In other embodiments, hinges may be located on the rearward portion of the door. Rear lower body panel 38*b* located on the passenger side (e.g., right side of utility vehicle 10) includes an aperture formed to allow access to gas cap 34.

FIG. 7 is a bottom view of utility vehicle 10 that illustrates undercarriage guard 58 positioned to provide protection to components of utility vehicle 10 from various objects (e.g., rocks, stumps, etc.). Undercarriage guard may be made of any suitable material, such as high-strength steel, aluminum, composite, plastic, etc.

FIGS. 8-14 include perspective, side, top, front, back, and bottom views of the utility vehicle, with body components removed to illustrate various components of the utility vehicle according to some embodiments. The frame 14 of utility vehicle 10 is comprised of a plurality of structural members. For ease of discussion, frame 14 is sub-divided into three sub-frame components, dashboard frame 65, seat frame 68, front frame 74, middle frame 75, and rear frame 77.

Figure 8:
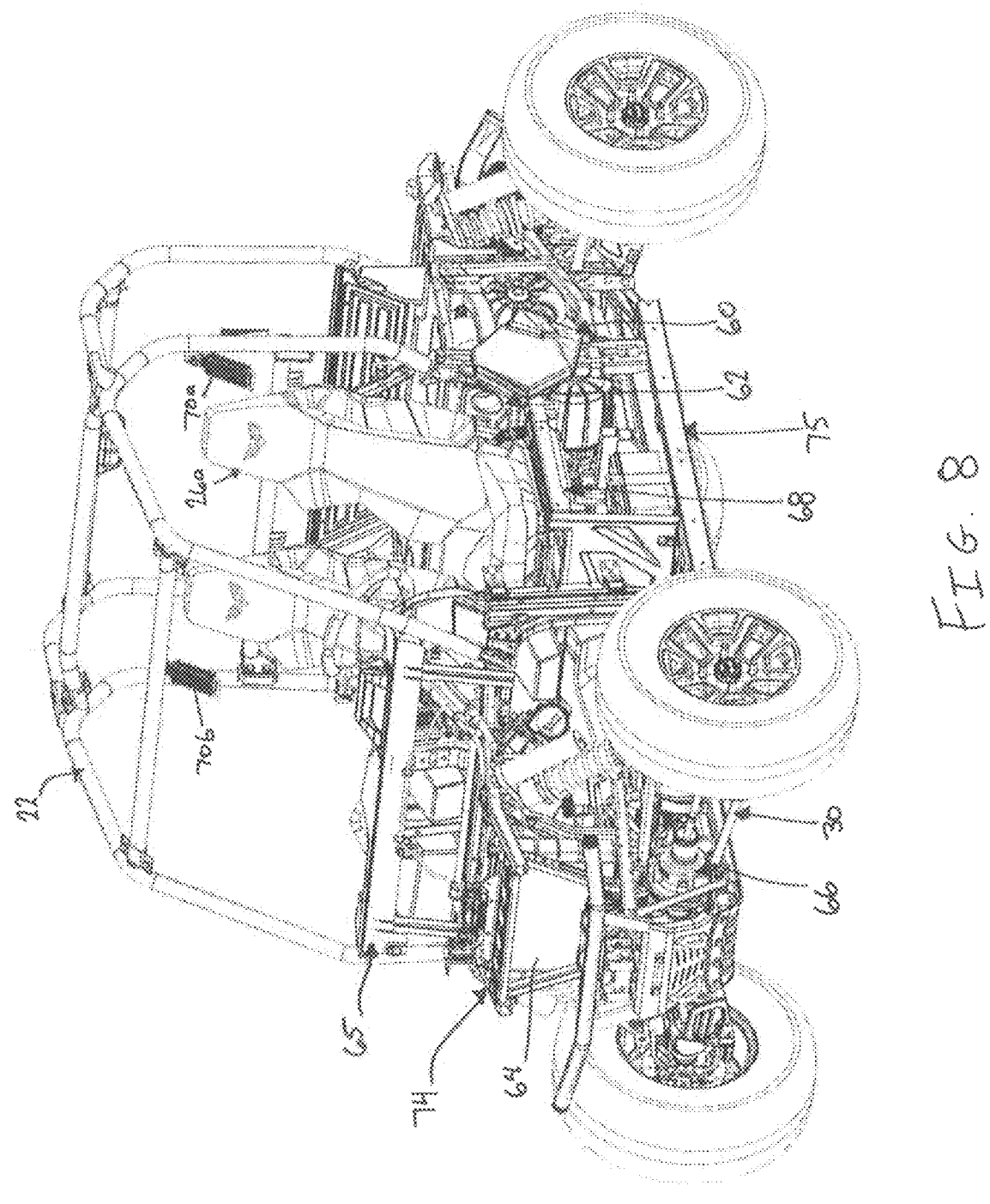
FIG. 8 is an orthogonal view of the utility vehicle, with body components removed to illustrate the frame of the utility vehicle according to some embodiments.
Figure 10:
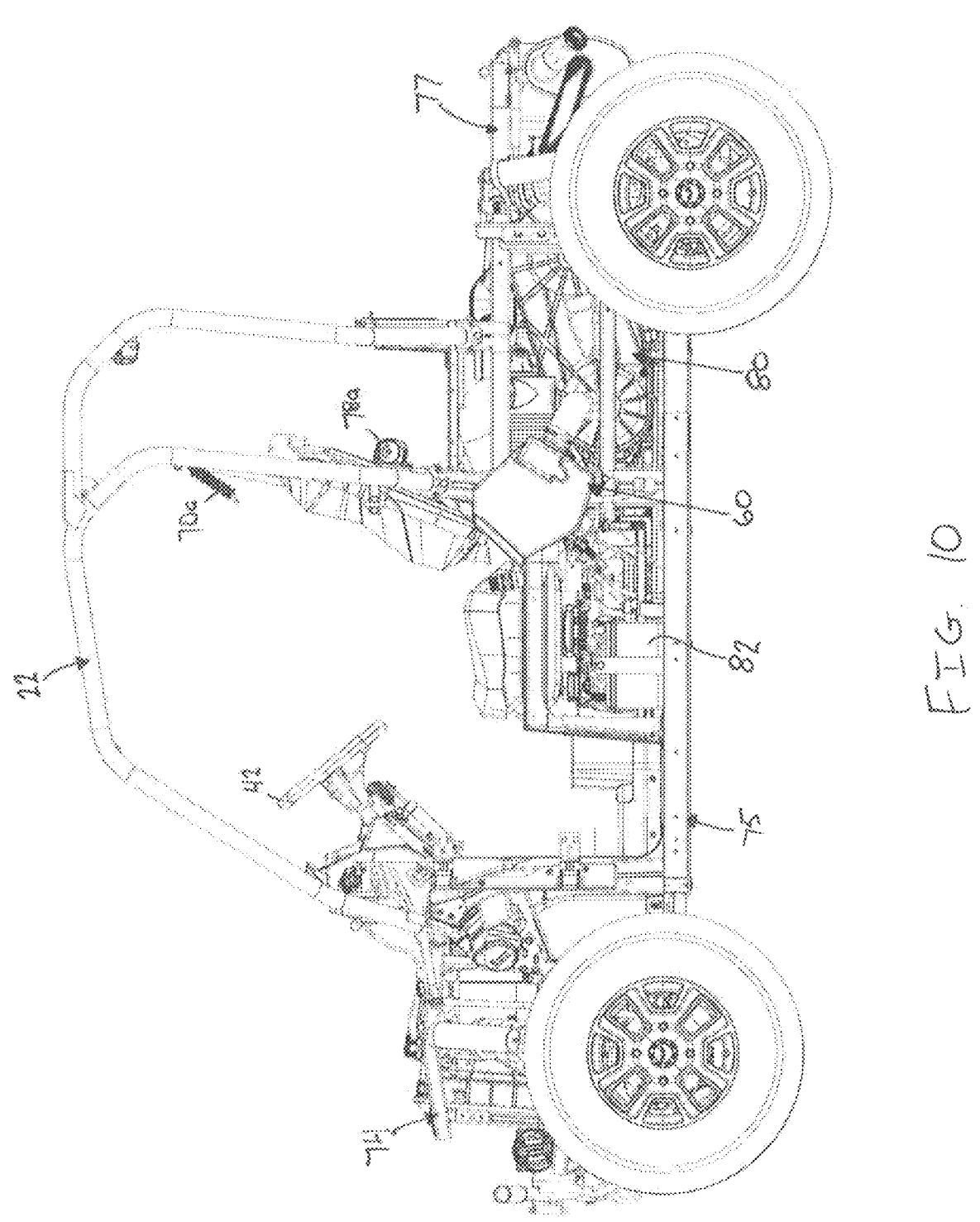
FIG. 10 is a side view of the utility vehicle, with body components removed to illustrate the frame of the utility vehicle according to some embodiments.
Figure 11:
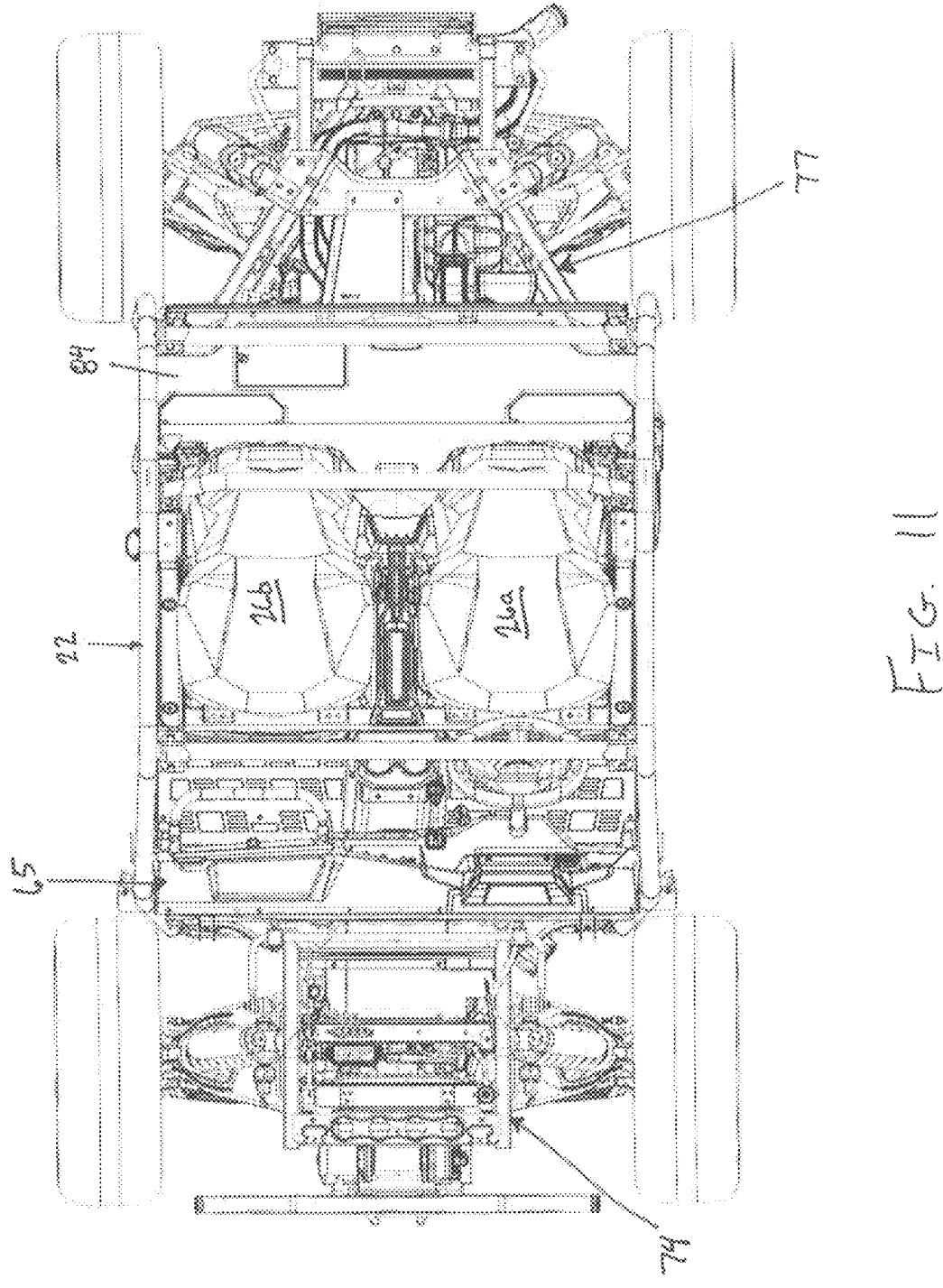
FIG. 11 is a top view of the utility vehicle, with body components removed to illustrate the frame of the utility vehicle according to some embodiments.
Figure 12:
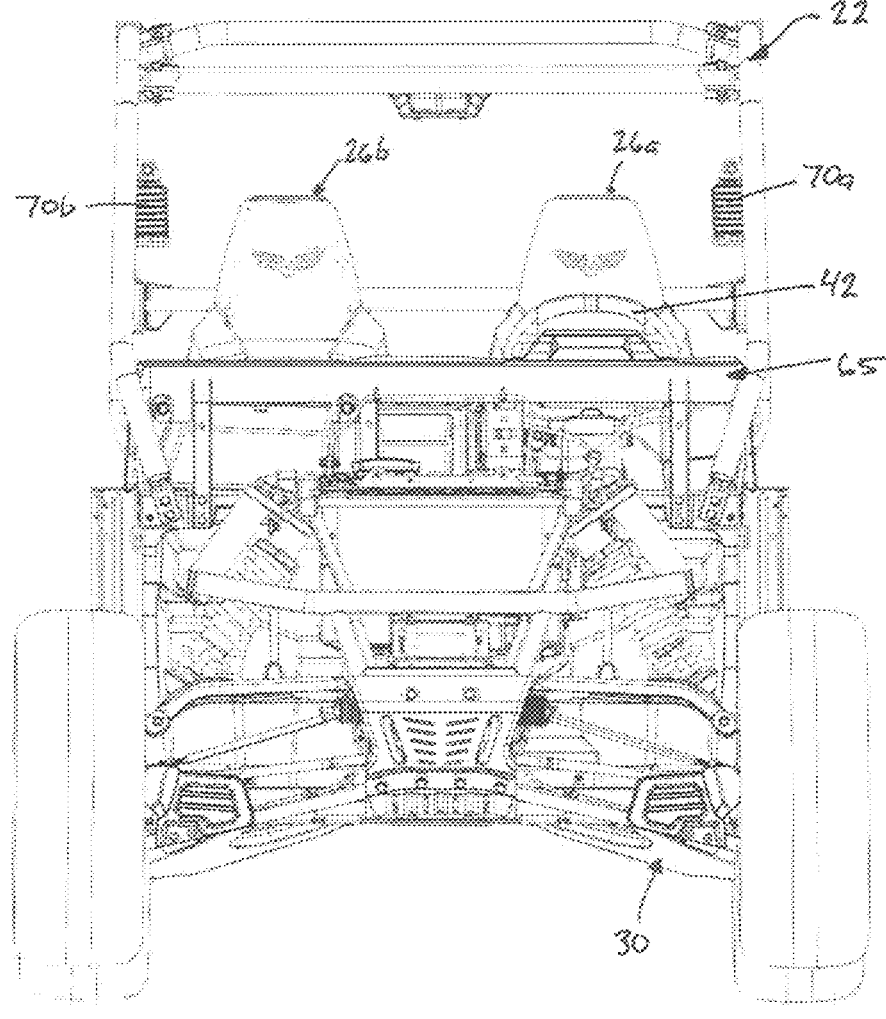
FIG. 12 is a front view of the utility vehicle, with body components removed to illustrate the frame of the utility vehicle according to some embodiments.
Figure 13:
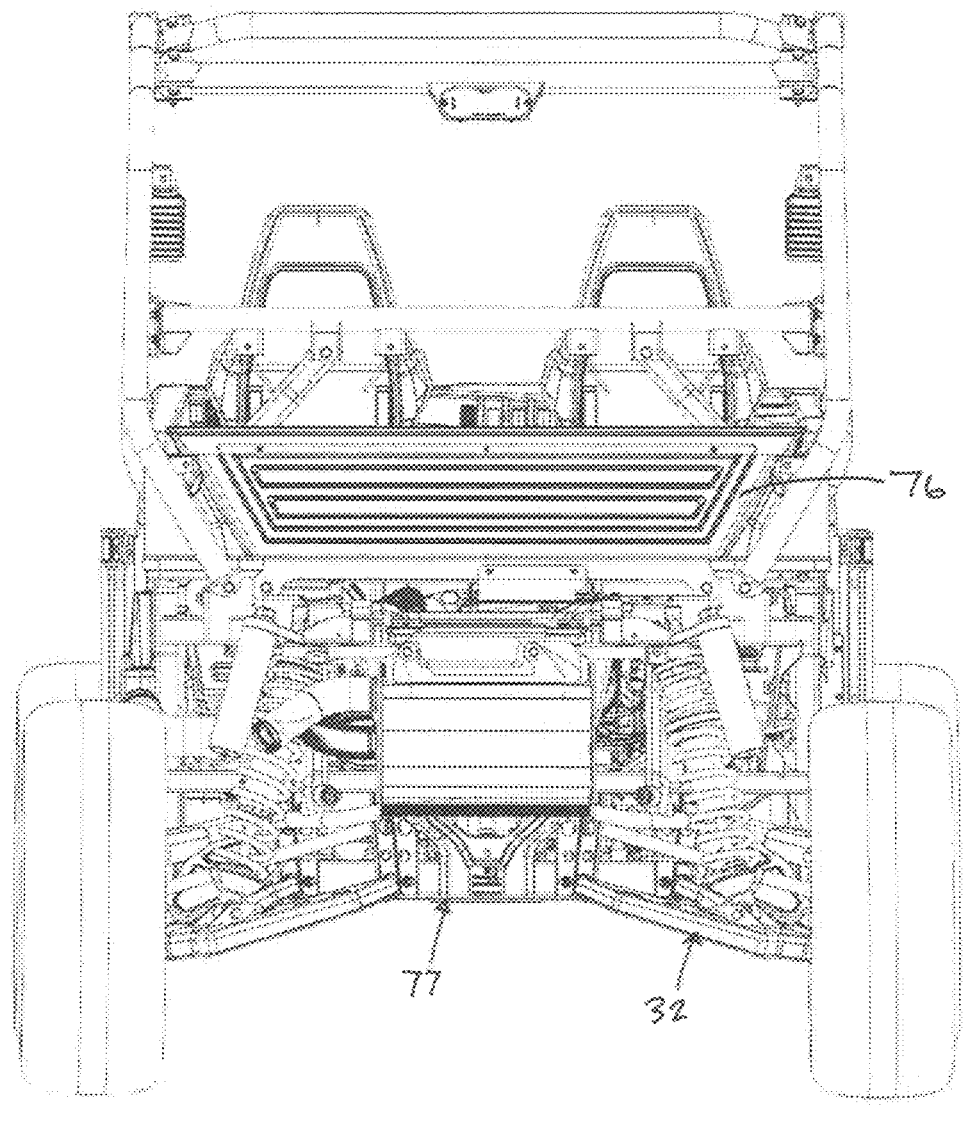
FIG. 13 is a back view of the utility vehicle, with body components removed to illustrate the frame of the utility vehicle according to some embodiments.

With respect to FIG. 8, continuously variable transmission (CVT) intake 60, air filter access panel 62, radiator 64, dashboard frame 65, front drivetrain 66, seat frame 68 and shoulder seat belts 70 are visible. As shown in FIGS. 8 and 10, the continuously variable transmission (CVT) 80 (not shown here) is air-cooled utilizing air provided by CVT intake 60, located in some embodiments on the driver side within the seating area 20. In this way, air provided to CVT 80 is drawn from within the seating area 20. A benefit of this approach is this reduces water, dirt and other particles from being provided into CVT 80. Engine air filter access panel 62 is similarly located within the seating area 20, rearward of driver seat 26*a* in the embodiment shown in FIG. 8.

Figure 9:
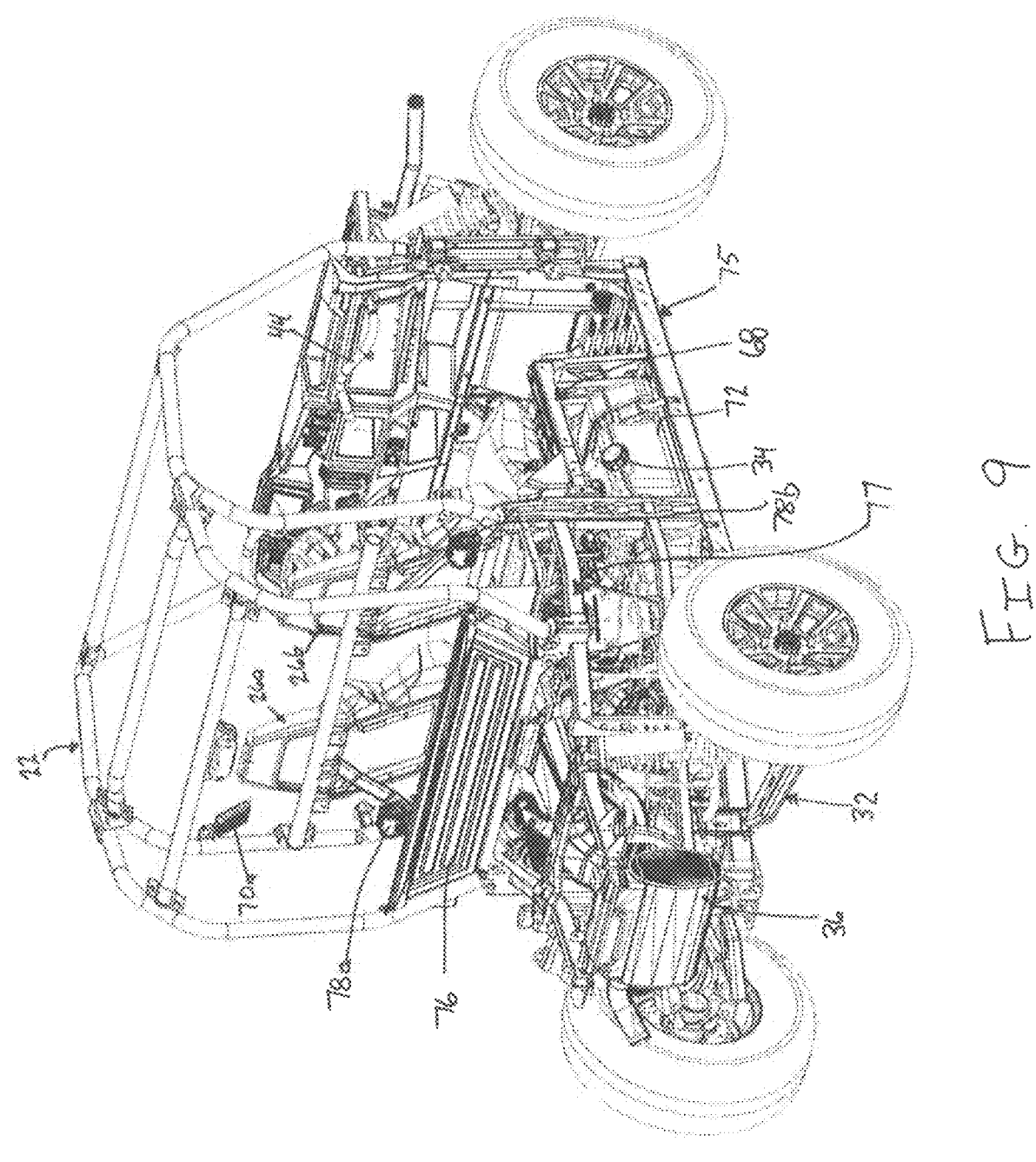
FIG. 9 is an orthogonal view of the utility vehicle, with body components removed to illustrate the frame of the utility vehicle according to some embodiments.

As shown in FIG. 9, gas tank 72, rear closeout panel 76, and seat belt retractor 78 are visible. Although not readily visible in this view, the engine/prime mover is located rearward of the seats 26*a* and 26*b*, supported by frame members. Exhaust system 36 includes a muffler and is located rearward of the engine/prime mover, and supported by frame 14. Gas tank 72 is located on the passenger side, located under seat frame 68 and supported by frame 14. Gas cap 34 is located on the top of gas tank 72 and is accessible via an aperture in the rear body panel (shown in FIG. 2).

Battery 82 is positioned on the driver side, below seat 26*a* (opposite the location of gas tank 72), and secured to frame 14.

As shown in FIG. 8, seats 26*a* and 26*b* are supported by seat frame 68, which in turn is affixed to frame 14. As discussed in more detail below, in some embodiments, seat belt retractors 78 are positioned on both the driver side and the passenger sides. In one embodiment, seat belt retractors 78 are located behind the respective seats 26*a*, 26*b*, and are affixed to the ROPS 22. Seat belt retractors 78 may be affixed to the ROPS 22 via one or more fasteners and/or weldment.

Figure 14:
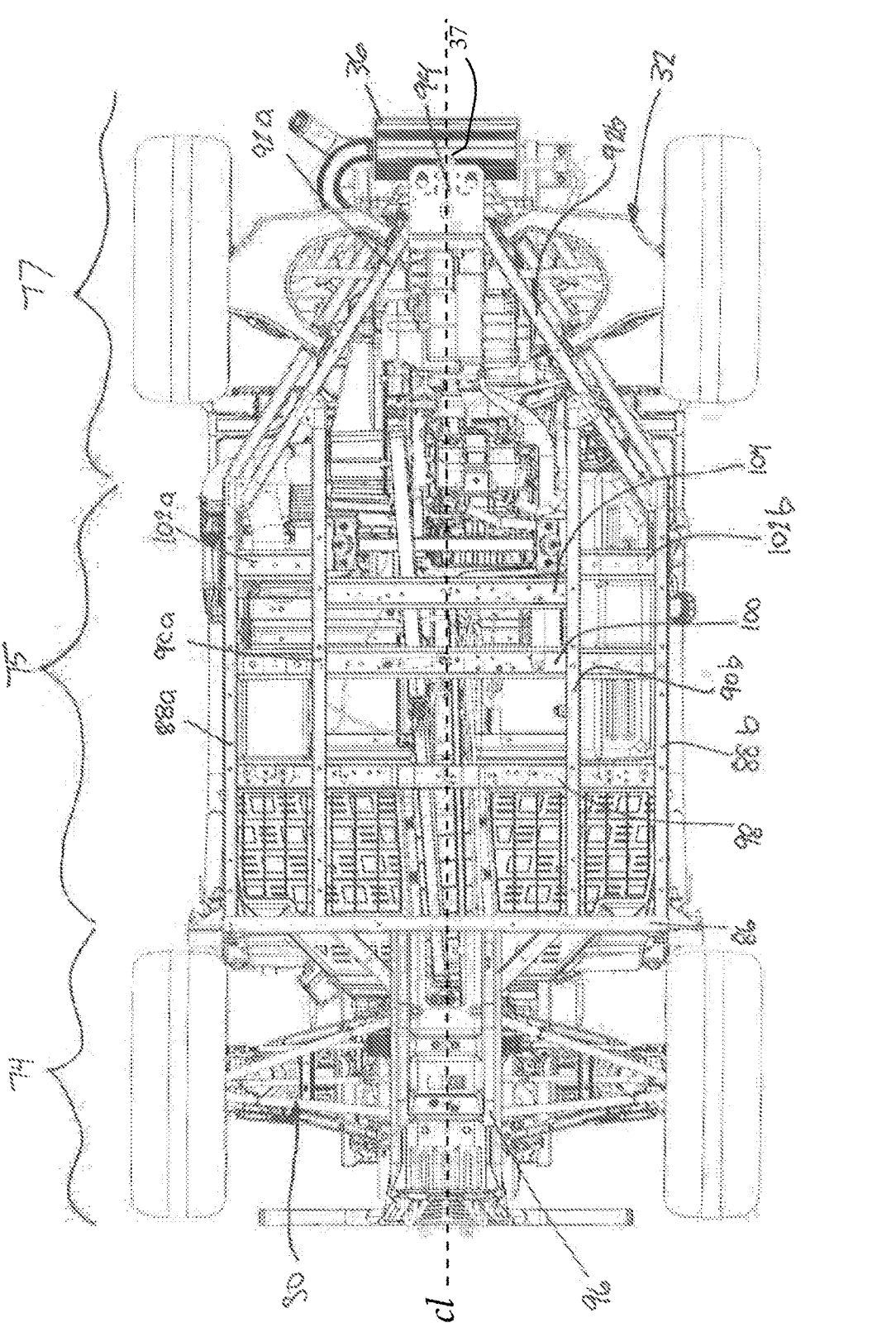
FIG. 14 is a bottom view of the utility vehicle, with body components removed to illustrate the frame of the utility vehicle according to some embodiments.

According to the embodiment shown in FIG. 14, a plurality of frame elements located on the bottom of utility vehicle 10 are visible, including a plurality of frame members extending horizontally in both a lateral (left to right) and longitudinal (front to back) directions. Frame elements visible in this view include forward lateral frame member 86, outer longitudinal frame members 88*a*, 88*b*, inner longitudinal frame members 90*a*, 90*b*, rear angled frame members 92*a*, 92*b*, rear bracket 94, forward bracket member 96, first middle lateral member 98, second middle lateral member 100, and rear lateral member 104. Forward bracket member 96 is coupled/affixed to forward lateral frame member 86, and may be affixed via one or more fasteners and/or weldments. In addition, in some embodiments one or more angled support members 97*a*, 97*b* may be connected between forward bracket member 96 and forward lateral frame member 86.

Figure 32:
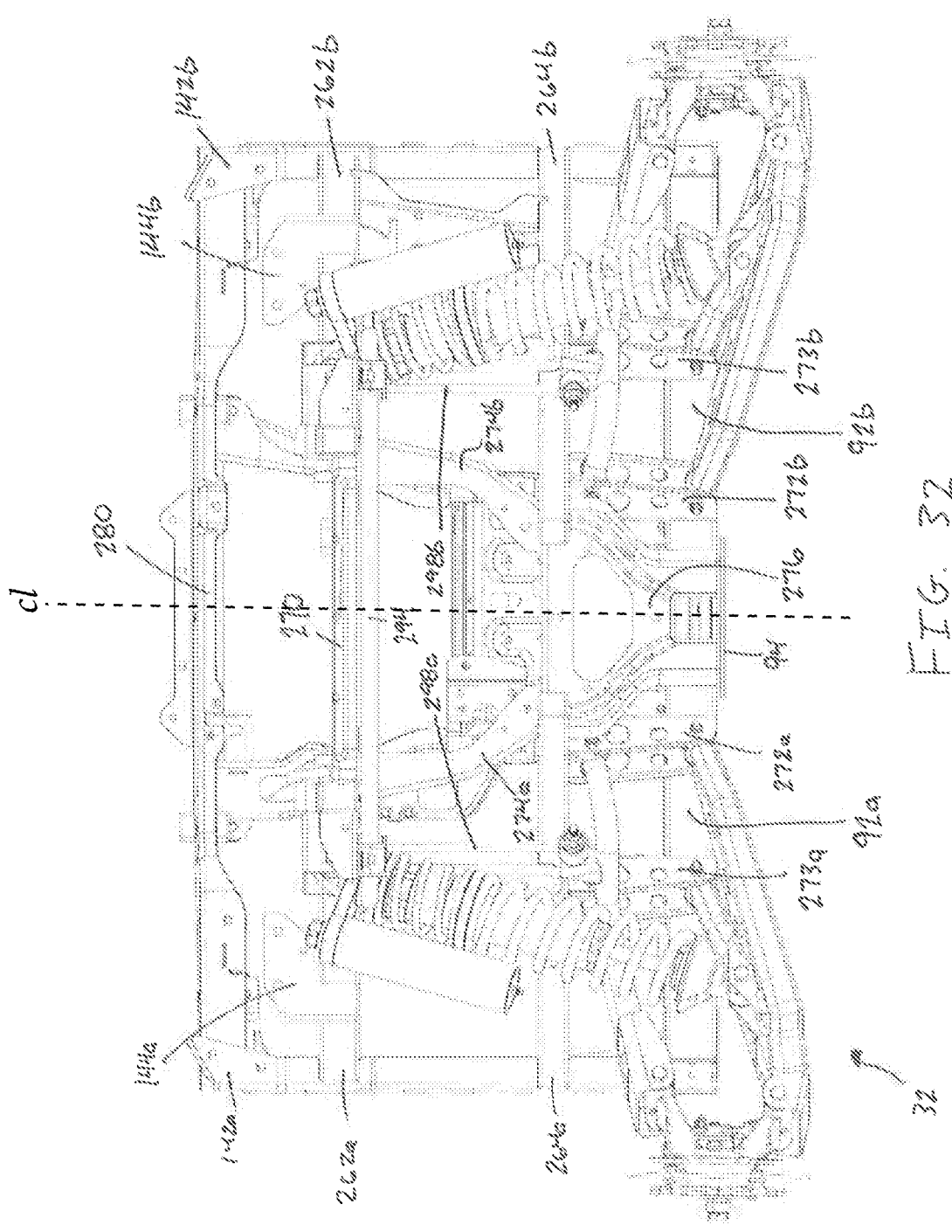
FIG. 32 is a rear view of the rear suspension and frame according to some embodiments.

In the embodiment shown in FIG. 14, outer longitudinal frame members 88*a*, 88*b* (located on both the driver and passenger side) and inner longitudinal frame members 90*a*, 90*b* extend longitudinally from forward lateral frame member 86. In some embodiments, outer longitudinal frame members 88*a*, 88*b* and inner longitudinal frame members 90*a*, 90*b* extend parallel to one another. In some embodiments, outer longitudinal frame members 88*a*, 88*b* include a bend or angled portion that directs the outer frame member 88 in a direction toward a centerline axis (e.g., "cl," illustrated in FIGS. 32 and 34). In other embodiments, the rear angled frame members 92*a*, 92*b* extend in an angled direction toward a centerline axis (e.g., "cl," illustrated in FIGS. 32 and 34) from the outer longitudinal frame members 88*a*, 88*b*. In some embodiments, outer longitudinal frame members 88*a*, 88*b* and inner longitudinal frame members 90*a*, 90*b* are attached to forward lateral frame member 86 via one or more fasteners and/or weldments. Similarly, outer longitudinal frame members 88*a*, 88*b* are attached to rear angled frame members 92*a*, 92*b*, respectively, via one or more fasteners and/or weldments. For example, in one embodiment a bracket is utilized to connect outer longitudinal frame member 88*a* to angled frame member 92*a*. In addition, in some embodiments, inner longitudinal frame members 90*a*, 90*b* are coupled to rear angled support members 92*a*, 92*b*, respectively. In the embodiment shown in FIG. 14, inner longitudinal frame members 90*a*, 90*b* are coupled to rear angled support members at a middle portion of rear angled support members 92*a*, 92*b*. In some embodiments, inner longitudinal frame members 90*a*, 90*b* are coupled to rear angled frame members 92*a*, 92*b* at a location closer to the connection of outer longitudinal f members 88*a*, 88*b*. In other embodiments, inner longitudinal frame members 90*a*, 90*b* are coupled to rear angled frame members 92*a*, 92*b* at a location closer to the connection of rear bracket 94. Coupling of inner longitudinal frame members 90*a*, 90*b* to rear angled frame members 92*a*, 92*b*, respectively, may be via fastener and/or weldments. For example, in the embodiment shown in FIG. 14, a bracket and fasteners are utilized to couple inner longitudinal frame members 90*a*, 90*b* to rear angled frame members 92*a*, 92*b*. In some embodiments, rear angled frame members 92*a*, 92*b* are coupled to rear bracket 94. In some embodiments, rear bracket 94 is configured to include a receiver hitch assembly 37. The receiver hitch assembly can be sized for any suitably sized ball mount (also not shown), for example using a 2" receiver or 1¼" receiver. The receiver hitch assembly 37 may further include a hitch plate which can include one or more rear suspension attachments.

In some embodiments, such as that shown in FIG. 8, front frame 74 provides support for components located forward of the seating area 20, including front suspension 30, radiator 64, and front drivetrain 66, among others. Radiator 64 is located above drivetrain 66, and positioned behind grill 50 (shown in FIG. 5) to utilize airflow provided by the movement of utility vehicle 10 to remove heat from the coolant supplied to the engine (not shown). In some embodiments, front drivetrain 66 is configured to receive mechanical power from the engine, which is distributed by front drivetrain 66 to the forward ground engaging members 16. Front suspension 30 couples the ground engaging members 16 to frame 14 in the front of the utility vehicle 10.

Figure 28:
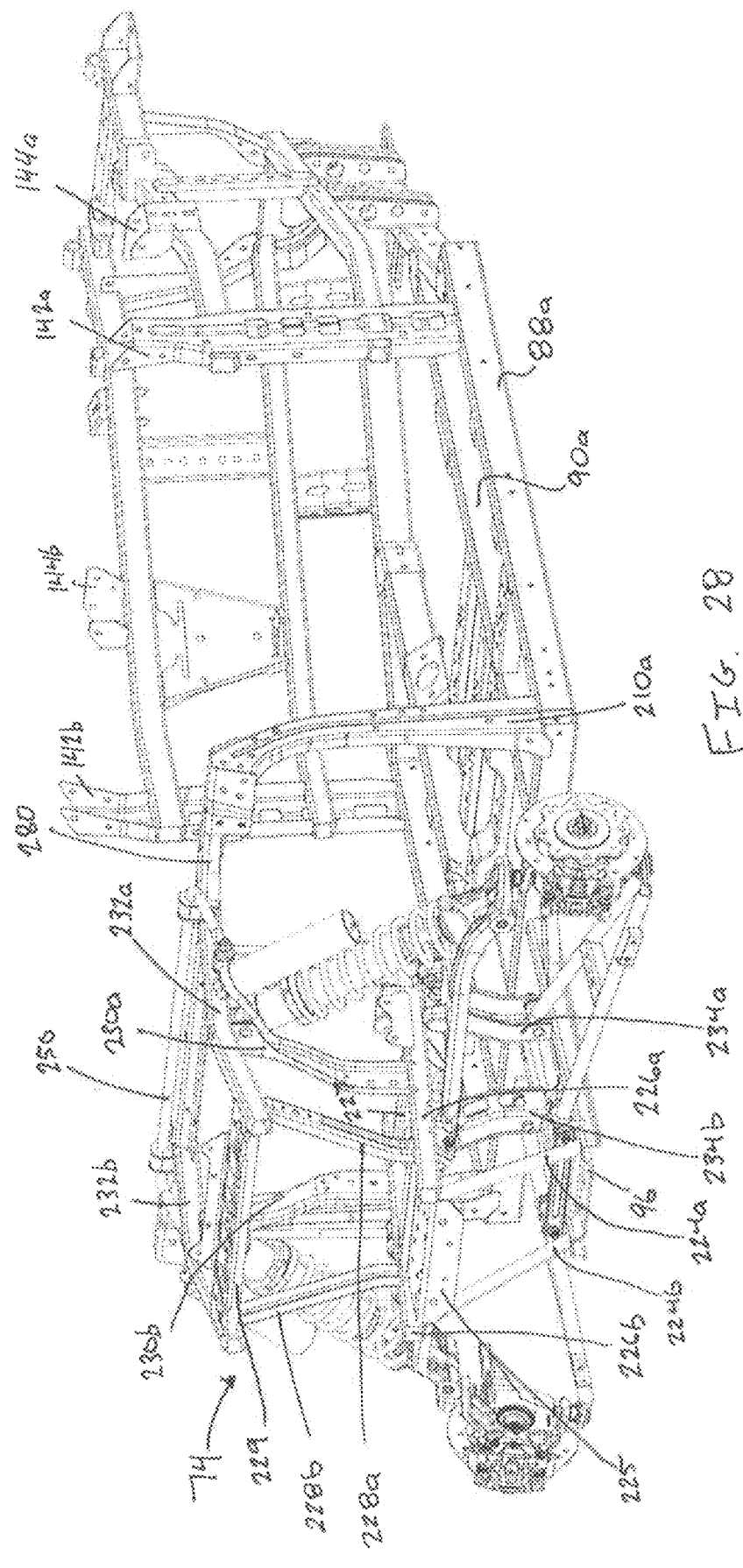
FIG. 28 is a front orthogonal view of the frame of the utility vehicle according to some embodiments.
Figure 31:
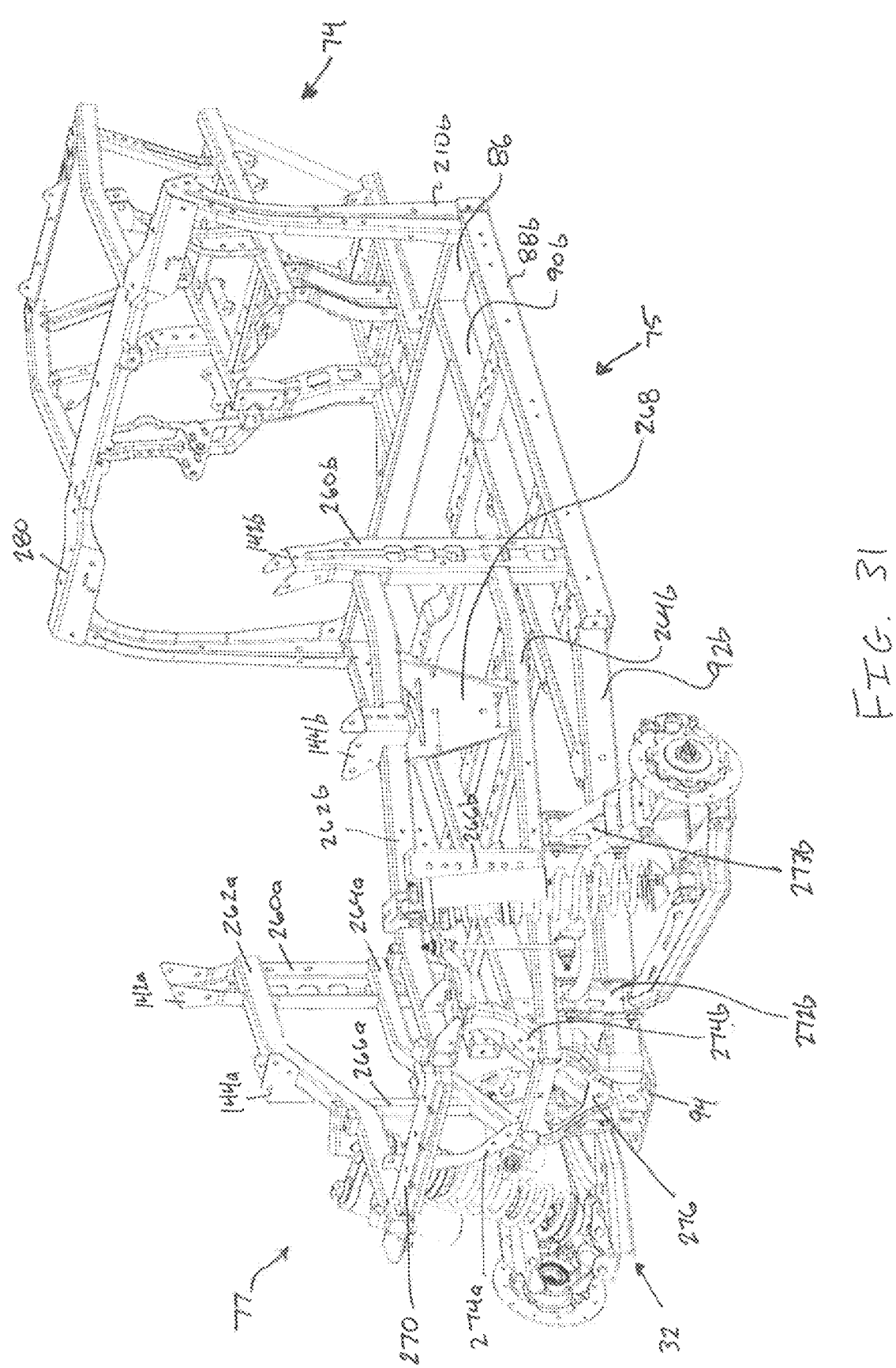
FIG. 31 is an orthogonal view of the frame and rear suspension according to some embodiments.

In some embodiments, such as that shown in FIG. 28, front frame 74 comprises a plurality of longitudinally extending frame members, including forward bracket member 96, middle frame members 226*a*, 226*b*, and upper frame members 232*a*, 232*b*. Middle frame members 226*a* and 226*b* are connected together by lateral frame members 225 and 227 as illustrated in FIG. 31. Likewise, upper frame members 232*a*, 232*b* are connected together by lateral support members including forward support member 229 and horizontal dash support 280. The longitudinally extending frame members are coupled together by a plurality of vertical frame members. In particular, forward bracket member 96 is connected to middle frame members 226*a*, 226*b* by front vertical frame members 224*a*, 224*b* and by rear vertical frame members 234*a*, 234*b*. Likewise, middle frame members 226*a*, 226*b* and upper frame members 232*a*, 232*b* are connected together by forward vertical frame members 228*a*, 228*b*, and rearward vertical frame members 230*a*, 230*b*.

In the embodiment shown in FIG. 28, forward bracket member 96 has a geometry configured to support front vertical frame members 224*a*, 224*b*, A-arm connector 246 (shown in FIG. 32), and rear vertical frame members 234*a*, 234*b*. In some embodiments, front vertical frame members 224*a*, 224*b* is angled in a forward and/or outward direction (top is located further forward than the bottom, and top portions are farther apart from one another) to provide the desired geometry of front frame 74. In some embodiments, front vertical frame members 224*a*, 224*b* are straight, albeit at the desired angle. In some embodiments, rear vertical frame members 234*a*, 234*b* are bent at several locations rear vertical to accommodate the middle frame members 226*a*, 226*b* having a width greater than the width of forward bracket member 96.

Similarly, in some embodiments, forward vertical frame members 228*a*, 228*b* and rearward vertical frame members 230*a*, 230*b* are angled and/or include one or more bends to accommodate the desired geometry. For example, in some embodiments the width between upper frame members 232*a*, 232*b* is greater than the width between middle frame members 226*a*, 226*b*, such that vertical frame members 228*a*, 228*b*, and 230*a*, 230*b* are configured to accommodate the difference in width. In some embodiments, the width between upper frame members 232*a*, 232*b* is greater than the width between middle frame members 226*a*, 226*b*. In addition, the width between middle frame members 226*a*, 226*b* is greater than the width of forward bracket member 96.

Upper frame members 232*a*, 232*b* are connected to horizontal dash support 280 (shown in FIG. 31), which in turn is coupled to the front vertical support members (pillar A) 210*a*, 210*b*. In some embodiments, front vertical support members 210*a*, 210*b* are coupled to outer longitudinal frame members 88*a*, 88*b*, respectively. With respect to each of the frame members, connecting frame members may be affixed to one another via one or more of brackets, fasteners, and/or weldments.

In some embodiments, such as that shown in FIG. 31, rear frame 77 comprises a plurality of longitudinally extending frame members, including rear lower frame members 92*a*, 92*b*, rear middle frame members 264*a*, 264*b*, and rear upper frame members 262*a*, 262*b*. As shown in FIG. 31, in the rearward direction, rear upper frame members 262*a*, 262*b* are connected together via rear horizontal support 270, and rear middle frame members 264*a*, 264*b* are connected together via rear vertical/horizontal support 276, which also extends vertically to couple the rear middle frame members 264*a*, 264*b* to rear bracket 94. In the forward direction, a plurality of vertical supports are utilized to support the plurality of longitudinally extending frame members, including rear outer vertical support members (pillar B) 260*a*, 260*b*, v-shaped vertical support 268, vertical supports 266*a*, 266*b*, rear middle vertical supports 274*a*, 274*b*, and control arm vertical supports 272*a*, 272*b*, 273*a*, and 273*b*. One or more of the vertical supports may be angled or bent to provide the desired geometry. For example, in some embodiments, rear middle vertical supports are bent such that the width between the bottom portions, which connect the rear middle frame members 264*a* and 264*b*, is less than the width between rear upper frame members 262*a* and 262*b*.

In some embodiments, vertical supports are coupled to the plurality of longitudinal members on the outer face of the longitudinal members. For example, control arm vertical supports 272*a*, 272*b*, 273*a*, and 273*b* are connected to an outer surface or face of rear lower frame members 92*a*, 92*b*, respectively. Similarly, vertical supports 266*a* and 266*b* are connected to the outer edge face of rear upper frame member 262*a* and 262*b*, respectively.

As discussed in more detail with respect to FIGS. 15-27, the ROPS 22 is supported by frame at a plurality of locations. For example, in one embodiment, ROPS 22 is supported forward of seating area 20 by front outer vertical support member 210*a*, 210*b* (shown in FIG. 28), using mounting bracket 132 located at a top portion of the vertical support member. In addition, ROPS 22 is supported rearward of seating area 20 by rear outer vertical support members 260*a*, 260*b*, using frame mounting bracket 142*a*, 142*b* respectively. In addition, ROPS 22 is further supported at a location rearward of rear platform 84 by brackets 144*a*, 144*b* mounted on rear upper frame members 262*a*, 262*b*, respectively. In some embodiments, brackets 144*a*, 144*b* are located laterally inward of frame mounting brackets 142*a*, 142*b*, respectively.

FIGS. 15-27 include perspective, side, front, and back views of the ROPS 22 according to various embodiments. In some embodiments, ROPS 22 includes forward side members 106*a*, 106*b*, forward center support 108, middle center support 110, rear center support 112, center crossbar support member 114, rear side members 116*a*, 116*b*, and crossbar support strap 118*a*, 118*b*. In some embodiments, support members are constructed of 1"-2", round, square, and/or rectangular tubing, typically steel but other materials may also be utilized that provide sufficient durability during a roll-over event.

Forward side members 106*a*, 106*b* and rear side members 116*a* and 116*b* are longitudinal extending members. A first end of forward side member 106*a* is coupled to frame 14, and in particular to front outer vertical support member 210*a* (as shown in FIG. 28), with a first end of forward side member 106*b* being coupled to front outer vertical support member 210*b* as shown in FIG. 28. Forward side members 106*a*, 106*b* includes several bends that direct the member generally upward and rearward, forming a canopy over seating area 20. Forward side members 106*a*, 106*b* are coupled to rear side members 116*a*, 116*b*, respectively, with rear side members 116*a*, 116*b* extending rearward from forward side members 106*a*, 106*b*. The portion of forward side members 106*a*, 106*b* that is coupled to rear side members 116*a*, 116*b* includes a bend that directs the forward side member 106*a*, 106*b* downward toward frame 14. In some embodiments, forward side members 106*a* and 106*b* are connected to frame 14 at rear outer vertical support members 260*a*, 260*b*, respectively, and in particular to frame mounting brackets 142*a*, 142*b* (as shown in FIG. 31). In some embodiments, the portion of forward side member 106*a*, 106*b* that connects to rear outer vertical support members 260*a*, 260*b* is bent inward. This bend in forward side members 106*a*, 106*b* increases the width between forward side members 106*a*, 106*b*, except at the ends where forward side members 106*a*, 106*b* connect to the frame 14. A benefit of this geometry is that it allows for greater width in the area in which passengers will be seated.

Rear side member 116*a*, 116*b* extends away from forward side members 106*a*, 106*b* in a rearward direction, with one or more bends in rear side members 116*a*, 116*b* resulting in rear side members 116*a*, 116*b* extending downward toward frame 14. In some embodiments, rear side members 116*a*, 116*b* are connected to frame 14 at brackets 144*a*, 144*b*, respectively, as shown in FIG. 31. Rear side members 116*a*, 116*b*, provide additional support for ROPS 22, as well as extending the protection provided by ROPS 22 to the rear platform 84. In some embodiments, the portion of rear side member 116*a*, 166*b* that connects to brackets 144*a*, 144*b*, respectively, is bent inward. This bend in rear side members 116*a*, 116*b* increases the width between rear side members 116*a*, 116*b*, except at the ends where rear side members 116*a*, 116*b* connect to the frame 14. A benefit of this geometry is that it allows for greater width in the area of rear platform 84.

In some embodiments, forward side members 106*a*, 106*b* are coupled together by several lateral support members, including forward center support 108 and center crossbar support member 114. Similarly, rear side members 116*a*, 116*b* are coupled together by several lateral support members, including middle center support 110 and rear center support 112. In some of the embodiments, brake light 35 is affixed to rear center support 112, near approximately the middle of the center support member.

In some embodiments, crossbar support straps 118*a*, 118*b* are coupled between center crossbar support member 114 and forward side members 106*a*, 106*b*, respectively. In some embodiments, crossbar support strap is coupled to center crossbar support member 114 at a location along the length of crossbar support member 114. In one embodiment, crossbar support strap 118*a* is connected less than halfway across center crossbar support member 114. In some embodiments, crossbar support strap 118a, 118b is connected to forward side member 106a, 106b, respectively via brackets 124a, 124b, respectively. In some embodiments, brackets 124a, 124 are also utilized to secure seat belt retractor mechanism 76a, 76b as shown in FIG. 9, for example.

Figure 15:
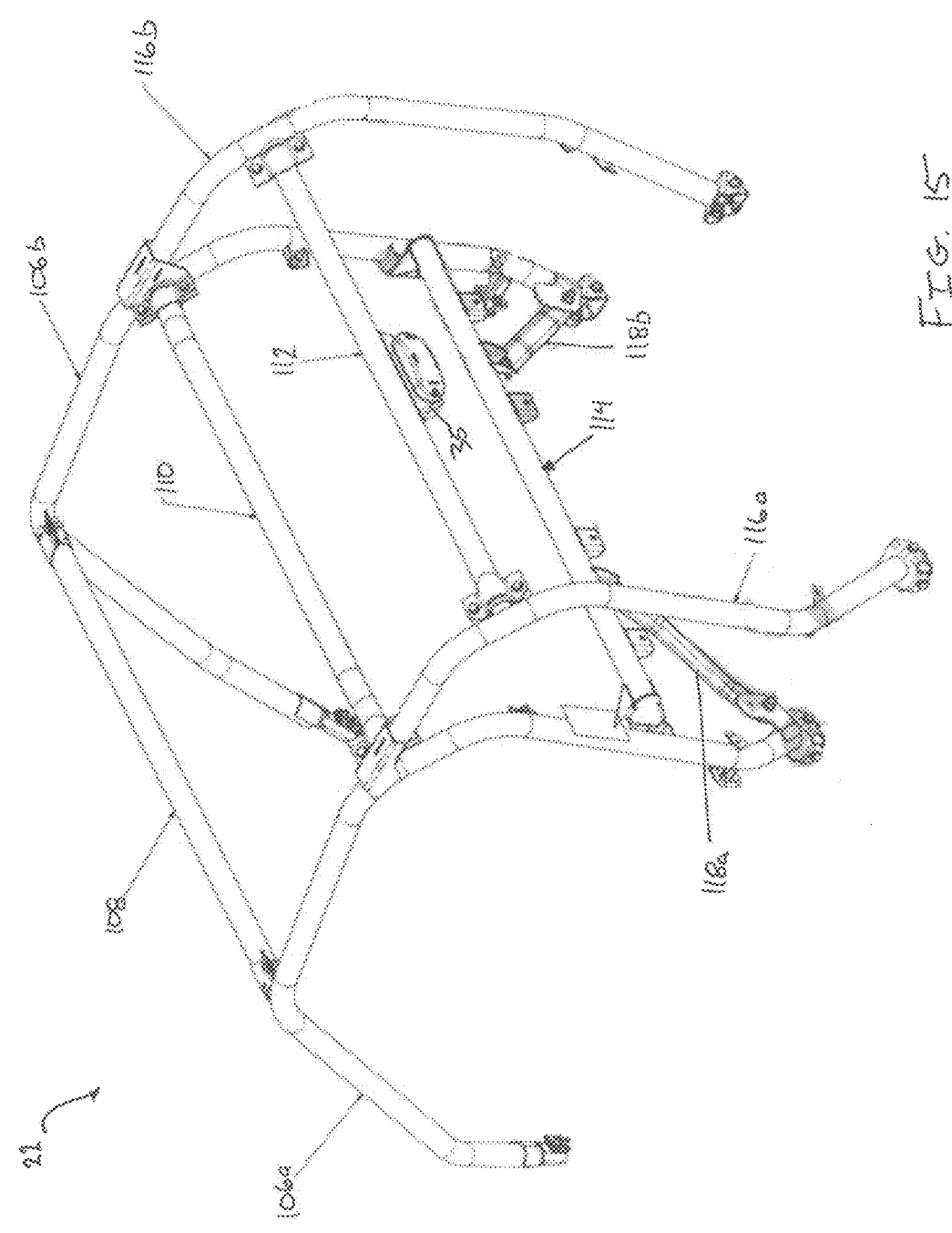
FIG. 15 is an orthogonal view of the roll-over protection system according to some embodiments.
Figure 16:
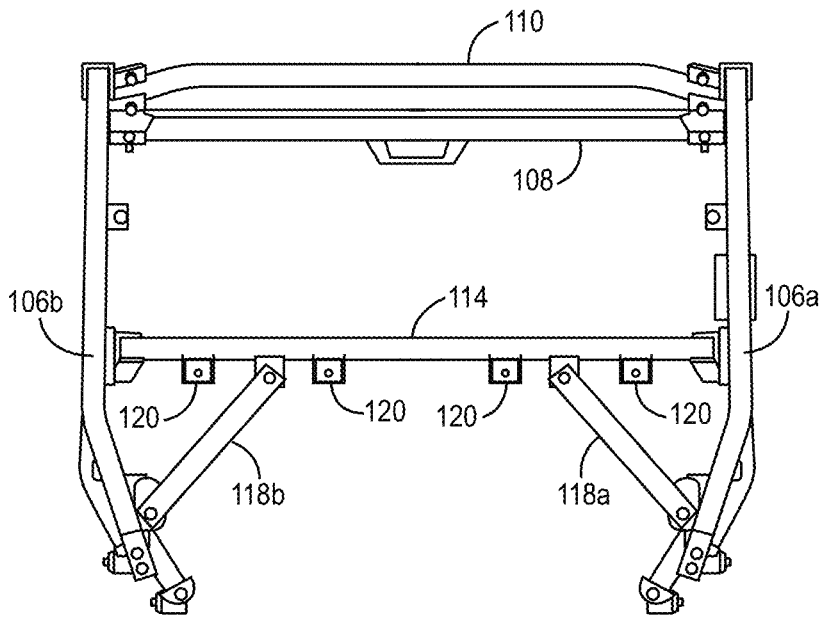
FIG. 16 is a rear view of the roll-over protection system according to some embodiments.

In some embodiments, crossbar support straps 118a, 118b are secured to center crossbar support member 114 via a pair of crossbar support mounts 122 as shown in FIGS. 15 and 16. In this embodiment, crossbar support mounts 122 are secured to center crossbar support member 114, wherein crossbar support straps 118a, 118b are secured via one or more fasteners and/or weldments to crossbar support mounts 122. The other end of crossbar support straps 118a, 118b are connected to forward side member 106a, 106b via brackets 124a, 124b, respectively. A benefit of this configuration is that force directed onto ROPS 22 is distributed from center crossbar support member 114 to the outside of ROPS 22 via crossbar support straps 118a, 118b.

Figure 17:
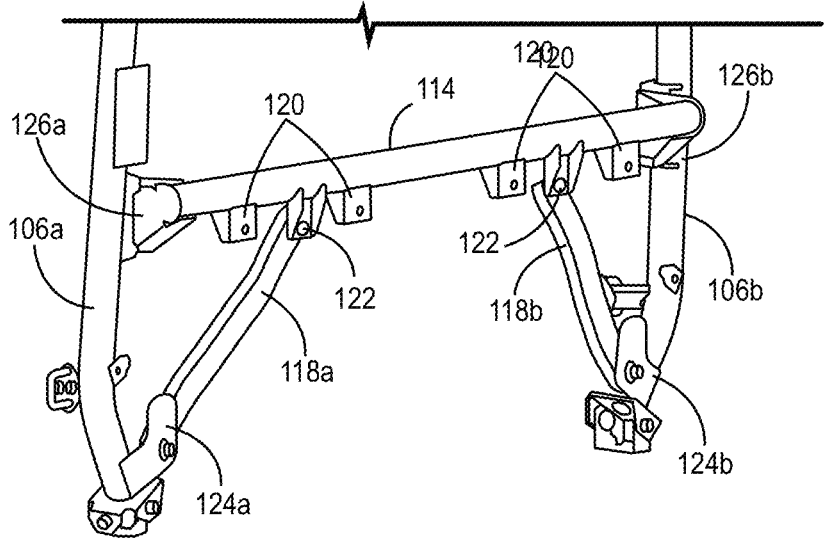
FIG. 17 is a front view of the roll-over protection system according to some embodiments.
Figure 18:
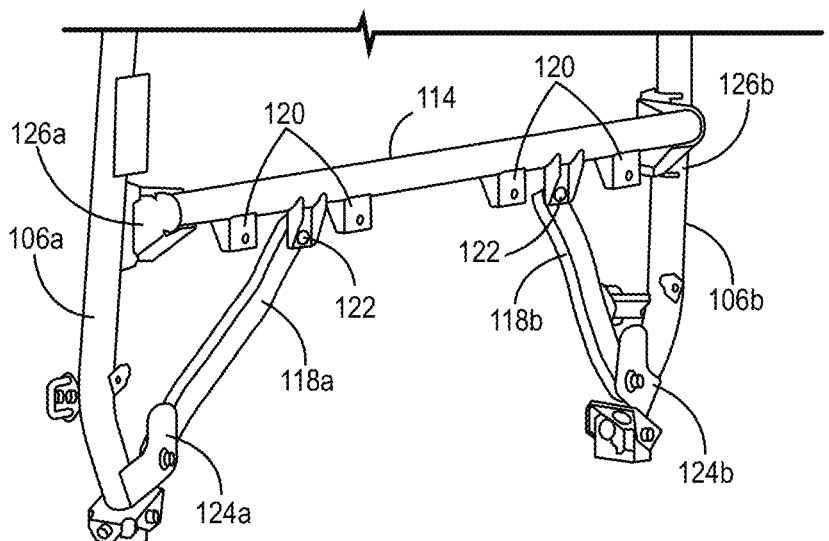
FIG. 18 is an orthogonal view of a portion of the roll-over protection system according to some embodiments.
Figure 19:
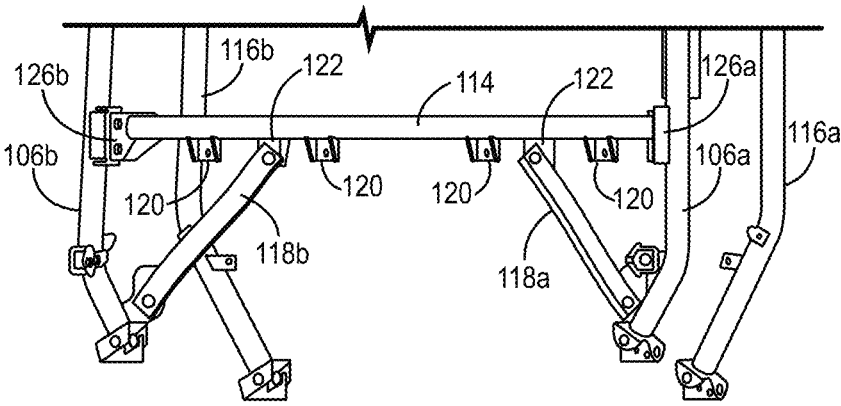
FIG. 19 is an orthogonal view of a portion of the roll-over protection system according to some embodiments.

In the embodiment shown in FIGS. 16 and 17 (back view and front view, respectively), a plurality of harness mounts 120 are also affixed to center crossbar member 114. Harness mounts 120 are arranged laterally along center crossbar support member 114 to secure harnesses utilized by passengers seated in seats 26a and 26b, respectively. In one embodiment, crossbar support mounts 122 and harness mounts 120 are the same part, simply connected to center crossbar support member 114 facing opposite directions. In other embodiments, dedicated mounts may be utilized for crossbar support mounts 122 and harness mounts 120. In addition to be utilized as mounts for harness systems—including after-market harness system—crossbar support mounts 122 may be utilized as mounts for a variety of accessories, including as mounts for a snorkel kit (e.g., vertical piping to provide a higher air intake position for the engine and/or CVT), bow/gun mount, storage mount, etc.

In some embodiments, center crossbar support member 114 is coupled to forward side member 106a, 106b via crossbar weldment mounts 126a and 126b, respectively. In this embodiments, crossbar weldment mounts 126a, 126b are configured to hold the crossbar member (in this case, center crossbar support member 114) in place. In one embodiment, the center crossbar support 114 is welded to the crossbar weldment mount 126 to secure the center crossbar support 114 to forward side members 106a and 106b.

Figure 20:
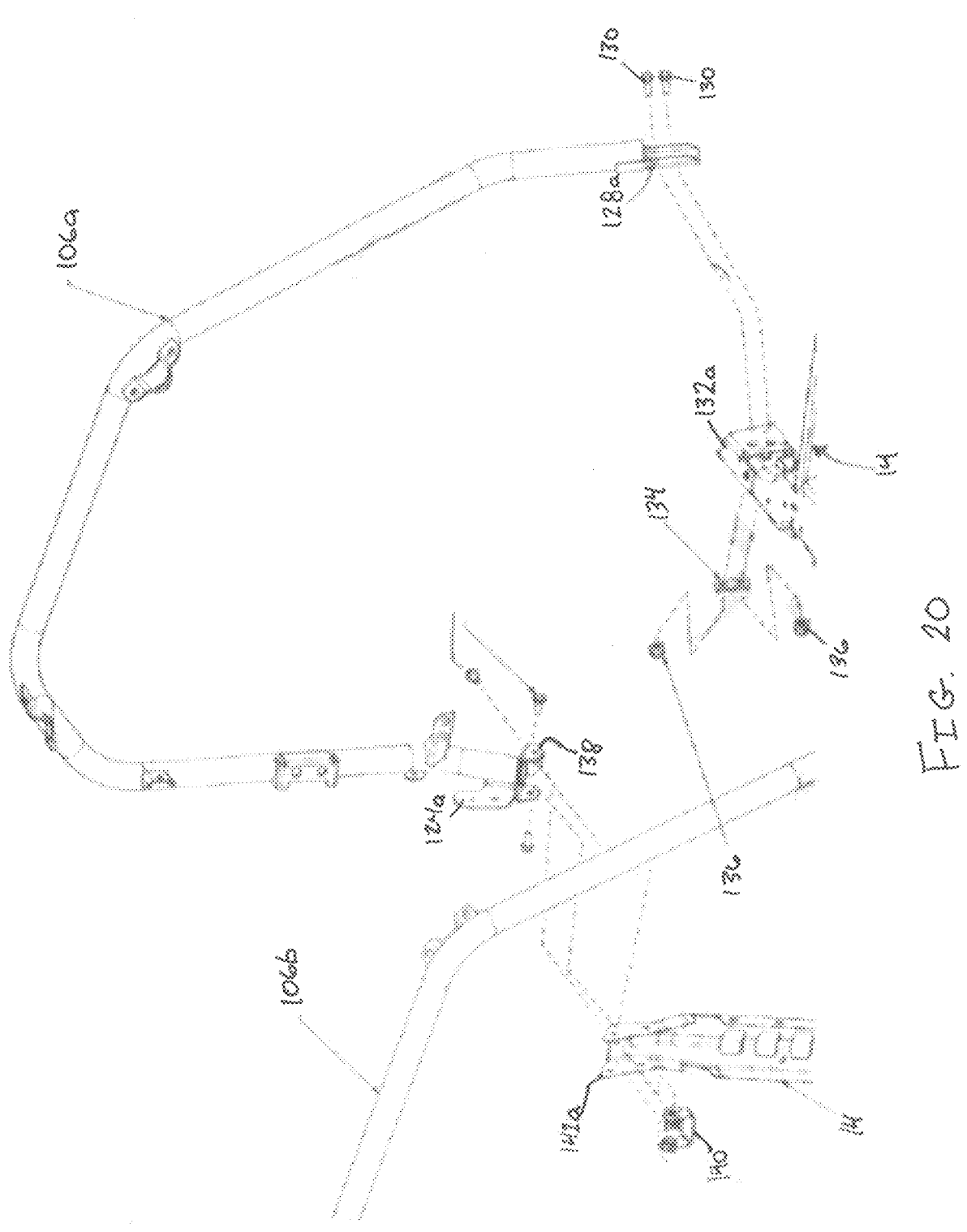
FIG. 20 is an exploded view illustrating connection of the roll-over protection system according to some embodiments.
Figure 21:
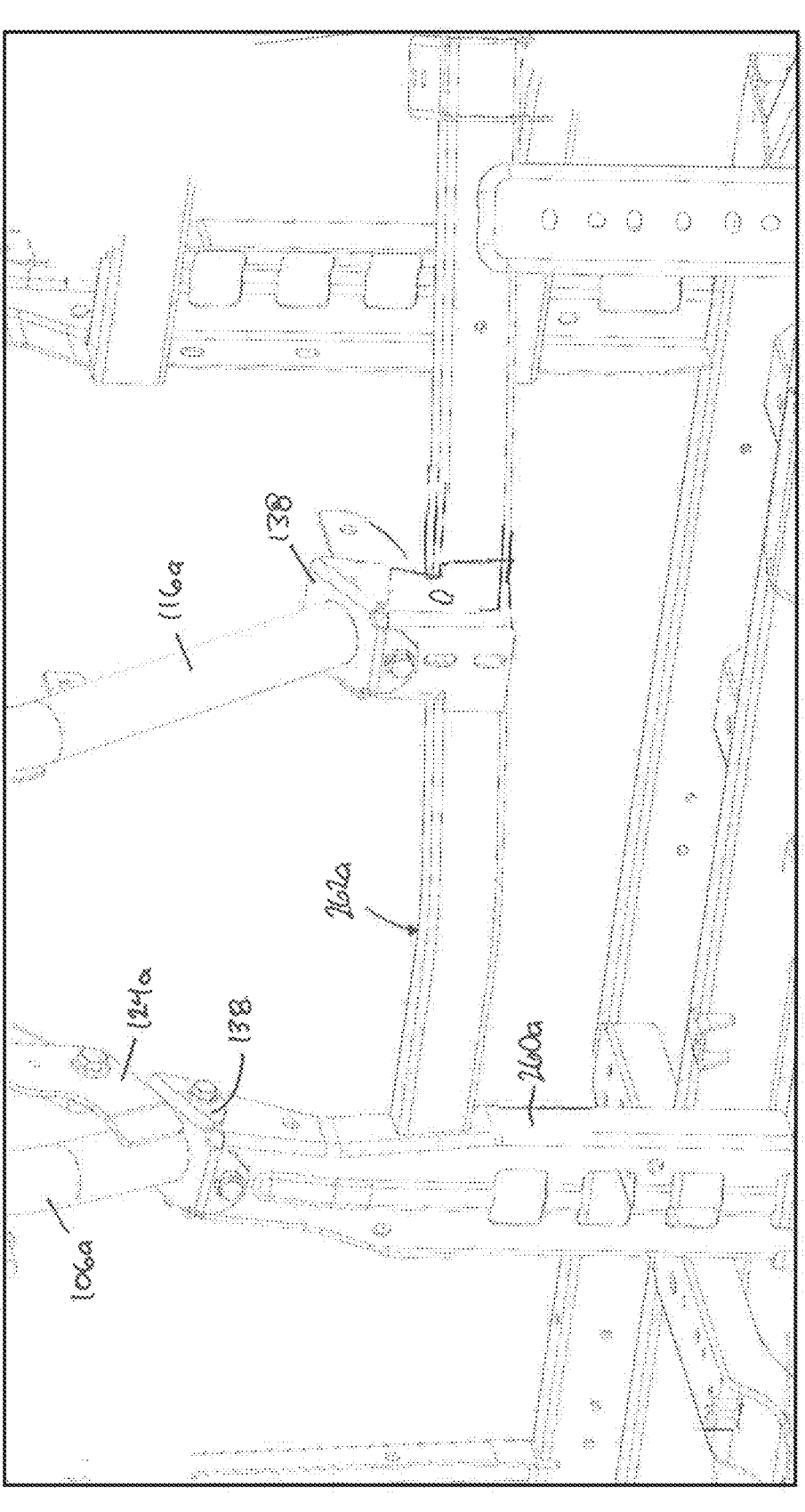
FIG. 21 is an orthogonal view of a portion of the roll-over protection system connected to the frame according to some embodiments.
Figure 22:
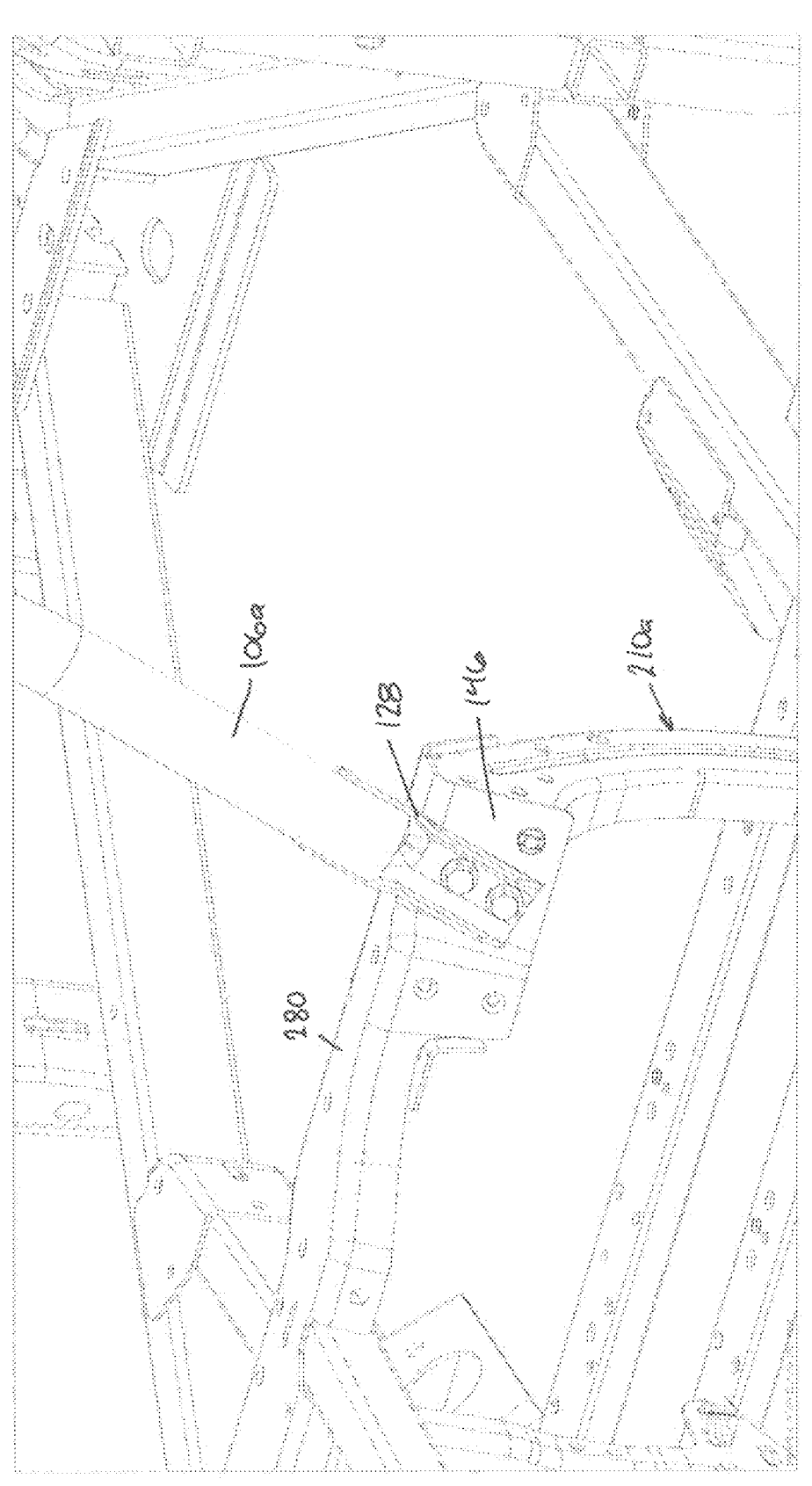
FIG. 22 is an orthogonal view of a portion of the roll-over protection system connected to the frame according to some embodiments.

FIGS. 20-22 illustrate the connection of ROPS 22 to frame 14. In particular, FIG. 20 illustrates the connection of forward side member 106a to frame mounting bracket 132a located on front outer vertical support member 210a (as shown in FIG. 28). In the embodiment shown in FIG. 20, forward side member 106a includes a frame mount 128a configured to receive fasteners 130 (e.g., bolts). The bolts extend through frame mount 128a into frame mounting bracket 132a, and into mount plate 134, wherein one or more nuts 136 are utilized to secure the fastener in place. Fasteners are referred to throughout the application as a means to connect various members together. For the sake of simplicity, the number '130' is utilized to designate fasteners, and the number '136' is utilized to designate the nuts utilized to secure the fasteners. It should be understood that while a single reference numeral is utilized, a plurality of different types of fasteners may be utilized, having different sizes, thread geometries, lengths, etc.

FIG. 20 also illustrates the connection of forward side member 106a to frame mounting bracket 142a located on rear outer vertical support member 260a as shown in FIG. 31. In this embodiment, a nut retention bracket is utilized, which is a bracket comprised of three vertical walls, wherein each of the vertical walls includes a nut secured to an inner wall surface. The nut retention bracket 140 is placed within frame mounting bracket 142, which includes a plurality of holes for receiving a fastener. Frame mounting bracket 138, located on the end of forward side member 106a, includes three flanges with holes for receiving a fastener. Frame mounting bracket 138 is configured to be placed over frame mounting bracket 142, wherein holes in each are aligned, and a fasteners are guided through frame mounting bracket 138, frame mounting bracket 142, and into nut retention bracket 140. The fasteners can be tightened without having to further secure the nuts retained within nut retention bracket 140, thereby allowing the fasteners to be easily tightened.

FIG. 21 illustrates the connection of forward side member 106a to frame mounting bracket 142a located on rear outer vertical support member 260a, as well as the connection of rear side member 116a to frame mounting bracket 144 located on rear upper frame member 262. In some embodiments, rear side member 116a is secured to frame mounting bracket 144 using the same type of arrangement utilized to connect forward side member 106a to frame mounting bracket 142a. For example, a nut retention bracket 140 (not shown in this view) may be placed within frame mounting bracket 144 and utilized to secure frame mounting bracket 138 to frame mounting bracket 144. In some embodiments, frame mounting bracket 144 is located on a portion of rear upper frame member 262 that is bent inward, resulting in rear side member 116a connecting to frame 14 at a location laterally inward of where forward side member 106a is connected to rear outer vertical port member 260a.

Similarly, FIG. 22 illustrates the connection of the forward portion of forward side member 106a to frame 14. In particular, in the embodiment shown in FIG. 22, forward side member 106a is coupled within frame mount 128. In some embodiments, forward side member 106a is welded to frame mount 128, but in other embodiments may be secured via fasteners, weldments, or a combination thereof. In the embodiment shown in FIG. 22, frame mount 128 is secured to frame mounting bracket 146 via fasteners that extend through frame mount 128, frame mounting bracket 146, and front outer vertical support member 210a. In some embodiments, frame mounting bracket 146 is fabricated as a part of horizontal dash support 280 extending laterally across the vehicle.

Figure 23:
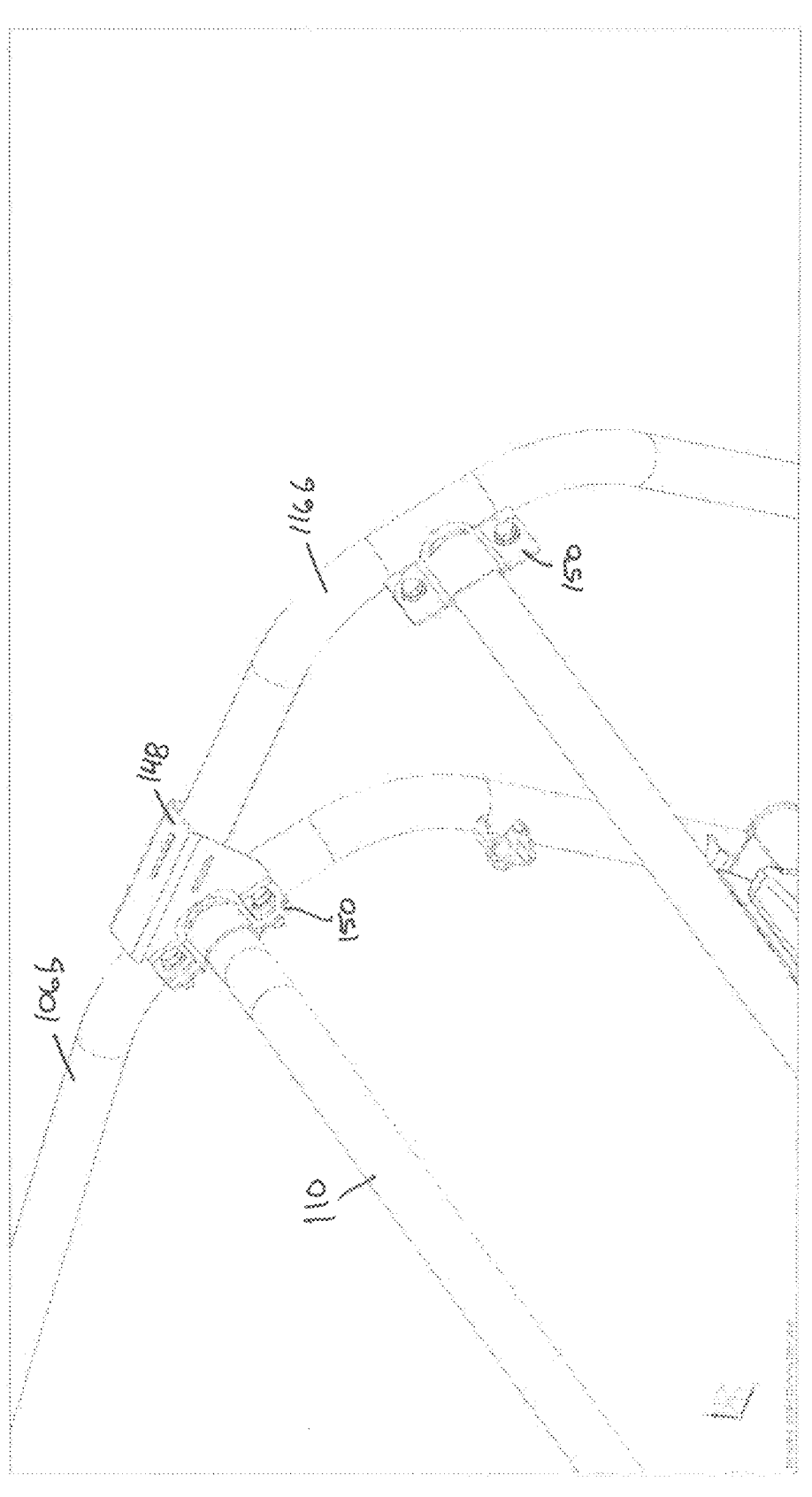
FIG. 23 is an orthogonal view of the connection of rear side members to forward side members of the roll-over protection system connected to the frame according to some embodiments.
Figure 24:
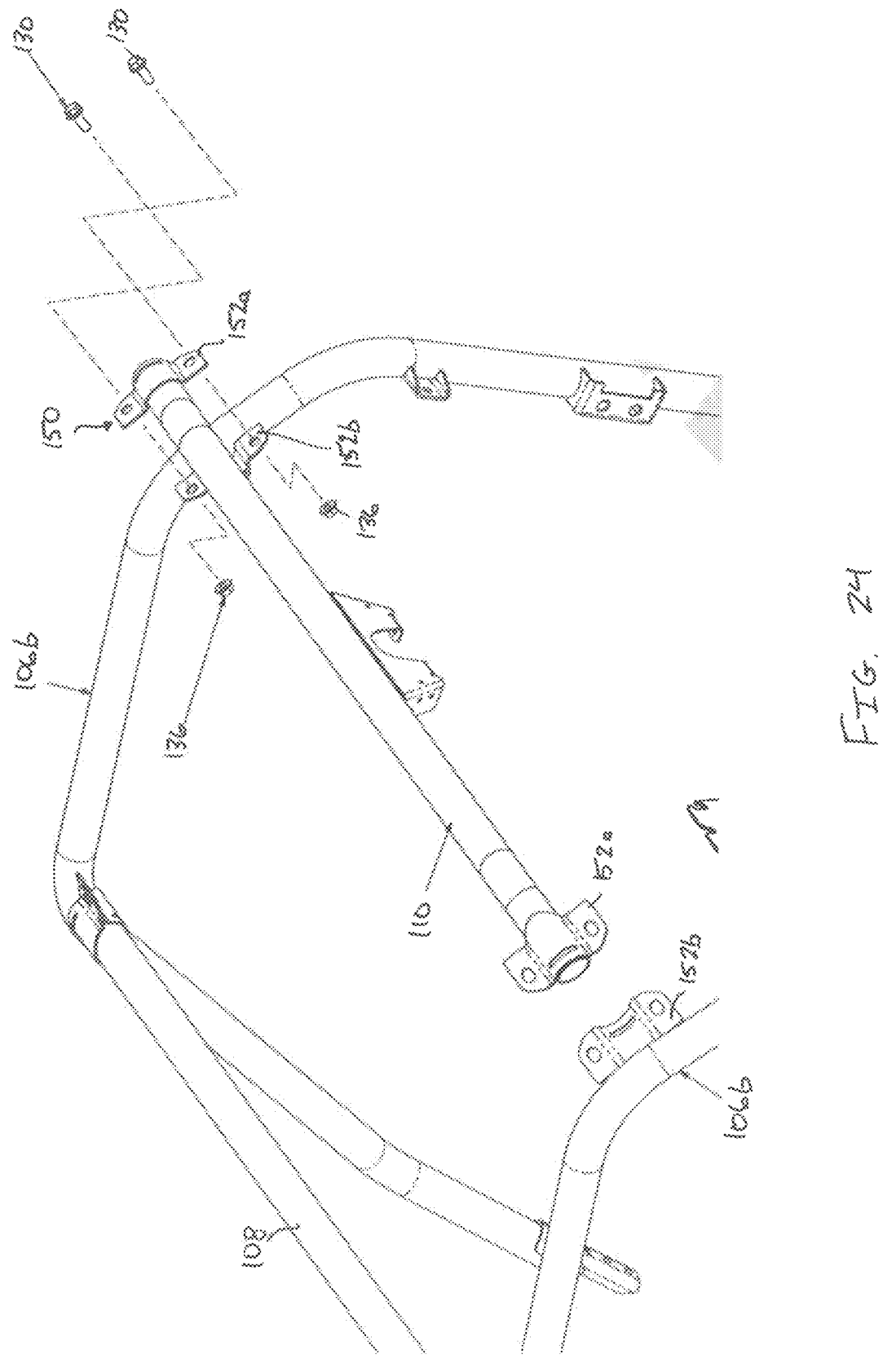
FIG. 24 is an exploded view illustrating connection of cross members to side members in the roll-over protection system according to some embodiments.
Figure 25:
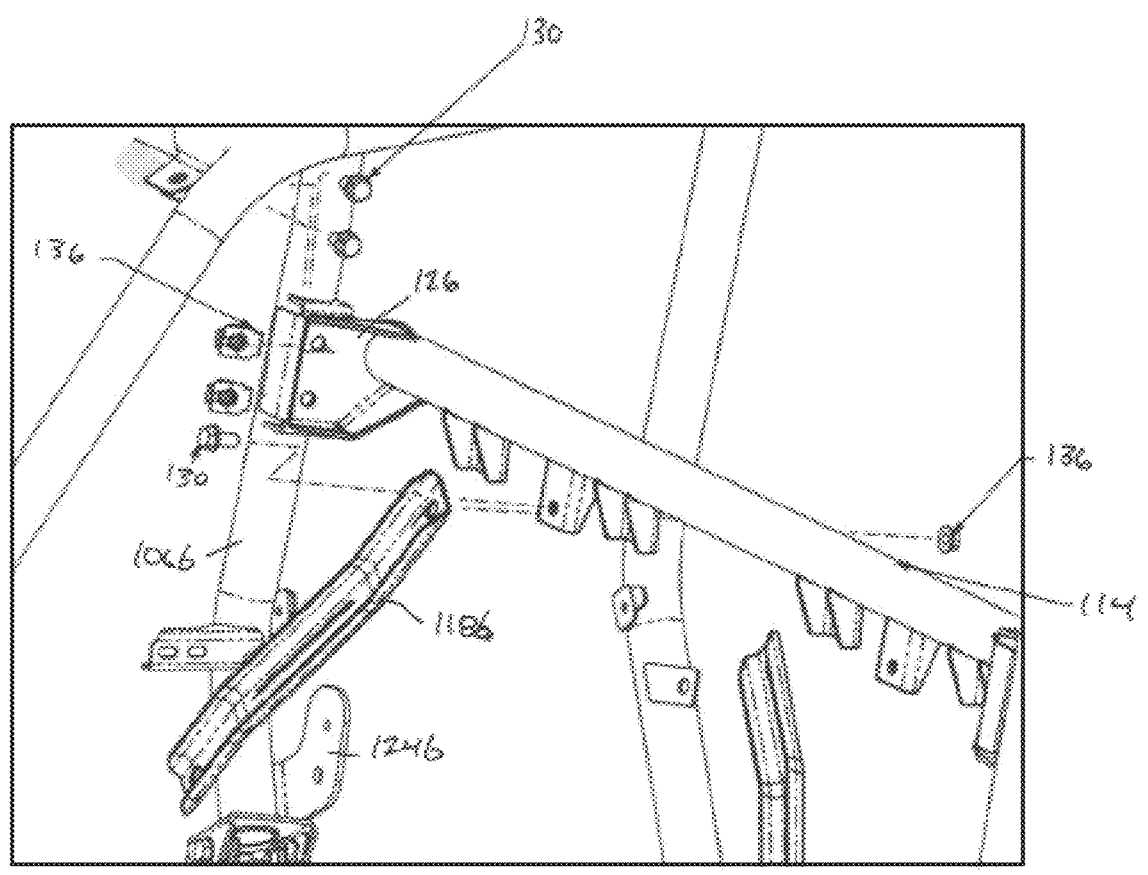
FIG. 25 is an exploded view illustrating connection of support strap to crossbar center support according to some embodiments.

FIGS. 23 and 24 illustrate the connection of front side member 106b to rear side member 116b, as well as the connection of lateral support members, including middle center support 110 and rear center support 112 to rear side member 116b. In some embodiments, front side member 106b is coupled to rear side member 116b by way of support member joint 148. In this embodiment, rear side member 116b extends into support member joint 148 and is secured therein. Securing rear side member 116b to support member joint 148 may be via fasteners and/or weldments. Support member joint 148 is secured to front side member 106b, wherein the coupling may be via fasteners and/or weldments. Middle center support 110 is secured to rear side member 116b via collar members 152a, 152b, secured together around middle center support 110 via fasteners (e.g., fasteners 130 and nuts 136). In this embodiment, middle center support 110 with collar 150 is secured to rear side member 116b via weldments. In other embodiments, fasteners may be utilized to secure middle center support 110 to rear side member 116b. In the embodiment shown in FIG. 23, rear center support 112 is similarly secured to rear side member 116b in the same manner, FIG. 25 illustrates the connection of crossbar support straps 118a to crossbar support member 114 via crossbar support mount 122, as well as the connection of crossbar support member 114 to forward side member 106a according to one embodiment. In the embodiment shown in FIG. 25, a fastener (e.g., 130) and bolt (e.g., 136) is utilized to secure crossbar support strap 118 to crossbar support mount 122. As discussed above, in some embodiments, crossbar support mount 122 is identical in structure to harness mounts 120, also located on center crossbar support member 114, but mounted in an opposite direction (e.g., rotated 180°.

In some embodiments, center crossbar support member 114 is secured to crossbar weldment mount 126 via weldments. Crossbar weldment mount 126 is then secured to forward side member 106a via a plurality of fasteners and bolts utilized to secure crossbar weldment mount 126 to a mount (not visible in this view) located on forward side member 106a. In some embodiments, crossbar support member 114 is located rearward of the forward side members 106a, 106b, due to location of crossbar support member 114 within crossbar weldment mount 126. A benefit of locating crossbar support member 114 rearward of forward side members 106a, 106b is that additional space is created in seating area 20 for the driver and passenger. This allows crossbar support member 114 to be located at a structurally optimal location, and yet be located rearward of seats 26a, 26b such that crossbar support member 114 can be placed at approximately shoulder-height of seated passengers without but not interfere with seats 26a, 26b or seated passengers. The location of crossbar support member 114 rearward of seated passengers is also due to the location or rear outer vertical support member 260, to which ROPS 22 (in particular, forward side members 106a, 106b) are connected, rearward of seats 26a, 26b. As a result, ROPS 22 provides roll-over protection without interfering with the usable space associated with seating area 20.

Figure 26:
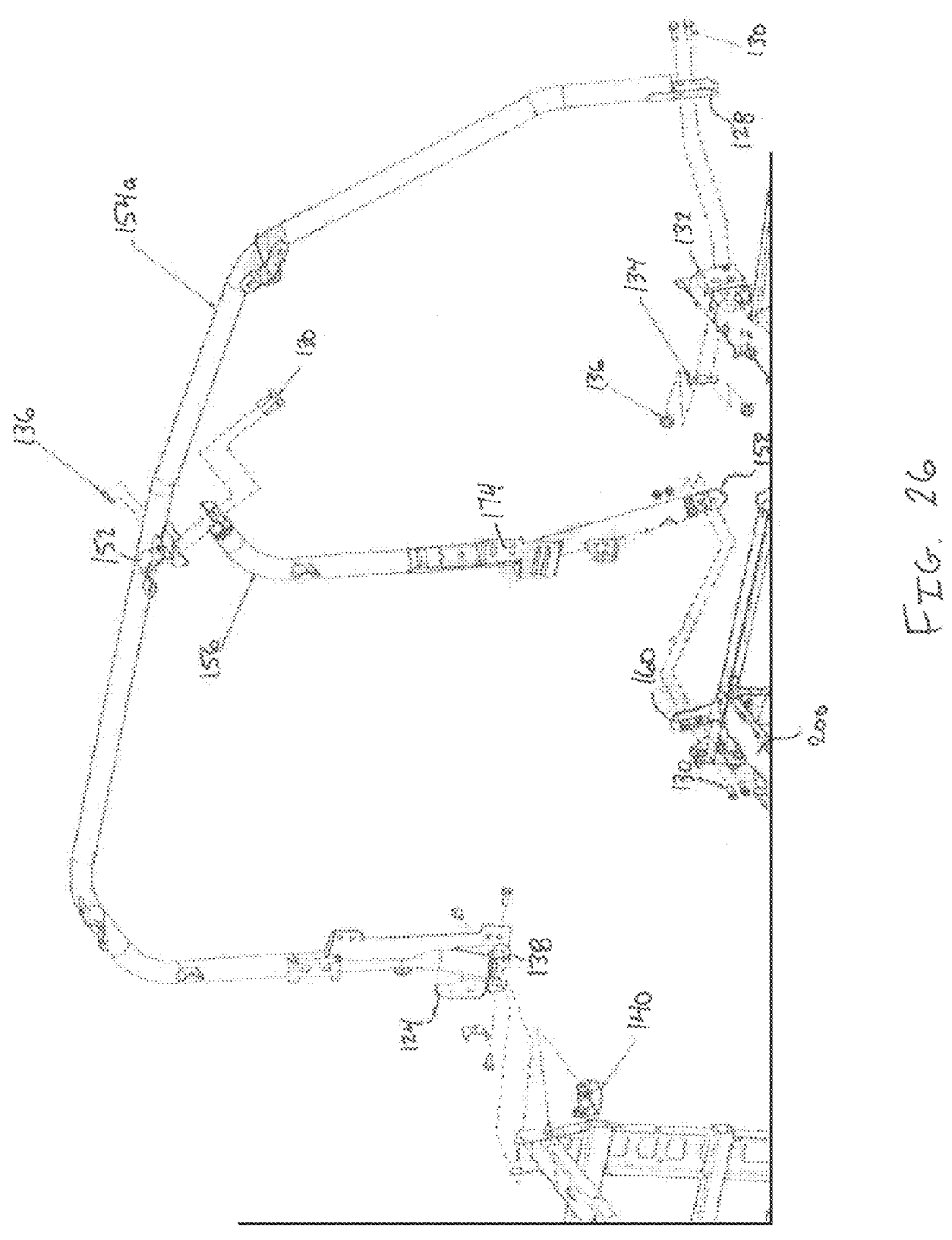
FIG. 26 is an exploded view illustrating connection of middle support member to the frame and to the forward side member of the roll-over protection system according to some embodiments.

FIG. 26 illustrates an embodiment in which an extended front side member 154a is utilized in place of standard forward side member 106a. In this embodiment, extended front side member 154a has a longitudinal length that is greater than standard forward side members 106a. In some embodiments, extended front side member 154a is utilized in conjunction with an extended rear platform 84, or with the addition of a back row of seating within the utility vehicle 10. To provide support for the extended front side member 154a, middle support member 156 is coupled to extended front side member 154a at a location approximately in the middle of extended front side member 154a, In some embodiments, middle support member 156 is coupled to extended front side member 154a via a fasteners and/or weldments. For example in one embodiment, collar 152 is utilized with a plurality of fasteners to secure middle support member 156 to front extended side member 154. Likewise, middle support member 156 includes a frame mount 158 located on a bottom end of the member, which is secured via fasteners to frame mounting bracket 160 located on frame 14. In addition to middle support member 156, extended side member 154 is secured to frame 14 via frame mounting bracket 138 located on a rearward end of the side member.

Figure 27:
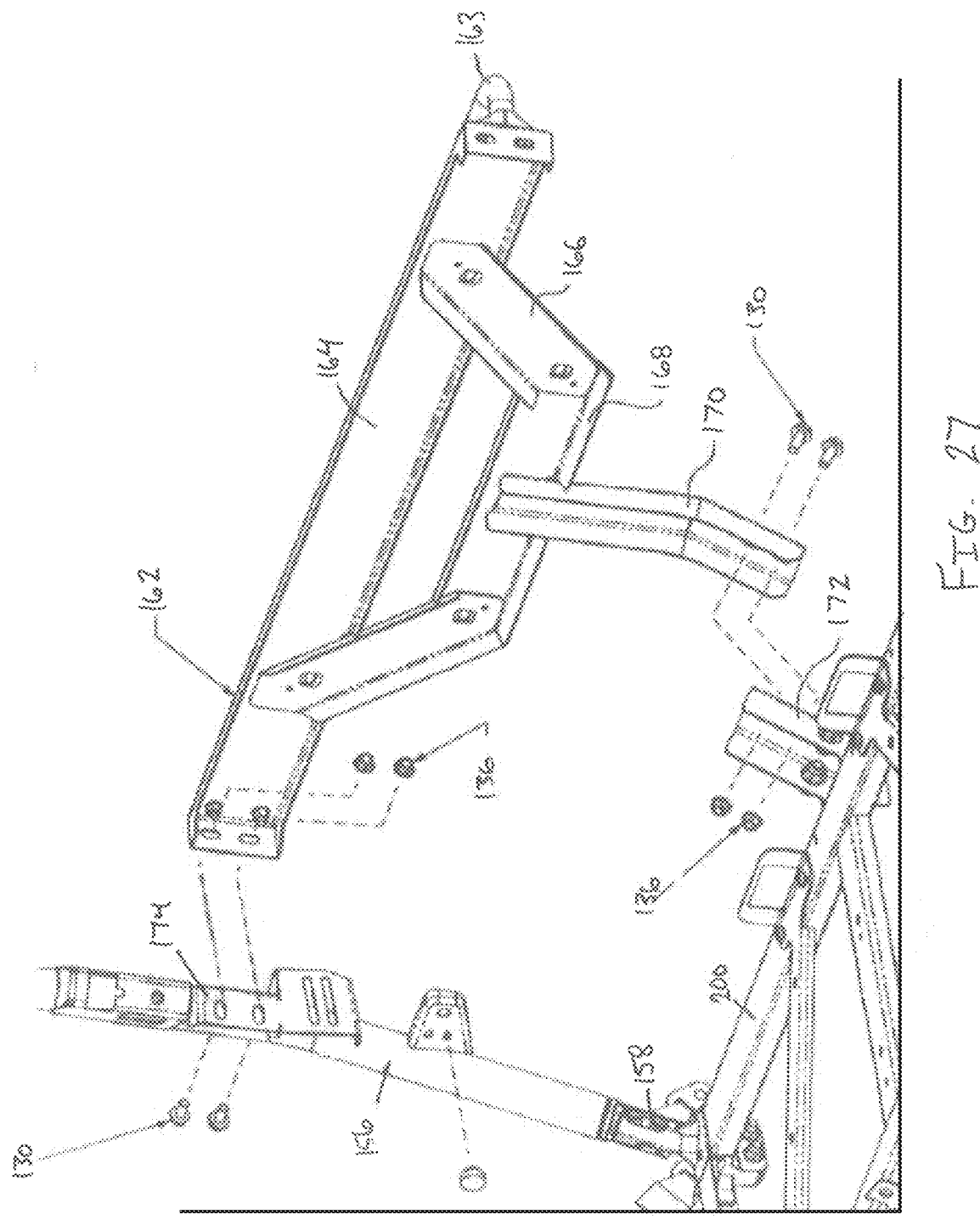
FIG. 27 is an exploded view illustrating seat support brackets to the frame according to some embodiments.

FIG. 27 illustrates seat support brackets 162 coupled to middle support member 156 to provide a seat support for the passenger/driver side seats 26a, 26b, as well as a rear passenger bar 163 for passengers riding in the extended cab located rearward of the driver and passenger. In particular, the view shown in FIG. 27 illustrates middle support member 156 being secured to frame cross member 200 via frame mount 158. Seat support brackets 162 includes top support member 164, angled support member 166, lower support member 168, and vertical support 170. Partially visible in FIG. 27 is passenger bar 163 located on the opposite side of top support member 164. Top support member is secured via fasteners and/or weldments to angled support members 166, which are in turn secured to lower support member and vertical support 170. Top support member 164 is further secured to frame 14 (in this case, middle support member 156) on at least one side by frame mounting bracket 174 via a plurality of fasteners and/or weldments. In one embodiment, top support member 164 is connected to front side member 106b, as shown in FIG. 27. In addition, vertical support is connected to frame 14 via frame mounting bracket 172 via fasteners and/or weldments. In this way, the seat support bracket 162 is connected to frame 14 and provides a passenger bar 163 for occupants located in the extended cab (not shown) located behind passenger and driver.

As discussed above, structural members comprising frame 14 may be tubular steel or aluminum, stamped sheet metal (e.g., steel, aluminum), hydroformed, cast, forged, or formed in any other suitable manner. With respect to each of the frame members, connecting frame members may be affixed to one another via one or more of brackets, fasteners, and/or weldments.

Figure 29:
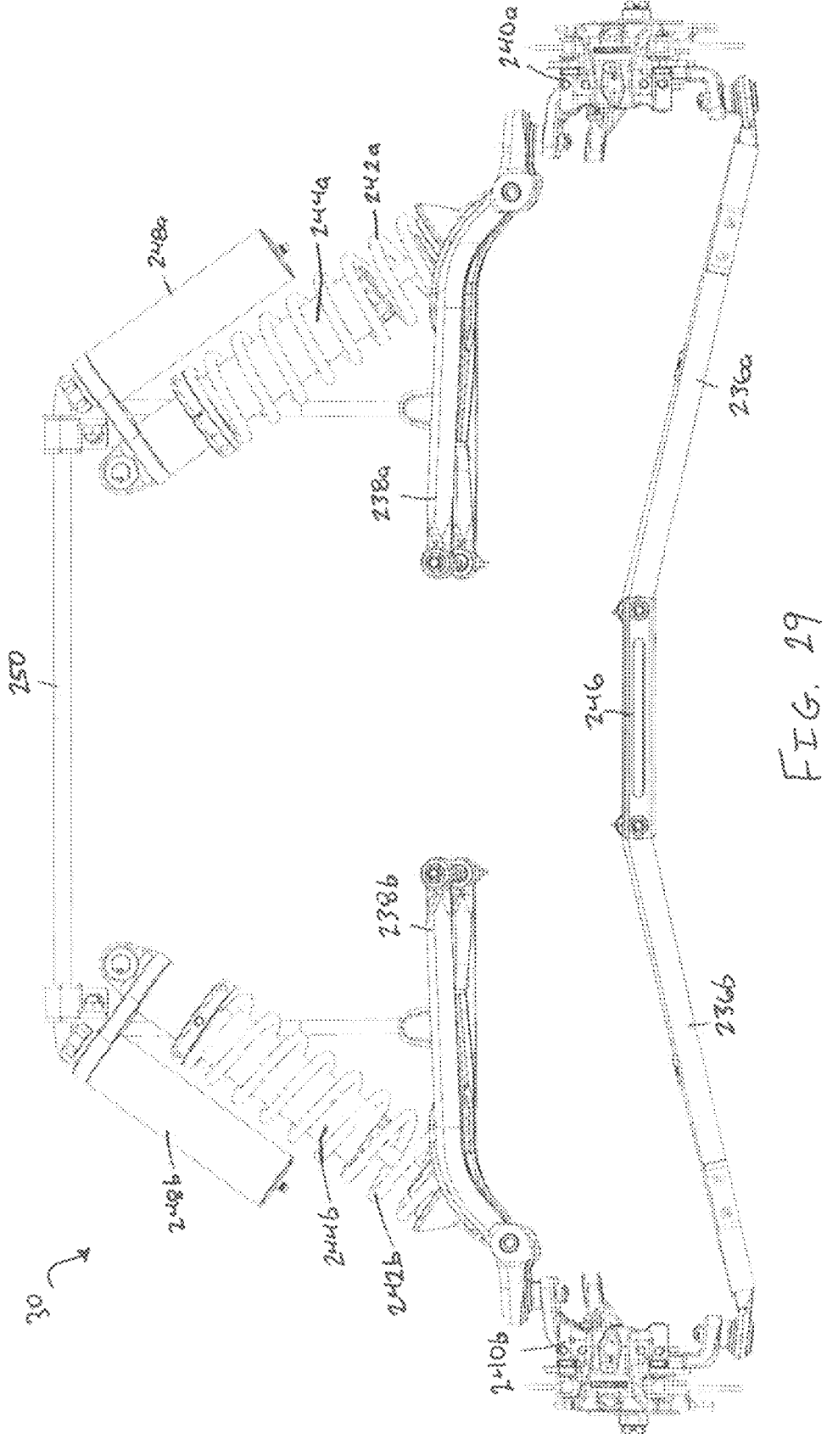
FIG. 29 is a front view of front suspension according to some embodiments.
Figure 30:
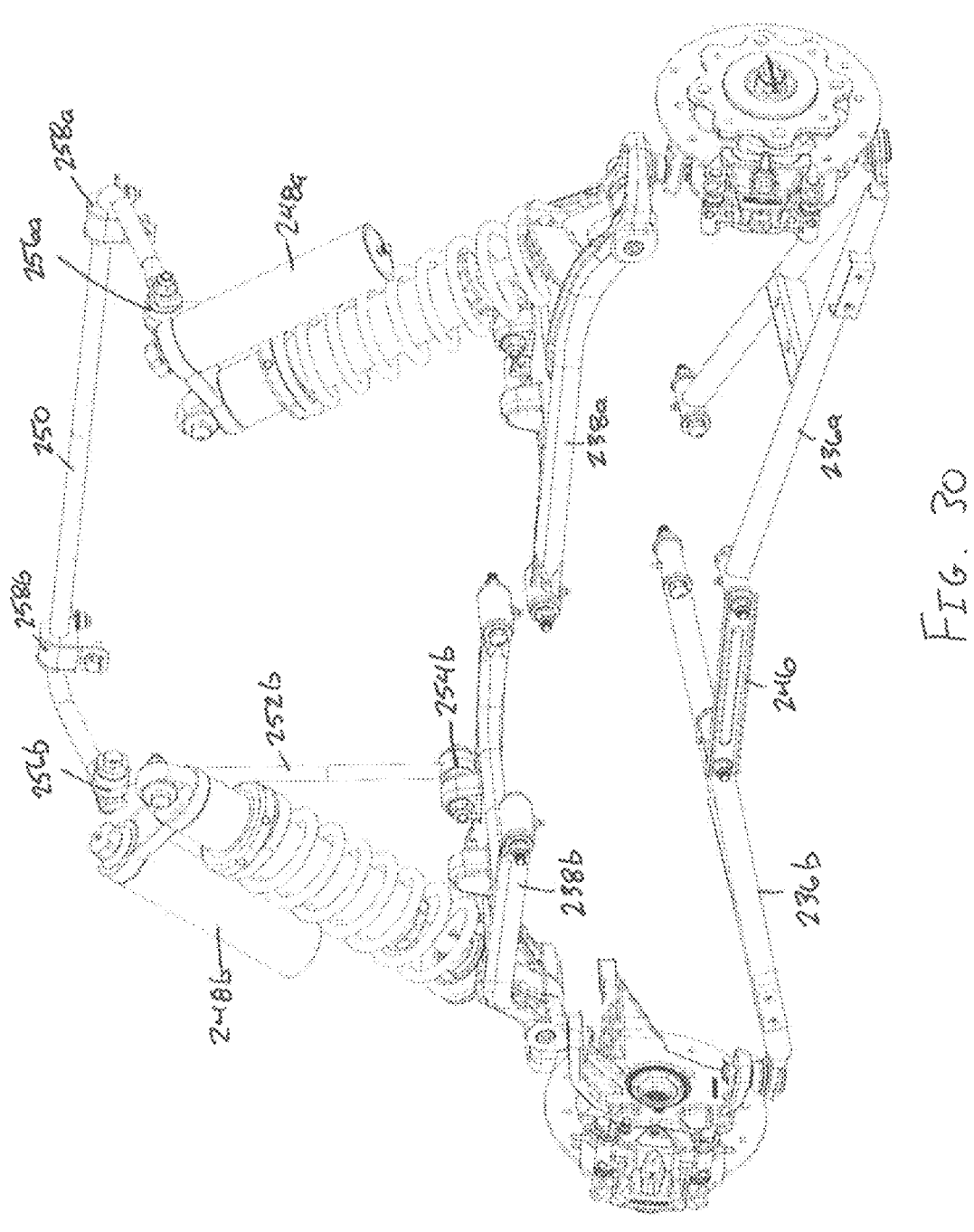
FIG. 30 is an orthogonal view of the front suspension according to some embodiments.
Figure 33:
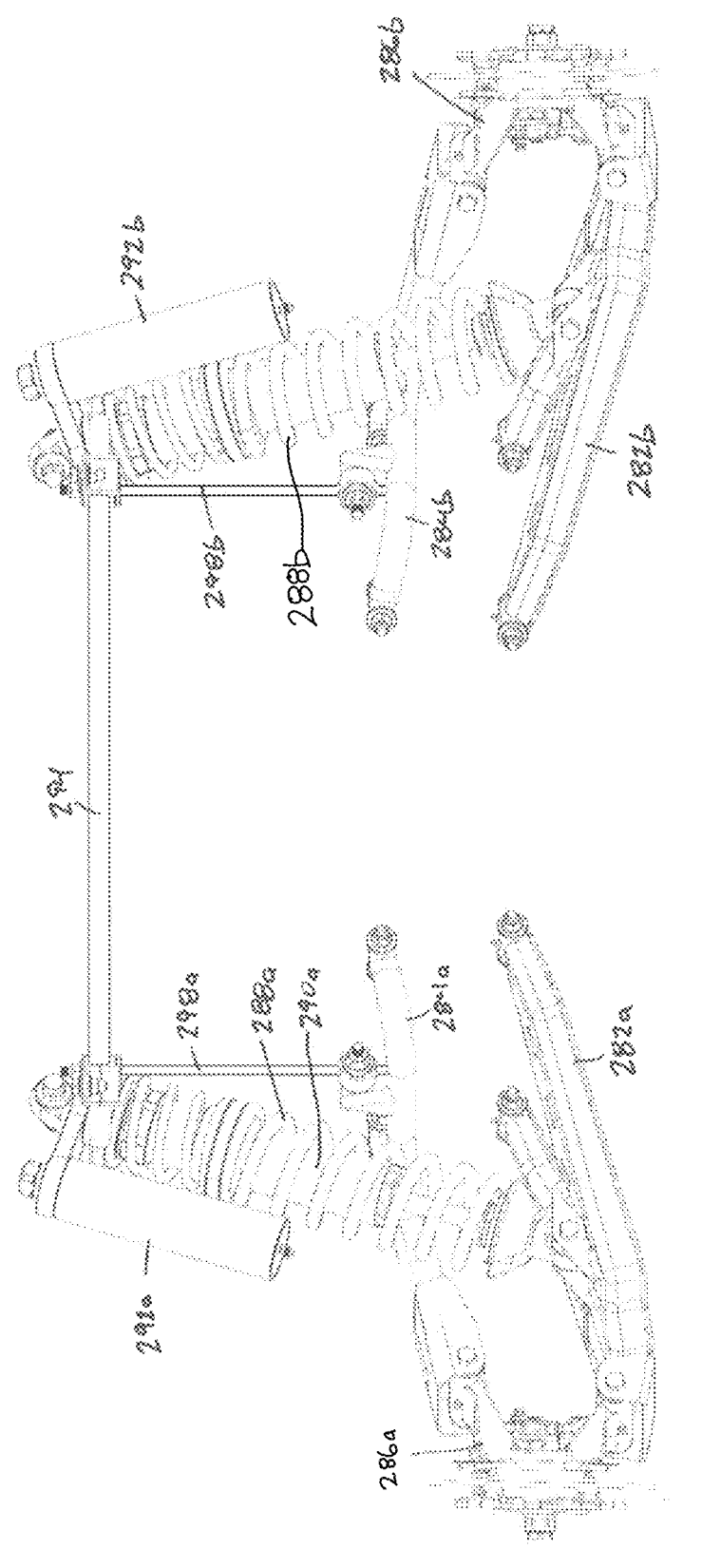
FIG. 33 is a rear view of the rear suspension according to some embodiments.
Figure 34:
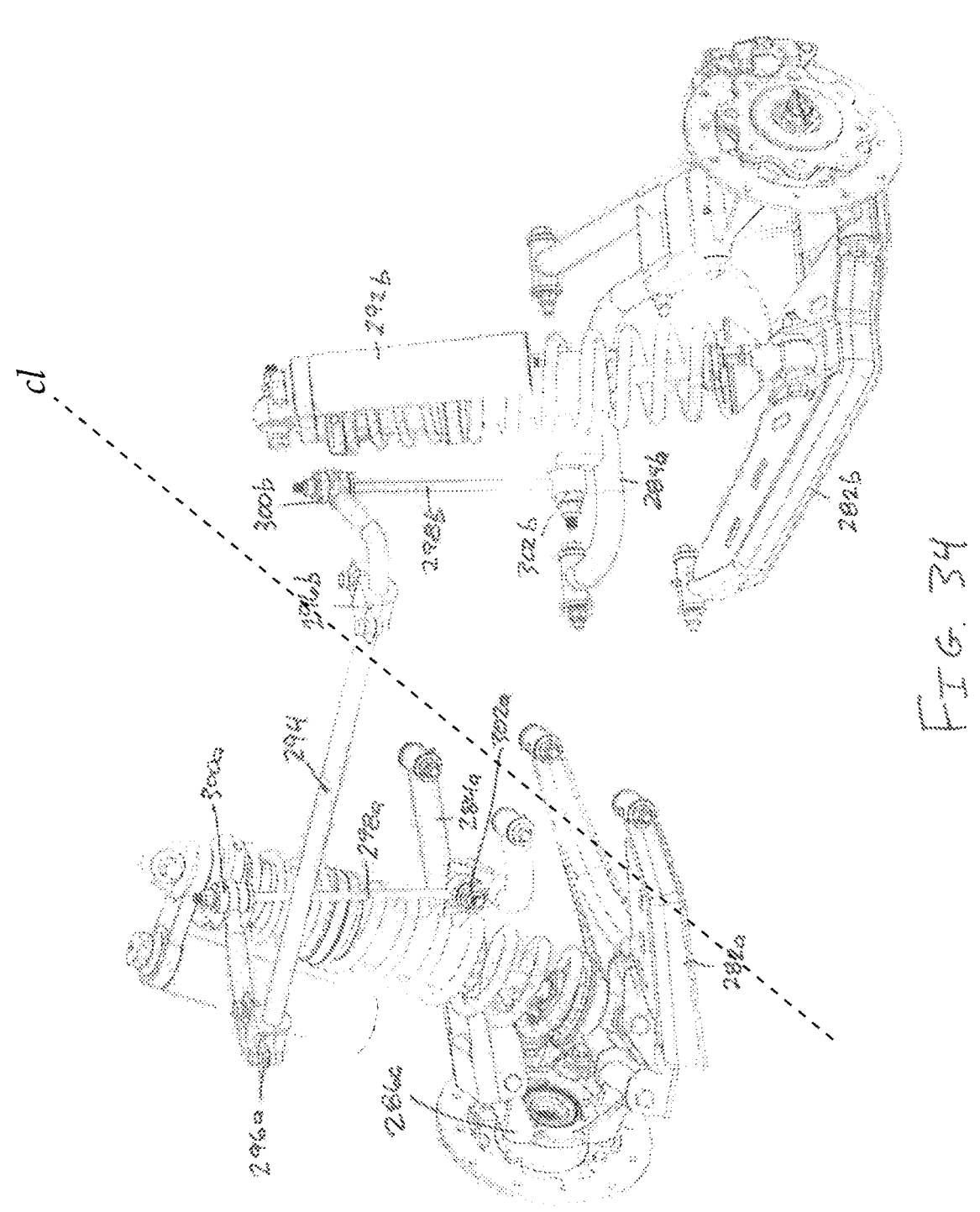
FIG. 34 is an orthogonal view of the rear suspension according to some embodiments.
Figure 35:
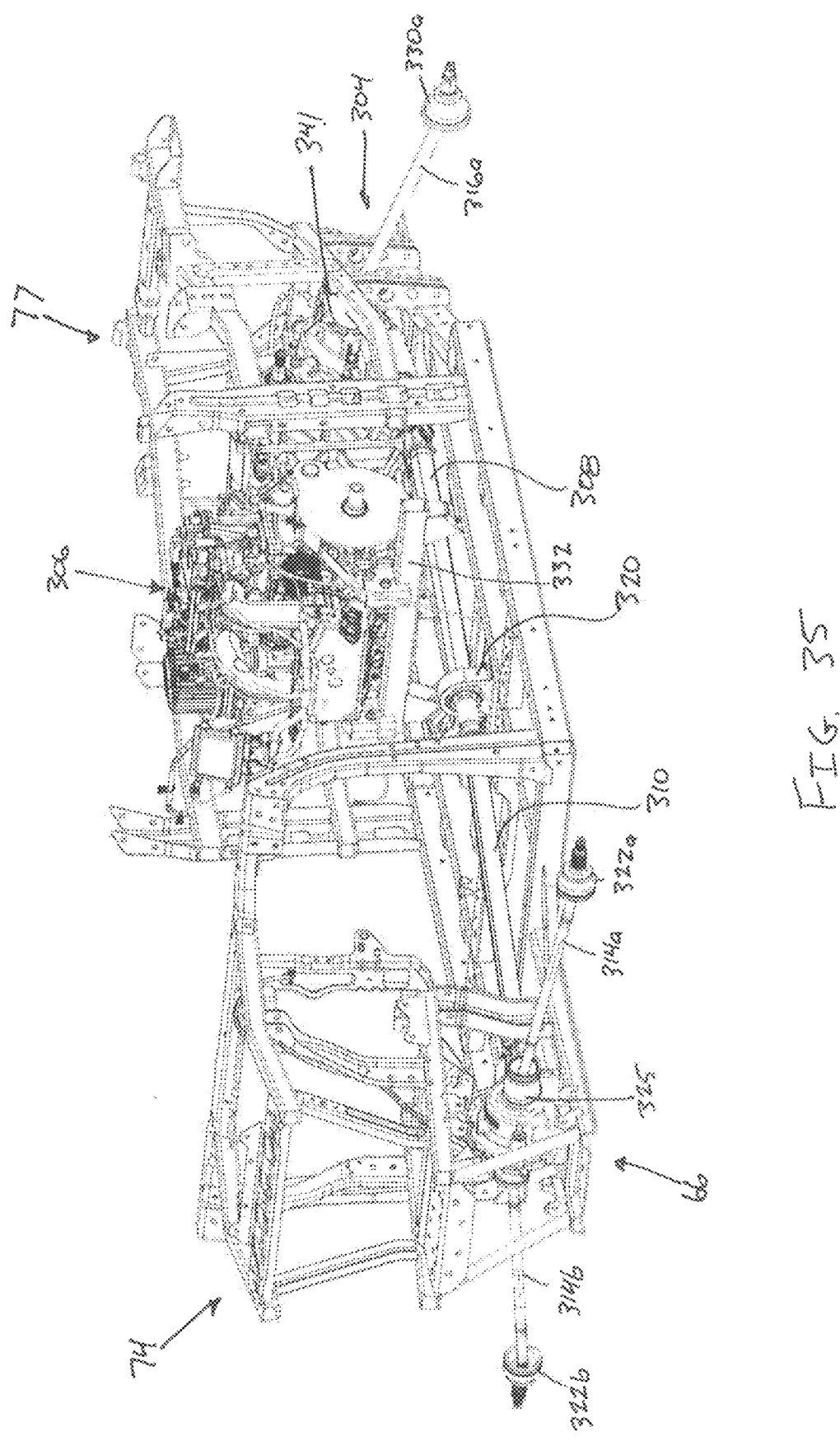
FIG. 35 is an orthogonal view of the frame and drivetrain components according to some embodiments.

FIGS. 29 and 30 illustrate the front suspension 30, and FIGS. 33 and 34 illustrate the rear suspension 32 of utility vehicle 10 according to some embodiments. Front suspension 30 includes front lower A-arms 236a, 236b, front upper A-arms 238a, 238b, front knuckle 240a, 240b, front springs 242a, 242b, front shocks 244a, 244b, lower A-arm connector 246, hydraulic cylinders 248a, 248b, and front anti-sway bar 250. Lower A-arm connector 246 is connected to front lower A-arms 236a and 236b, and is also connected to frame 14 (in particular, forward bracket member 96 shown in FIG. 28). Front lower A-arms 236a, 236b are connected to front knuckle 240a, 240b, which in turn supports ground engaging member 16. Front upper A-arm 238a, 238b is connected to frame 14 on one end, and to the top of front knuckle 240a, 240b, respectively, on the other end. Front anti-sway bar 250 is connected to both front upper A-arms 238a, and 238b. In the embodiment shown in FIG. 30, front anti-sway bar 250 is connected through a series of linkages to front upper A-arms 238a and 238b. In one embodiment, linkages include vertical anti-roll bar (ARB) links 252a, 252b, lower elastomeric members 254a, 254b, and upper elastomeric members 256a, 256b. Front anti-sway bar 250 includes a lateral portion that is held in place by frame mounting brackets 258a, 258b, which mounts the front anti-sway bar 250 to frame 14. In addition to the lateral portion, front anti-sway bar 250 includes approximately ninety degree bends on each end that directs the front anti-sway bar 250 in a generally forward direction. The two ends of front anti-sway bar 250 are coupled through upper elastomeric members 256a, 256b to ARB links 252a, 252b, respectively, which in turn are coupled through elastomeric members 254a, 254b to front upper A-arms 238a, 238b, respectively. In operation, vertical movement by one of the front upper A-arms (e.g., 238a) but not the other is resisted by the spring-force of front anti-sway bar 250. Elastomeric members allow rotation about a central axis of the elastomeric members, and frame mounting brackets 258a, 258b similarly allow front anti-sway bar to rotate within the mounting bracket. In some embodiments, the geometry of front anti-sway bar 250 is selected such that ARB links 252a, 252b are positioned directly above front upper A-arms 238a, 238b, specifically above the portion to which the ARB links 252a, 252b are attached.

Rear suspension 32 includes rear lower A-arms 282a, 282b, rear upper control arms 284a, 284b, rear knuckle 286a, 286b, rear springs 288a, 288b, rear shocks 290a, 290b, hydraulic cylinders 292a, 292b, and rear anti-sway bar 294. Rear lower A-arms 282a, 282b are connected to rear knuckle 286a, 286b, which in turn supports ground engaging member 16. Rear upper control arms 284a, 284b is connected to frame 14 on one end, and to the top of rear knuckle 286a, 286b, respectively, on the other end. Rear anti-sway bar 294 is connected to both rear upper control arms 284a, and 284b. In the embodiment shown in FIG. 34, rear anti-sway bar 294 is connected through a series of linkages to rear upper control arms 284a and 284b. In one embodiment, linkages include rear anti-roll bar (ARB) links 298a, 298b, lower elastomeric members 302a, 302b, and upper elastomeric members 300a, 300b. Rear anti-sway bar 294 includes a lateral portion that is held in place by rear hangars 296a, 296b, which mounts the rear anti-sway bar 294 to frame 14. In addition to the lateral portion, rear anti-sway bar 294 includes approximately ninety degree bends on each end that directs the rear anti-sway bar 294 in a generally forward direction. The two ends of rear anti-sway bar 294 are coupled through upper elastomeric members 300a, 300b to rear ARB links 298a, 298b, respectively, which in turn are coupled through elastomeric members 302a, 302b to rear upper control arms 284a, 284b, respectively. In operation, vertical movement by one of the rear upper control arms (e.g., 284a) but not the other is resisted by the spring-force of rear anti-sway bar 294. Elastomeric members allow rotation about a central axis of the elastomeric members, and rear hangars 296a, 296b similarly allow rear anti-sway 294 bar to rotate within the mounting bracket. In some embodiments, the geometry of rear anti-sway bar 294 is selected such that rear ARB links 298a, 298b are positioned directly above rear upper control arms 284a, 284b, specifically above the portion to which the rear ARB links 298a, 298b are attached. In some embodiments, rear anti-sway bar 294 is positioned outside of frame 14, and in particular is rearward of control arm vertical supports 272a, 272b, and 273a, 273b to which the rear ARB links 298a, 298b are attached. In some embodiments, relative to rear springs 288a, 288b and rear shocks 290a, 290b, rear anti-sway bar 294 is positioned rearward of both.

In addition, in some embodiments, relative to exhaust 36, rear anti-sway bar 294 is similarly positioned rearward of exhaust system 36. Utilizing both a front anti-sway bar 250 and rear anti-sway bar 294 reduces body roll as a result of fast cornering of the car and/or traveling over uneven surfaces.

FIGS. 35-48 include perspective, side, bottom, top, front, back, and exploded views of drivetrain components according to some embodiments. In some embodiments, utility vehicle 10 is a 4-wheel drive vehicle that provides power to all four wheels. In other embodiments, utility vehicle 10 may be a front-wheel drive or rear wheel drive vehicle in which power is provided to only two of the four wheels. The embodiment shown in FIGS. 35-48 refers to a 4-wheel drive vehicle, in which drivetrain components include, in general, engine/prime mover 306, rear driveshaft 308, shaft coupler 312, front driveshaft 310, front drivetrain 66 which includes front half shafts 314a, 314b, and rear drivetrain 304 which includes rear half shafts 316a, 316b. Engine/prime mover 306 is located in the rear portion of utility vehicle 10, supported by frame 14. Rear driveshaft 308, shaft coupler

Figure 38:
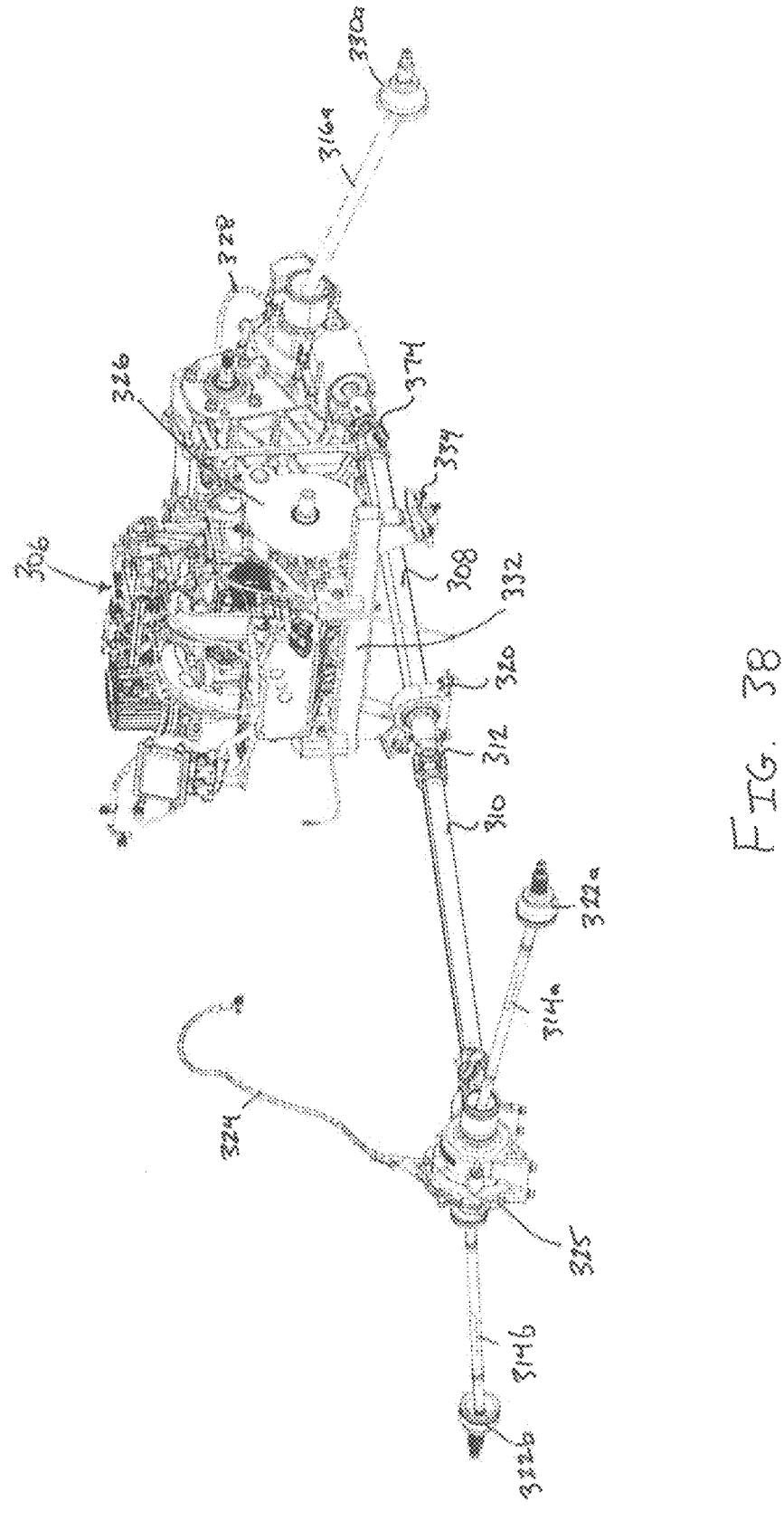
FIG. 38 is an orthogonal view of the drivetrain components according to some embodiments.
Figure 39:
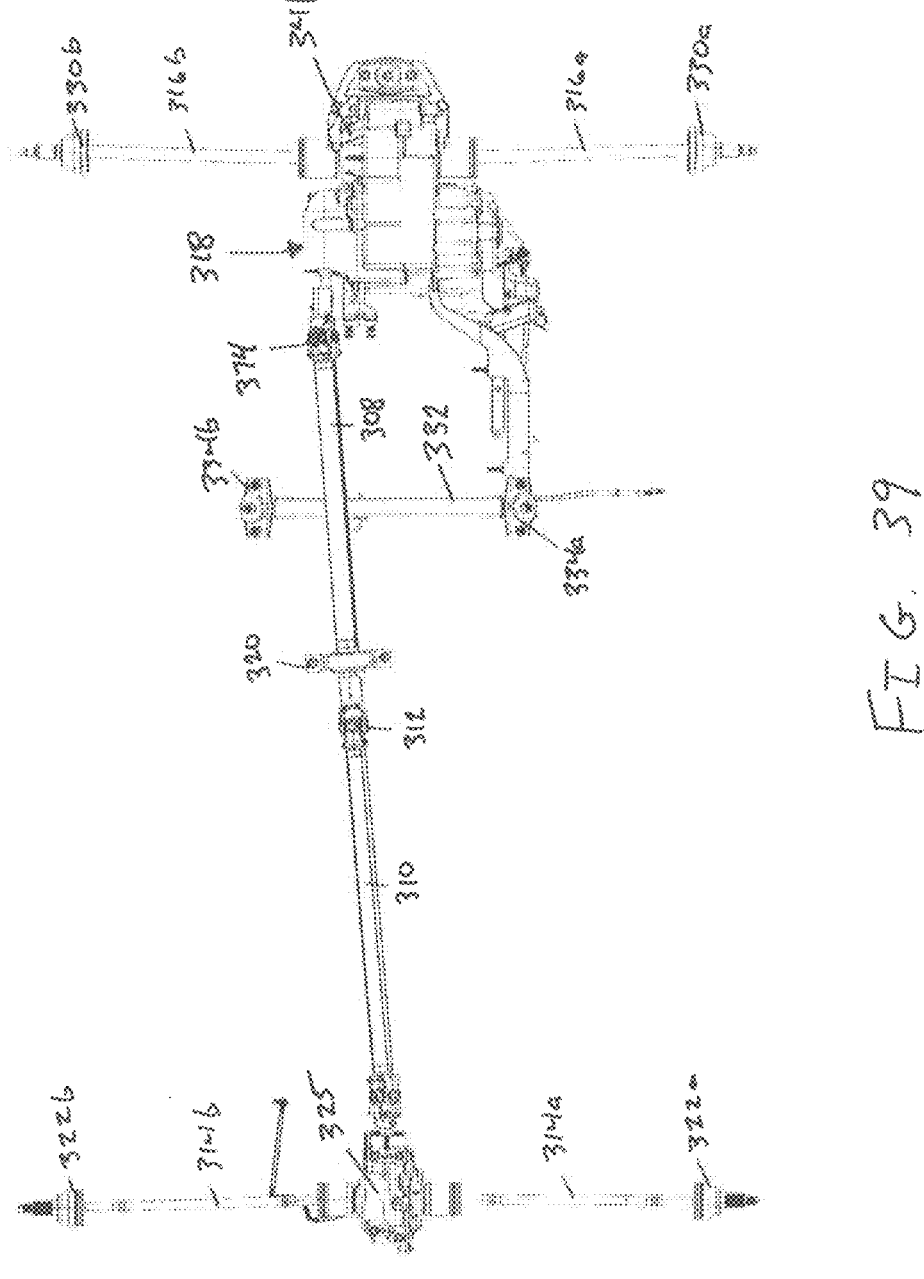
FIG. 39 is a top view of the drivetrain components according to some embodiments.
Figure 40:
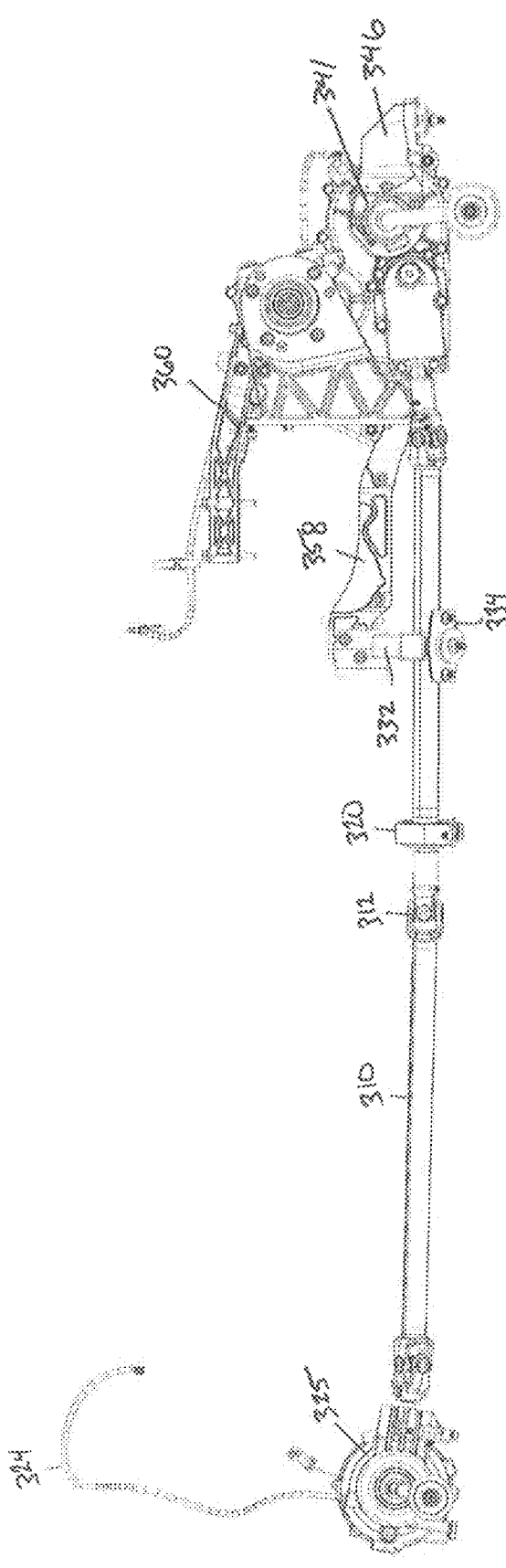
FIG. 40 is a side view of the drivetrain components according to some embodiments.
Figure 41:
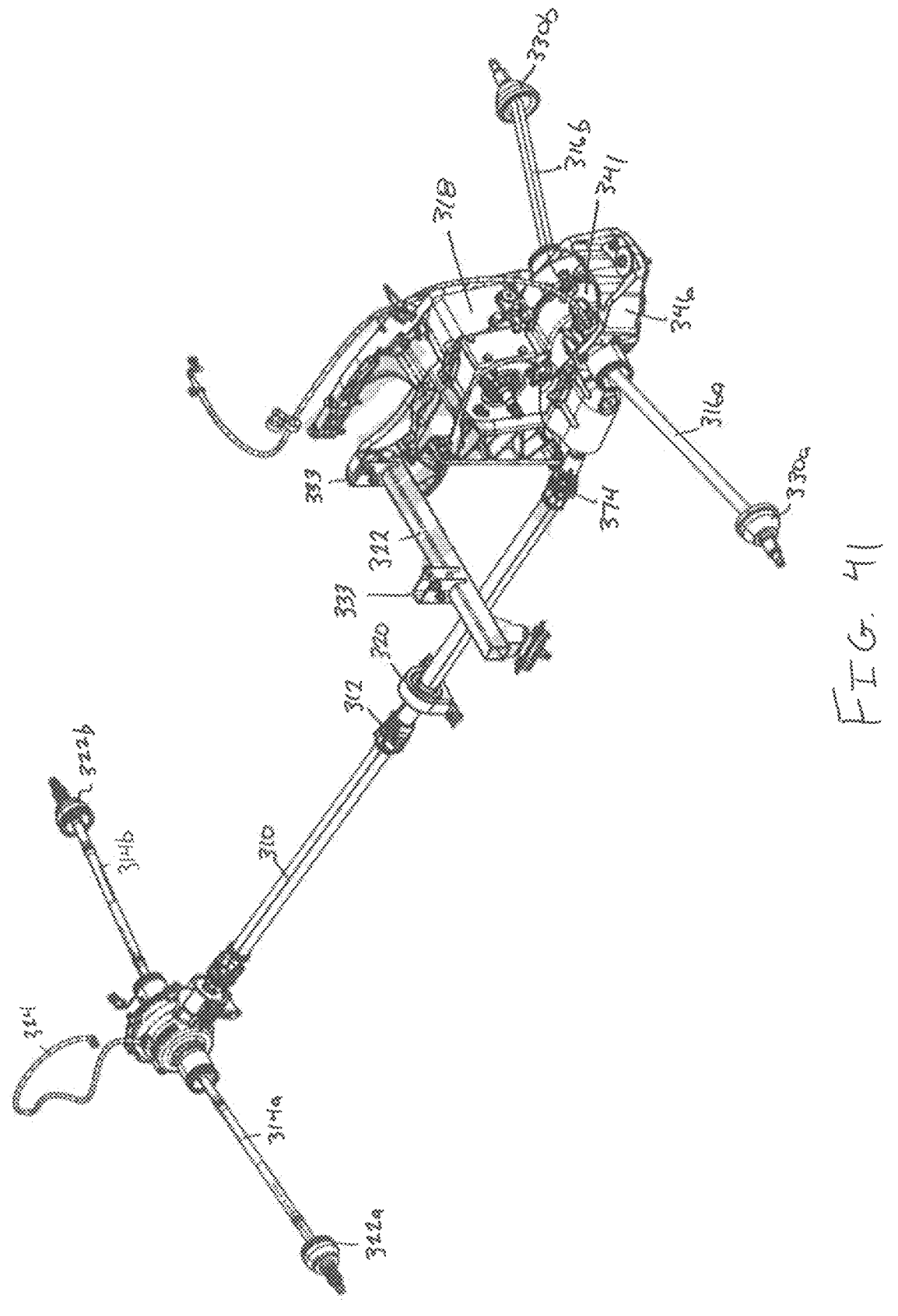
FIG. 41 is an orthogonal view of the drivetrain components according to some embodiments.

312, and front driveshaft 310 act to communicate mechanical power from engine/prime mover 306 to front drivetrain 66, which distributes the received mechanical power to forward or front ground engaging members 16. In some embodiments, front drivetrain 66 includes a differential that may utilize differential gearing to distribute power to the respective left and right front wheels. In some embodiments, the differential may be an open differential, locking differential, limited-slip differential, electronically controlled limited-slip differential, or others. Similarly, the rear drivetrain 304 may utilize a differential including any of those listed above. In addition to differentials, front drivetrain 66 may include a hose 324 for providing a lubricant to the gears of the differential assembly, and may further include front continuous velocity (CV) axles 322a, 322b, which may include inner CV joints and outer CV joints, for coupling the differential to the ground engaging members as shown in FIG. 38.

Figure 36:
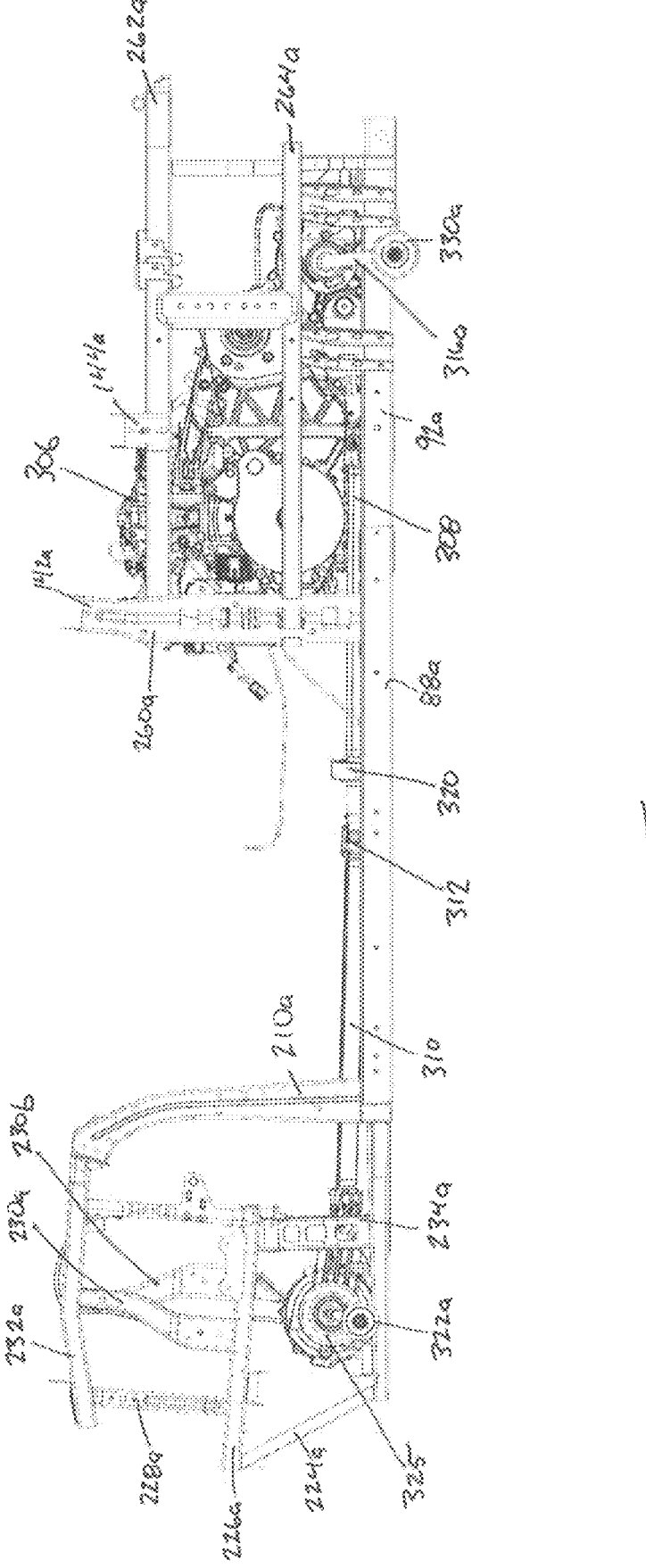
FIG. 36 is a side view of the frame and drivetrain components according to some embodiments.
Figure 37:
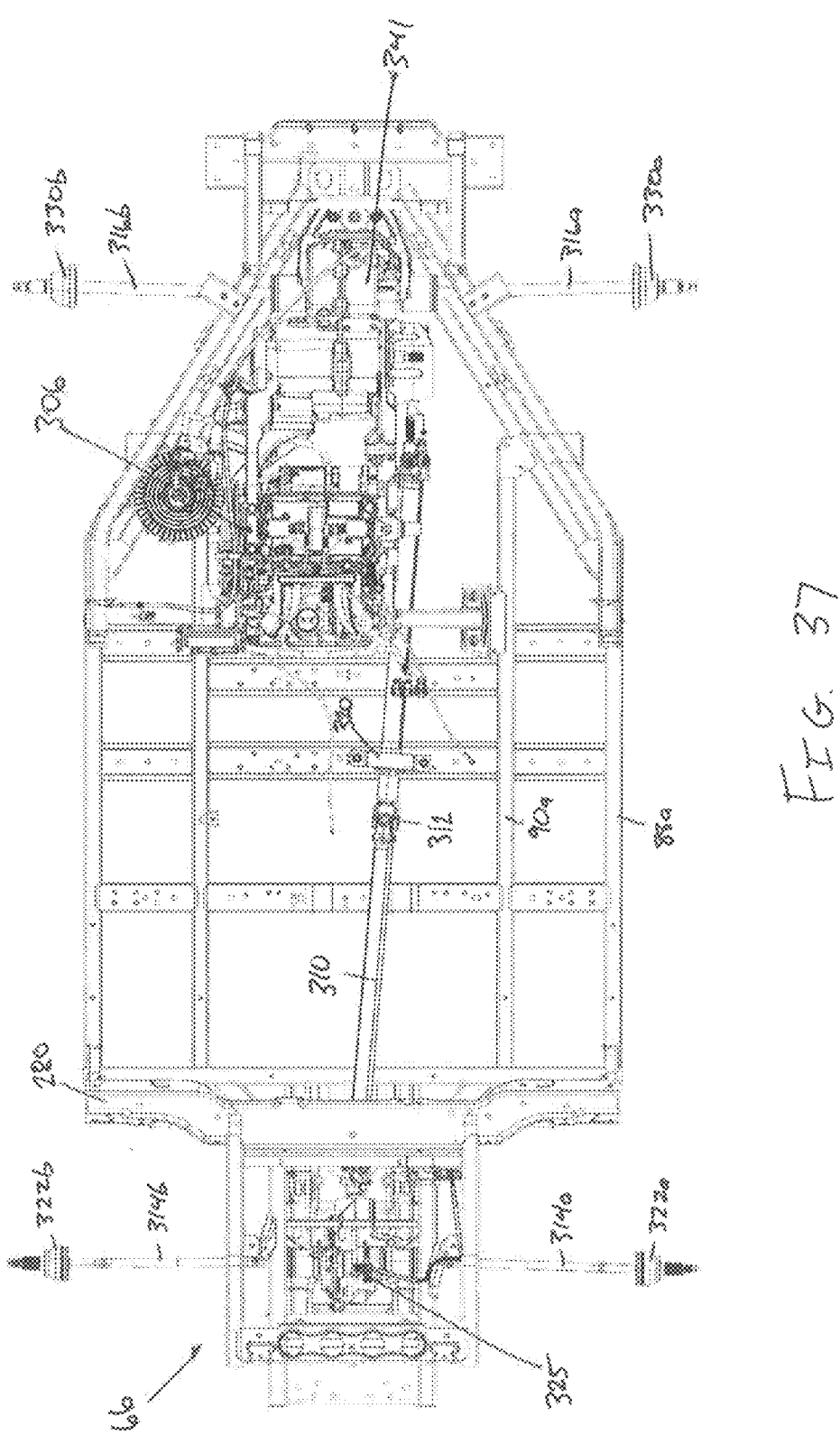
FIG. 37 is a top view of the frame and drivetrain components according to some embodiments.

The embodiment shown in FIG. 36 illustrates the relative elevation of the drivetrain components relative to one another and to frame 14. For example, assuming horizontal frame components are approximately level, rear driveshaft 308 and front driveshaft 310 angle generally upward from back to front. In other embodiments, rear driveshaft 308 and front driveshaft 310 are approximately level. In addition, FIG. 36 illustrates the elevation of rear drivetrain 304 as slightly elevated compared with front drivetrain 66. The top view shown in FIG. 37 illustrates how rear driveshaft 308 and front driveshaft 310 are angled relative to the centerline axis to accommodate the location of the crankshaft/flywheel associated with prime mover/engine 306. FIG. 37 also illustrates how the rear driveshaft 308 and front driveshaft 310 are supported by shaft mount 320. In the embodiment shown in FIG. 37, shaft mount 320 is mounted to frame crossbar components, and supports rear driveshaft 308. In other embodiments, additional. Shaft mounts may be utilized and/or located at different locations along the length of rear driveshaft 308 and front driveshaft 310.

Figure 42:
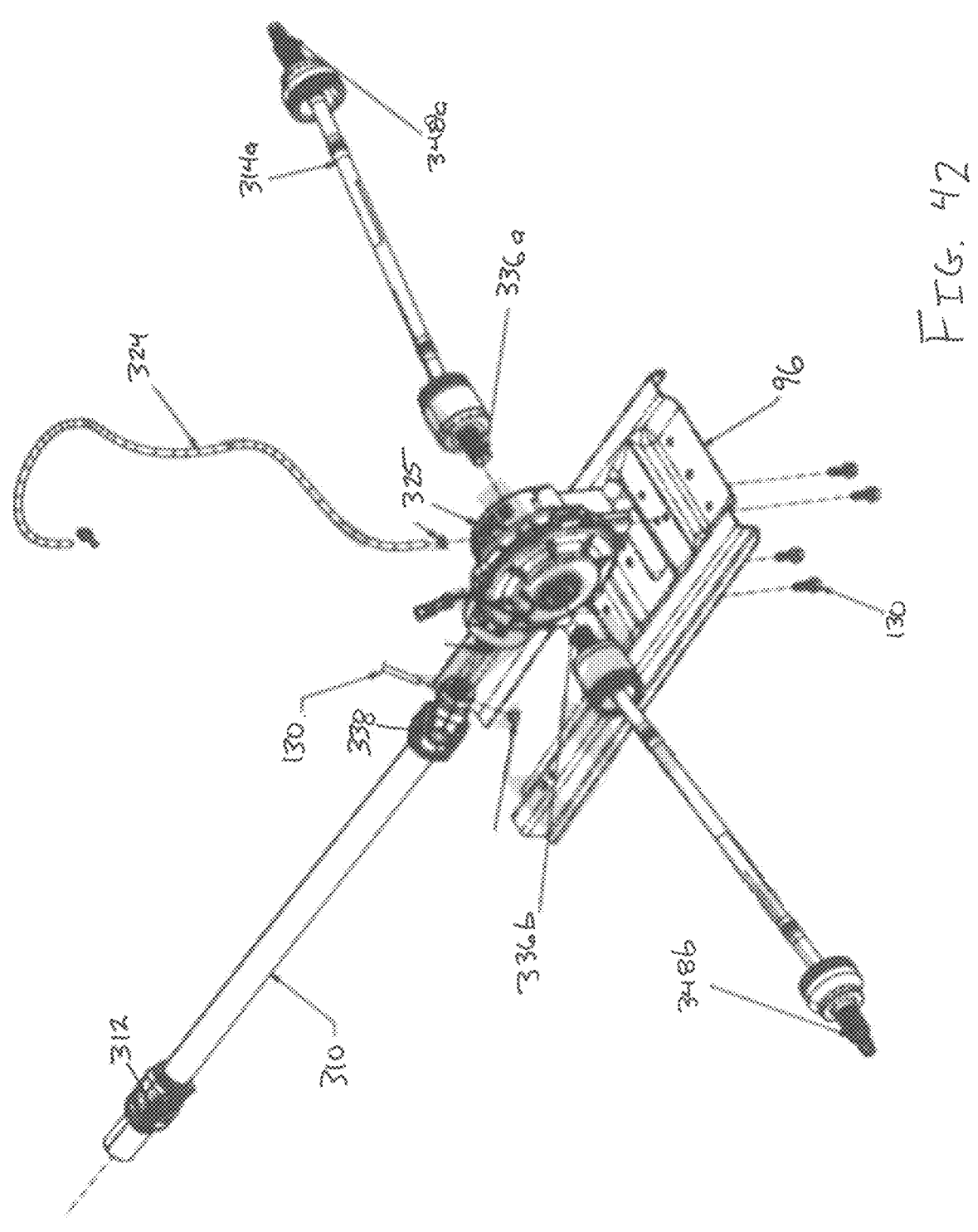
FIG. 42 is an orthogonal view of the drivetrain components according to some embodiments.
Figure 43:
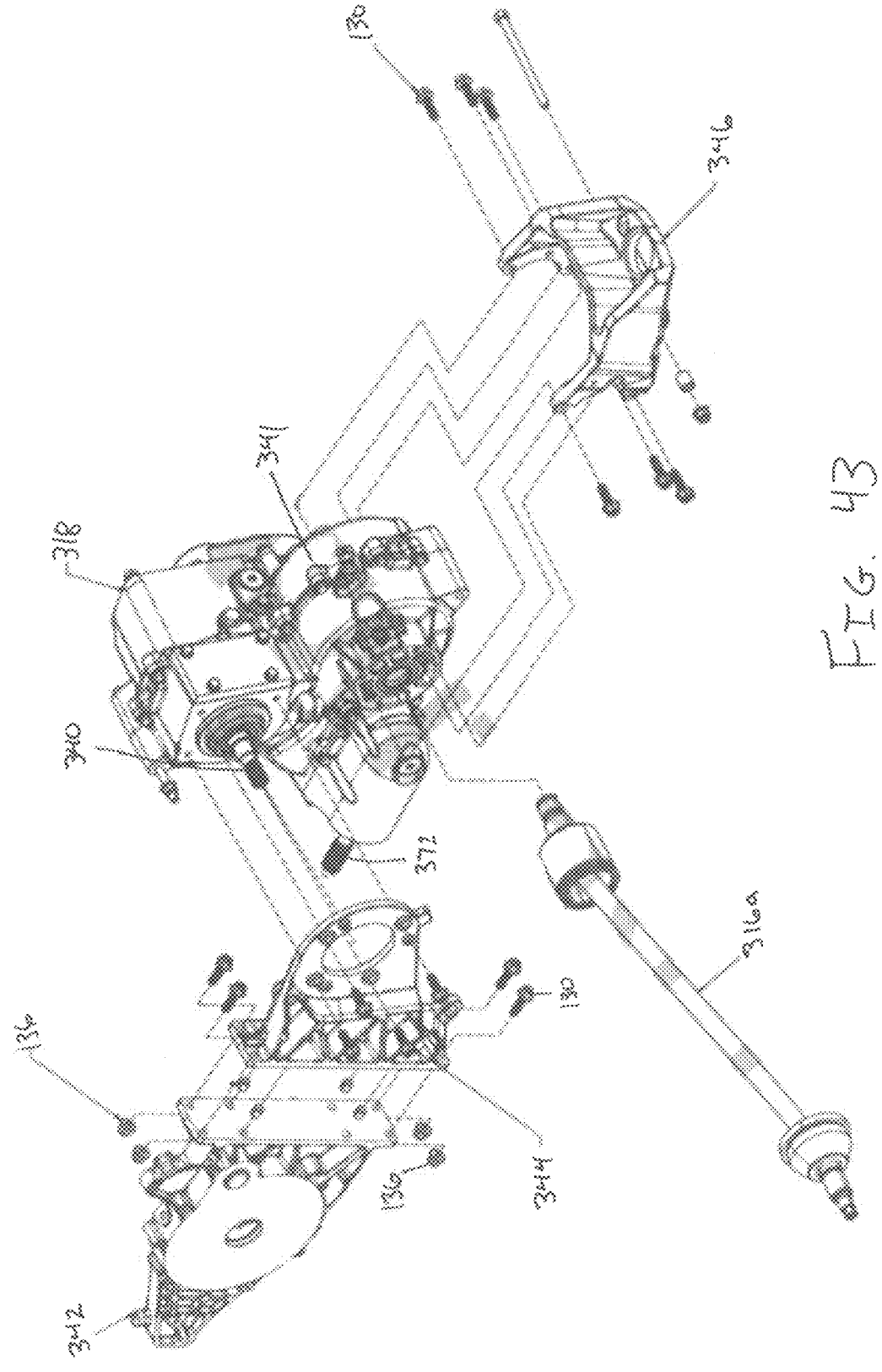
FIG. 43 is an exploded view of the gearbox and half-shafts according to some embodiments.

In some embodiments, front drivetrain 66 is mounted directly to forward bracket member 96 via plurality of fasteners. In addition, CV axles 322a, 322b include spline/shaft couplers 336a, 336b for coupling the CV axles to the front differential as shown in FIG. 42.

In some embodiments, rear drivetrain 304 includes gearbox 318, rear differential 341, engine cover 342, gearbox cover 344 and rear differential cover 346. Gearbox input shaft 340 is configured to receive power generated by the engine/prime mover 306 (as provided via the crankshaft 394 and CVT 80 such as a continuously variable transmission as shown in FIGS. 52-56). Gearbox 318 distributes the mechanical power received at gearbox input shaft 340 from the CVT 80 to front drivetrain axle 343 as well as to rear differential 341, located adjacent to gearbox 318. In some embodiments, mechanical power is distributed by gearbox 318 to rear driveshaft 308 via splined output shaft 372 shown in FIG. 48, which is coupled to rear driveshaft 308 via shaft coupler 314. In some embodiments, second middle lateral member 100 is utilized to support rear driveshaft 308 via a shaft mount 320 shown in FIG. 48. In some embodiments, shaft mount 320 includes a shaft bushing and/or bearing mount. In some embodiments, additional shaft mounts may be utilized forward or rearward of shaft mount 320 to provide support for the rear driveshaft 308 and/or front driveshaft 310. Furthermore, in the embodiment shown in FIG. 44, rear differential cover 346 is secured to rear differential 341 via a plurality of fasteners. Likewise, engine cover 342 is secured to gearbox 318 via a plurality of fasteners.

Figure 44:
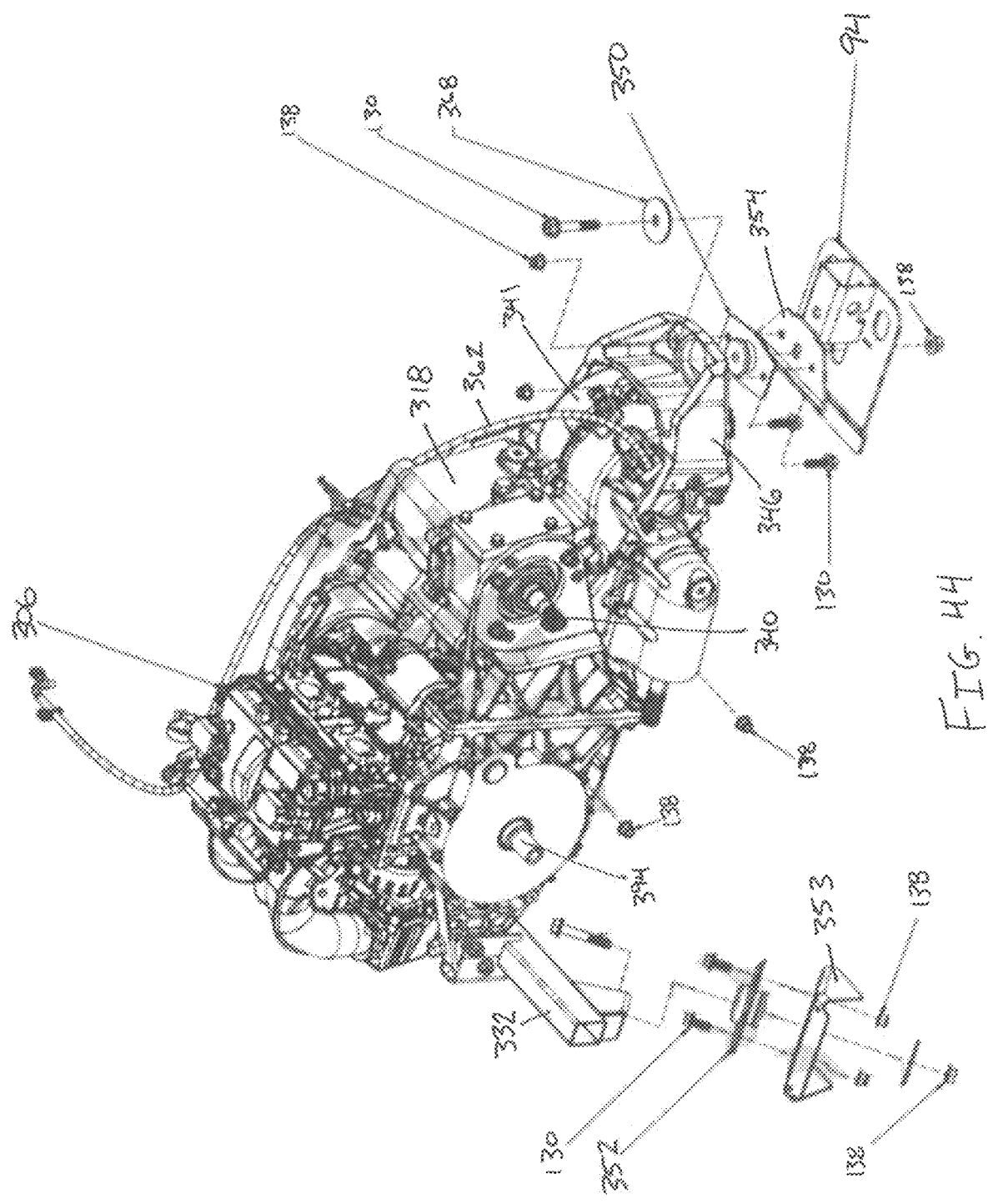
FIG. 44 is an exploded view of the engine/prime mover connected to the frame according to some embodiments.
Figure 45:
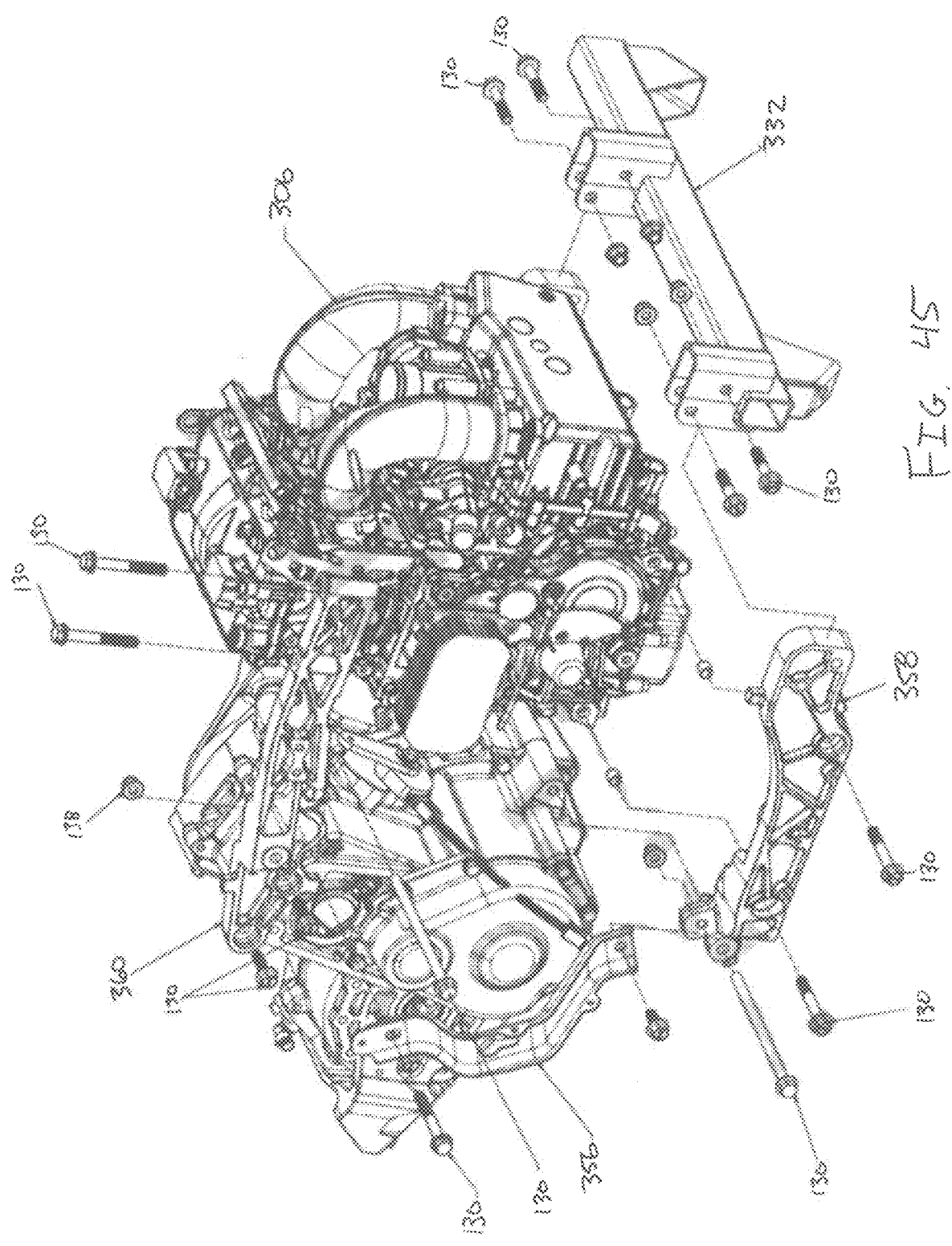
FIG. 45 is an orthogonal view of the engine/prime mover connected to the frame according to some embodiments.
Figure 46:
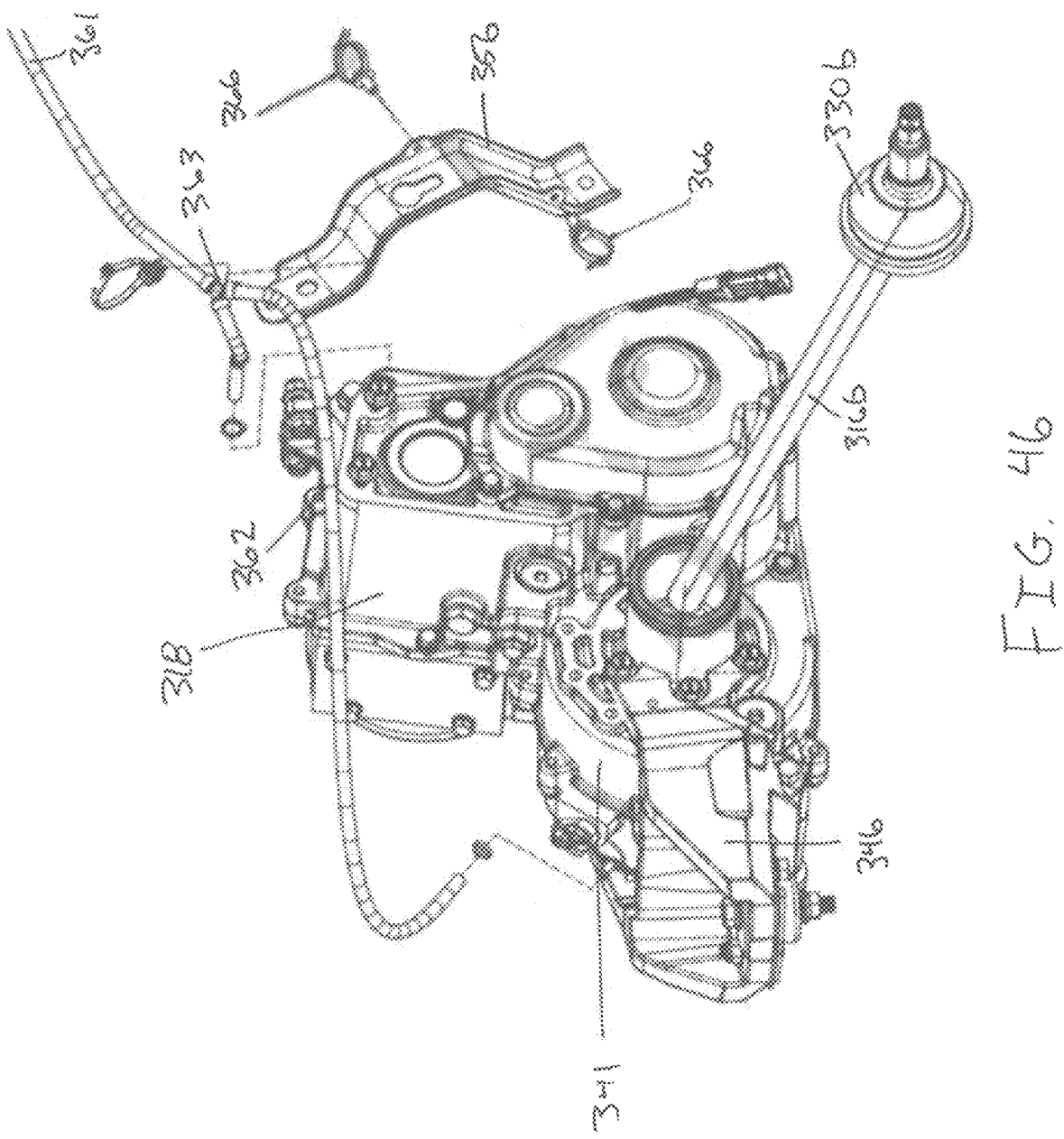
FIG. 46 is an orthogonal view of the rear differential according to some embodiments.
Figure 47:
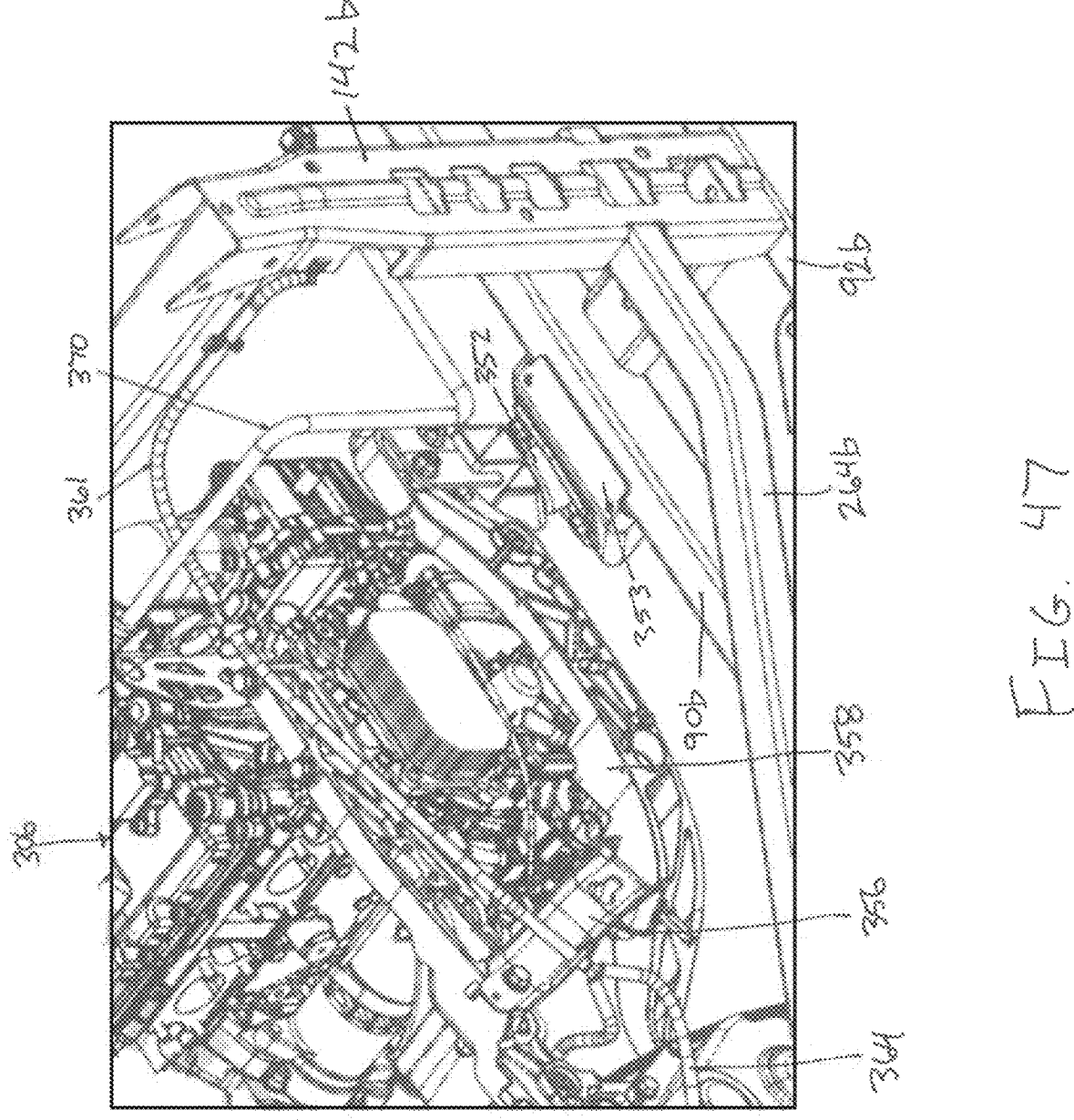
FIG. 47 is an orthogonal view illustrating connection of the engine/prime mover to the frame according to some embodiments.
Figure 48:
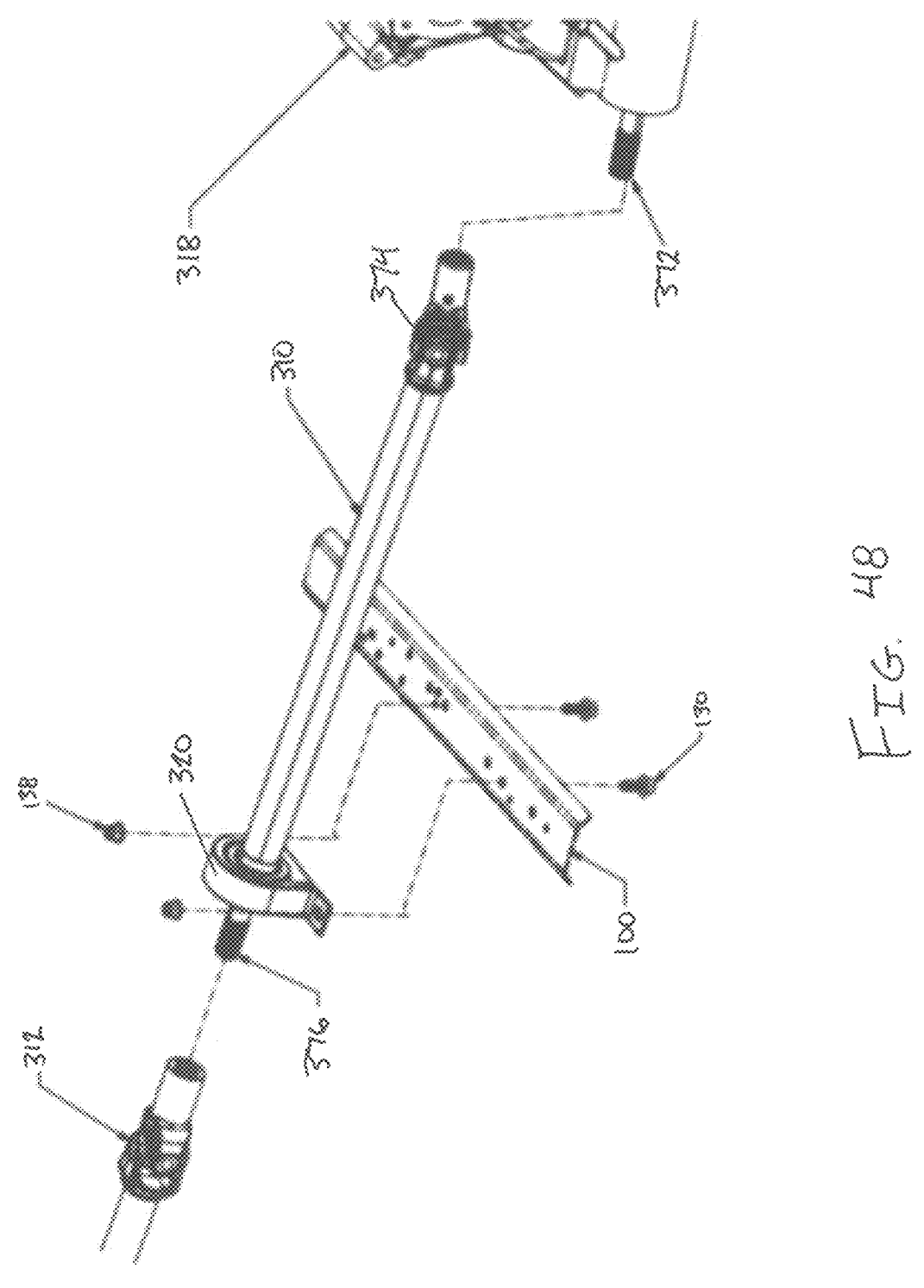
FIG. 48 is an exploded view illustrating the connection of the front drive shaft to the frame according to some embodiments.
Figure 49:
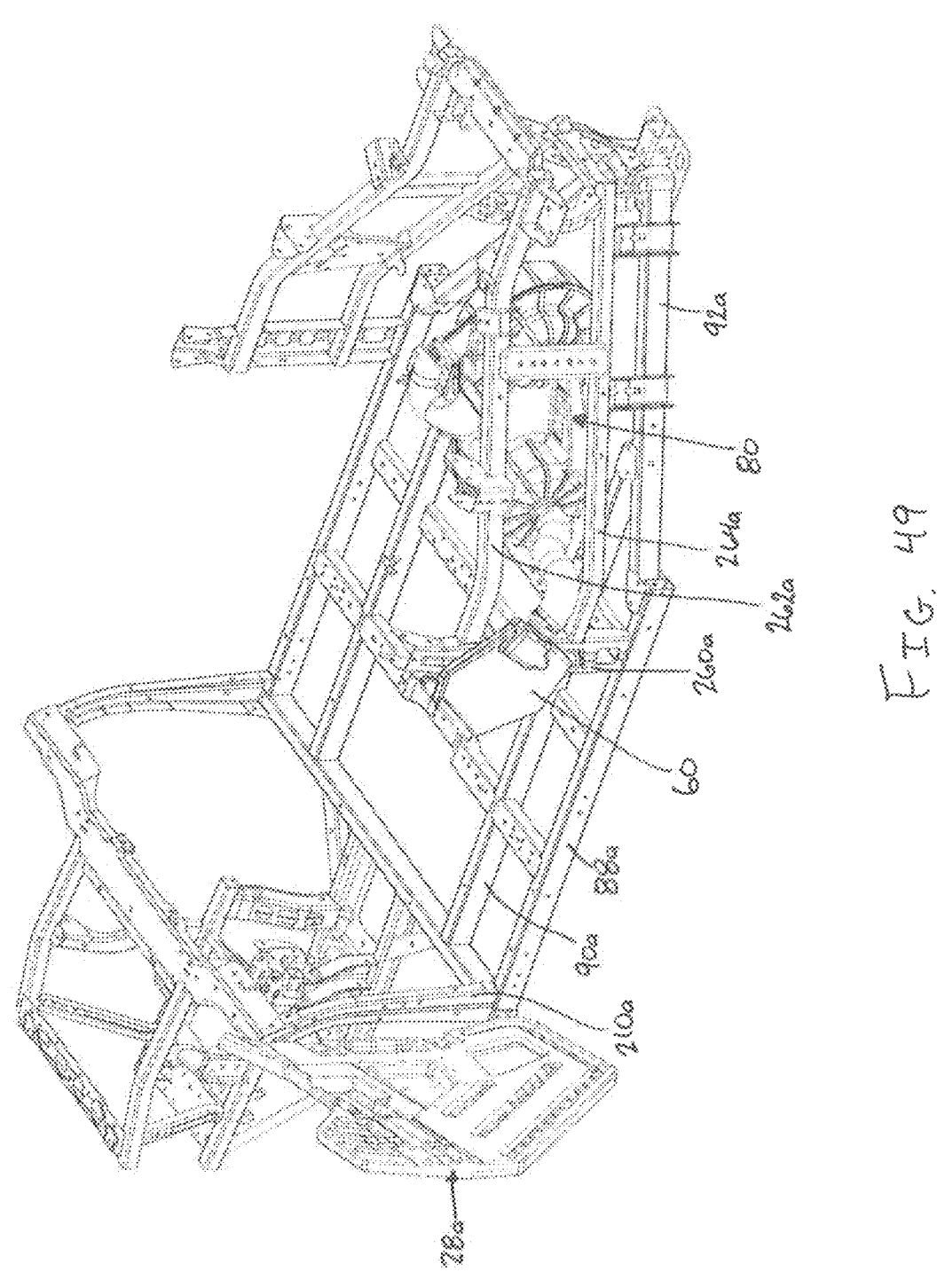
FIG. 49 is an orthogonal view of the continuously variable transmission (CVT) cooling system and CVT within the vehicle frame according to some embodiments.

FIGS. 44 and 45 illustrate rear drivetrain 304 mounted on the prime mover/engine 306, as well as mounting of both rear drivetrain 304 and prime mover/engine 306 to frame 14. For example, in some embodiments, vibration isolators are utilized to mount rear drivetrain 304 and/or prime mover/ engine 306 to frame 14. In some embodiments, vibration isolators comprise elastomeric rings selected to dampen/ reduce vibrations. In the embodiment shown in FIG. 44, rear vibration isolator 350 is coupled between rear differential cover 346 and rear bracket 94. In this embodiment, a plurality of fasteners are utilized to secure rear differential cover 346 to rear bracket 94. In some embodiments a forward vibration isolator 352 is connected between engine support member 332 and mounting bracket 353 that is then connected to inner lower frame member 90 as shown in FIG. 47.

In some embodiments, a plurality of brackets are utilized to secure prime mover/engine 306 to frame 14. For example, in the embodiment shown in FIG. 45, engine support member 332, mounting brackets 333, lower right casting 358, shifter bracket 356, and upper casting 360 are utilized to secure prime mover/engine 306 to frame 14. Upper casting is configured to receive one or more fasteners oriented in a vertical direction for securing the upper casting 360 to prime mover/engine 306, and further configured to receive one or more fasteners oriented in a horizontal direction for securing the upper casting 360 to rear drivetrain 304. Shifter bracket 356 is configured to be coupled to upper casting 360. In some embodiments, the fasteners utilized to secure upper casting 360 to rear drivetrain 304 are also utilized to secure shifter bracket 356 to upper casting 360. In other embodiments, dedicated fasteners are utilized to secure shifter bracket 356 to upper casting 360. Shifter bracket 356 is further configured to be connected or otherwise secured to lower right casting 358. In one embodiment, fasteners utilized to secure shifter bracket 356 to lower right casting 358 also act to secure shifter bracket 356 and lower right casting to one or more of rear drivetrain 304 and prime mover/engine 306. For example, a first fastener is provided through shifter bracket 356, through a flange aperture in lower right casting 358, and secured with a bolt to couple shifter bracket 356 to lower right casting 358. A second fastener is provided through lower right casting 358 and secured to rear drivetrain 304, while additional fasteners are provided through lower right casting 358 and secured to prime mover/engine 306. In addition, in some embodiments, lower right casting 358 is secured to mounting brackets 333 located on engine support member 332. In this way, upper casting 360, shifter bracket 356, lower right casting 358, and engine support member 332 act to support and secure prime mover/engine 306 to frame 14 as well as securing rear drivetrain 304 to both engine 306 and frame 14. An assembled view of upper casting 360, shifter bracket 356, lower right casting 358, and engine support member 332 according to some embodiments is shown in FIG. 47.

Figure 50:
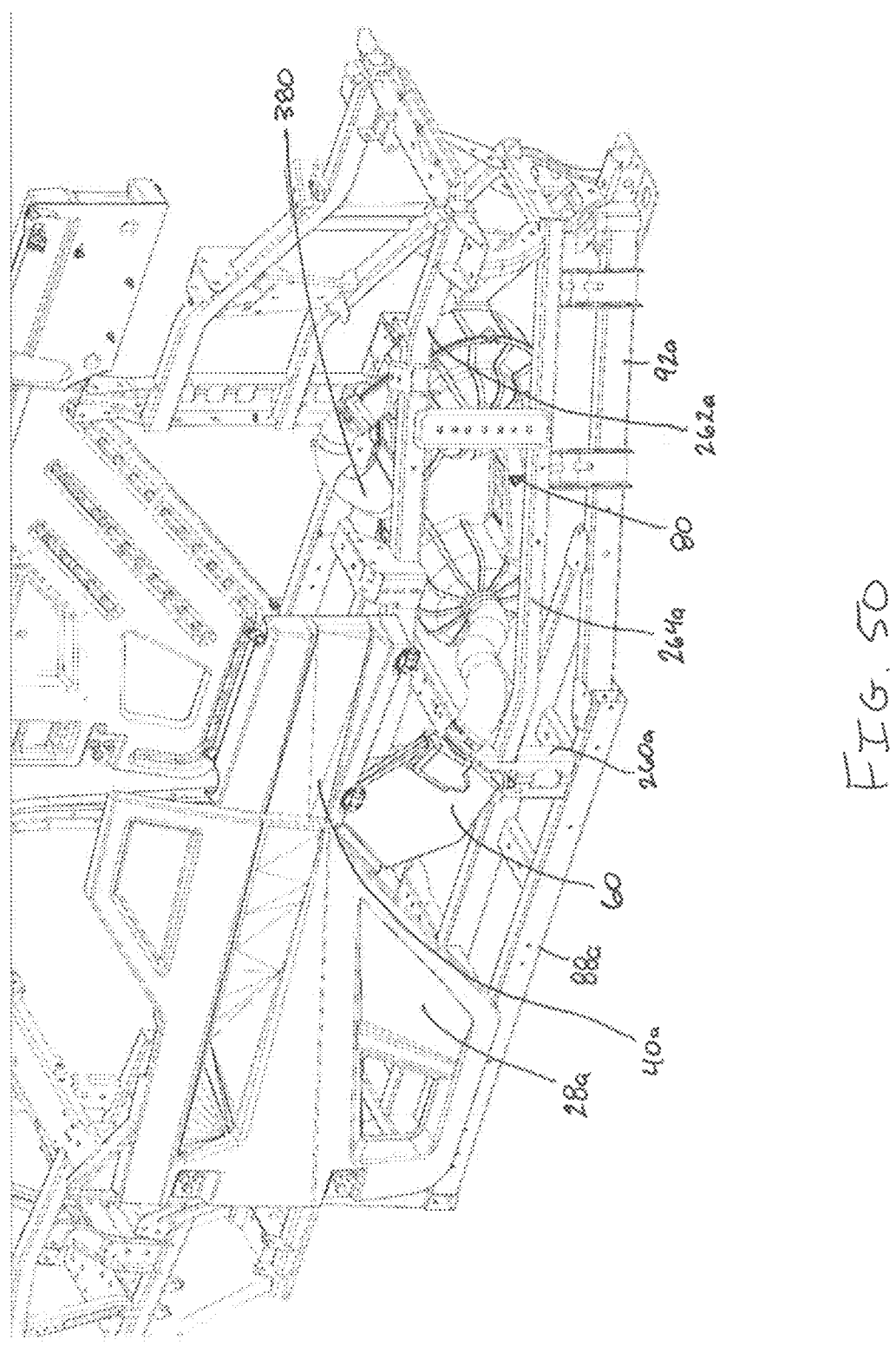
FIG. 50 is an orthogonal view of the continuously variable transmission (CVT) cooling system and CVT within the vehicle frame according to some embodiments.
Figure 51:
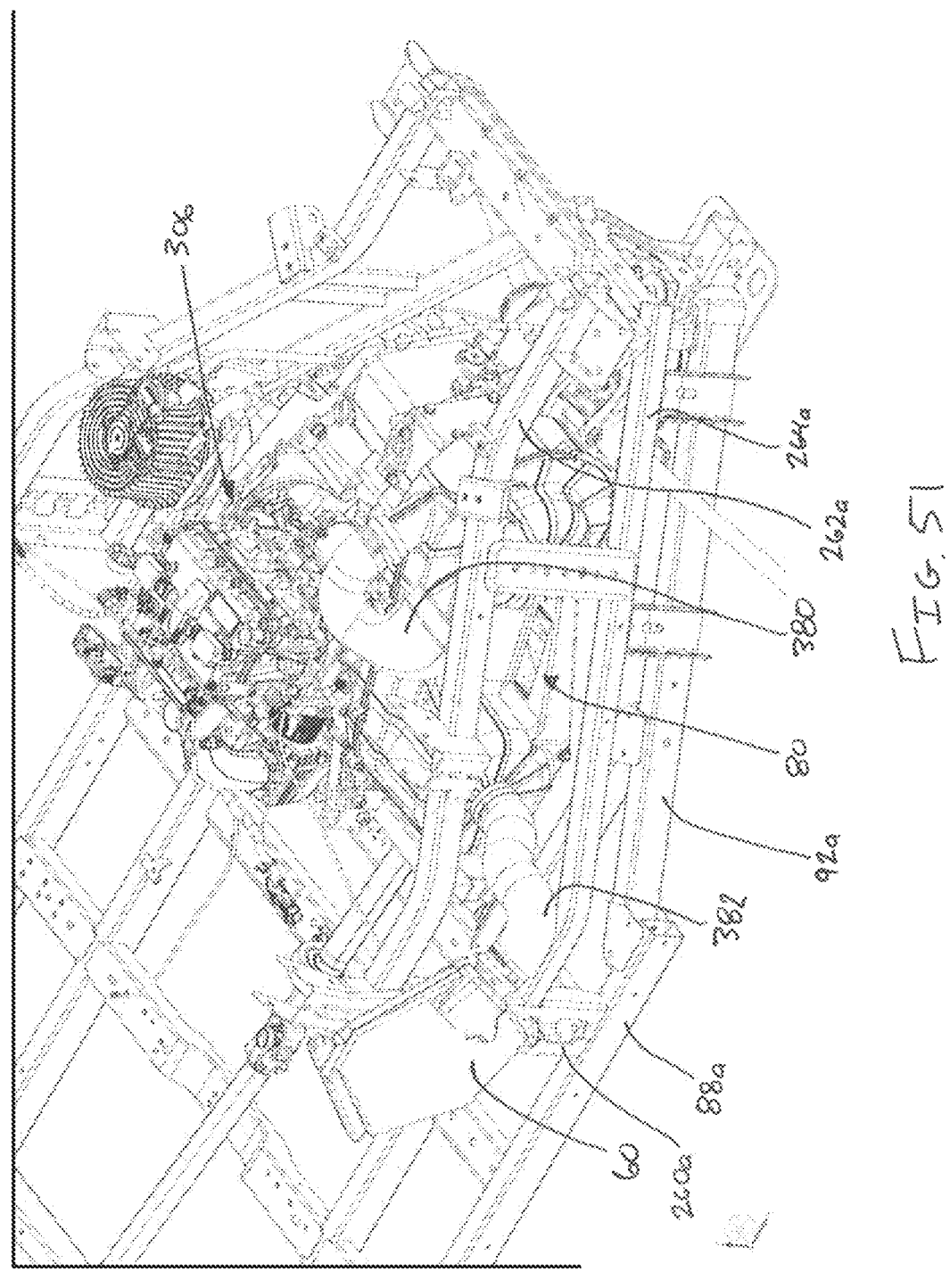
FIG. 51 is an orthogonal view of the CVT cooling system, CVT and engine within the vehicle frame according to some embodiments.

FIGS. 49-61 include perspective, exploded, side, and cross-sectional views of the continuously variable transmission (CVT) cooling system and CVT according to some embodiments. In some embodiments, CVT intake 60 is located on the driver side, positioned to pull air from within seating area 20, and to direct the cooling air via hose 382 into CVT 80 to provide cooling of the components located therein, before being discharged through CVT exhaust 380. In some embodiments, CVT intake 60 is mounted to the outside of rear outer vertical support member 260. In some embodiments, CVT intake 60 is located adjacent to driver-side door 28a and extended cab door 40. In particular, CVT intake is located just rearward of driver-side door 28a and just below extended cab door 40. In some embodiments, the location of CVT intake 60 adjacent driver-side door 28a results in CVT intake 60 acting as part of the body close-out associated with the interior of seating area 20, wherein the term "closeout" refers to panels/components that close out or separate the seating area from the frame of utility vehicle 10. For example, a dash acts as a portion of the interior closeout that separates the seating area 20 from the dash frame and components located forward of the dash (e.g., radiator, suspensions, etc.). In some embodiments, CVT intake 60 is configured geometrically to fit with driver side door 28a and other panel components to provide continuous interior closeout when driver side door 28a and other panel components are closed. For example, FIG. 50 illustrates how the geometry of CVT intake 60 is configured to fit alongside drive-side door 28a and rear upper panel 40 to provide interior closeout. In some embodiments, to provide functionality as part of the interior closeout, CVT intake 60 is positioned outside of components of frame 14. For example, in the embodiment shown in FIGS. 49-51 and 58-59, CVT intake 60 is located outside of rear outer vertical support member 260. In the embodiment shown in FIGS. 59 and 60, CVT intake 60 is located on the interior side of extended cab door 40, such that CVT intake 60 is sandwiched between components of frame 14 and exterior panel components such as extended cab door 40.

Figure 59:
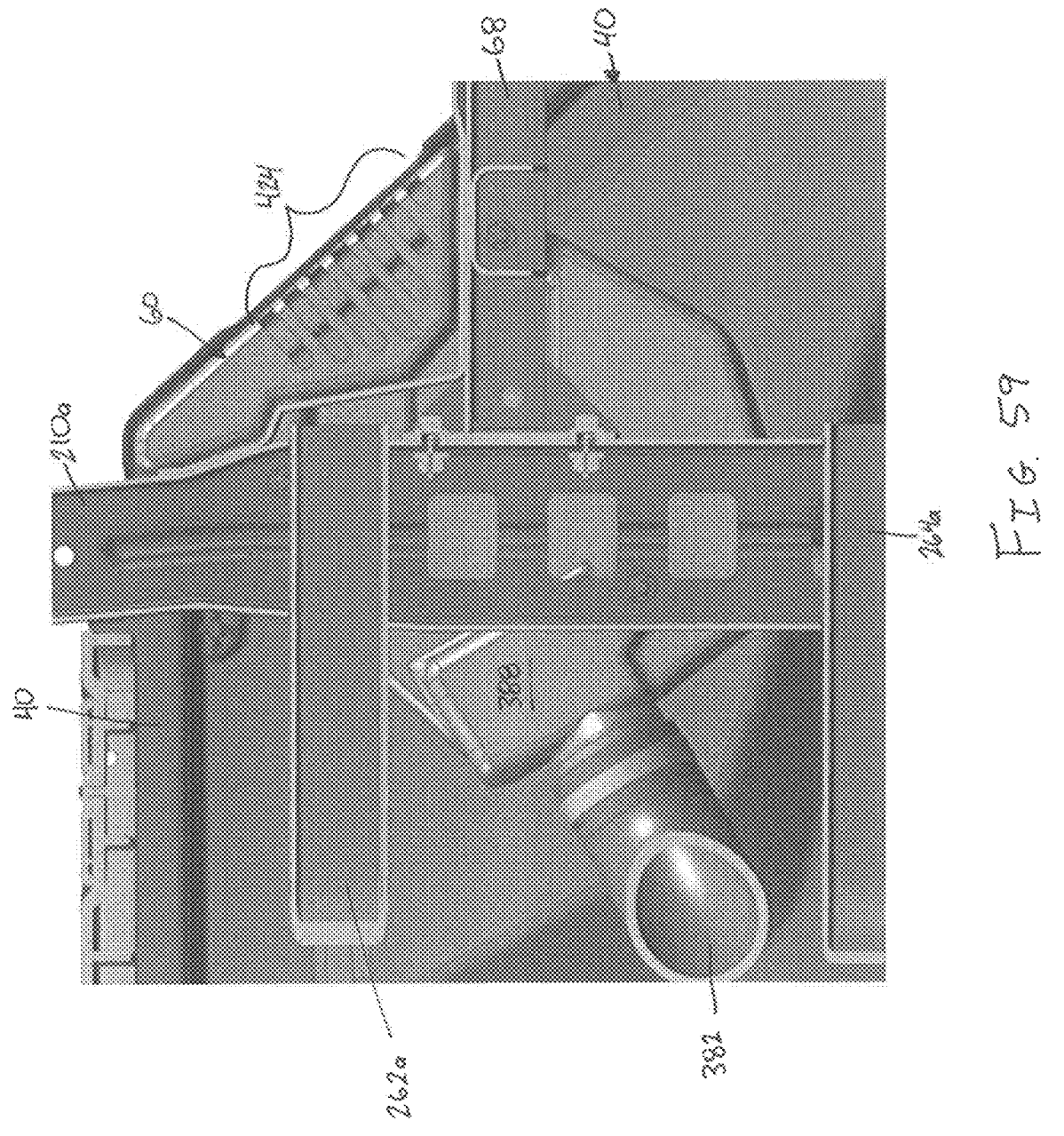
FIG. 59 is a cross-sectional view of the CVT intake and vehicle frame according to some embodiments.

In some embodiments, the CVT air vents 424 such as those shown in FIG. 59 are positioned to be located above seat frame 68 and forward of rear outer vertical support member 260. Positioning of CVT air vents 424 in this location protects air vents from conditions exterior to the body of utility vehicle 10 such as rain, mud, and dirt, while positioning the CVT air vents 424 in a way that allows air to be drawn from the interior (e.g., seating area 20) of utility vehicle 10. In some embodiments, CVT air vents 424 are located below the top of the interior closeout and external paneling, ensuring CVT air vents 424 are not subject to external conditions. CVT intake 60 provides output air via air hose 382 to CVT 80 is located below seat frame 68, and is provided between rear upper frame member 262 and rear middle frame member 264, and rearward of rear outer vertical support member 260. In this way, CVT intake 60 provides cooling airflow to CVT 80, described below.

In some embodiments, CVT 80 is coupled to receive mechanical power developed by prime mover/engine 306 via crankshaft 394, and to provide mechanical power to the gearbox 318 via gearbox input shaft 396. In the embodiment shown in FIG. 54, crankshaft 394 is coupled to flywheel 326 and drive clutch 402. A CVT belt 406 is coupled between drive clutch 402 and driven clutch 404. Both the drive clutch 402 and driven clutch 404 include a stationary and movable sheave, wherein CVT belt 406 is positioned between the stationary and movable sheaves in both the drive clutch 402 and the driven clutch 404. The distance between the sheaves determines the pitch radius, wherein when the sheaves are far apart, the CVT belt 406 rides lower and the pitch radius decreases. Conversely, when the movable sheave is positioned close to the stationary sheave, the belt rides higher and the pitch radius increases. The gear ratio provided by the CVT 80 is based on the pitch radius of the drive clutch 402 and the pitch radius of the driven clutch 404. A low gear (high torque output) is achieved when the movable sheave and the stationary sheave of the drive clutch 402 are far apart, and the movable sheave and the stationary sheave of the driven clutch 404 are close together. Similarly, a high gear (low torque output) is achieved when the movable sheave and the stationary sheave of the drive clutch 402 are close together, and the movable sheave and the stationary sheave of the driven clutch 404 are far apart. Because the pitch radius of both the drive clutch 402 and driven clutch 404 can be continuously modified, the CVT 80 provides a continuously variable gear ratio between the crankshaft 394 and gearbox input shaft 396.

However interaction of, CVT belt 406 with the drive clutch 402 and driven clutch 404 results in thermal loads. To dissipate thermal energy within CVT 80, cooling air is circulated through CVT 80. In some embodiments, in addition to providing mechanical power to drive clutch 402, crankshaft 394 is coupled to drive clutch fan 410. Clutch fan 410—when engaged—is driven by crankshaft 394 to pull cooling air from CVT air vents 424 located on CVT intake 60 and providing cooling air to drive clutch 402, driven clutch 404 and CVT belt 406. Cooling air circulated through CVT 80 is exhausted via CVT exhaust 380. In some embodiments, clutch fan 410 is engaged at all times (i.e., operates as just a fan). In other embodiments, various types of clutches may be utilized to selectively engage clutch fan 410, including viscous or fluid coupling clutch controlled via a bi-metallic sensory system, or electronically controlled via a temperature sensor and controller. In general, as the temperature rises (either within CVT 80, or elsewhere), clutch fan 410 is engaged to provide cooling air.

Figure 52:
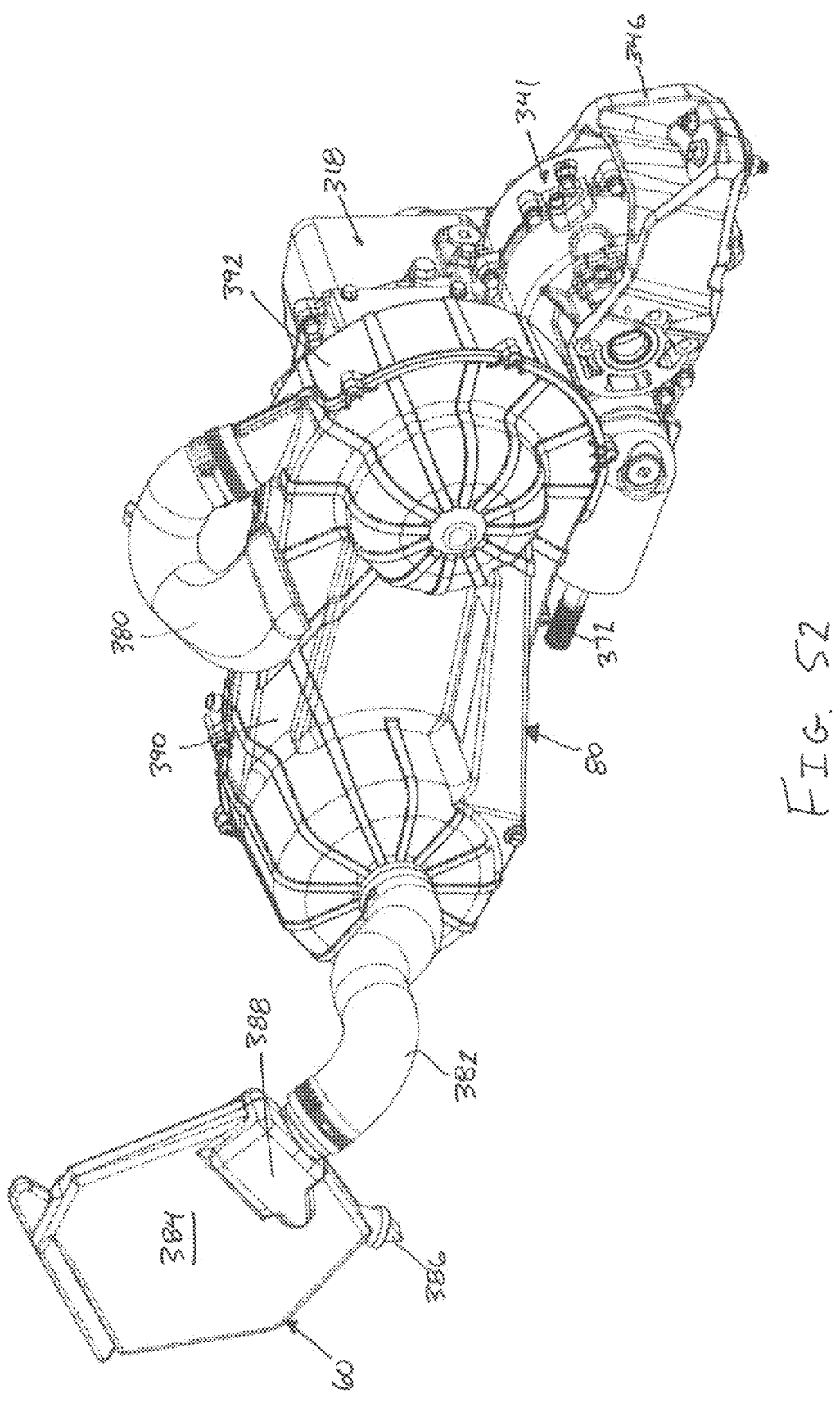
FIG. 52 is an orthogonal view of the CVT cooling system and CVT according to some embodiments.
Figure 53:
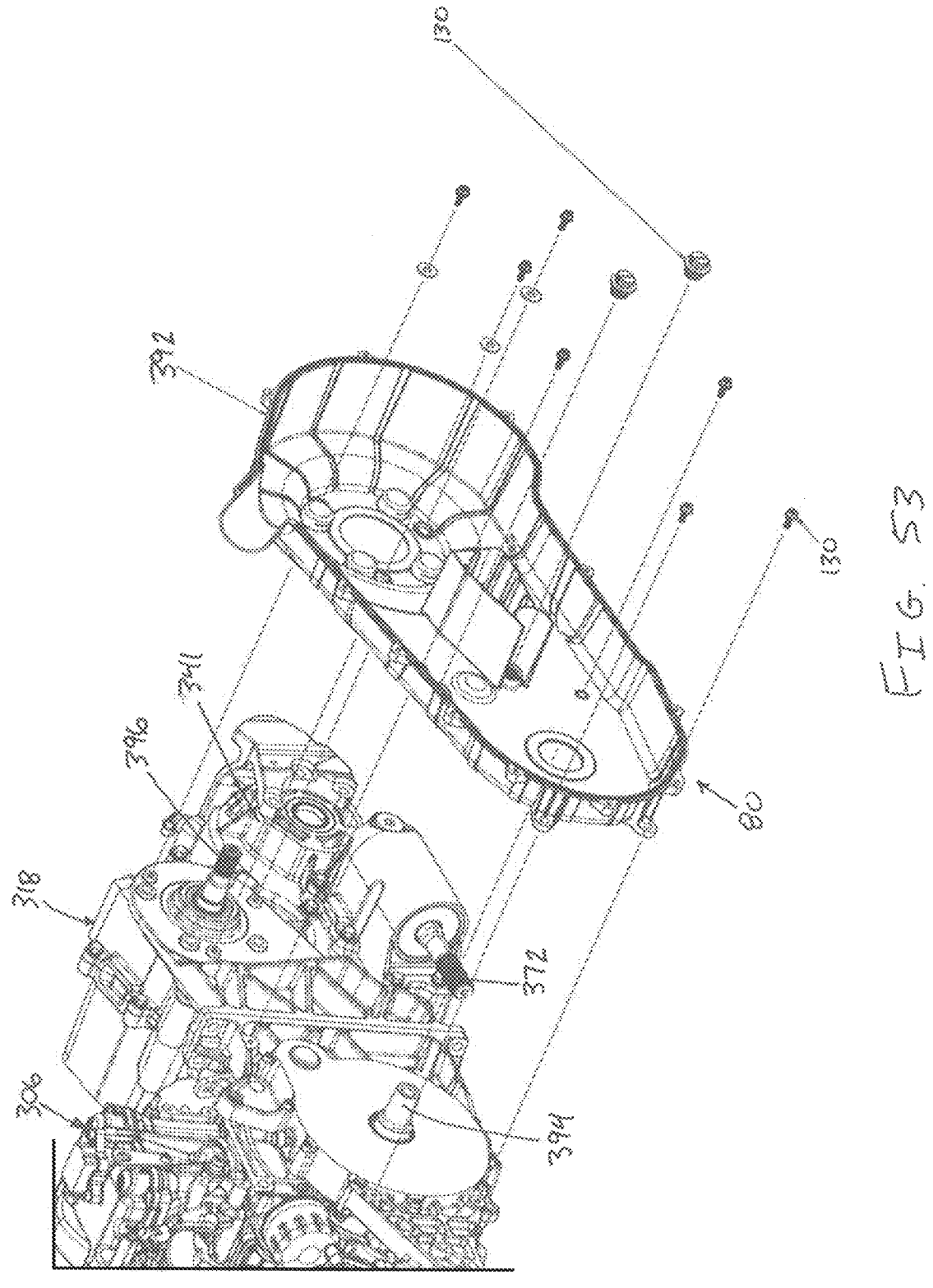
FIG. 53 is an exploded view of the CVT housing according to some embodiments.
Figure 54:
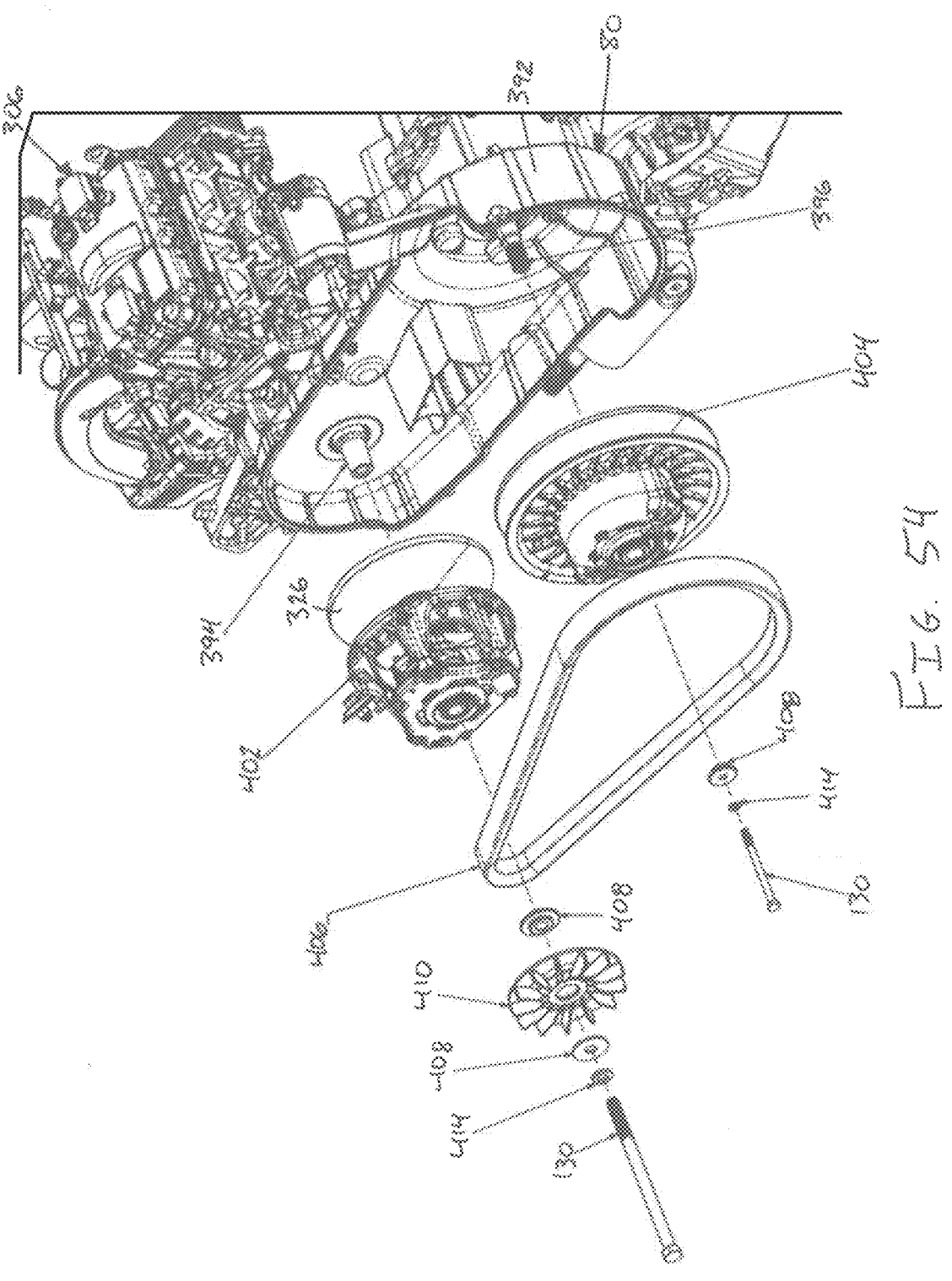
FIG. 54 is an exploded view of the CVT according to some embodiments.
Figure 55:
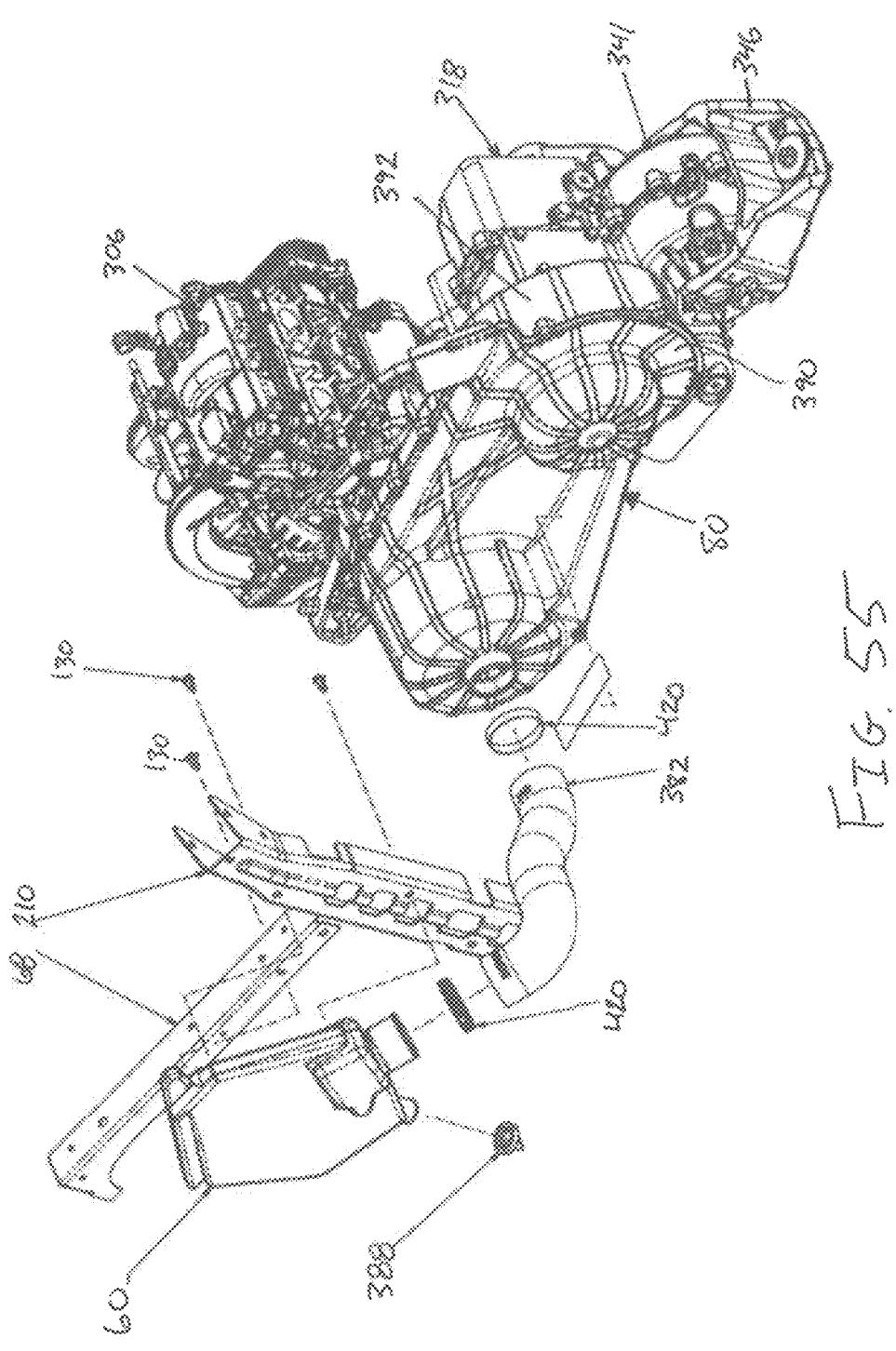
FIG. 55 is an exploded view of the CVT cooling system according to some embodiments.
Figure 56:
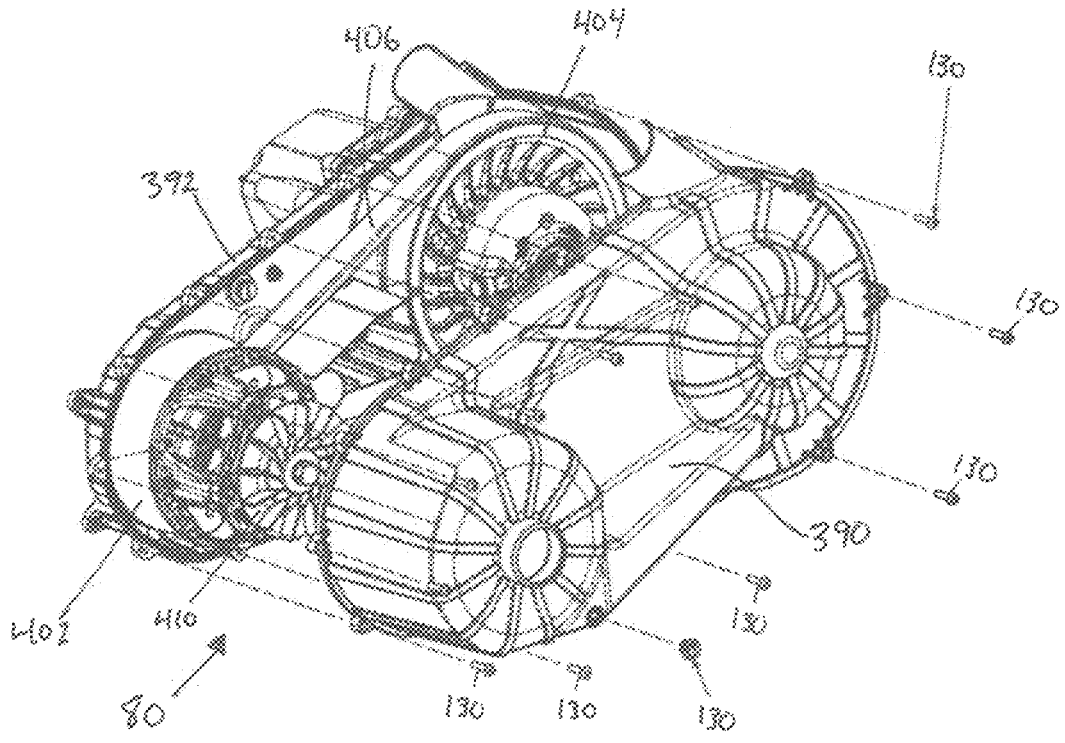
FIG. 56 is an exploded view of the CVT housing according to some embodiments.
Figure 57:
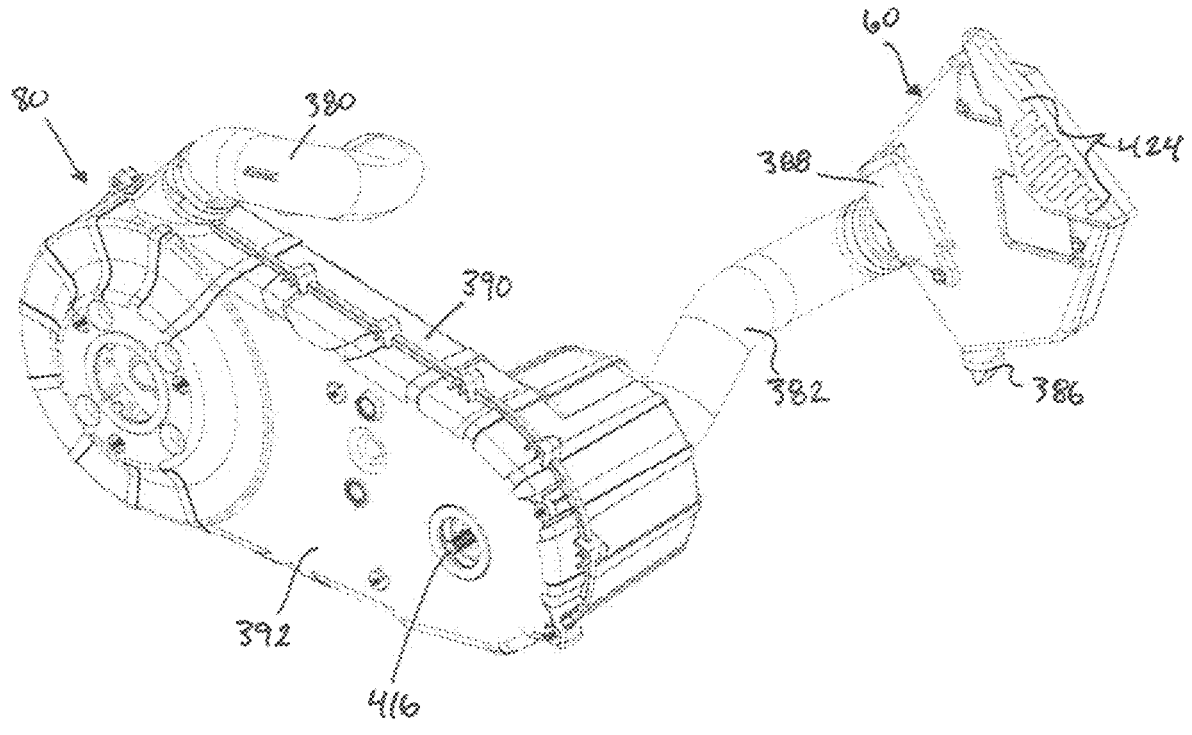
FIG. 57 is an orthogonal view of the CVT cooling system and CVT according to some embodiments.

As illustrated in FIGS. 52 and 55, air hose 382 is connected to the portion of CVT 80 that houses clutch fan 410. IN this way, cooling air is drawn in through CVT intake 60 and provided via air hose 382 to CVT 80. In some embodiments, air hose 382 is secured to CVT intake 60 via clamp 420, and similarly is connected to CVT 80 via clamp 420. In addition, the embodiment shown in FIG. 55 illustrates the mounting of CVT intake 60 to seat frame 68 and to front outer vertical support member 210 via a plurality of fasteners. FIG. 56 illustrates the attachment of outer CV cover 390 to inner CV cover 392, to house CVT components.

Figure 58:
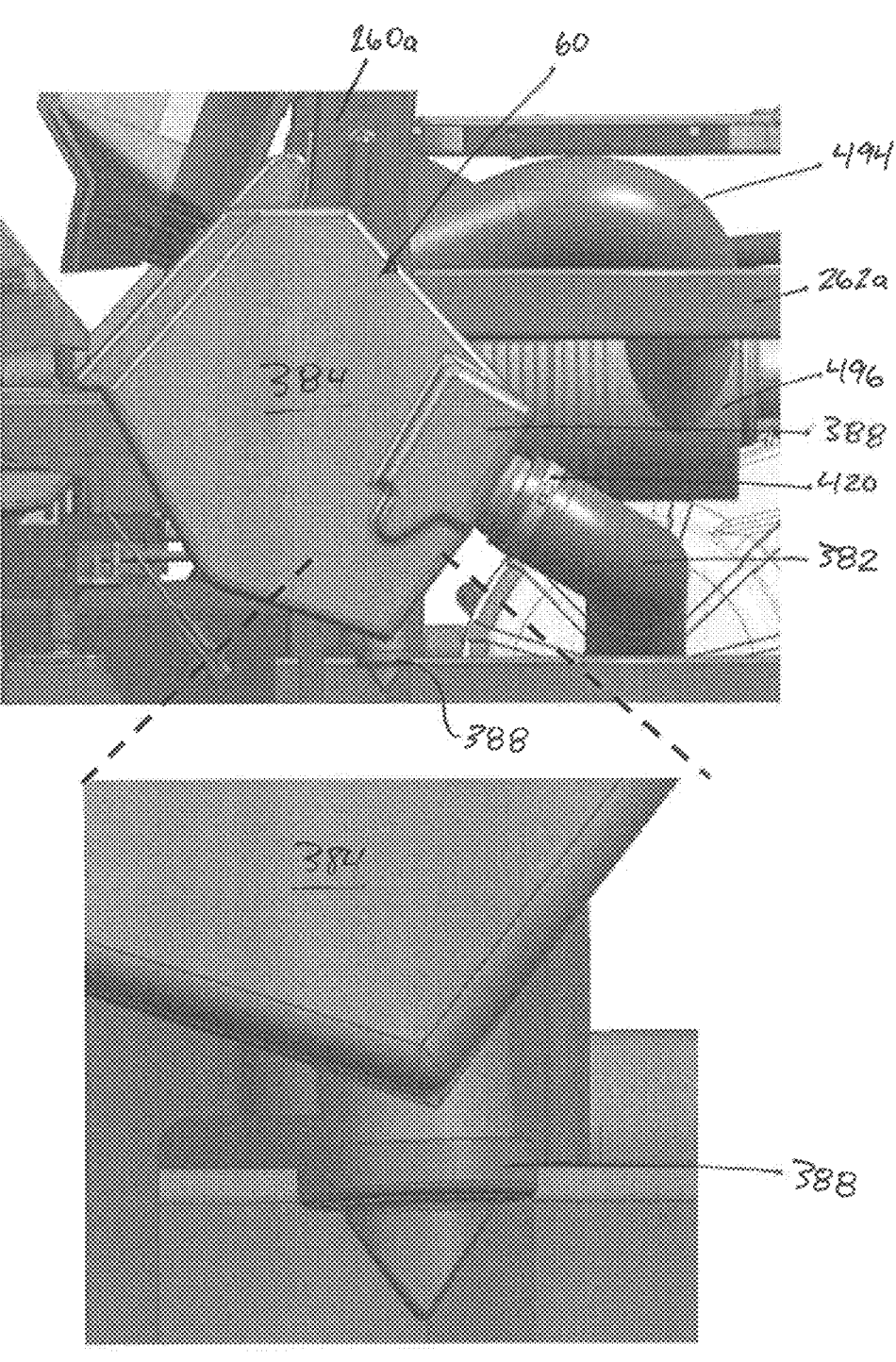
FIG. 58 is a side view of the CVT intake according to some embodiments.

FIGS. 58-61 illustrate in more detail CVT intake 60 according to some embodiments. In particular, FIG. 58 illustrates a side view of CVT intake 60, with a magnified insert illustrating the location of drain 386. In some embodiments, a duckbill drain is utilized for drain 386. A duckbill drain is an elastomeric member that includes elastomeric lips in the form of a "duckbill" that allows water to flow in one direction (e.g., out of the CVT intake 60) but prevents water from backflowing into CVT intake 60. That is, duckbill drain 386 acts as a one-way valve that allows water/liquid to flow out of CVT intake 60 but prevents water from flowing backward into CVT intake 60. In this way, any water (e.g., rain) that is provided into CVT intake 60 via CVT air vents 424 is allowed to flow out via duckbill drain 386, but water splashed up onto CVT intake 60 is prevented from flowing through duckbill drain 386 into CVT intake 60. In other embodiments, various other one-way valves may be utilized to allow water captured within CVT intake 60 to be expelled, while preventing water from being provided into CVT intake 60. In addition, FIG. 58 illustrates a cavity 388 located adjacent to air hose 382. In some embodiments, cavity 388 is utilized to house a filter for filtering air provided by CVT intake 60 to CVT 80.

Figure 61:
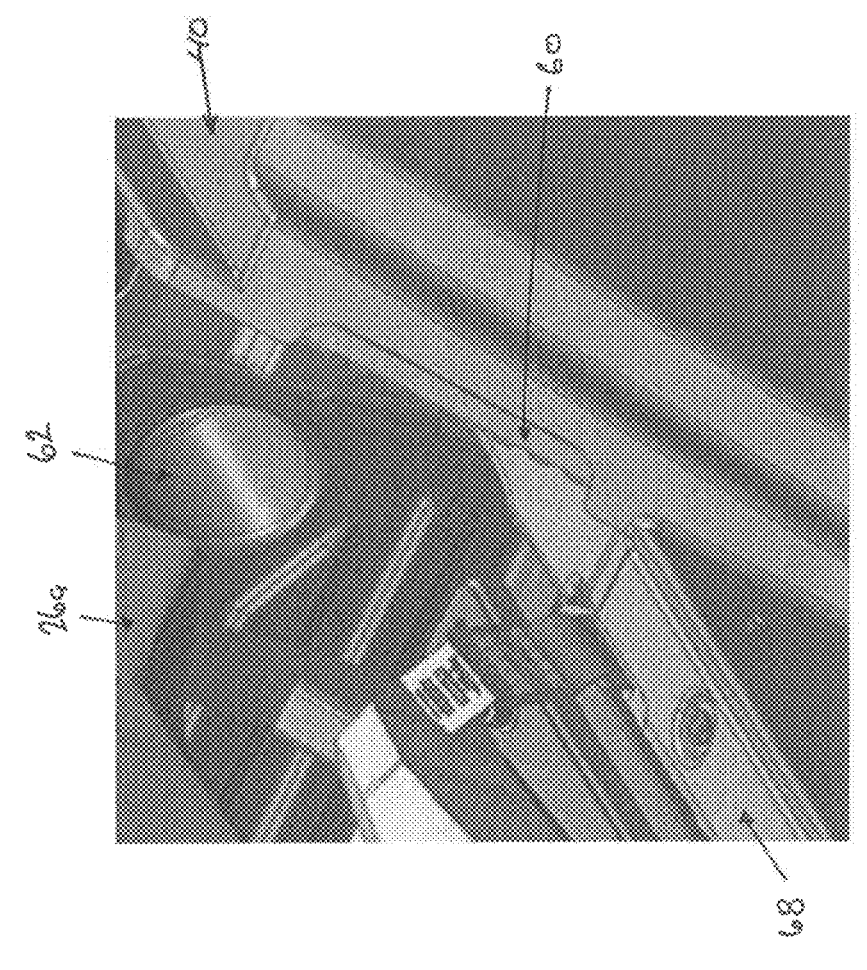
FIG. 61 is an orthogonal view illustrating the orientation of the CVT intake relative to engine air intake according to some embodiments.
Figure 60:
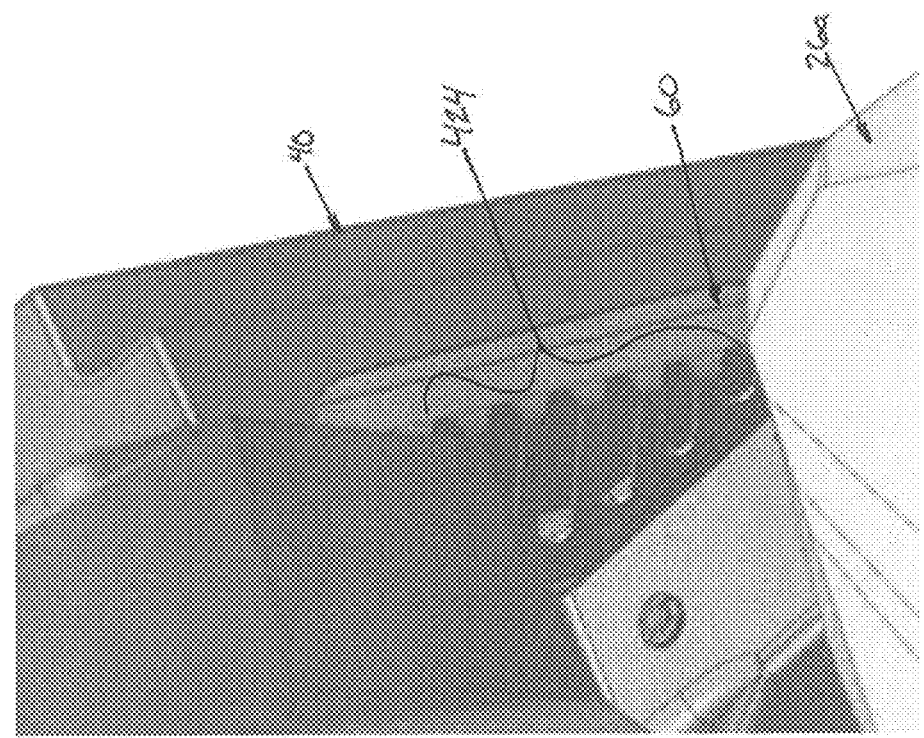
FIG. 60 is an orthogonal view of the CVT intake according to some embodiments.
Figure 62:
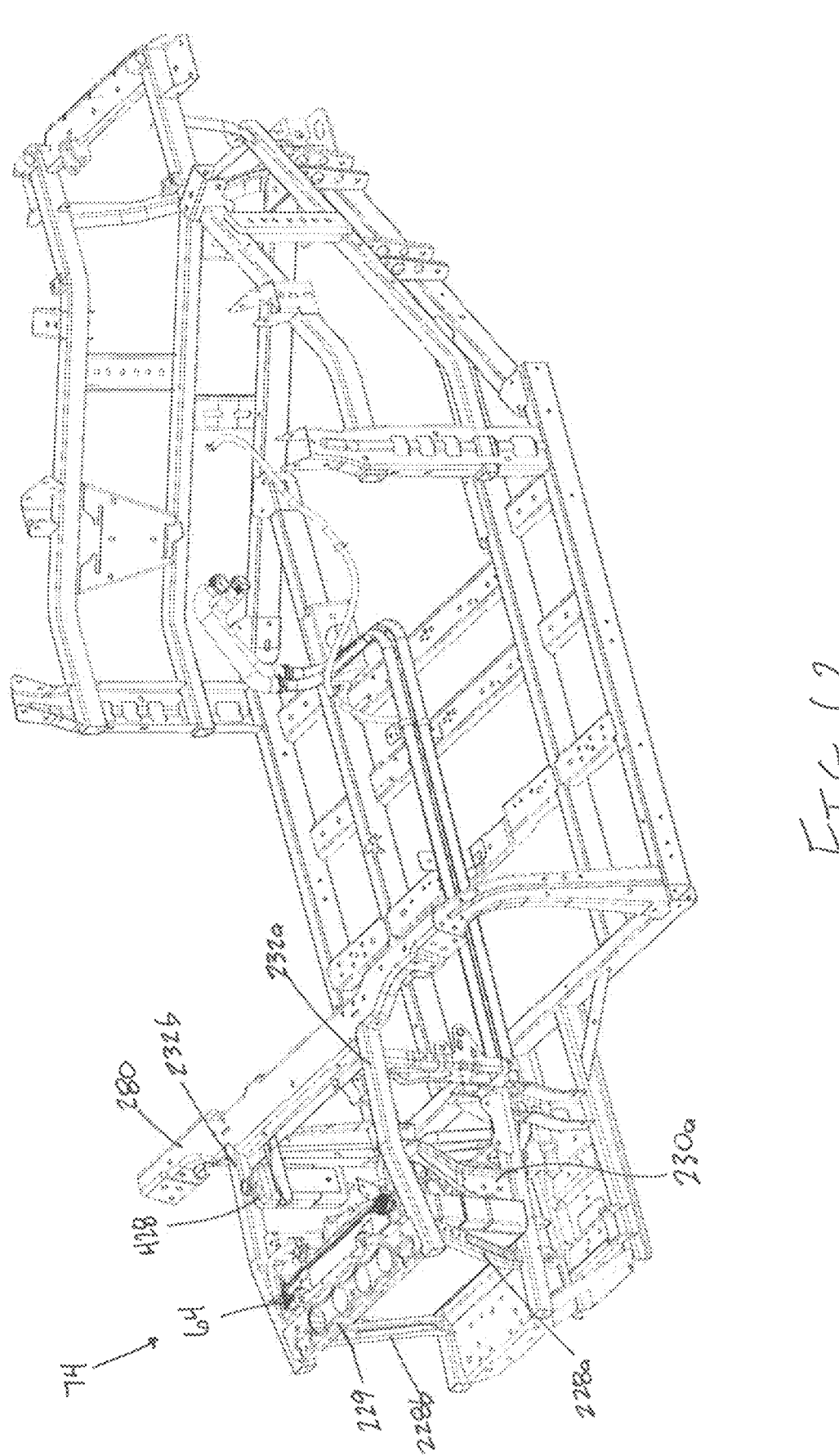
FIG. 62 is an orthogonal view of the radiator mounted within the vehicle frame according to some embodiments.
Figure 63:
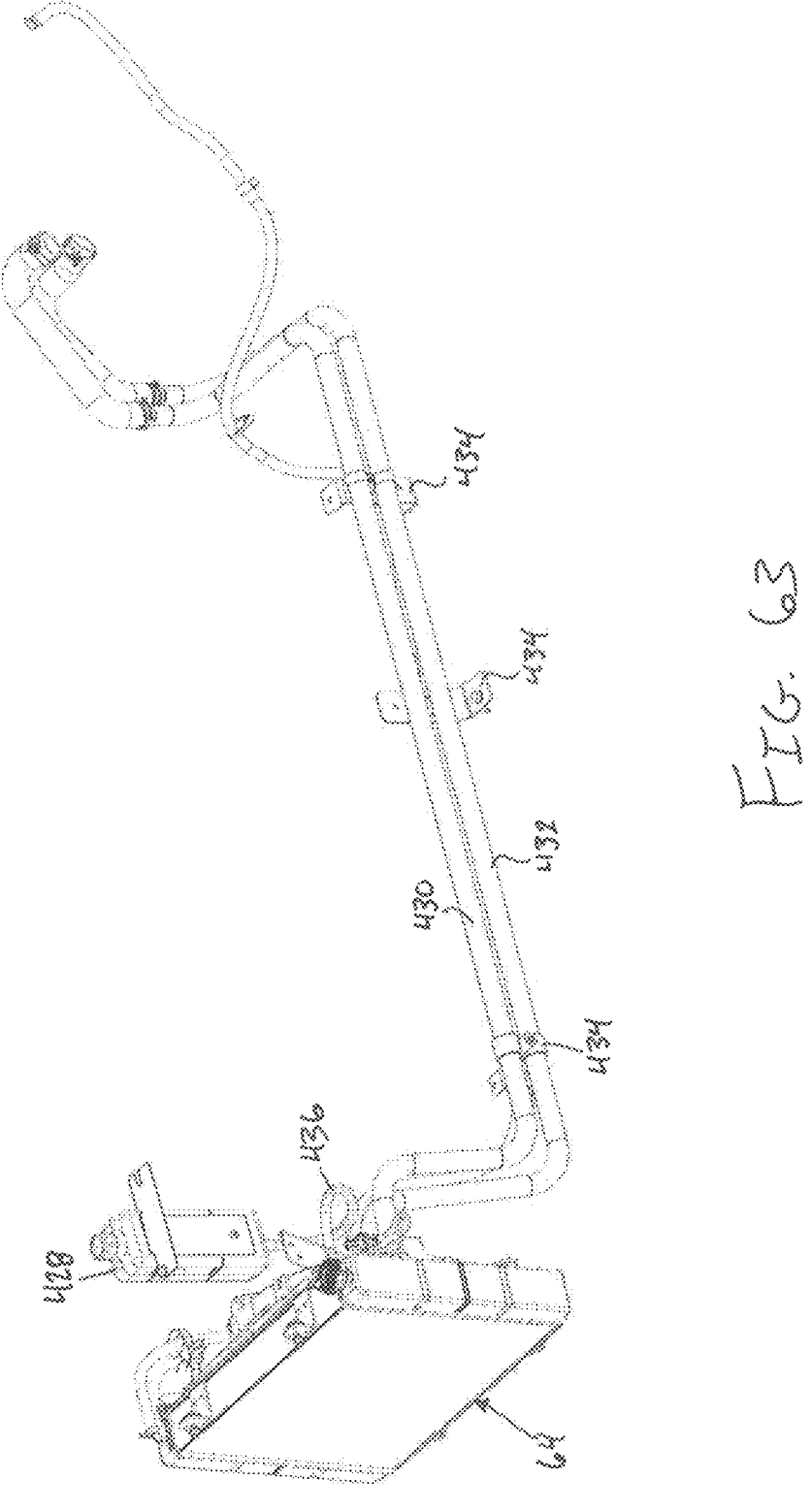
FIG. 63 is an orthogonal view of the engine cooling system according to some embodiments.

FIG. 59 is a cross-sectional view of CVT intake 60 that illustrates the mounting of CVT intake 60 to frame members. In particular, CVT air vents 424 are oriented to draw air into CVT intake 60 from within seating area 20. As illustrated in FIG. 60, CVT air vents 424 are oriented inward toward seating area 20, to prevent exposure of the vents to the elements outside of utility vehicle 10. In addition, FIG. 61 illustrates the orientation of CVT intake 60 relative to engine air intake included as part of air filter access panel 62, which is positioned behind seat 26*a*. In the embodiment shown in FIG. 59, CVT intake 60 is affixed to front outer vertical support member 210 via fasteners 418 (in this case, at least two fasteners). In addition, CVT intake 60 is affixed to seat frame 68 via one or more fasteners.

FIGS. 62-66 include perspective views illustrating the position of engine cooling system within the frame 14 of utility vehicle 10, as well as the position and components of gas tank 72 and carbon canister 450 according to some embodiments. In some embodiments, shown in FIGS. 62 and 63, the cooling circuit is closed loop and includes radiator 426, overflow tank 428, and coolant hoses 430 and 432. The cooling circuit communicates coolant via coolant hose 432 to prime mover/engine 306. The coolant removes heat from engine 306, and provides coolant (now heated) back to radiator 426 via coolant hose 430. The coolant flows through radiator 426, wherein airflow providing via the movement of utility vehicle 10 provides cooling to the coolant, before being returned to the engine.

Figure 64:
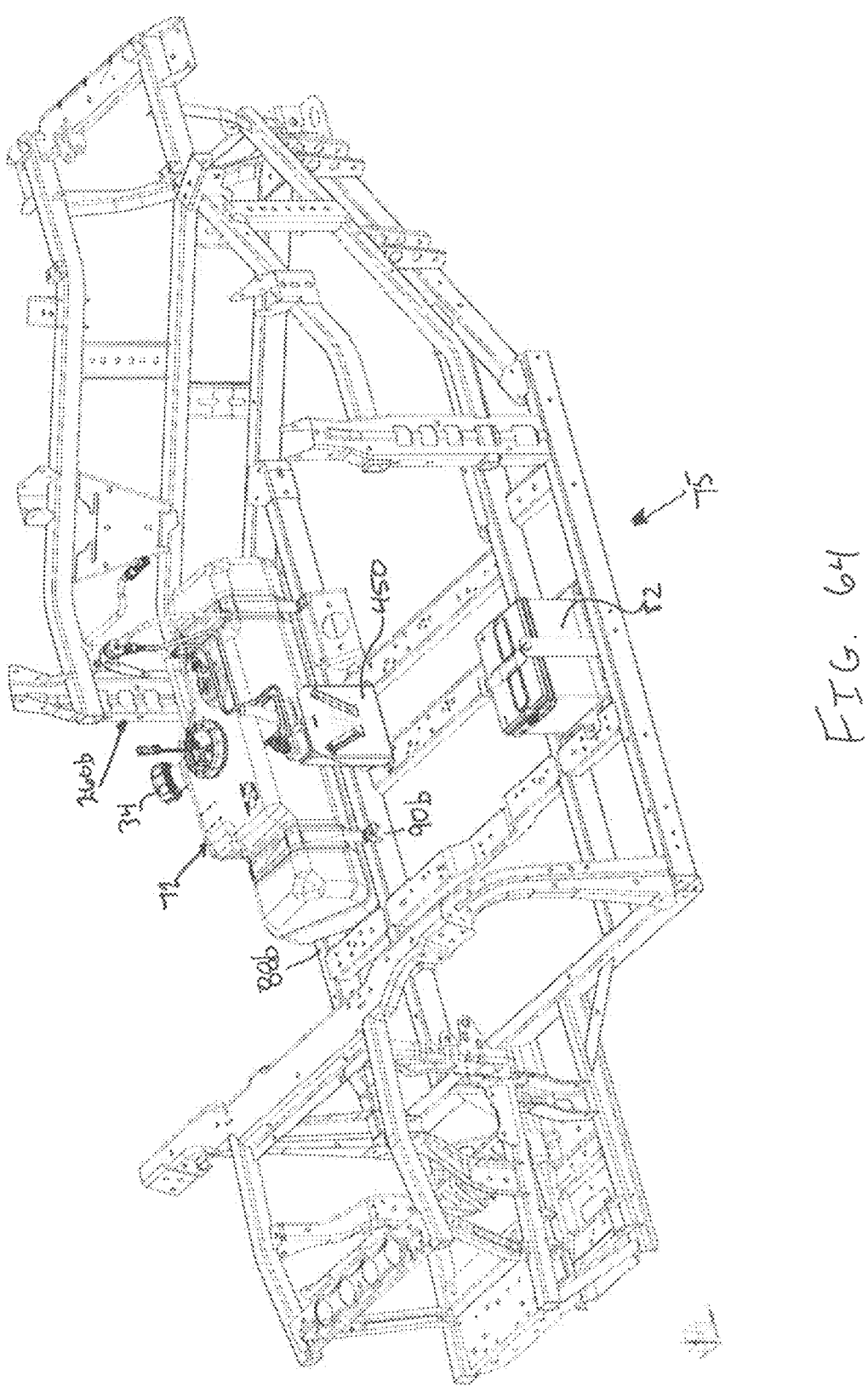
FIG. 64 is an orthogonal view of the gas tank mounted within the vehicle frame according to some embodiments.
Figure 65:
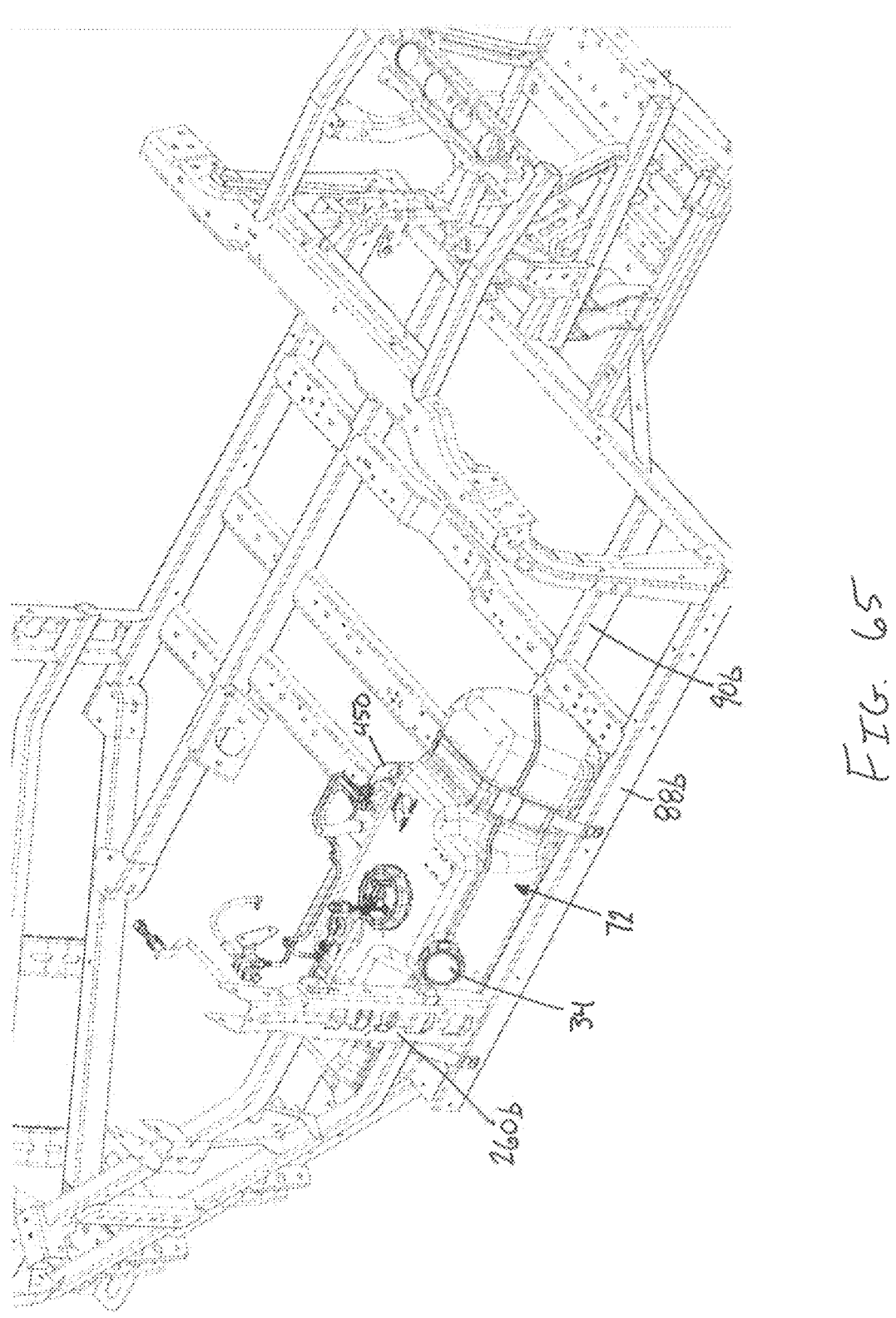
FIG. 65 is an orthogonal view of the gas tank mounted within the vehicle frame according to some embodiments.
Figure 66:
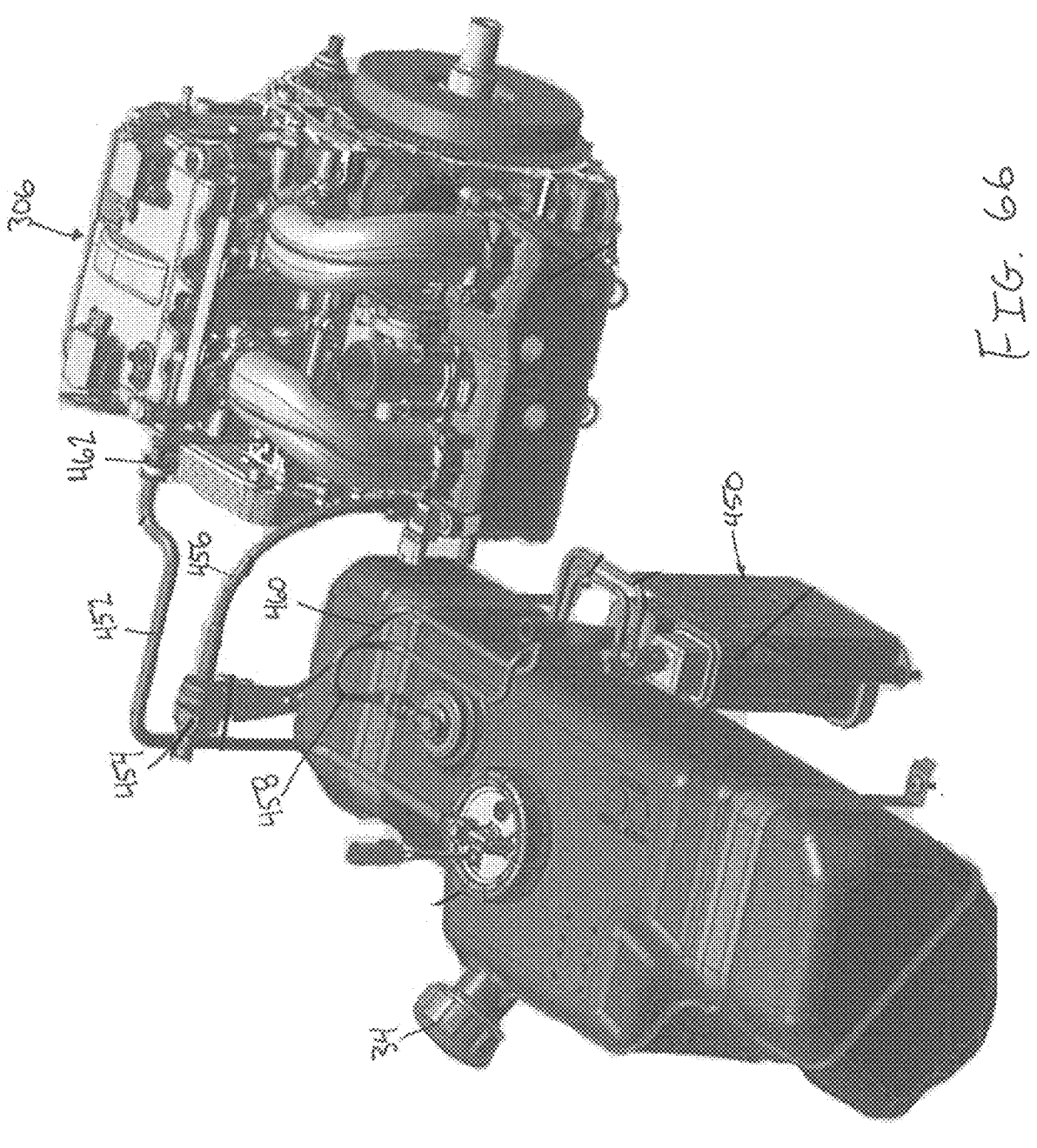
FIG. 66 is an orthogonal view of the gas tank, carbon canister and engine according to some embodiments.
Figure 67:
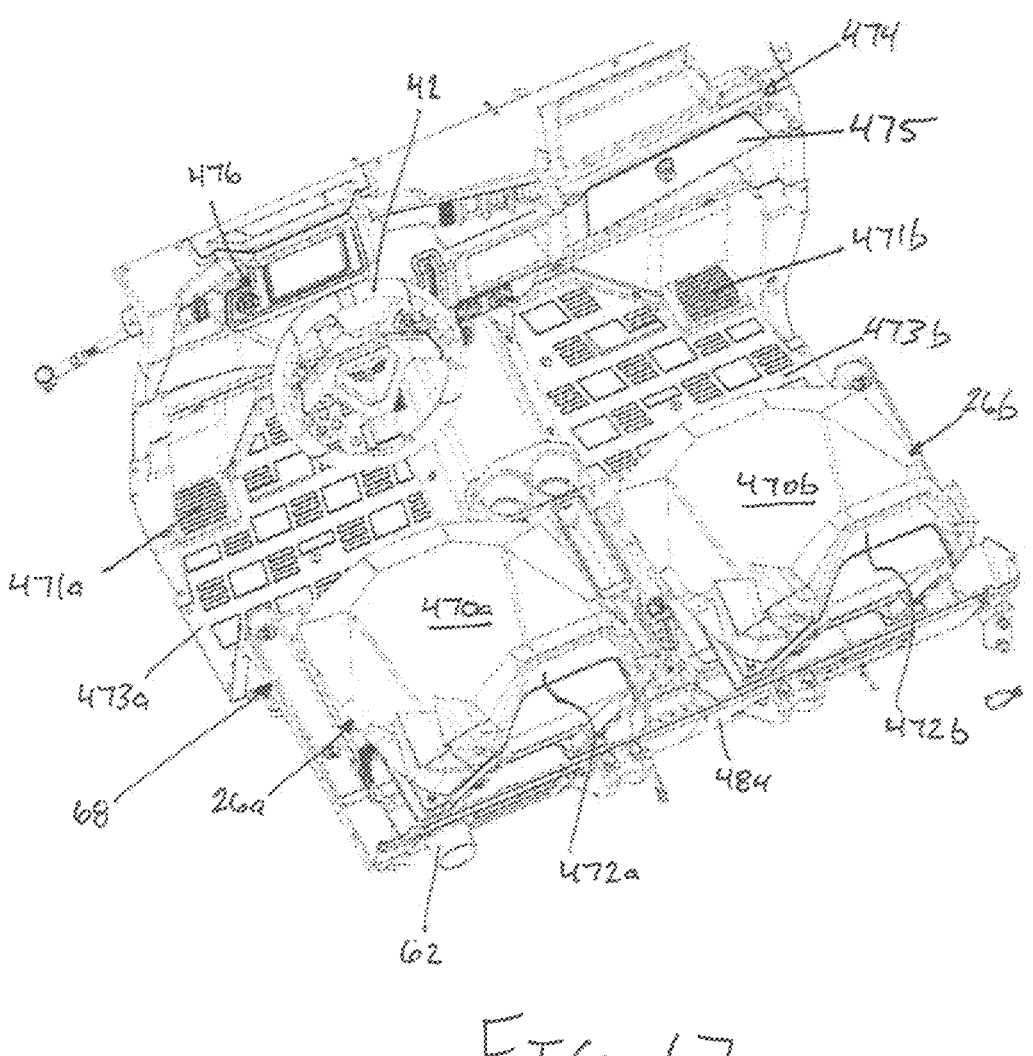
FIG. 67 is an orthogonal view of the cabin seating area according to some embodiments.
Figure 68:
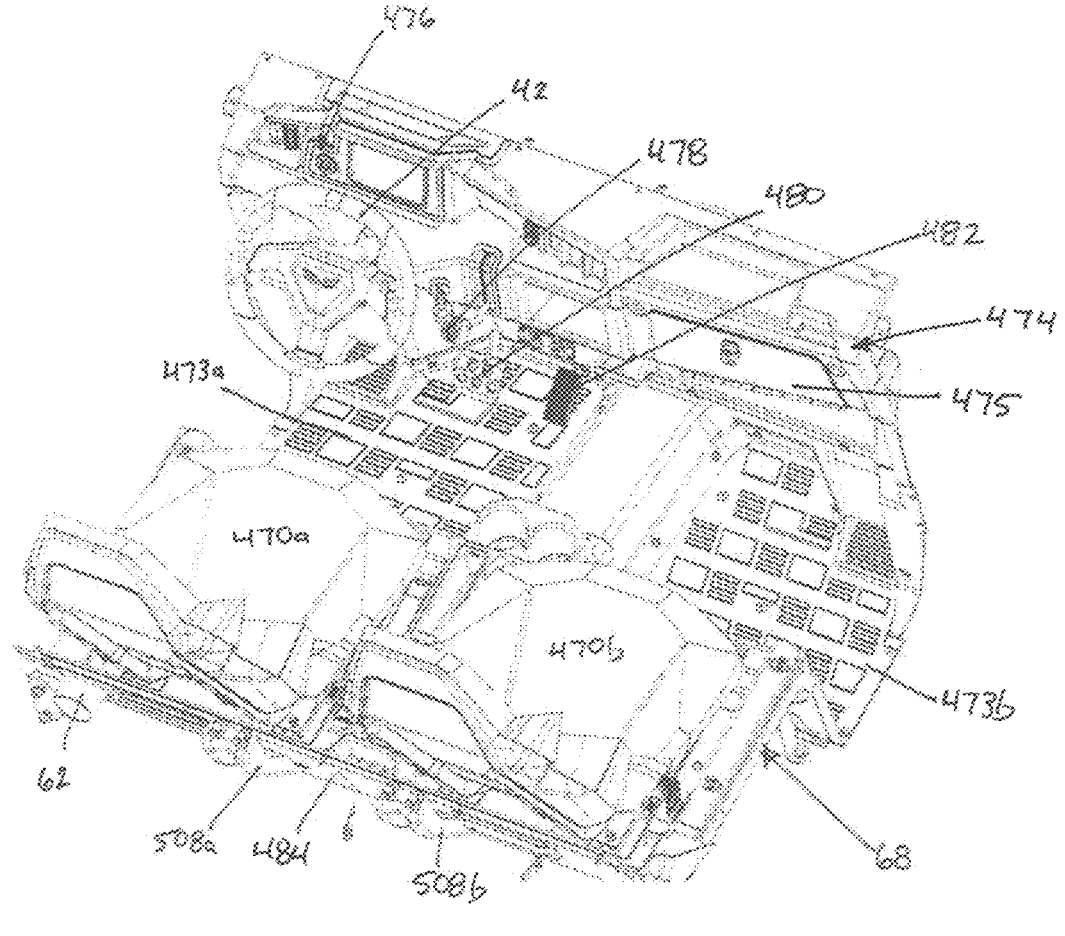
FIG. 68 is an orthogonal view of the cabin seating area according to some embodiments.
Figure 69:
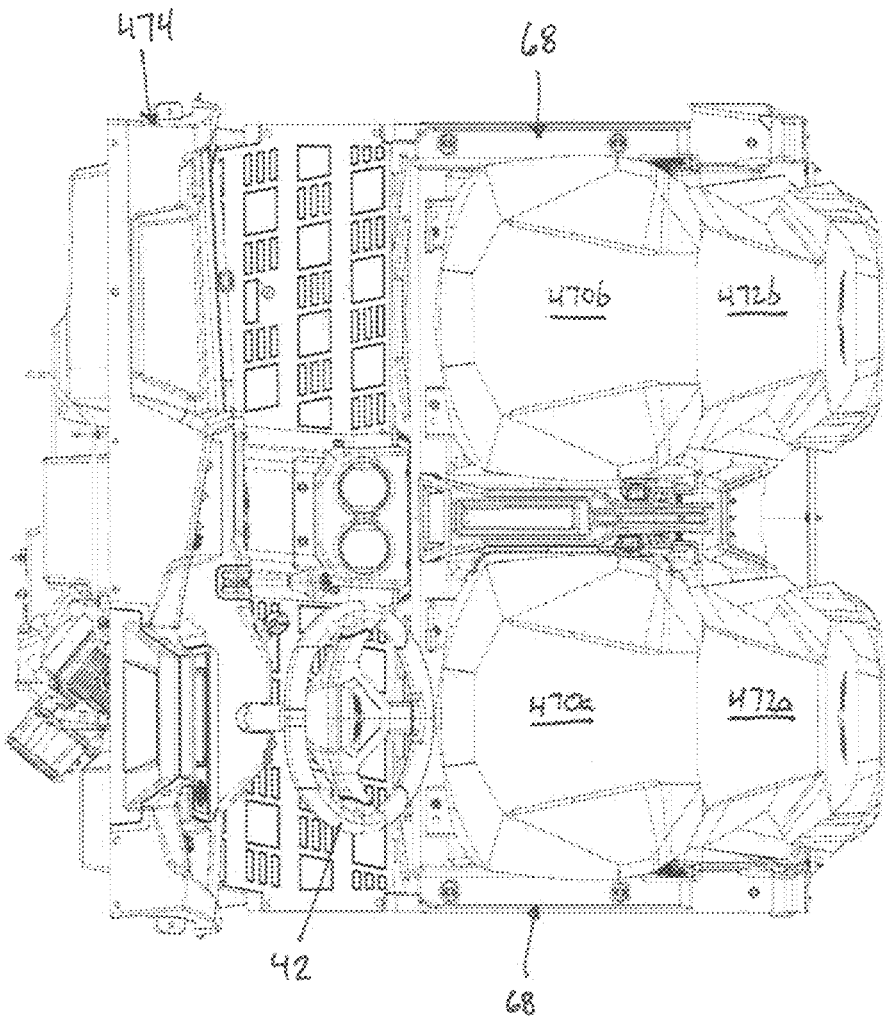
FIG. 69 is a top view of the cabin seating area according to some embodiments.

FIGS. 64-66 are perspective views illustrating a gas tank 72 and carbon canister 450 utilized according to some embodiments. As described earlier, in some embodiments, gas tank 72 is located on the passenger side and includes a gas cap located on a top side of the gas tank 72 accessible to a user for filling the gas tank 72. In general, carbon canister 450 is utilized to collect evaporated fuel vapors that would otherwise be vented by gas tank 72 into the atmosphere. When engine 306 is running, fuel vapors stored in carbon canister 450 may be provided (via purge control valve 454) to engine 306 to be burned.

In some embodiments, gas tank 72 and carbon canister 450 are located on the passenger side of utility vehicle 10, beneath passenger seat 26*b*. In the embodiment shown in FIG. 66, fuel is provided from gas tank 72 to prime mover/engine 306 via fuel hose 452. Vapors that may otherwise be vented into the atmosphere are collected and provided to carbon canister 450 via vapor line 458.

In the embodiment shown in FIG. 64, carbon canister 450 is mounted to lower frame members, including one or more of second middle lateral member 100 and/or rear lateral member 104 shown in FIG. 14 via one or more of fasteners and/or weldments. In some embodiments, carbon canister 450 is mounted at a location above gas tank 72, such that vapor line 458 connected between gas tank 72 and carbon canister 450 increases in vertical height from gas tank 72 to carbon canister 450, thereby preventing liquid fuel from flowing into carbon canister 450. In the embodiment shown in FIGS. 65 and 67, carbon canister 450 is mounted at a location that places carbon canister 450 vertically below gas tank 72. In this embodiment, to prevent liquid fuel from flowing into carbon canister 450, a U-shaped trap is utilized to prevent liquid fuel from flowing into carbon canister 450.

Fuel vapors collected by carbon canister 450 are output to the engine for combustion via vapor line 460, which is connected to the engine 306 via purge control valve 454. When purge control valve 454 is closed, then no fuel vapor is allowed to flow. When purge control valve 454 is open, then fuel vapor is allowed to flow through vapor line 458 and into engine 306 for combustion. In some embodiment, purge control valve 454 is controlled by an engine control unit (ECU) (not shown), which determines when conditions are appropriate for combusting fuel vapor. Control parameters utilized may include one or more of ambient temperature, engine temperature, engine running conditions, etc. Based on the monitored control parameters, ECU selectively opens purge control valve 454 to allow vapor stored in carbon canister 450 to be provided to engine 306 via vapor line 456.

In some embodiments, vapor lines 458 and 460 are plastic and utilize quick connects to connect to gas tank 72 to carbon canister 450, and to connect carbon canister 450 to purge control valve 454. In some embodiments, the vapor line 456 from purge control valve 454 to the plenum of engine 306 is also made of plastic using quick connects, but in other embodiments the line between purge control valve 454 and engine 306 is a simple rubber hose that utilizes normal connectors (e.g., clamps). A benefit of utilizing quick connects on the plastic lines is that it allows for these lines to be connected/disconnected quickly by a user/technician. In some embodiments, the closeout portions (panels separating passengers in the seating area from components such as gas tank 72 and carbon canister 450) may be removed by the user to provide easy access to gas tank 72 and carbon canister 450.

FIGS. 67-79 provide various perspective views, top views, and side views of the seating area 20 as well as frame components associated with the seating area 20. In some embodiments, seating area is comprised of driver side seat 26a and passenger side seat 26b. As discussed above, in other embodiments, seating area 20 may utilize a bench seat in a three-abreast configuration, or may be arranged in a 60/40 arrangement. On the driver's side, steering wheel 42 is positioned in front of driver's seat 26a. Steering wheel may be adjustable to accommodate different size passengers. Drive display 476 is positioned forward of steering wheel 42. Display may display information consisting of one or more of speedometer, tachometer, odometer, fuel gage, turn indicators, gearshift position indicator, seat belt warning light, engine malfunction lights, low tire pressure, lighting controls, safety systems, navigation systems, and others. In some embodiments, the display consists primarily of analog displays/gauges. In other embodiments the display may consist of an electronic (e.g., LCD/LED) type display configured to display various data. In particular, electronic displays allow for the addition of navigation services that display the current location of the user and directions. In addition, shifter 478 is located on the dashboard adjacent to steering wheel 42. Brake pedal 480 and gas pedal 482 are located in the just above floor panel 473a on the driver side. In some embodiments, gas pedal 482 is mechanically connected to the throttle of prime mover/engine 306. In other embodiments, gas pedal 482 is configured to provide an electrical control signal to prime mover/engine 306 in response to mechanical input from the driver (e.g., depressing the pedal). Likewise, brake pedal 480 may be mechanically connected to the braking mechanisms associated with each of the plurality of ground engaging members 16, or may provide an electrical signal that is communicated to braking mechanisms associated with each of the plurality of ground engaging members in response to mechanical input from the driver (e.g., depressing the brake).

In some embodiments, dashboard 474 includes a glove compartment 475, additional electronic type displays, passenger bar 44 (shown in FIG. 4). In the embodiment shown in FIG. 67, seats 26a, 26b include base portion 470a, 470b, respectively and backrest portions 472a, 472, respectively. As discussed above, seats 26a, 26b may be adjustable vertically and horizontally as required by the user. In some embodiments, glove compartment 475 may be opened to access a winch control that allows a user to operate the winch assembly 624 (shown in FIGS. 103-105) via the side of the vehicle (rather than having to stand next to winch assembly 624 in the front of the vehicle).

The embodiment shown in FIGS. 70 and 73-75 illustrate the location of air filter access panel 62, associated air hose 494, engine air cleaner box 496, and air hose 498 utilized to provide intake air to prime mover/engine 306. In this embodiment, engine air intake is provided via air filter access panel 62, which is located rearward of driver seat 26a, and just to the left. Air received into air filter access panel 62 is provided from within the seating area 20, so as to avoid foreign particles/water from being provided to air filter access panel 62. In this embodiment, engine air cleaner box 496 is located directly behind driver seat 26a, and at least partially below rear platform 84 located behind seats 26a, 26b. In some embodiments, rear platform 84 can be lifted or removed to allow easy access to engine air cleaner box 496. In some embodiments, air filter access panel 62 can be lifted or removed to allow access to engine air cleaner box 496 for filter replacement/repair. In one embodiment shown in FIG. 70, engine air cleaner box 496 is mounted longitudinally, rather than laterally. In one embodiment, also shown in FIG. 70, engine air cleaner box 496 is mounted directly to lateral cross-member 492 extended between rear upper frame members 262a and 262b.

Figure 70:
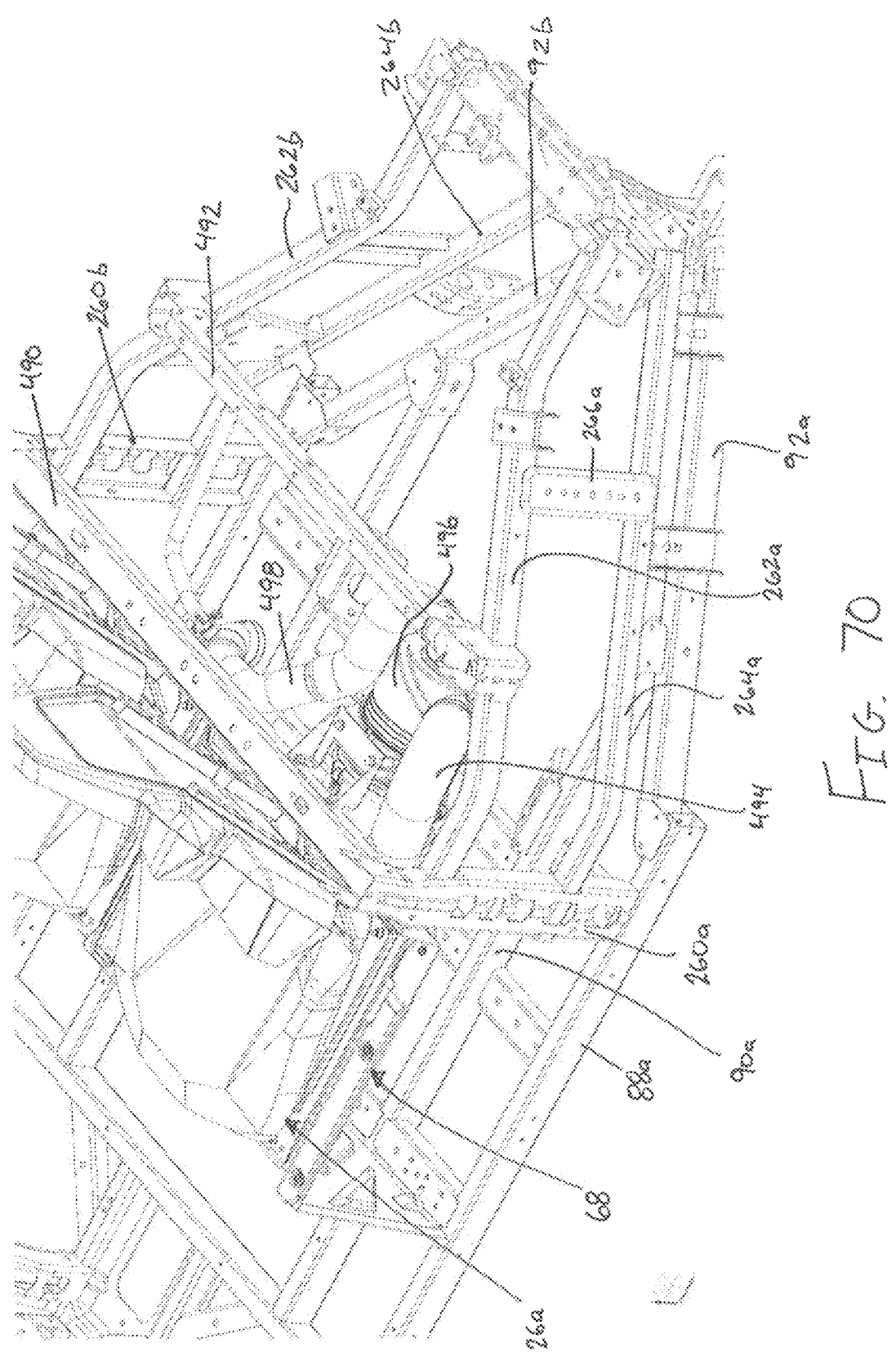
FIG. 70 is an orthogonal view that illustrates the location of the engine air box cleaner relative to the cabin seating area according to some embodiments.

In addition, the embodiment shown in FIG. 70 illustrates the location of seat frame 68, which support seats 26a and 26b, along with lower cross-bar seat support member 490 extending laterally across utility vehicle.

Figure 71:
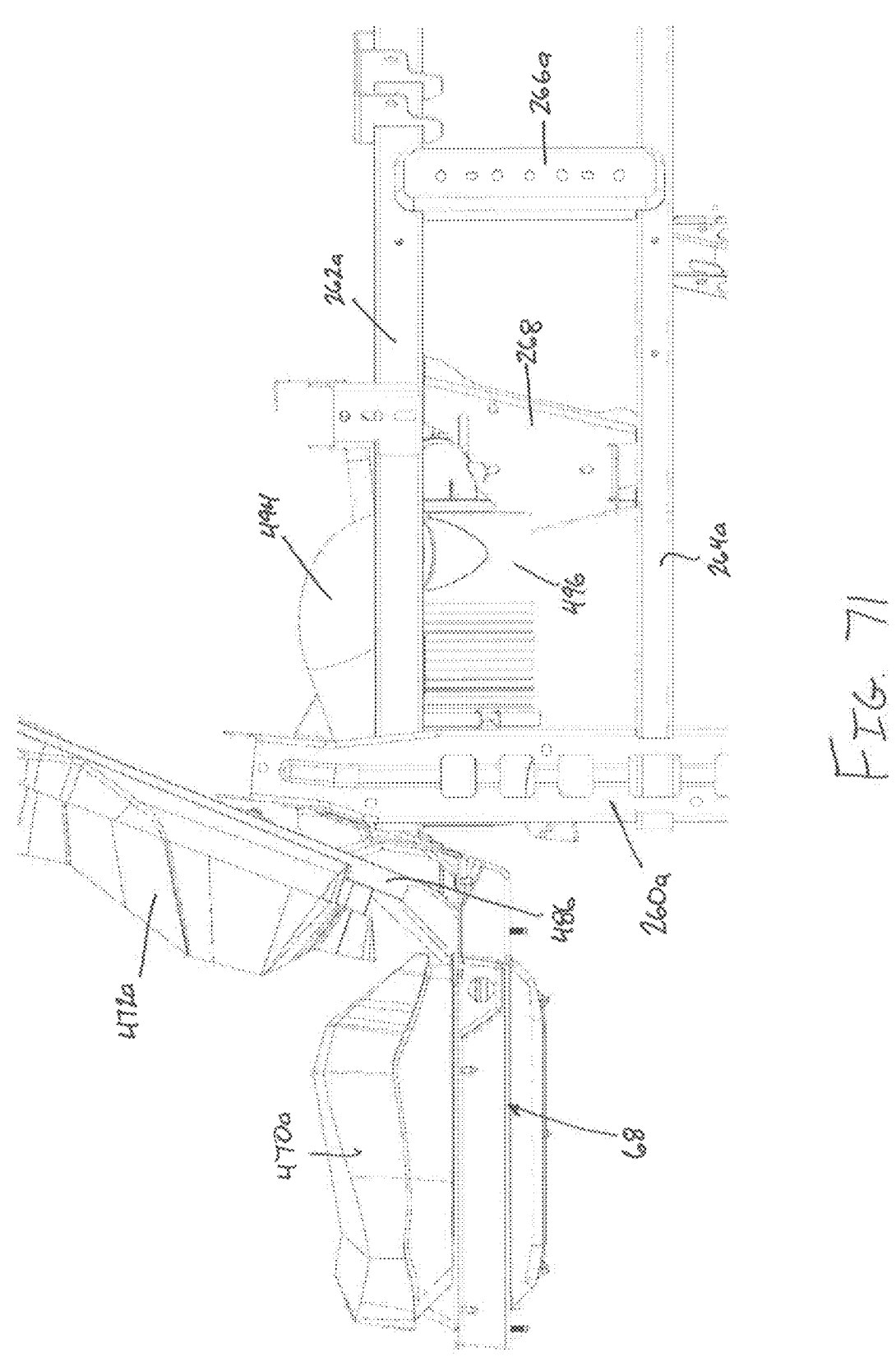
FIG. 71 is a side view that illustrates the location of the engine air box cleaner relative to the cabin seating area according to some embodiments.
Figure 72:
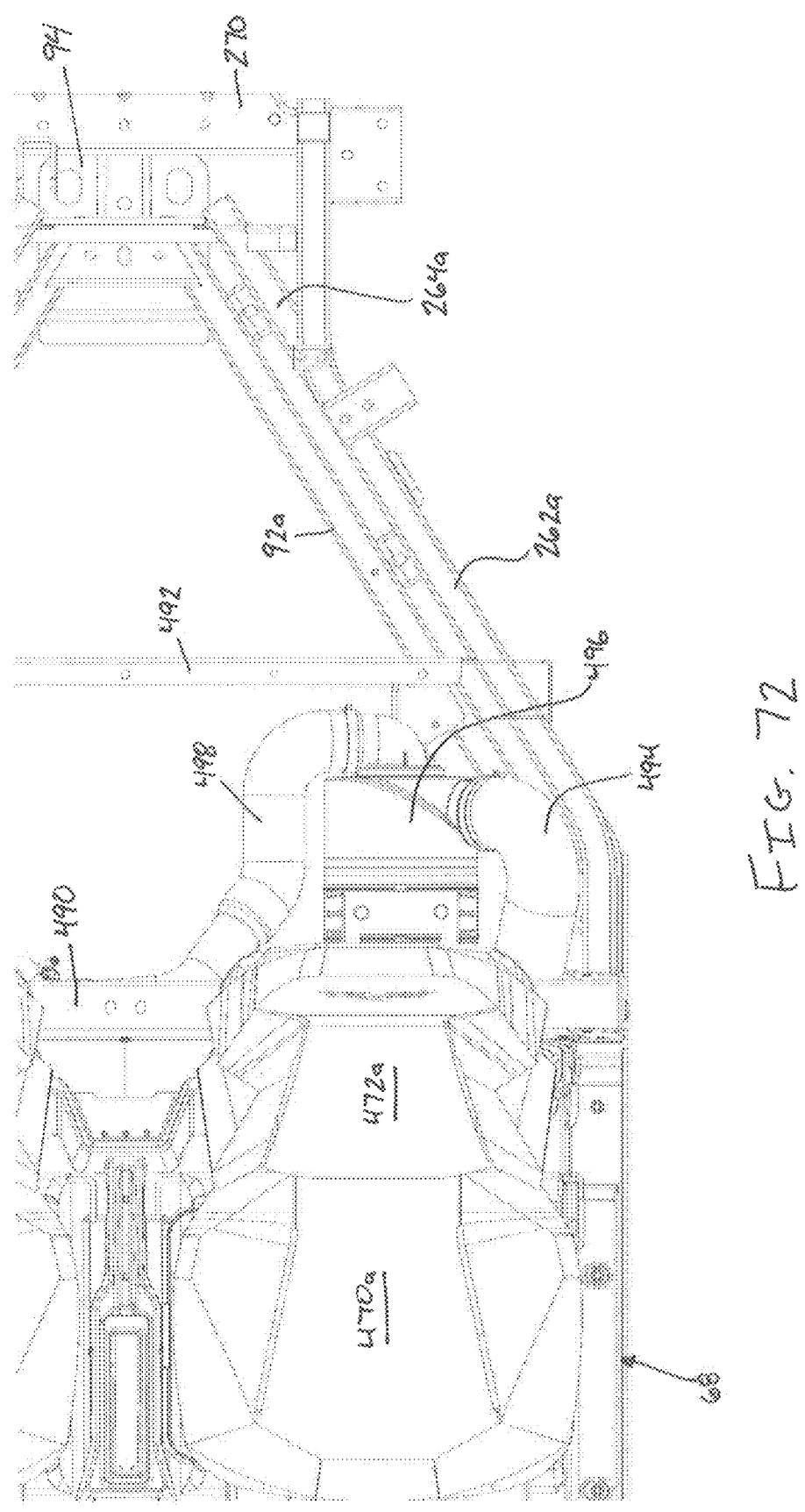
FIG. 72 is a top view that illustrates the location of the engine air box cleaner relative to the cabin seating area according to some embodiments.
Figure 73:
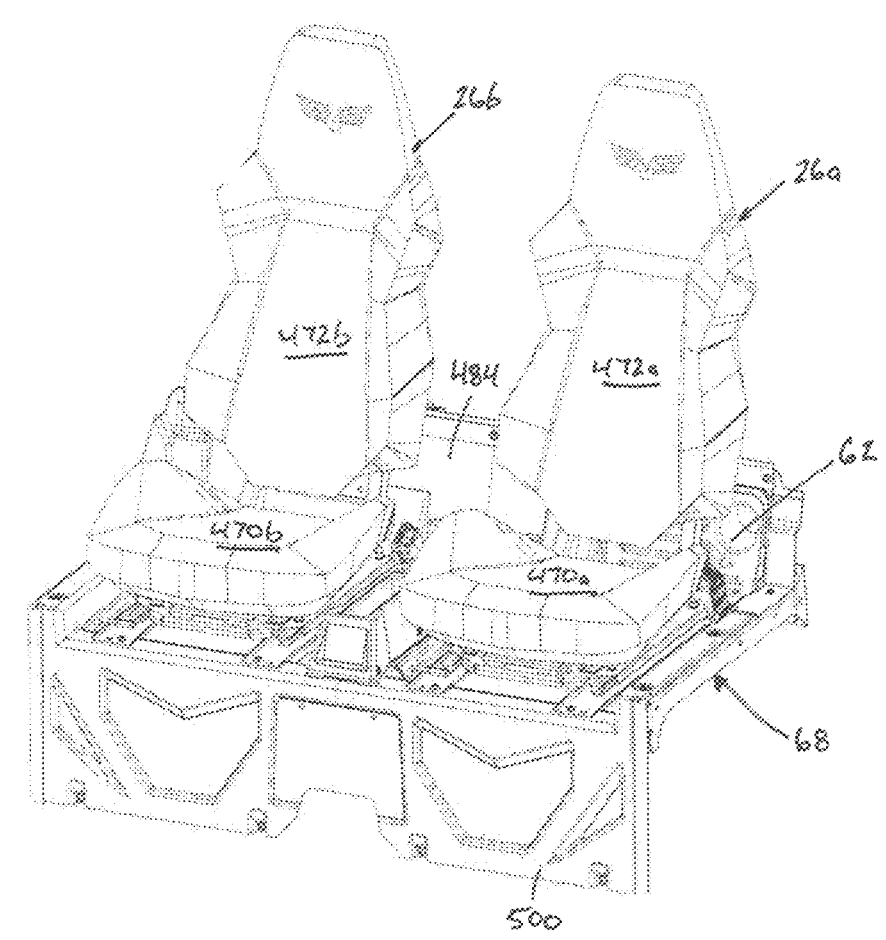
FIG. 73 is an orthogonal view of a seating arrangements according to some embodiments.
Figure 74:
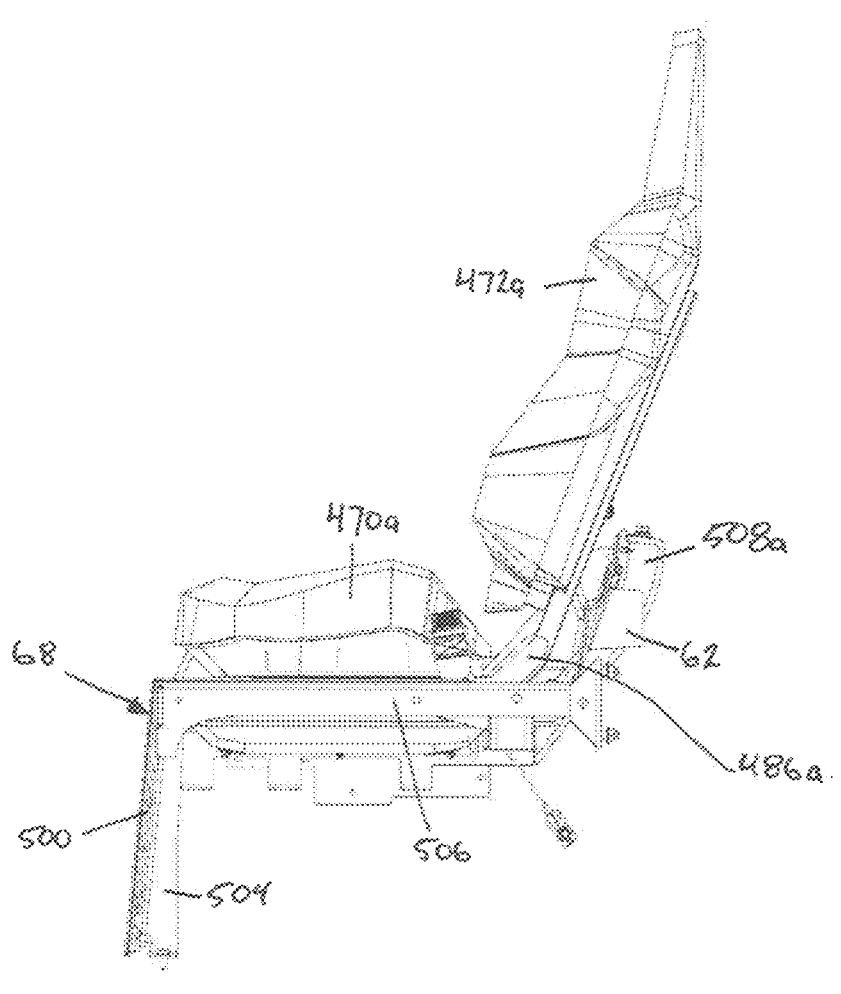
FIG. 74 is a side view of the seating arrangements according to some embodiments.
Figure 75:
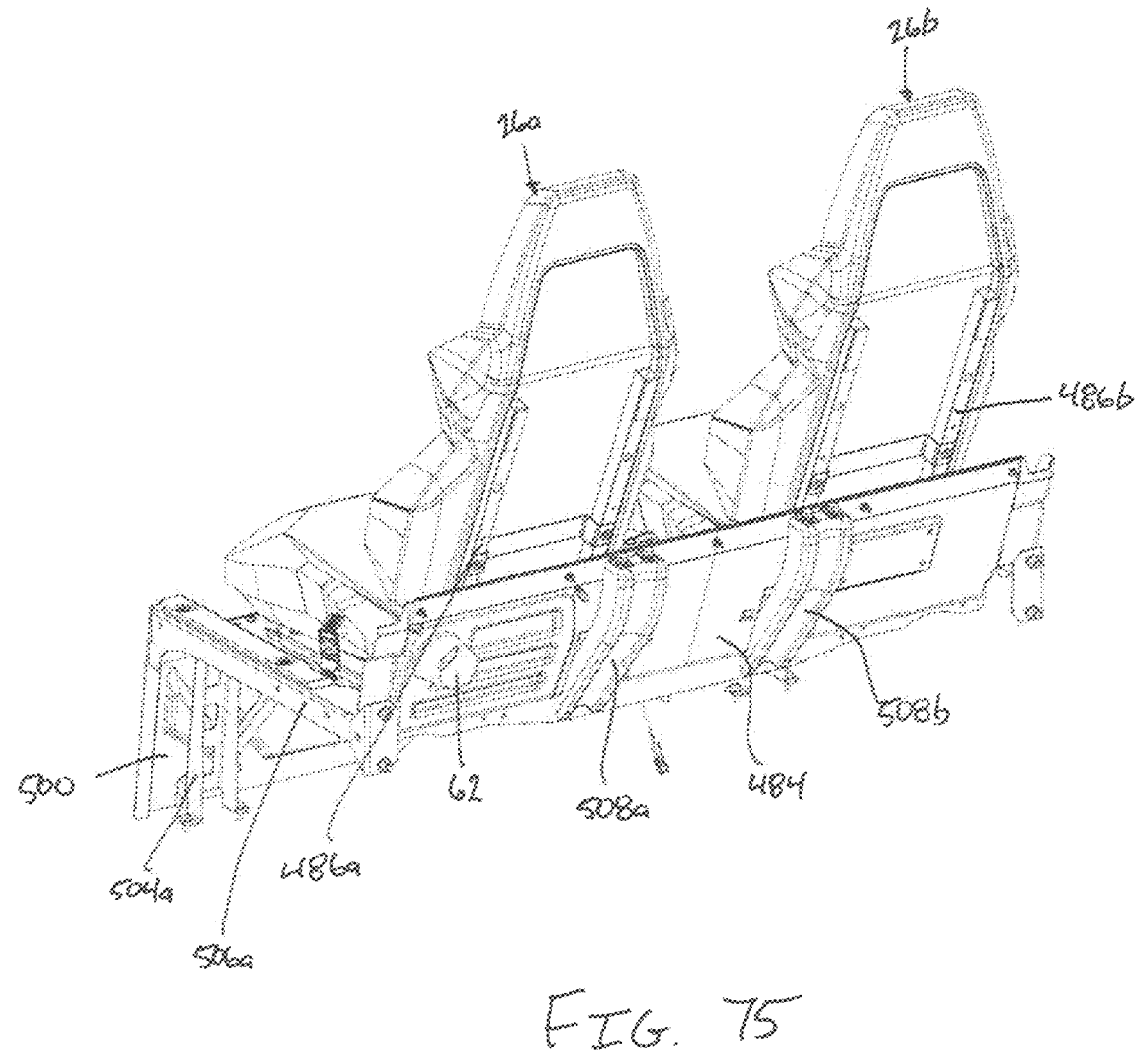
FIG. 75 is an orthogonal view of the seating arrangement according to some embodiments.
Figure 76:
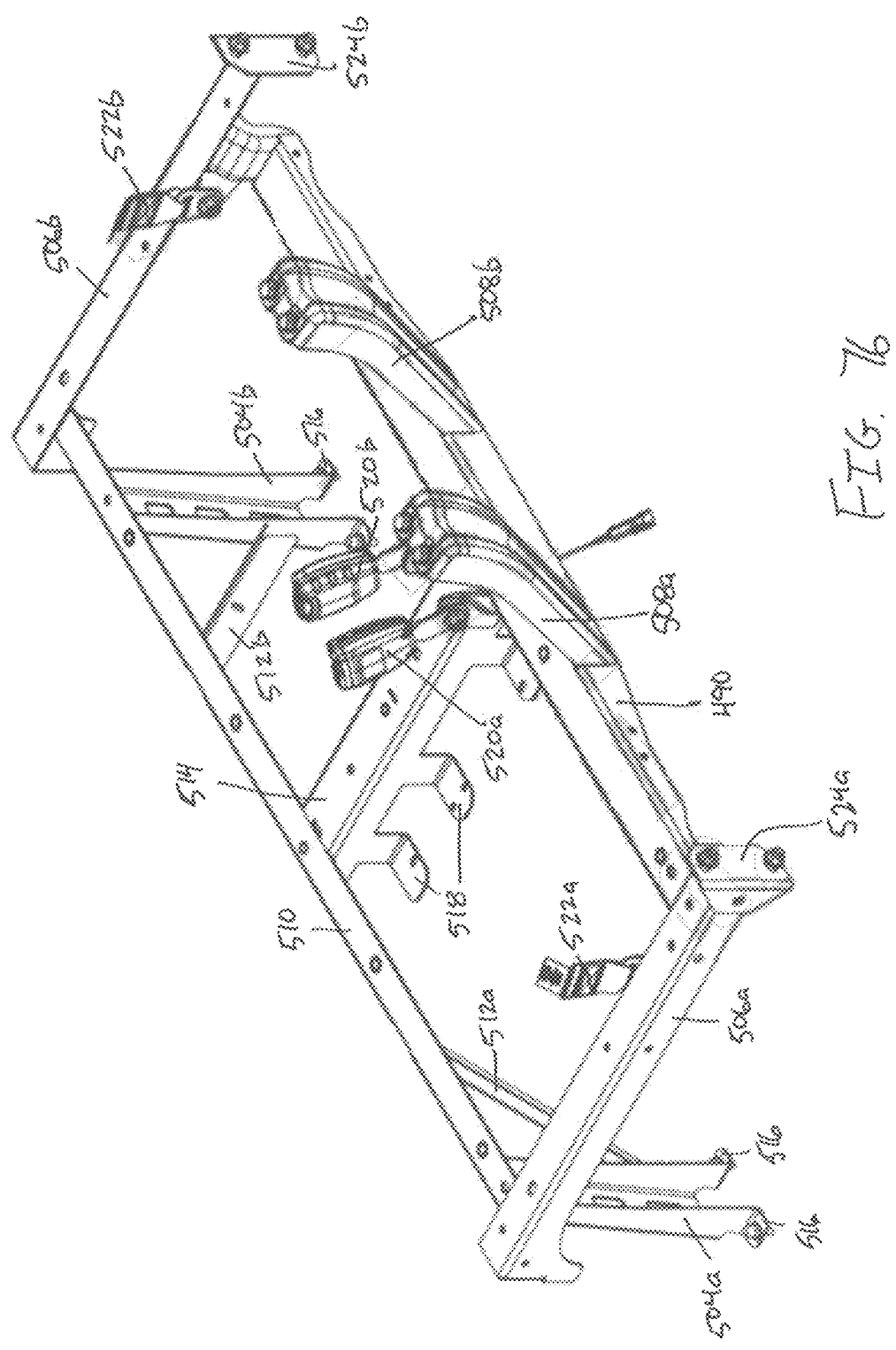
FIG. 76 is an orthogonal view of the seating frame according to some embodiments.
Figure 77:
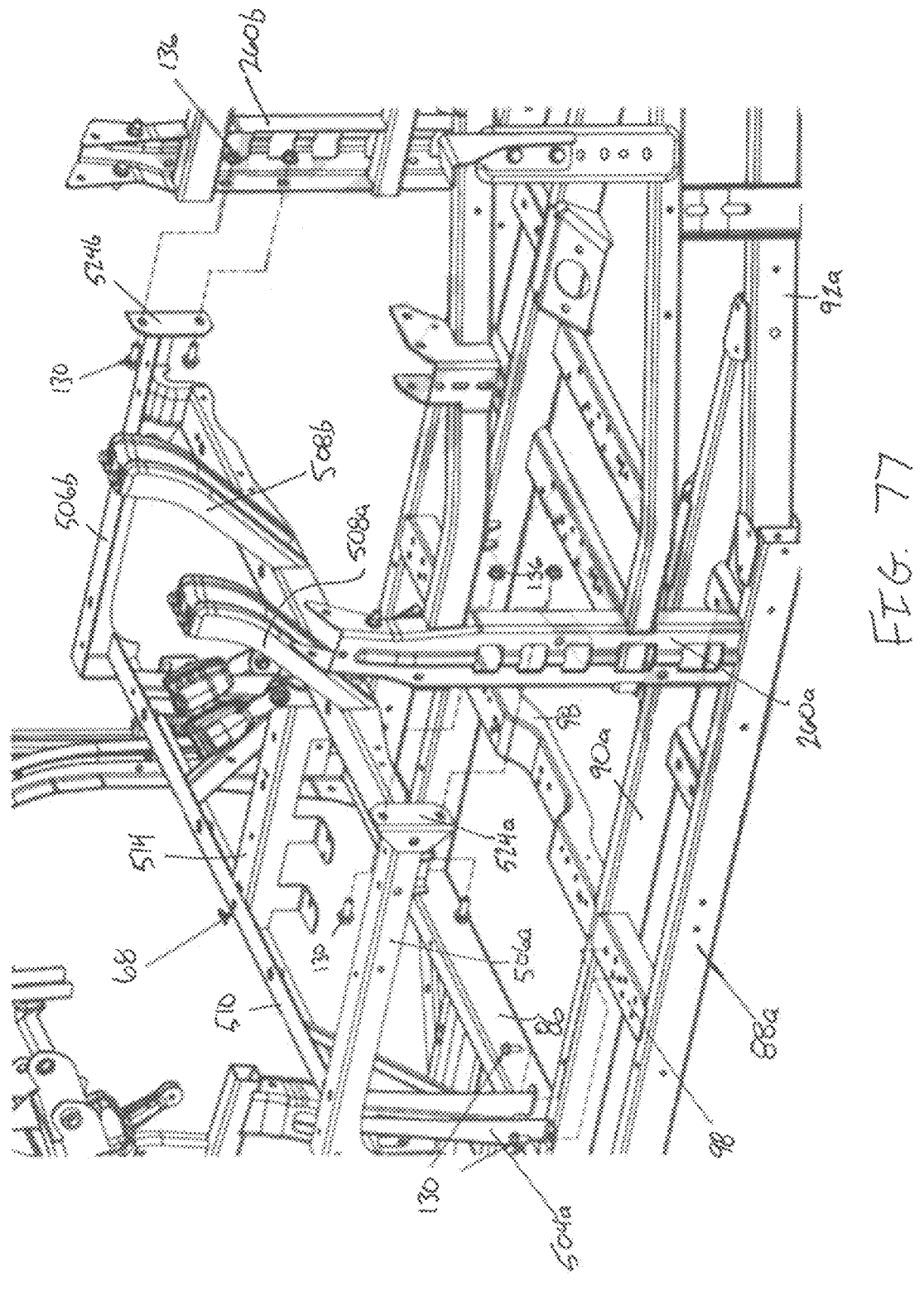
FIG. 77 is an orthogonal view illustrating the connection of the seating frame to the frame according to some embodiments.
Figure 78:
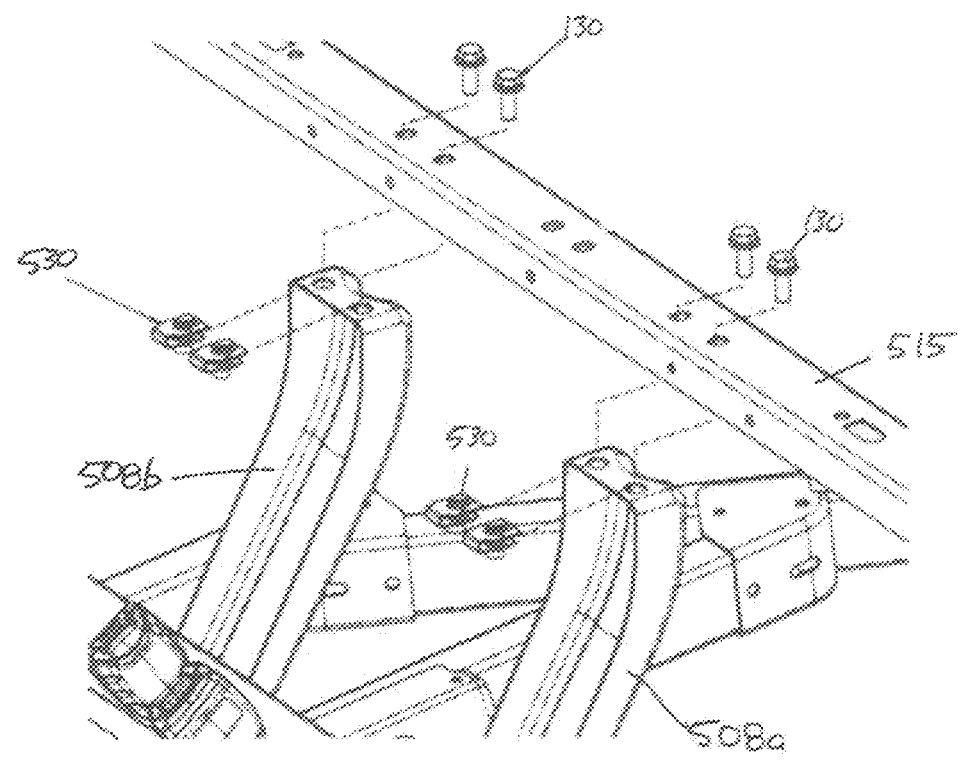
FIG. 78 is an exploded view illustrating the connection of the seating frame to the frame according to some embodiments.

FIGS. 73-79 illustrate in additional detail the components of seat frame 68 utilized to secure seats 26a, 26b. In one embodiment, seat frame 68 is comprised of a plurality of members, including forward support pillars 504a, 504b, horizontal seat supports 506a, 506b, rear seat support pillars 508a, 508b, forward cross-beam support 510, angled cross-bar support members 512a, 512b, center seat support member 514. Forward support pillars 504a, 504b include frame mounting flanges 516 that allow the forward support pillars 504a, 504b to be secured to frame 14 (in particular, to cross-beam member 98 as shown in FIG. 77). Forward support pillars 504a, 504b support forward cross-beam support 510. In some embodiments, to provide additional support, angled cross-bar support members 512a, 512b are connected between forward support pillars 504a, 504b and forward cross-beam support 510 at approximately a forty-five degree angle. In some embodiments, forward cross-beam support 510 is coupled to forward support pillars 504a, 504b via one or more of fasteners and/or weldments. Likewise, horizontal seat supports 506a, 506b are connected to and supported by forward cross-beam support 510 on one end. The other end of horizontal seat supports 506a, 506b are coupled to the frame 14 via seat frame mounting brackets 524. In particular, in one embodiment horizontal seat supports 506a, 506b are coupled to rear outer vertical support members 260a, 260b, respectively (as shown in FIGS. 71 and 77). In some embodiments, fasteners are utilized to connect horizontal seat supports 506a, 506b to rear outer vertical support members 260a, 260b. Lower cross-bar seat support member 490 is connected to horizontal seat supports 506a, 506b, via one or more fasteners and/or weldments. In some embodiments, lower cross-bar seat support member 490 is mounted slightly below horizontal seat supports 506a, 506b, as shown in FIG. 76. Rear seat support pillars 508a, 508b are connected to lower cross-bar seat support member 490. Rear seat support pillars 508a, 508b, in turn, are utilized to support upper cross-bar seat support member 515 as shown in FIG. 78. In some embodiments, a plurality of fasteners and nut clips are utilized to secure upper cross-bar seat support member 515 to rear seat support pillars 508a, 508b. In some embodiments, rear seat support pillars 508a, 508b include a bend or angle that results in the top of the rear seat support pillars 508a, 508b being located further rearward, allowing room for seats 26a, 26b to be tilted rearward in the same manner. In addition, rear closeout panel 484 is illustrated in FIG. 73, along with the formation of air filter access panel 62 within the rear closeout panel 484. Rear closeout panel 484 is located rearward of seats 26a, 26b, and provides a closet-out of seating area 20.

Figure 79:
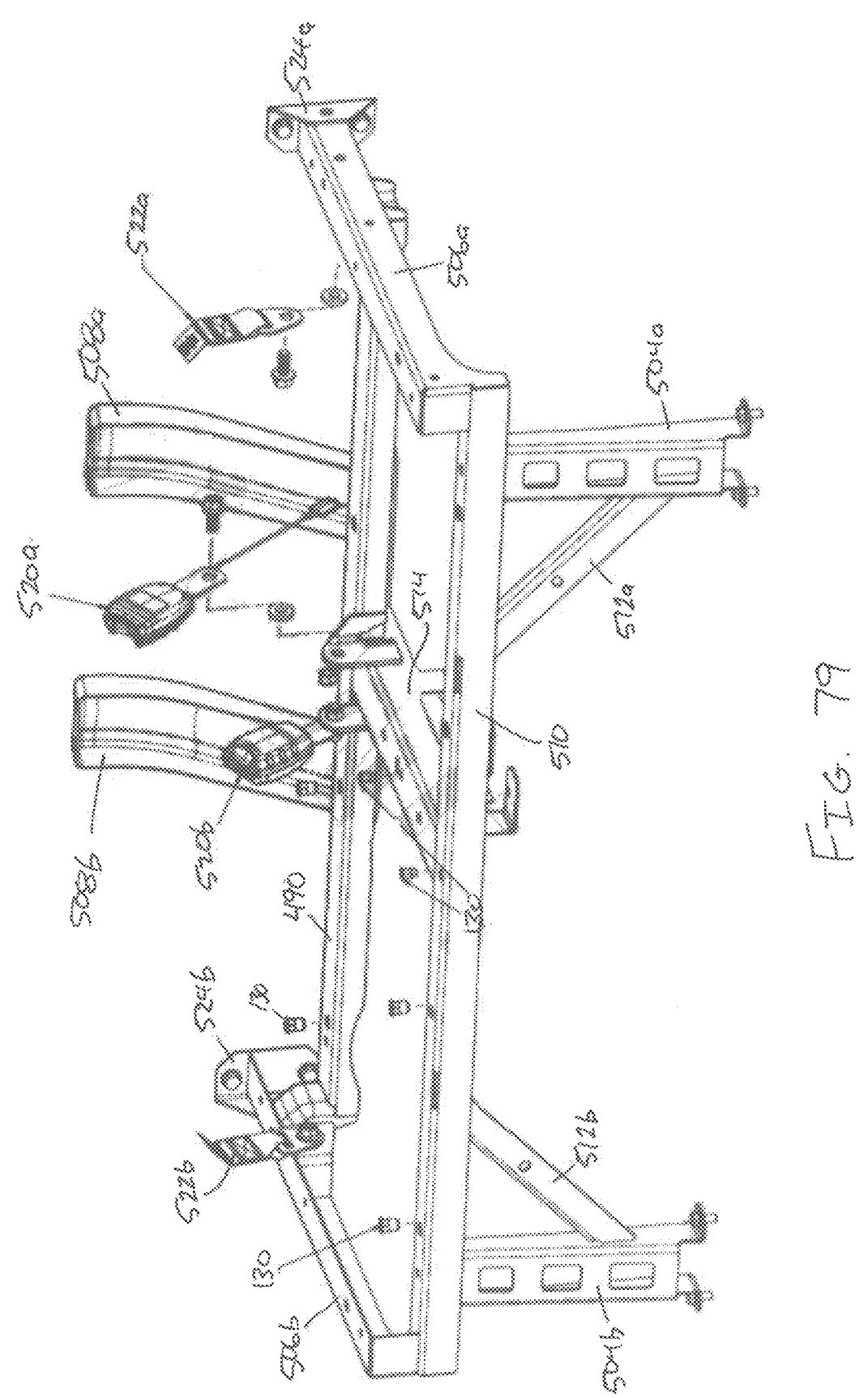
FIG. 79 is an orthogonal view illustrating the connection of the seating frame to the frame according to some embodiments.
Figure 80:
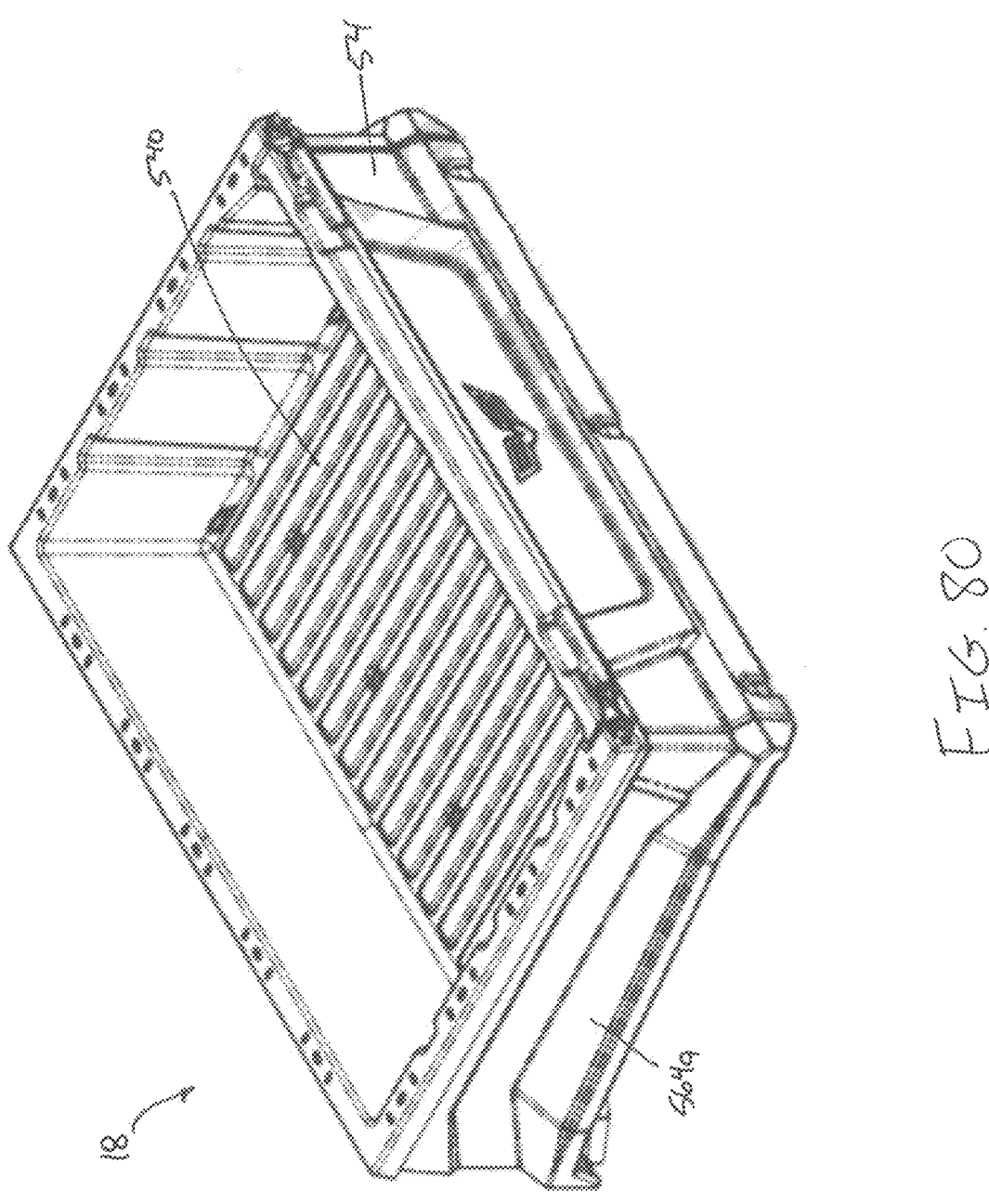
FIG. 80 is an orthogonal view of a cargo box according to some embodiments.
Figure 81:
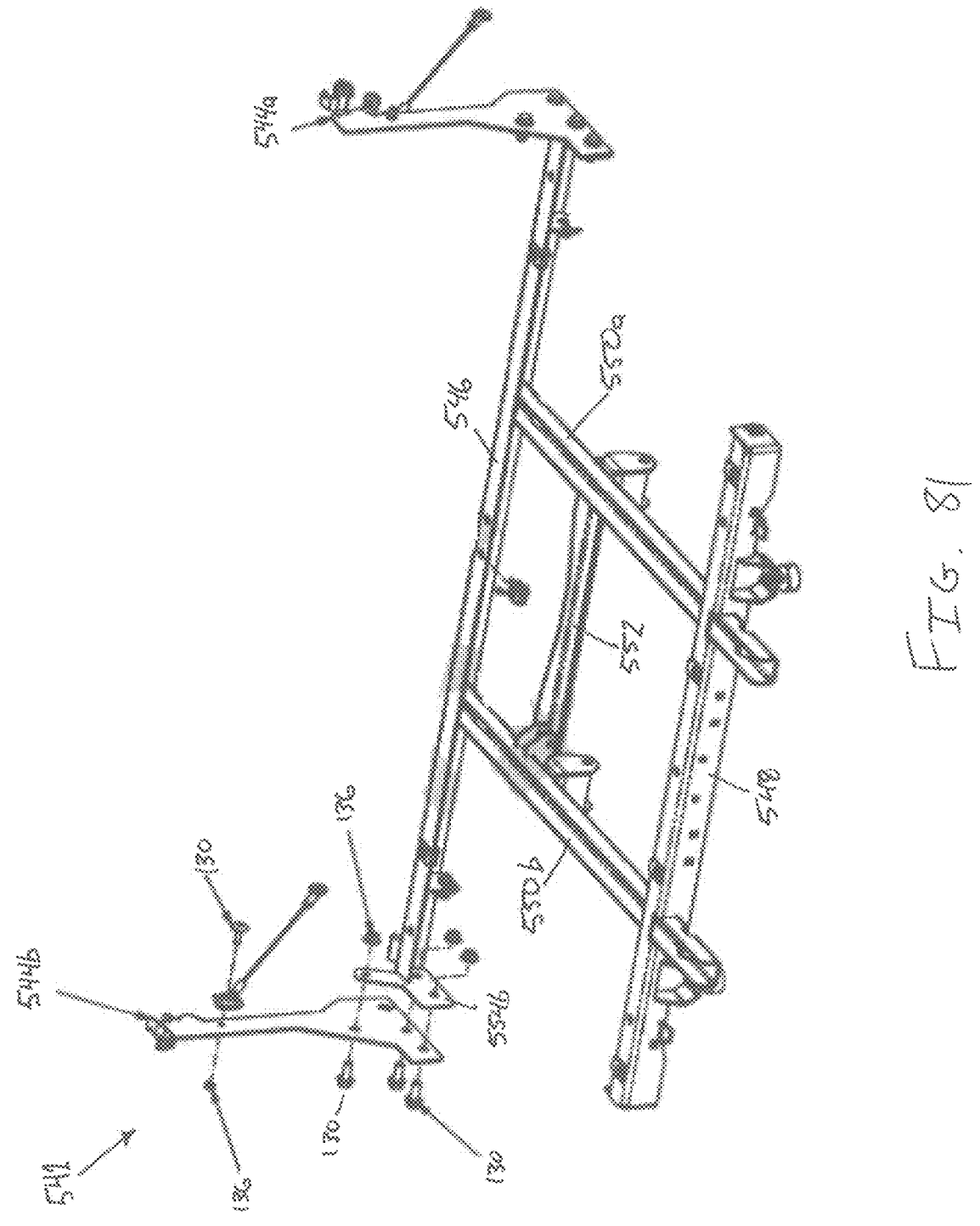
FIG. 81 is an exploded view illustrating the connection of a tailgate bracket to a cargo box frame according to some embodiments.
Figure 82:
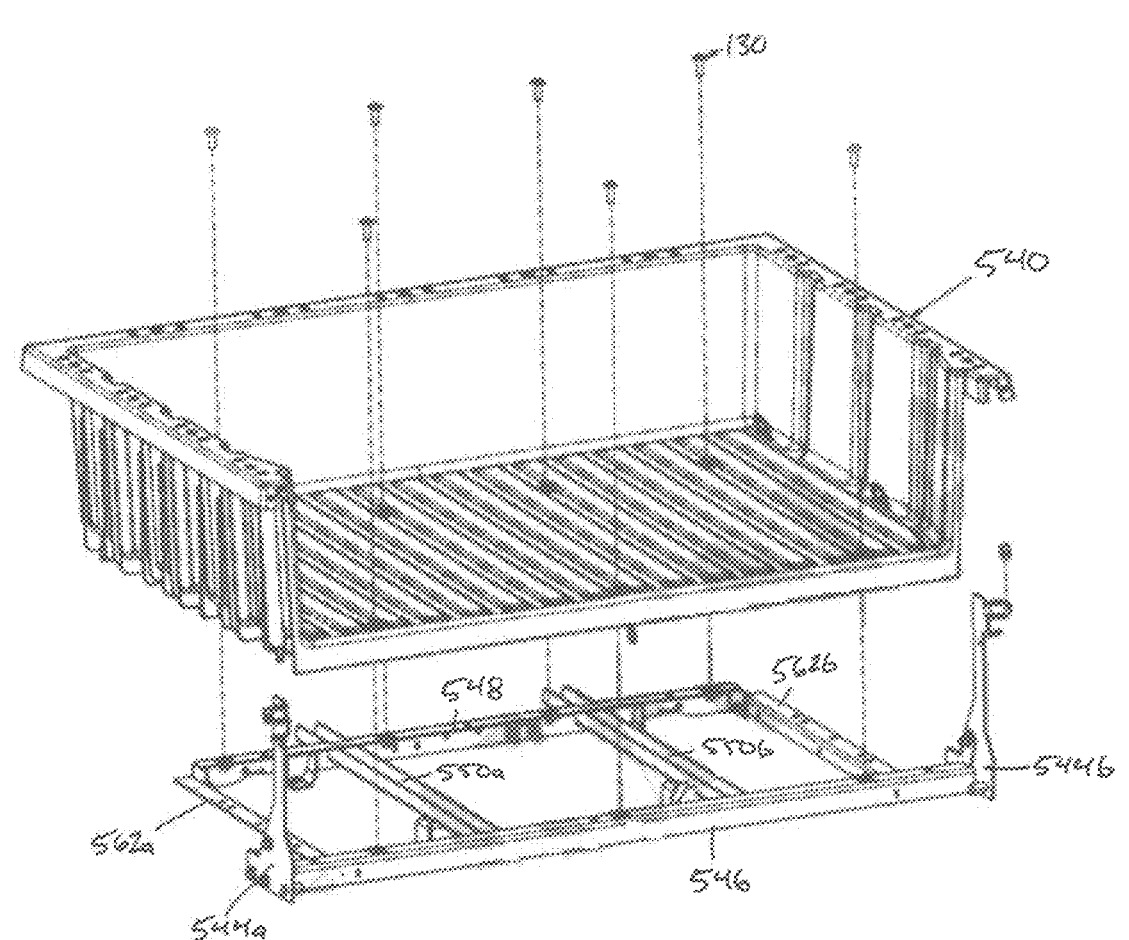
FIG. 82 is an exploded view illustrating the connection of the cargo box to the cargo box frame according to some embodiments.
Figure 83:
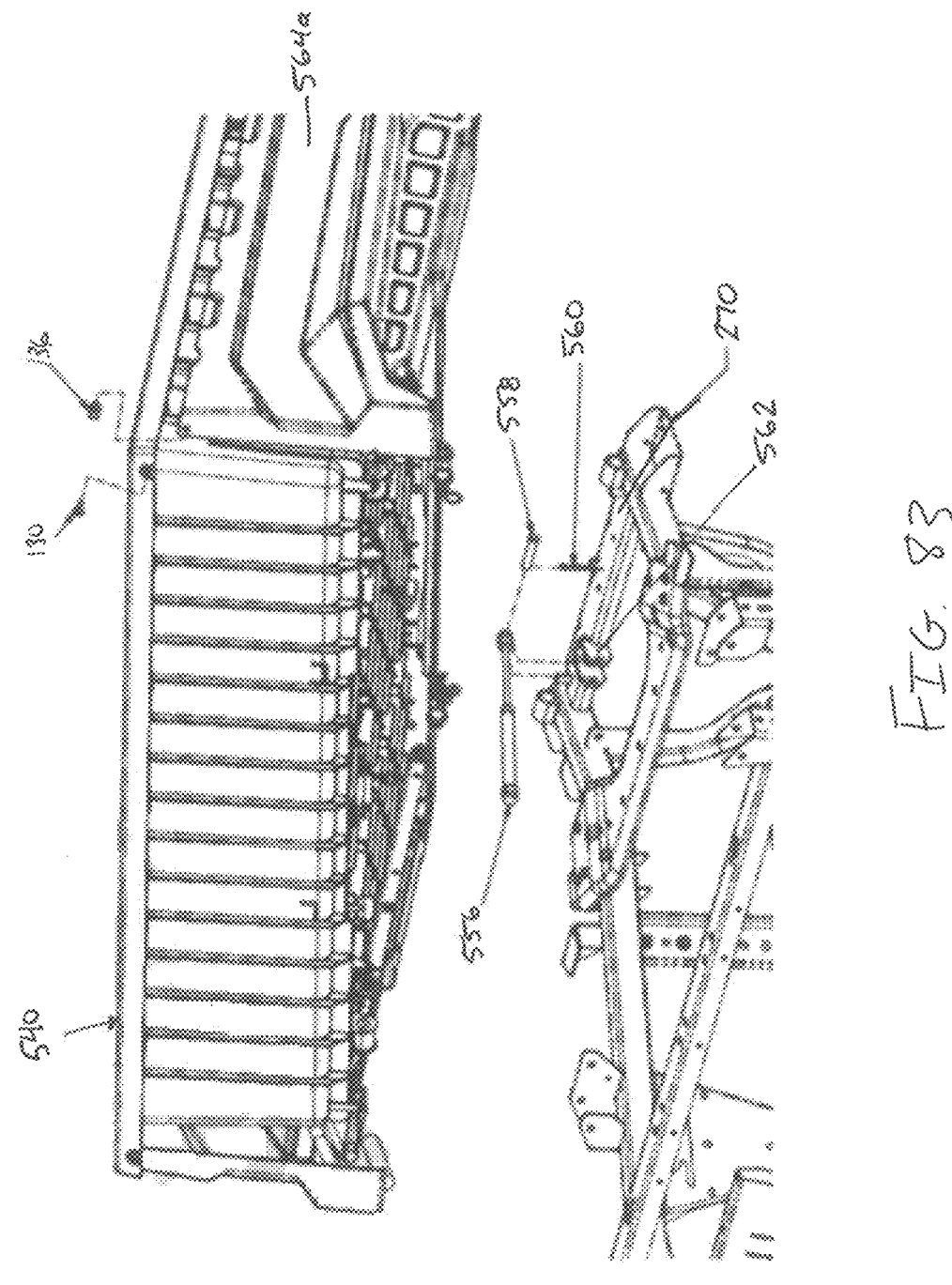
FIG. 83 is an exploded view illustrating the connection of a gas spring to the cargo box according to some embodiments.
Figure 84:
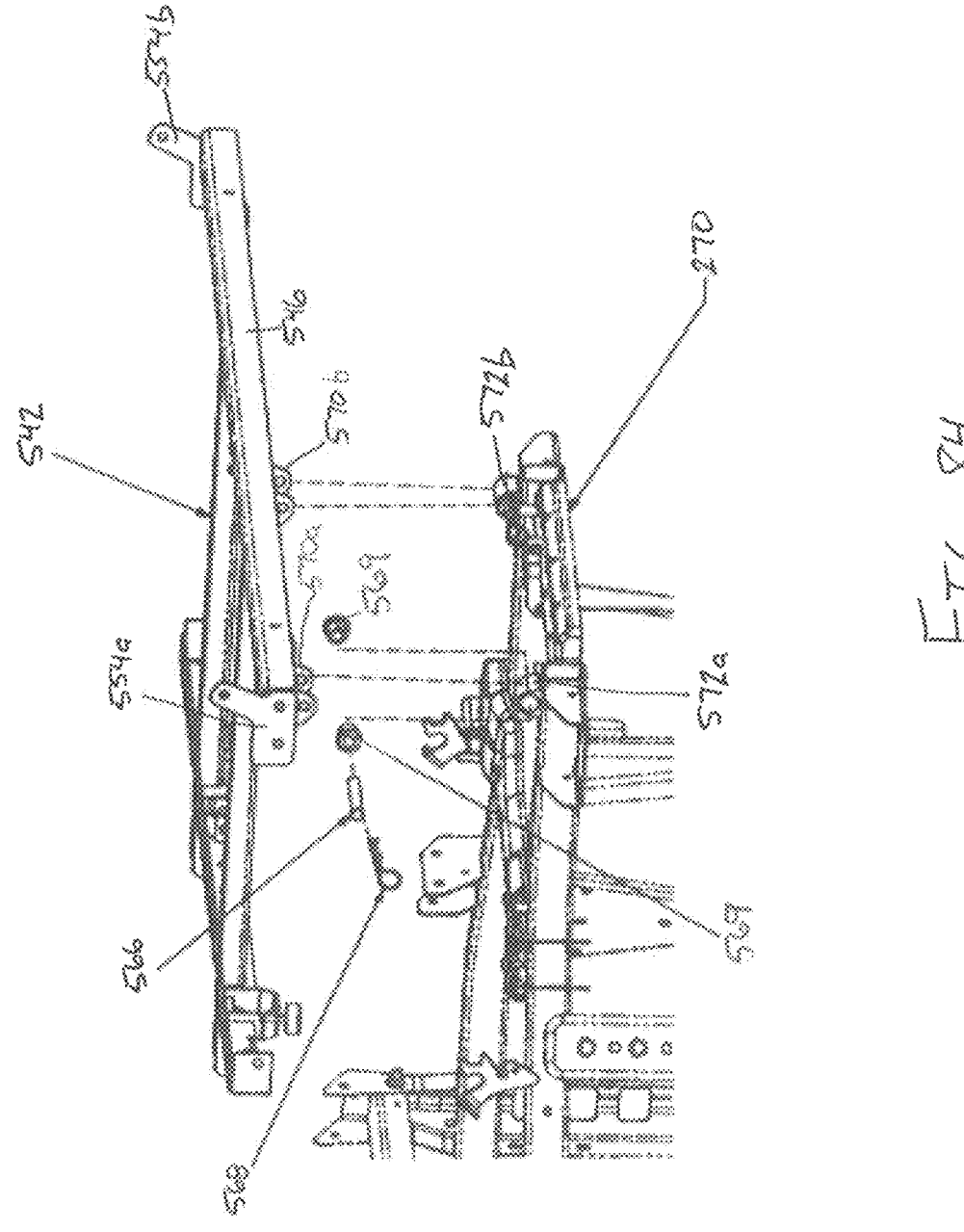
FIG. 84 is an exploded view illustrating the connection of the cargo box frame to the frame according to some embodiments.
Figure 85:
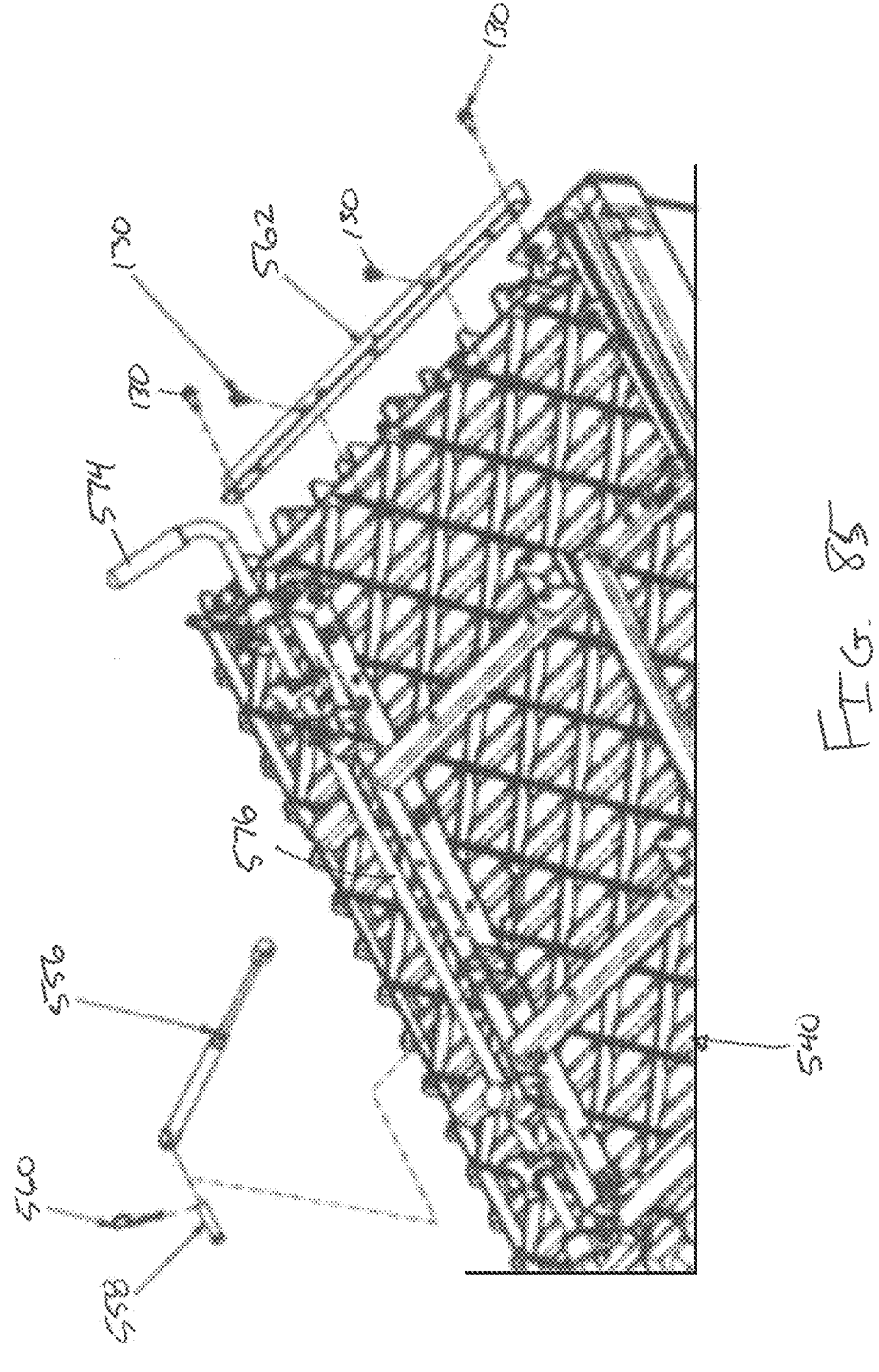
FIG. 85 is a bottom view illustrating the connection of the lift handle to the cargo box frame according to some embodiments.

In addition, center seat support member 514 includes a plurality of mounting flanges 518 that are utilized to secure electrical components to the seat frame 68. In some embodiments, seat frame 68 is configured for seat belt fasteners 520a, 520b and seat belt clasps 522a, 522b to be mounted on the frame 14. For example, seat belt fasteners 520a, 520b are mounted to center seat support member 514 via one or more fasteners and/or weldments, with seat belt fastener 520a mounted on the driver side of center seat support member 514 and seat belt fastener 520b mounted on the passenger side of center seat support member 514. Similarly, seat belt clasps 522a, 522b are mounted to horizontal seat supports 506a, 506b, respectively, via one or more fasteners and/or weldments as shown in FIG. 79.

FIGS. 80-94 illustrate perspective and exploded views of cargo box 18 as well as the frame elements utilized to support cargo box 18. In some embodiments, cargo box 18 comprises a bed assembly 540 that includes at least three walls defining an inner geometry of cargo box 18. Tailgate 54 is located between two opposite walls to provide a four-wall enclosure of bed assembly 540. In some embodiments, tailgate 54 is hinged along a bottom surface of tailgate 54 to allow tailgate to open, providing easier access to items stored within cargo box 18. Bed assembly 540 is mounted onto cargo box frame 542, which includes a plurality of frame members, including tailgate bracket 544, rear lateral support member 546, forward lateral support member 548, inner bed frame members 550a, 550b, and cross-bar support member 552. Forward lateral support member 548 and rear lateral support member 546 extend parallel to one another, and are connected by inner bed frame members 550a, 550b, which also extend parallel to one another. Connections between forward lateral support member 548 and inner bed frame members 550a, 550b may be via one or more fasteners and/or weldments. Similarly, connections between rear lateral support member 546 and inner bed frame members 550a, 550b may be made via one or more fasteners and/or weldments. Inner bed frame members are attached to a middle portion of forward lateral support member 548 and rear lateral support member 546. Cross-bar support member 552 is connected between inner bed frame members 550a, 550b. In addition to inner frame members, outer frame members 562a, 562b are connected between forward lateral support member 548 and rear lateral support member 546 at an outer edge of each lateral support member.

Tailgate brackets 544a, 544b extend in a vertical direction, and are connected on one end to mounting brackets 554a, 554b, respectively associated with rear lateral support member 546. In some embodiments, tailgate bracket 544 is attached to mounting bracket 554 via a plurality of fasteners, which in turn is pivotally mounted to rear lateral support member 546, such that tailgate bracket 544 (and tailgate 54) can be opened by pivoting tailgate 54 about the axis defined by rear lateral support member 546. Bed assembly 540 is secured to cargo box frame 526 via a plurality of fasteners provided through bed assembly 540 and secured to cargo box frame 542.

In some embodiments, cargo box 18 is connected to frame 14 via hinge joints 570a, 570b and brackets 572a, 572b located on cargo box frame 542 and frame 14, respectively, to allow cargo box 18 to be articulated, allowing contents within cargo box 18 to be dumped. In some embodiments, the hinged portions connecting cargo box 18 to frame 14 are located at the rear of the cargo box, such that articulation of the cargo box 18 results in the forward portion of cargo box 18 being moved upward while the rear pivots about the brackets 572a, 572b. In other embodiments, hinges may be provided on the side of cargo box 18 to allow side dumping of cargo box 18. In the embodiment shown in FIG. 84, hinge joint 572a, 572b is located at a rear portion of frame 14 (in particular, on rear horizontal support 270). In some embodiments, a clevis pin 566 and bushings 569 are utilized to pivotally secure the cargo box frame 542 to frame 14 via brackets 572a, 572b, with a cotter pin 568 utilized to secure clevis pin while allowing hinge joints 570a, 570b to rotate relative to brackets 572a, 572b and clevis in 566. In some embodiments, gas spring 556 is connected between frame 14 (in one embodiment, rear horizontal support 270) and cargo box 18. In some embodiments, gas spring 556 provides a force that aids in articulating cargo box 18 in a dumping motion. In addition, gas spring 556 provides a force that prevents cargo box 18 from being returned to a horizontal position from a dumping position and to smooth the return of cargo box 18 to a horizontal position.

Figure 86:
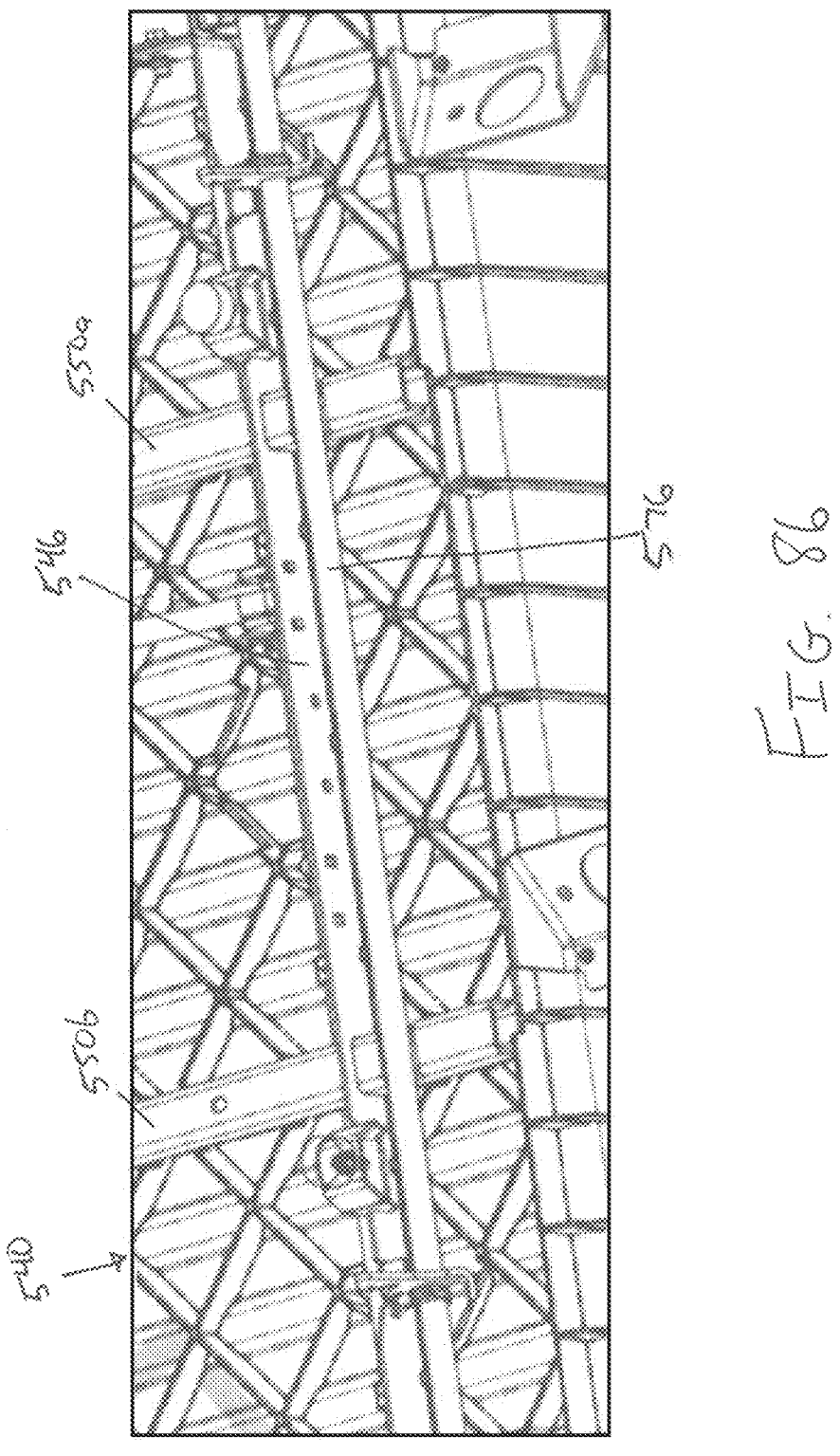
FIG. 86 is a bottom view of the cargo box frame and cargo box according to some embodiments.
Figure 87:
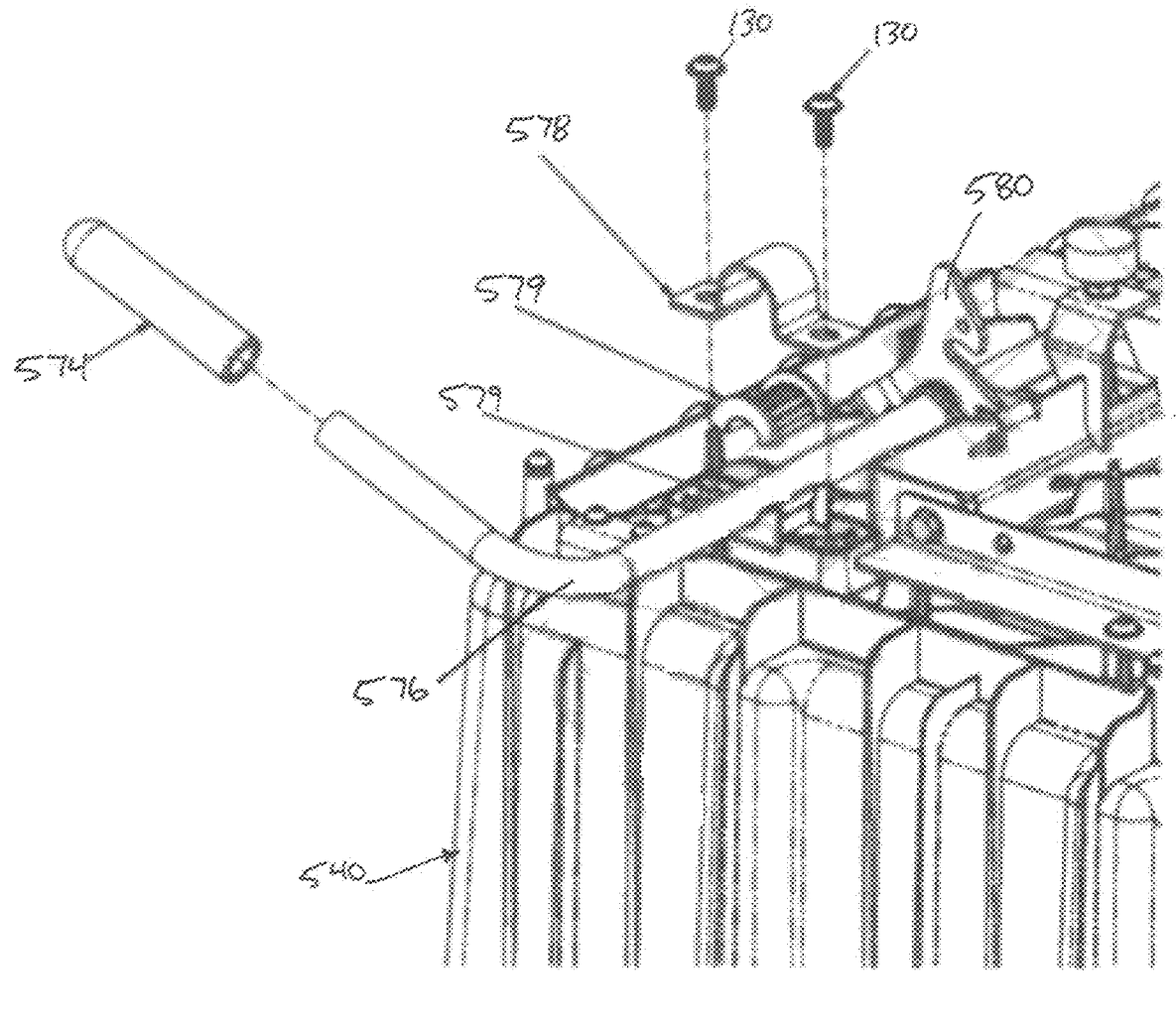
FIG. 87 is an exploded view illustrating the connection of the dump lever to the cargo box according to some embodiments.

In some embodiments, illustrated in FIGS. 86 and 87, a mechanism is illustrated for actuating the dumping of cargo box 18, which includes dump handle 574, dump rod 576, dump rod mounting bracket 578, bushing 579, and release hinge 580. Dump rod 576 extends laterally across a forward portion of cargo box 18, secured to cargo box 18 by dump rod mounting brackets 578. Release hinge 580 includes a catch portion, which is captured by a catch located on frame 14. When dump handle 574 is in a first position, release hinge 580 is captured by the component located on frame 14 and prevents cargo box 18 from articulating in a dumping action. Rotating dump handle 574 releases hinge 580 and allows the forward portion of cargo box 18 to be articulated in a generally upward direction about the brackets 572 towards in the rear of cargo box 18.

Figure 92:
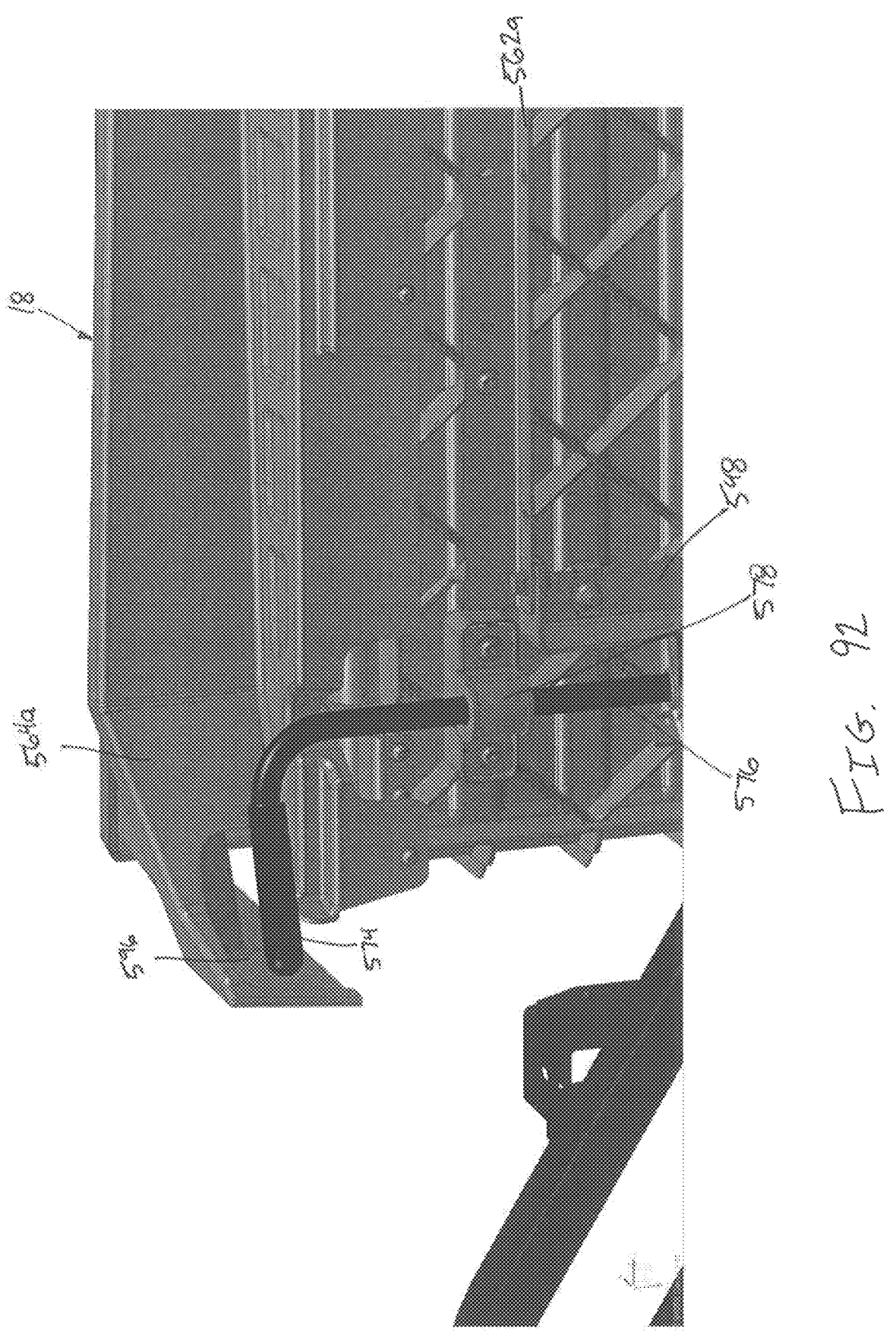
FIG. 92 is an orthogonal view of a dump lever according to some embodiments.
Figure 93:
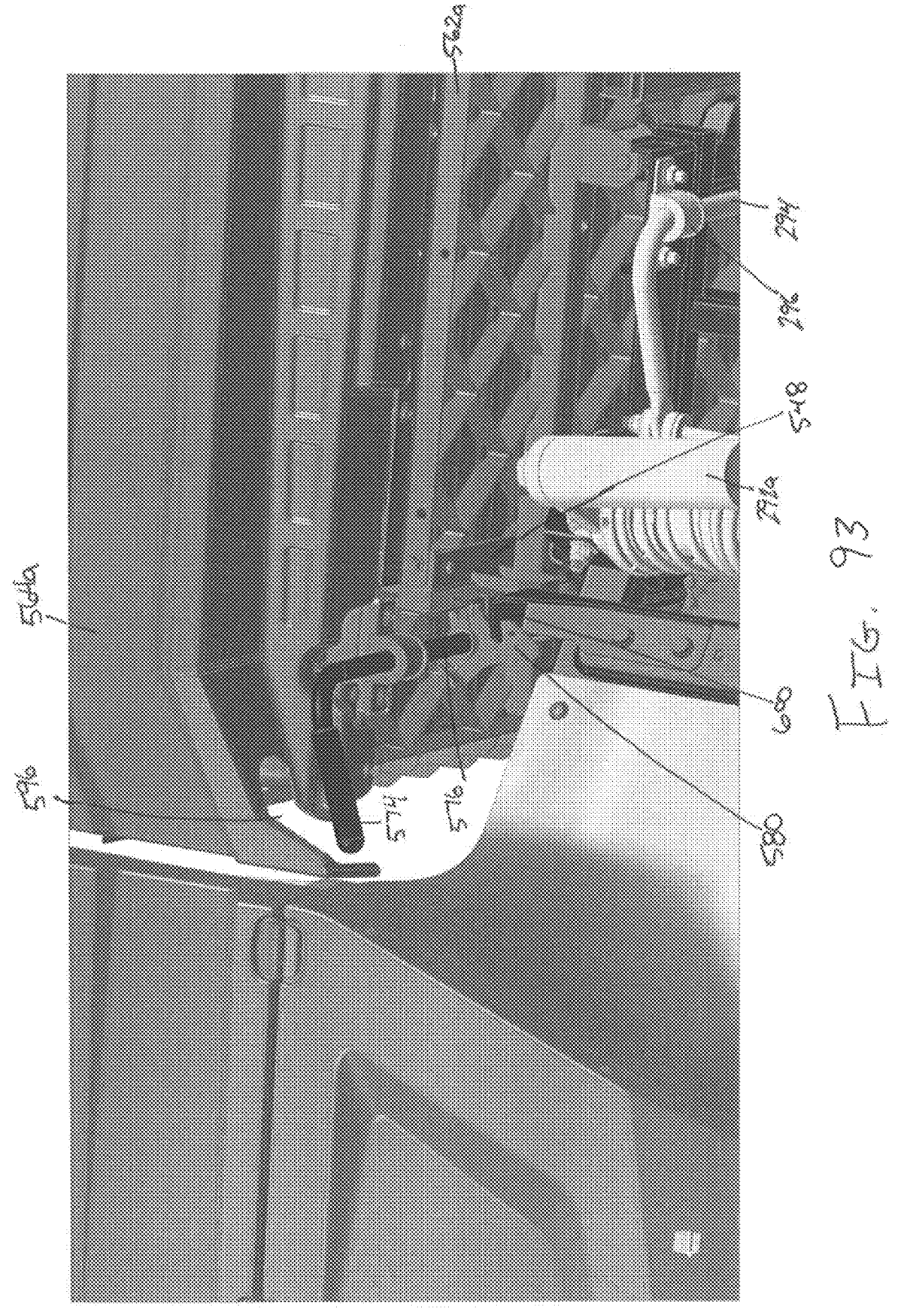
FIG. 93 is a bottom orthogonal view of a dump lever and recess within a fender flare to receive the dump lever according to some embodiments.
Figure 94:
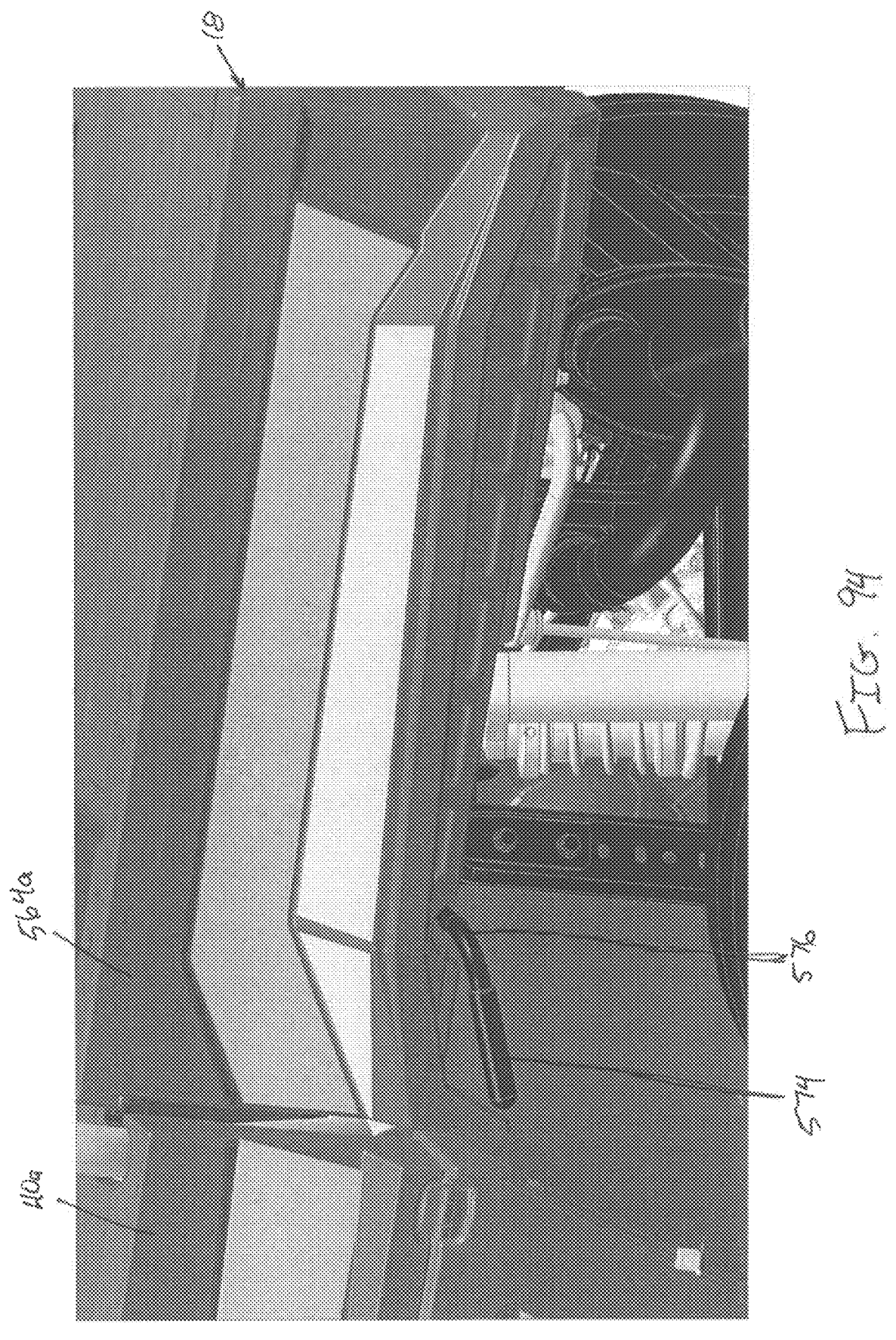
FIG. 94 is a top orthogonal view of a dump lever and cargo box according to some embodiments.

FIG. 92 is a bottom view illustrating dump handle 574, dump rod 576, and dump rod mounting brackets 578 utilized to secure dump rod 576 to cargo box 18. Similarly, FIG. 93 is a bottom view that illustrates release hinge 580 engaged with catch 600, which prevents cargo box 18 from being articulated upward in a dumping action. In addition, the embodiment shown in FIG. 93 illustrates the mechanism by which dump handle 574 is rotated upward into the dump handle cavity formed in the side panel member to release hinge 580 from catch 600 and allow cargo box 18 to articulate upward. Similarly, when cargo box 18 is returned to the horizontal position, the geometry of release hinge 580 allows catch 600 to capture release hinge 580 without requiring actuation of dump handle 574. In some embodiments, dump handle 574 further includes a locking mechanism that prevents release hinge 580 and catch 600 from disengaging by accident.

In some embodiments, dump handle 574 is located outside (i.e., laterally outward) of cargo box 18 in order to make the handle accessible to an operator. In some embodiments, such as those shown in FIGS. 89, 92, and 93, dump handle 574 is recessed within one of the plurality of panels (e.g., panel 564*a*). For example, in the embodiment shown in FIG. 93, panel 564*a* includes a fender flare 596 that defines a recess in which dump handle 574 is partly recessed. In some embodiments, dump handle 574 is oriented parallel relative to the ground. In other embodiments, such as that shown in FIGS. 92 and 93, dump handle 574 is oriented downward (e.g., non-parallel with the ground) in the same and/or similar orientation/direction as fender flare 596. For example, in one embodiment, dump handle 574 is oriented downward at an angle of approximately 15 degrees, but in other embodiments may be oriented downward at an angle of between 0 degrees and 45 degrees. One benefit of utilizing a downward angle (e.g., 15 degrees) is that this angle provides an ergonomic advantage when it comes to articulating cargo box 18 upward. In some embodiments, the downward angle is selected to approximately match the downward angle of the fender flair 596 in order to improve user access to the dump handle 574.

Figure 88:
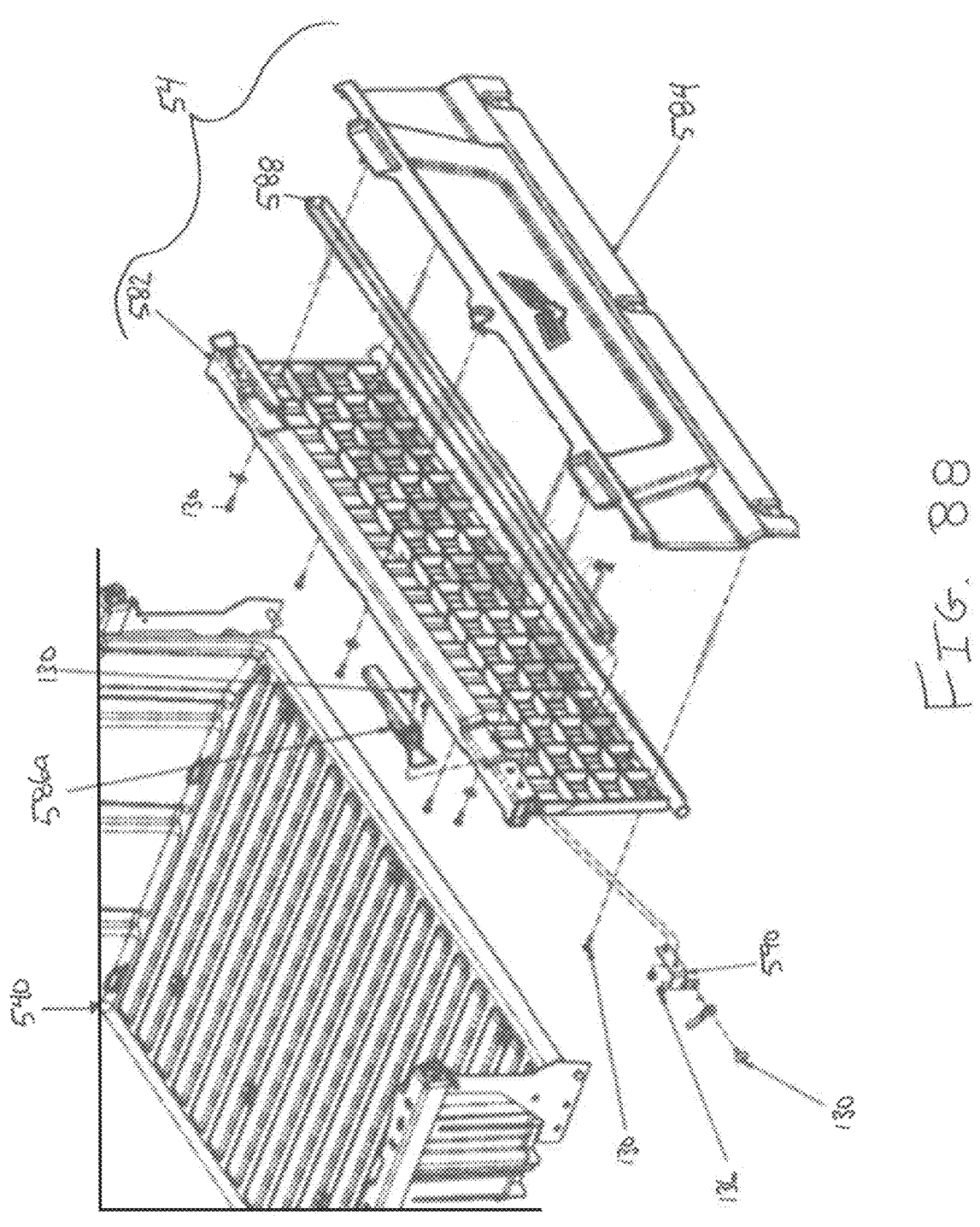
FIG. 88 is an exploded view of the tailgate according to some embodiments.
Figure 89:
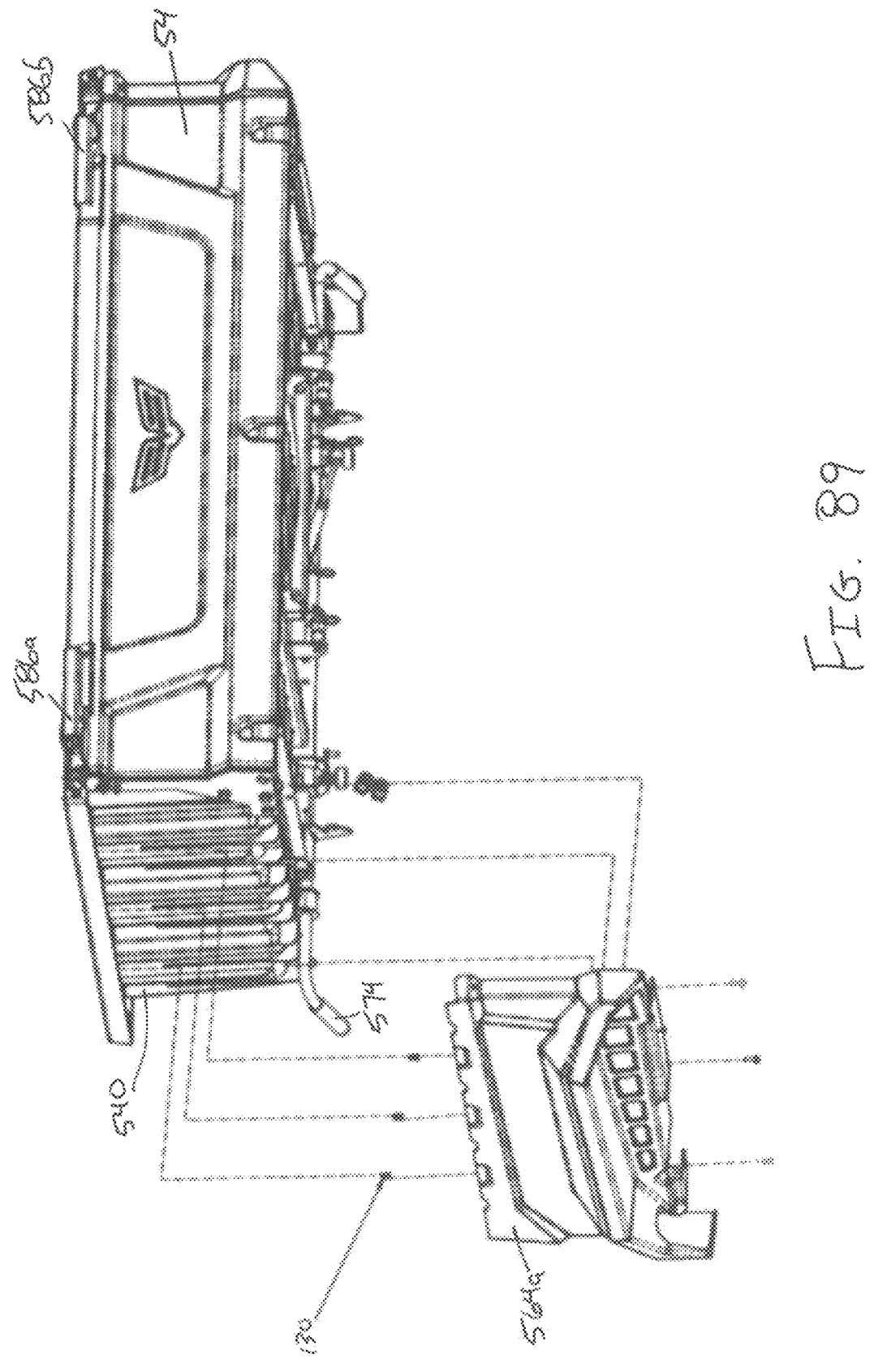
FIG. 89 is an exploded view illustrating the connection of panels to the cargo box according to some embodiments.
Figure 90:
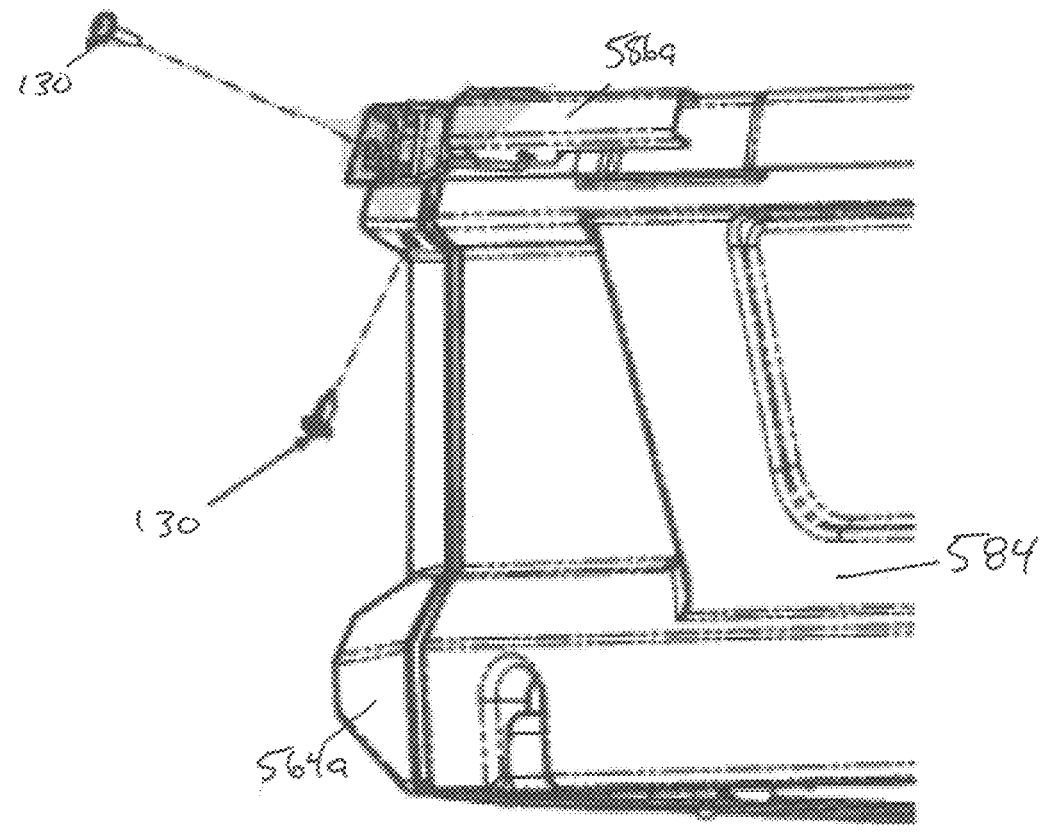
FIG. 90 is an exploded view illustrating the coupling of a handle to the tailgate according to some embodiments.
Figure 91:
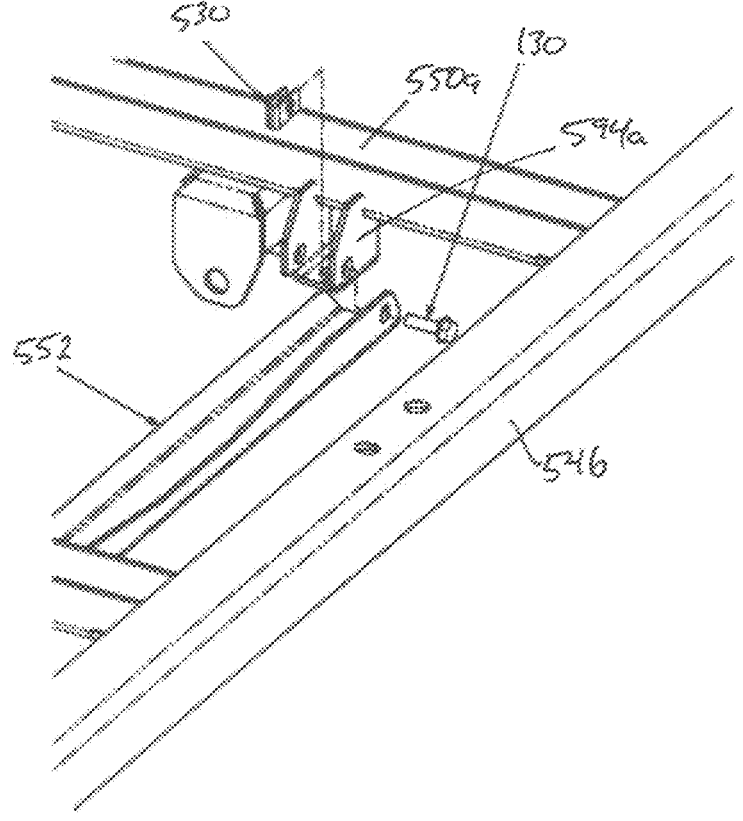
FIG. 91 is an exploded view illustrating the connection of an inner cargo frame member to a cross bar member according to some embodiments.

In the embodiment shown in FIG. 88, the construction of cargo box tailgate 54 is illustrated, which includes tailgate frame 582, tailgate panel 584, and tailgate handles 586. In one embodiment, a plurality of fasteners are utilized to secure tailgate panel 584 to tailgate frame 582. Tailgate frame 582 may be comprised of aluminum, steel, and/or other materials. Tailgate panel 584 may similarly be comprised of aluminum and/or steel, but may also be comprised of materials easily configured to provide a desired geometry/design, such as plastics. Similarly, as shown in FIG. 89, a plurality of panels 564*a*, 564*b*, and 564*c* (564*b* and 564*c* not shown in this view) may be affixed to bed assembly 540. As discussed with respect to tailgate 54, in some embodiments, bed assembly 540 may be comprised of aluminum, steel, and/or other materials. Panels 564*a*, 564*b*, and 564*c* may similarly be comprised of aluminum and/or steel, but in some embodiments may be comprised of plastic materials that are more easily configured to provide the desired geometry/design. In some embodiments, because panels 564*a*, 564*b*, and 564*c* can be adhered to bed assembly 540 via easily accessible fasteners provided through the top of panels 564*a*, 564, 564*c* and through the bottom of panels 564*a*, 564*b*, and 564*c*, it is possible in some embodiments to modify/replace these panels to dramatically change the look of the utility vehicle 10 at relatively low cost. A benefit of this approach is a utility vehicle may be delivered to a dealership, and upon purchase by a consumer the desired panels 564*a*, 564*b*, 564*c* (as well as those panels located throughout utility vehicle 10 such as those shown in FIGS. 95-102) can be provided separately based on user preferences and installed by the dealership or directly by the user.

FIGS. 95-102 illustrates a plurality of views of body panel components utilized with respect to utility vehicle 10, including door panels 28*a*, 28*b*, rear lower body panels 38*a*, 38*b*, front fenders 39*a*, 39*b*, extended cab doors 40*a*, 40*b*, and fender flare panels 43*a*, 43*b*. In some embodiments, body panels may be constructed of aluminum, steel, or plastic. In some embodiments, one or more of the body panels are comprised of one material (e.g., steel) while other body panels are comprised of a different material (e.g., plastic). Body panels are attached to frame 14, typically by one or more fasteners.

Figure 95:
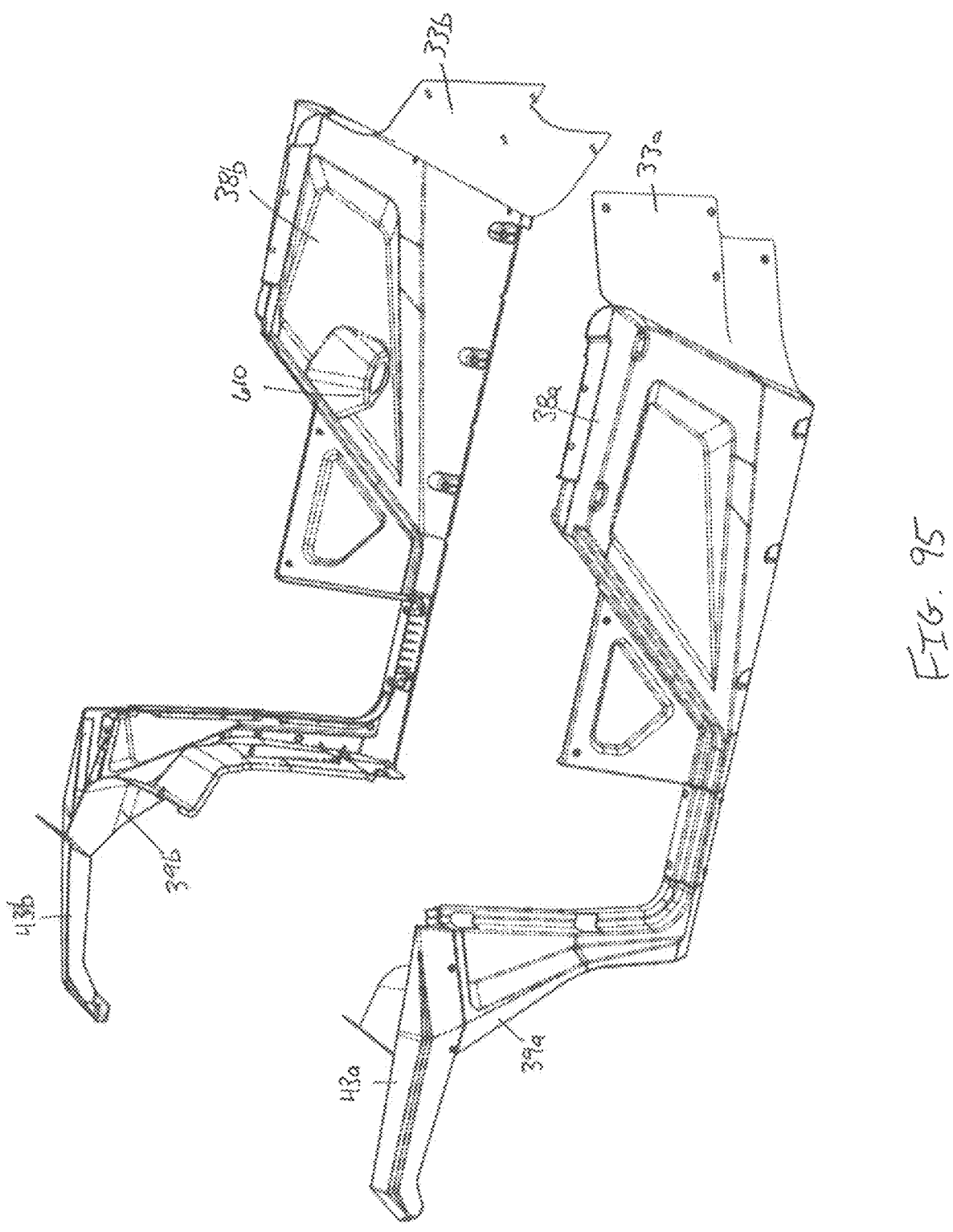
FIG. 95 are side views of body frame members according to some embodiments.
Figure 97:
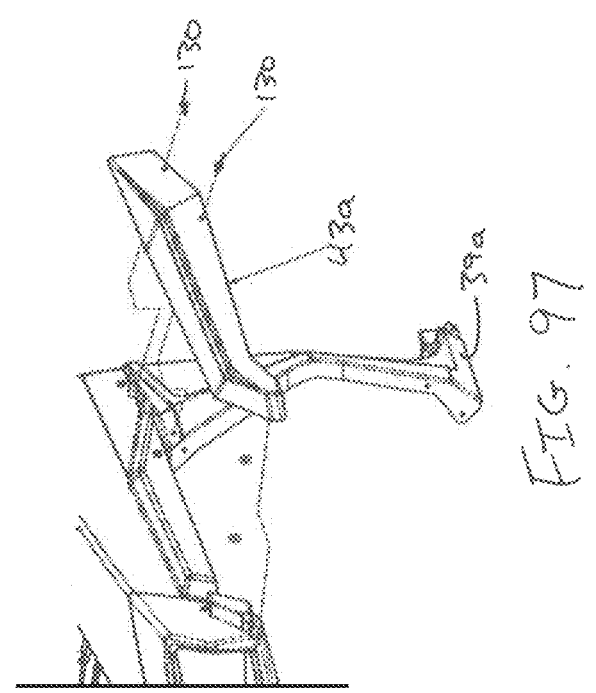
FIG. 97 is an exploded view of a fender flare connected to the frame according to some embodiments.
Figure 96:
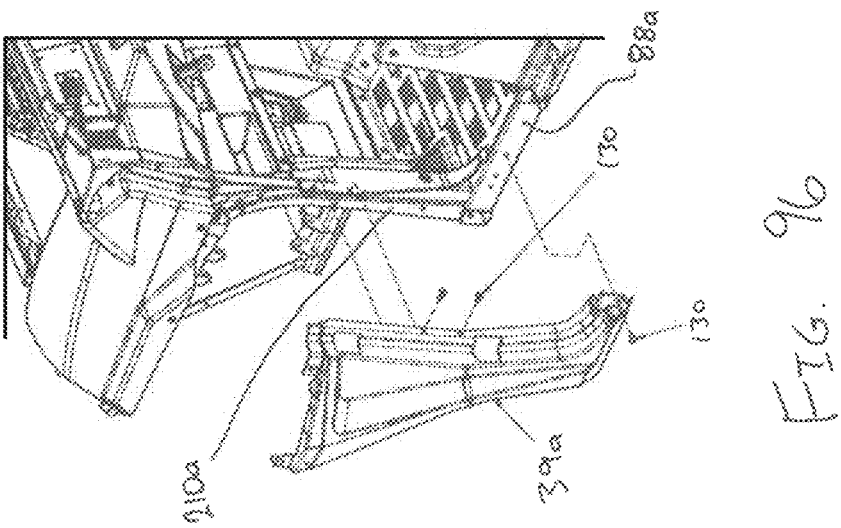
FIG. 96 is an exploded view that illustrates the connection of a front fender to the frame according to some embodiments.

For example, FIG. 95 illustrates a side view of fender flare panels 43*a*, 43*b*, front fender 39*a*, 39*b*, and rear lower body panel 38*a*, 38*b*. Fender flare panels 43*a*, 43*b* are formed to fit over front wheels, and to provide protection to elements located within frame from dirt and debris. Similarly, rear wheel wells 33*a*, 33*b* are affixed to rear lower body panel 38*a*, 38*b*, and have a geometry that extends radially inward to protect components located forward of real wheels. FIG. 96 illustrates front fender 39*a* being affixed to frame 14. In particular, FIG. 96 illustrates the relative position of front fender 39*a* relative to seating area 20, with front fender 39*a* being located just forward of seating area 20.

Figure 98:
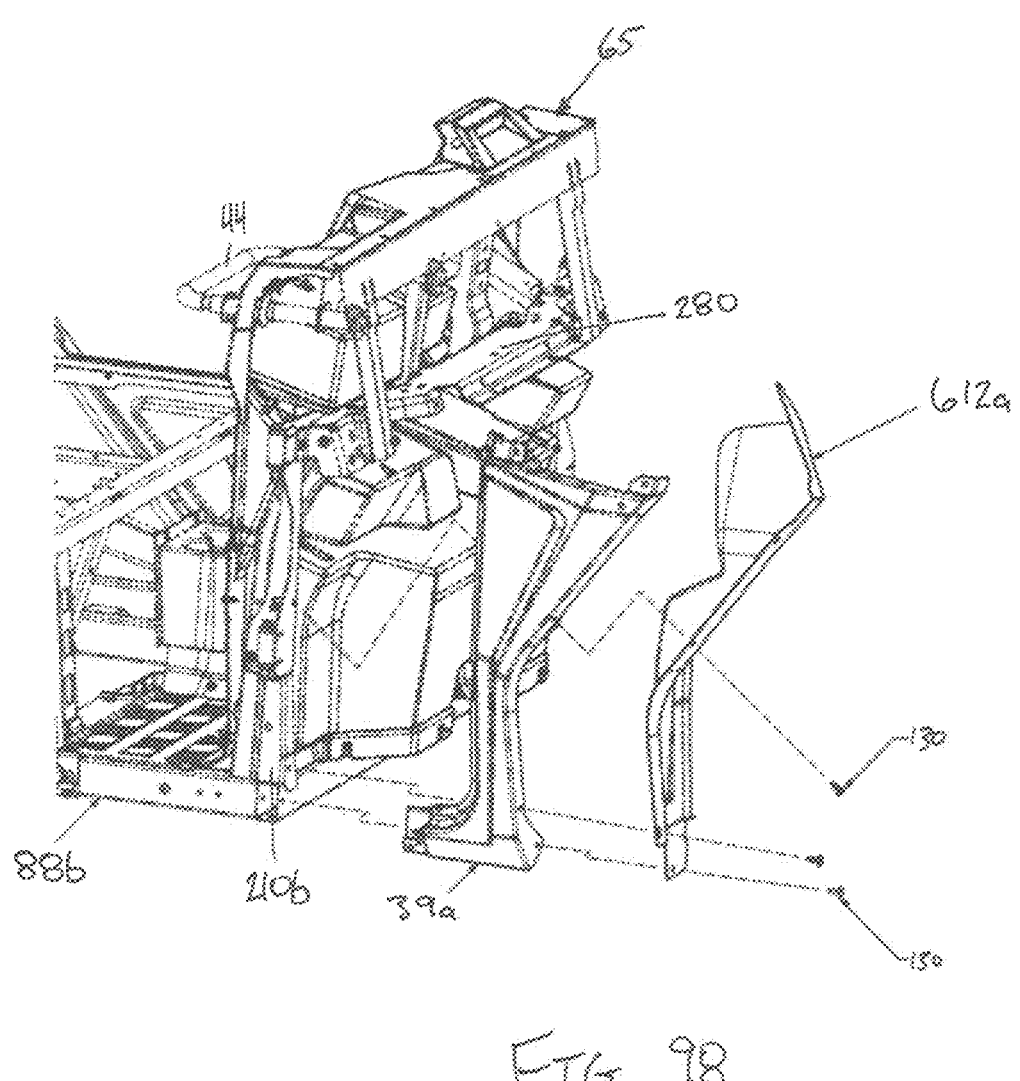
FIG. 98 is an exploded view illustrating the connection of front fenders to the frame according to some embodiments.
Figure 99:
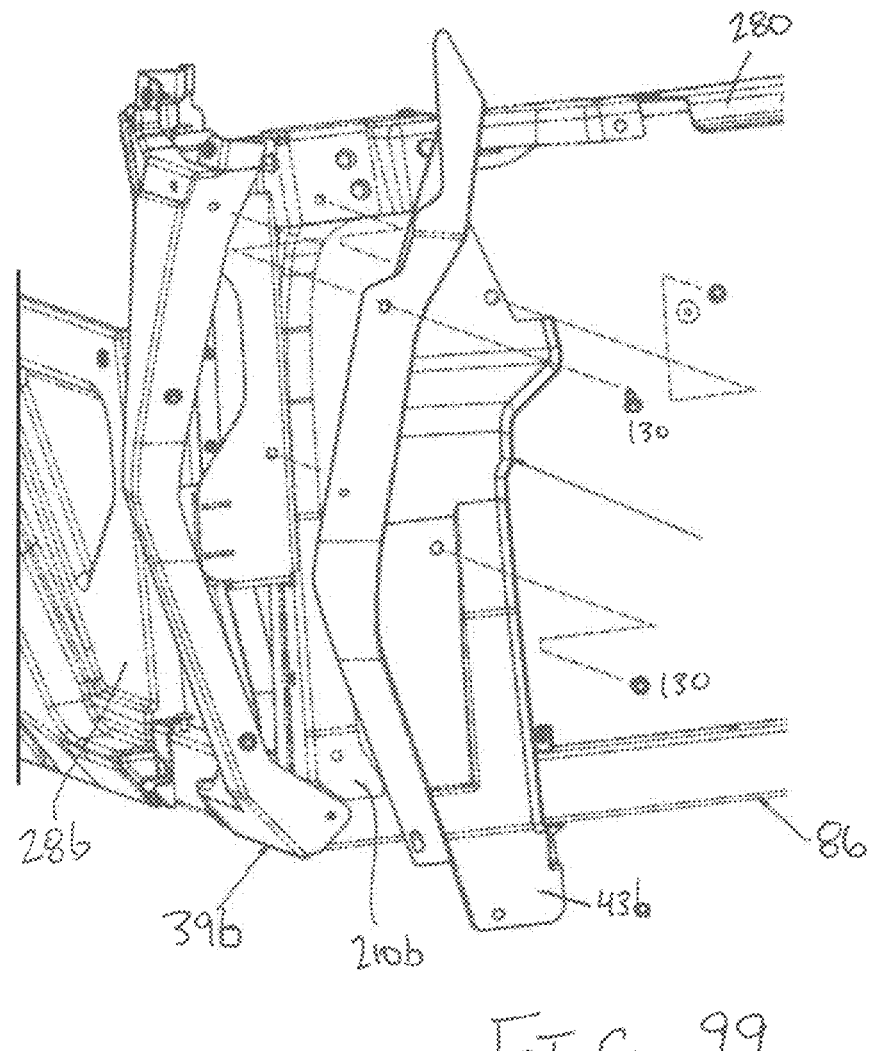
FIG. 99 is an exploded view illustrating the connection of front fenders to the frame according to some embodiments.

In the embodiment shown in FIGS. 98 and 99, a fender liner 612*a* is affixed to front fender 39*a*. In general, fender liners are utilized to protect fenders from the corrosive effects of dirt and water generated by the tires. However, in this embodiment, fender liner 612*a* is located between the front fender 39*a* and the seating area 20, to provide close-out of front vertical support member 210*a* (with a similar front fender 39*b* and fender liner 612*b* utilized to close-out front vertical support member 210*b*). In one embodiment, a plurality of fasteners are utilized to secure fender liner 612*a* to front fender 39*a*, as well as to frame 14 (as shown in FIG. 99).

Figure 100:
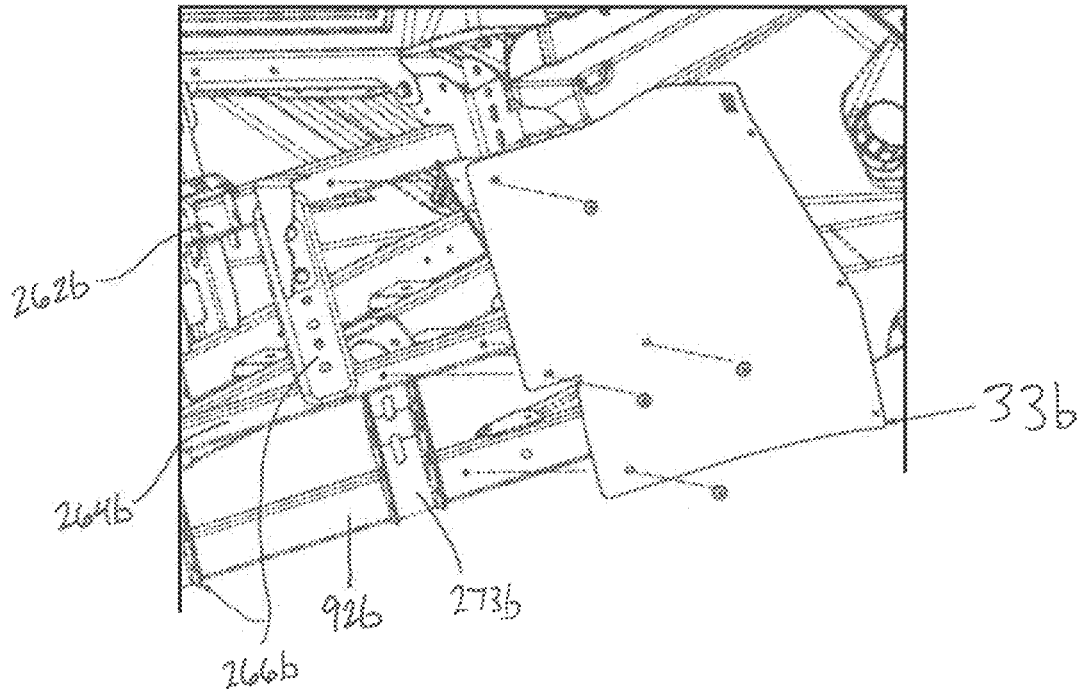
FIG. 100 is an exploded view illustrating the connection rear wheel well panels to the frame according to some embodiments.

FIG. 100 illustrates the connection of wheel well panel 33*b* to frame components including rear upper frame member 262*b*, rear middle frame member 264 and rear angled frame member 92*b*. In the embodiment shown in FIG. 100, a plurality of fasteners are utilized to secure wheel well panel 33*b* to the respective frame members. In one embodiment, wheel well panel 33*b* is located forward of vertical supports 266*b* and 273*b*. Wheel well panel 33*b* includes a geometry that that is curved outward at the forward end of the panel, providing a surface that protects components located forward of the rear ground engaging members 16 from debris and water kicked up by the wheel.

Figure 101:
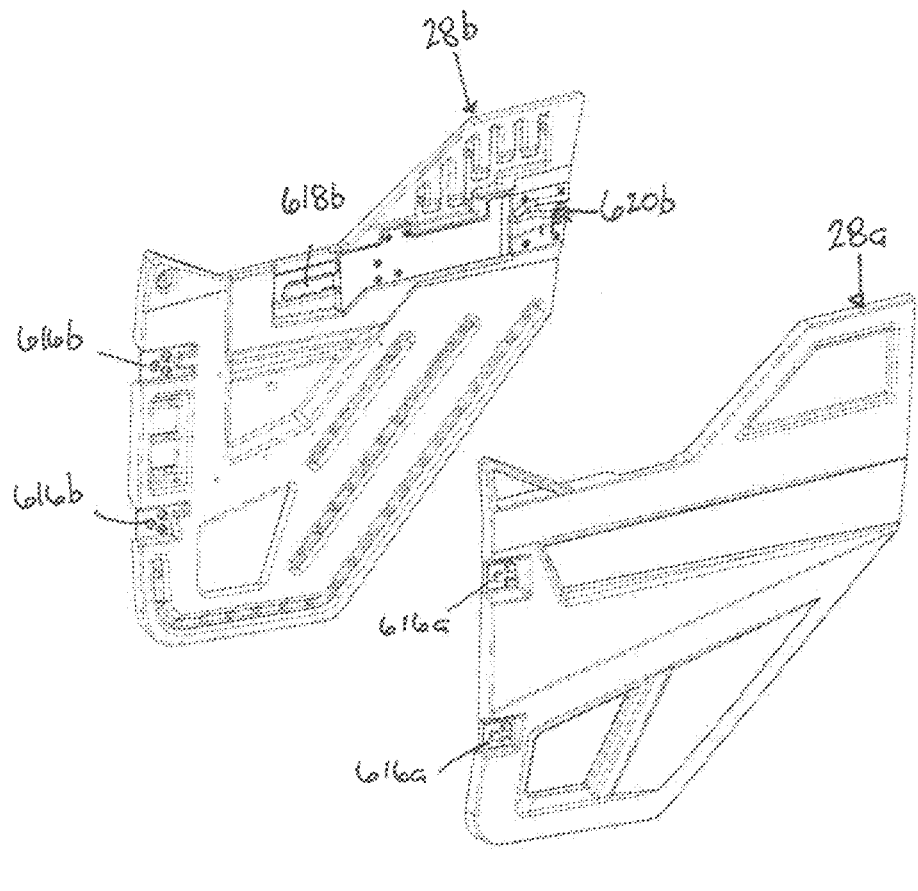
FIG. 101 is a side view of left and right door panels according to some embodiments.

FIGS. 101 and 102 are perspective views of door panel 28*a*, 28*b*, and extended cab doors 40*a*, 40*b*, respectively. In the embodiment shown in FIG. 101, each door panels 28*a*, 28*b* include two or more hinges 616*a*, 616*b* and a door handle 618*a*, 618*b*. In some embodiments, the door handle 618*a*, 618*b* is located on the top of the door panel 28*a*, 28*b* and inside the vehicle. By locating the door handle 618*a*, 618*b* and latch mechanism (only latch mechanism 620*b* is visible) on the inside of door panels 28*a*, 28*b*, it protects these components from the corrosive effect of the elements (e.g., dirt, rain). In most embodiments, utility vehicle 10 does not include windows, so locating door handles 618*a*, 618*b* within the interior of the door is acceptable. Similar to door panels 28*a*, 28*b*, in some embodiments, extended cab doors 40*a*, 40*b* are located just rearward of doors 28*a*, 28*b*, respectively, and include two or more hinge mechanisms (only driver-side hinge mechanism 622*a* is visible) that allows the doors to be opened and closed. In some embodiments, the hinge mechanisms 622*a*, 622*b* are located on the bottom of extended cab doors 40*a*, 40*b* to allow the cab doors to be opened downward to allow easier access to the area behind passenger seats 26*a*, 26*b*. In some embodiments, extended cab door latches (only passenger side latches 621*b* are visible) are located on the top of extended cab doors 40*a*, 40*b* to correspond with the hinge mechanism 622*a*, 622*b* located on the bottom of the extended cab door 40*a*, 40*b*.

FIGS. 103-111 are perspective, exploded and front views of the front fascia 24, headlights 48, and grill 50 associated with utility vehicle 10. As shown in FIG. 102, headlights 48 are located on either side of grill 50. Radiator 426 is located behind grill 50, to receive airflow provided via grill 50. Bumper assembly 31 is located below front fascia 24, and includes bumper bar 52 configured to protect front fascia 24 from impact.

In some embodiments, in the area behind bumper assembly 31, a winch assembly 624 is mounted to front frame 74. Winch assembly 624 includes a motor 625, a winding cylinder 626, roller assembly 627, and guideposts 628*a*, 628b. In general, winch assembly 624 includes a cable (not shown) that can be unwound and attached to an object. Winch assembly 624, and in particular, motor 625, is utilized to wind the cable around winding cylinder 626 and apply force to the object. When affixed to a movable object, winch assembly 624 can be utilized to aid in moving the object. When affixed to a stationary object, winch assembly 624 can be utilized to apply force to utility vehicle 10 and aid in moving utility vehicle 10. Motor 625 is actuated to rotate winding cylinder 626 to either wind or unwind associated cable (not shown). Guideposts 628a, 628b act to maintain the cable within the desired area. In some embodiments, motor 625 is an electric motor connected to receive power from battery 82. In other embodiments, motor 625 is connected to receive electrical power generated by the engine (e.g. alternator), requiring the engine to be running to operate motor 625. Control of winch assembly 624 may be provided a control switch located adjacent to the winch assembly. However, in some embodiments the control may be located remote from the winch assembly. For example, as discussed above, winch control may be located within glove compartment 475, allowing an operator to operate the winch while standing to the side of the vehicle or within the passenger seating area. In other embodiments, winch control may be operated via a remote control that communicates wirelessly with the winch assembly 624.

Figure 106:
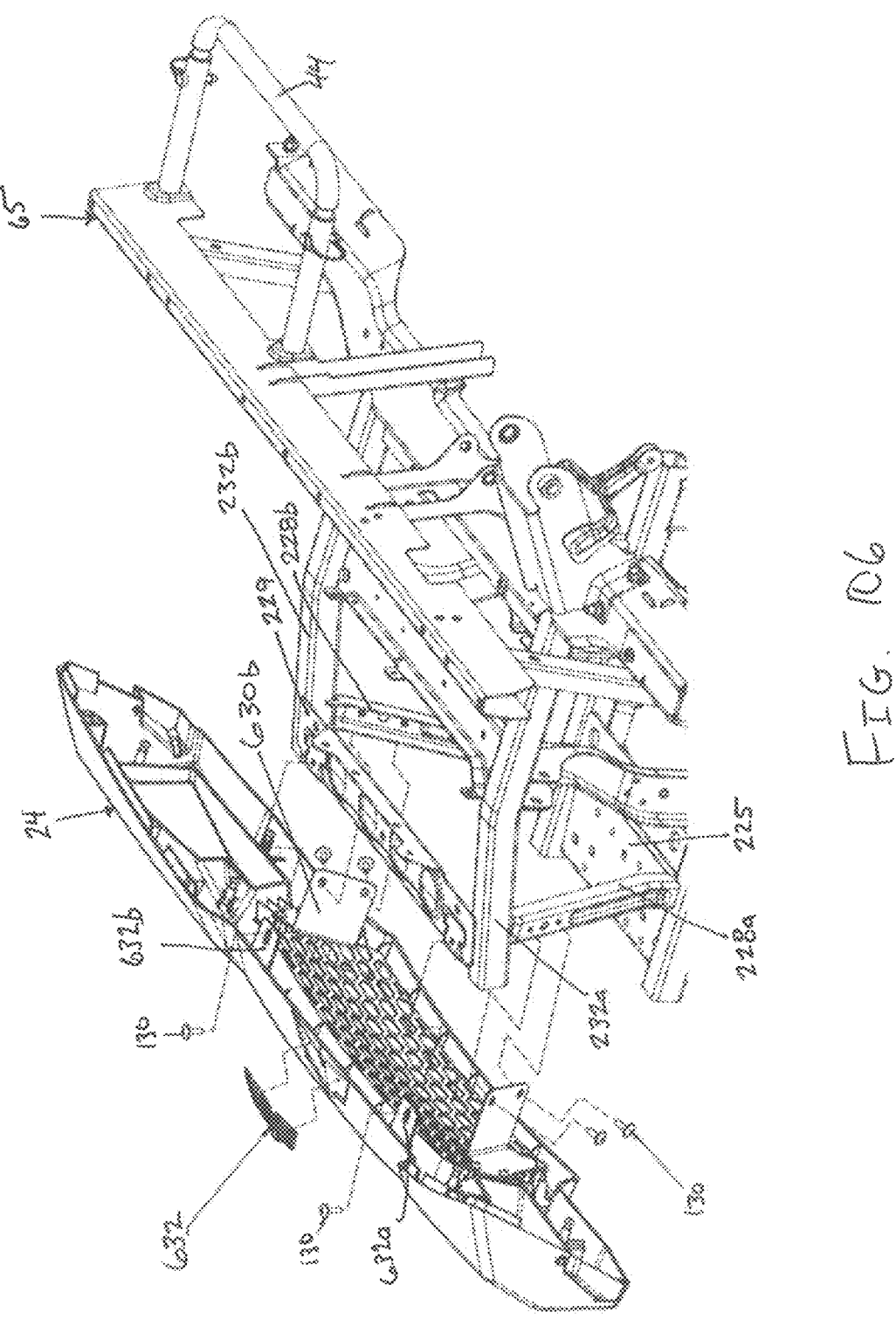
FIG. 106 is an exploded view illustrating the connection of the front fascia to the frame of the vehicle according to some embodiments.
Figure 107:
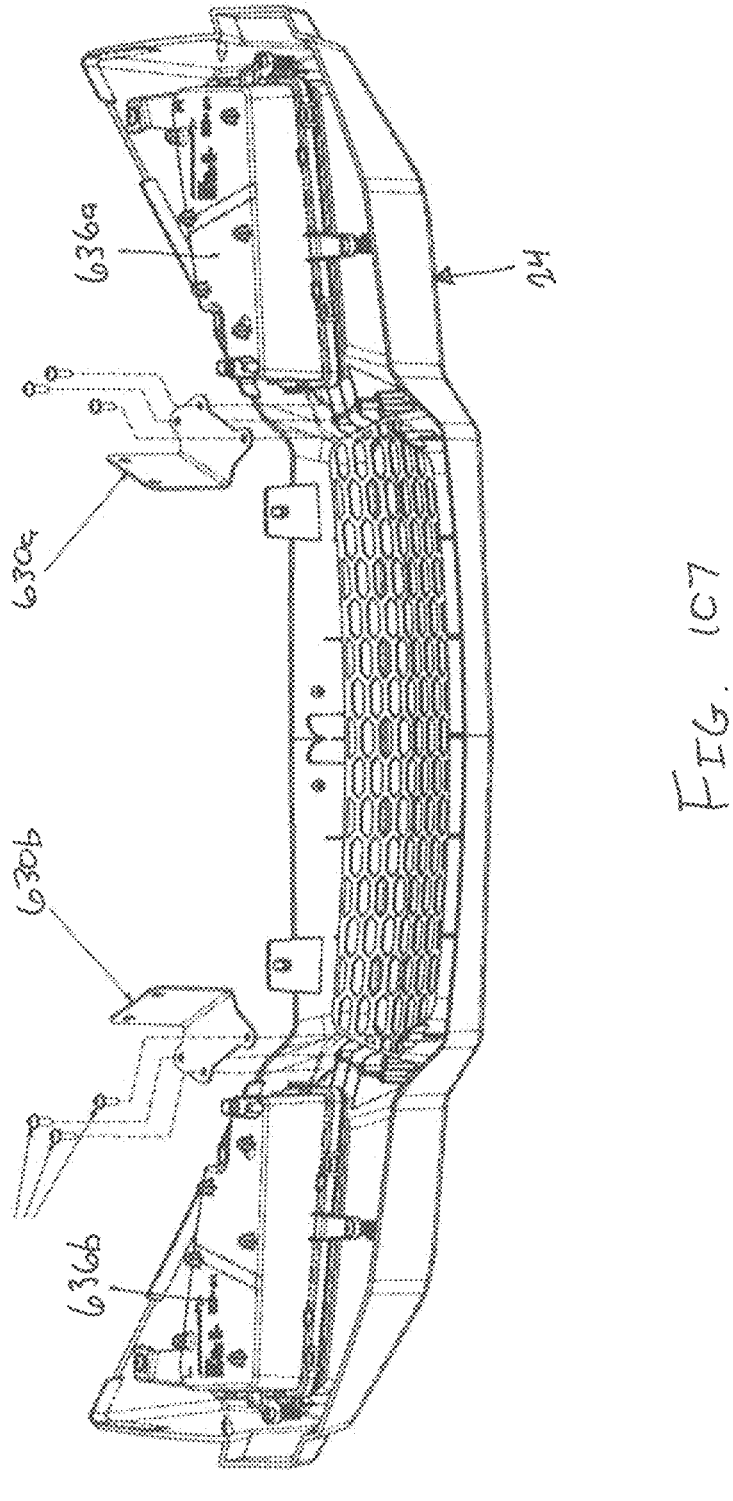
FIG. 107 is an exploded view illustrating the connection of brackets to the front fascia according to some embodiments.
Figure 106:
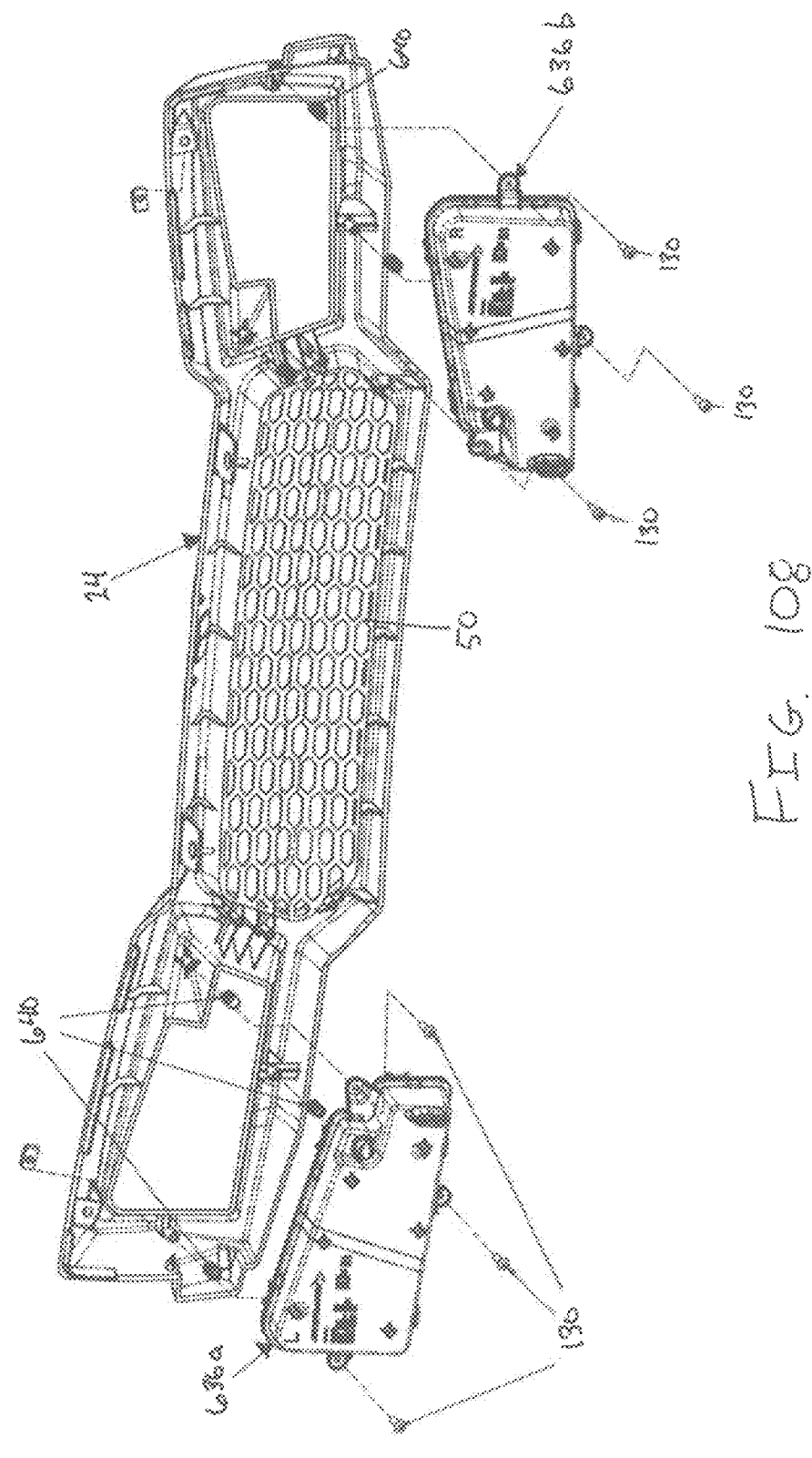
Figure 109:
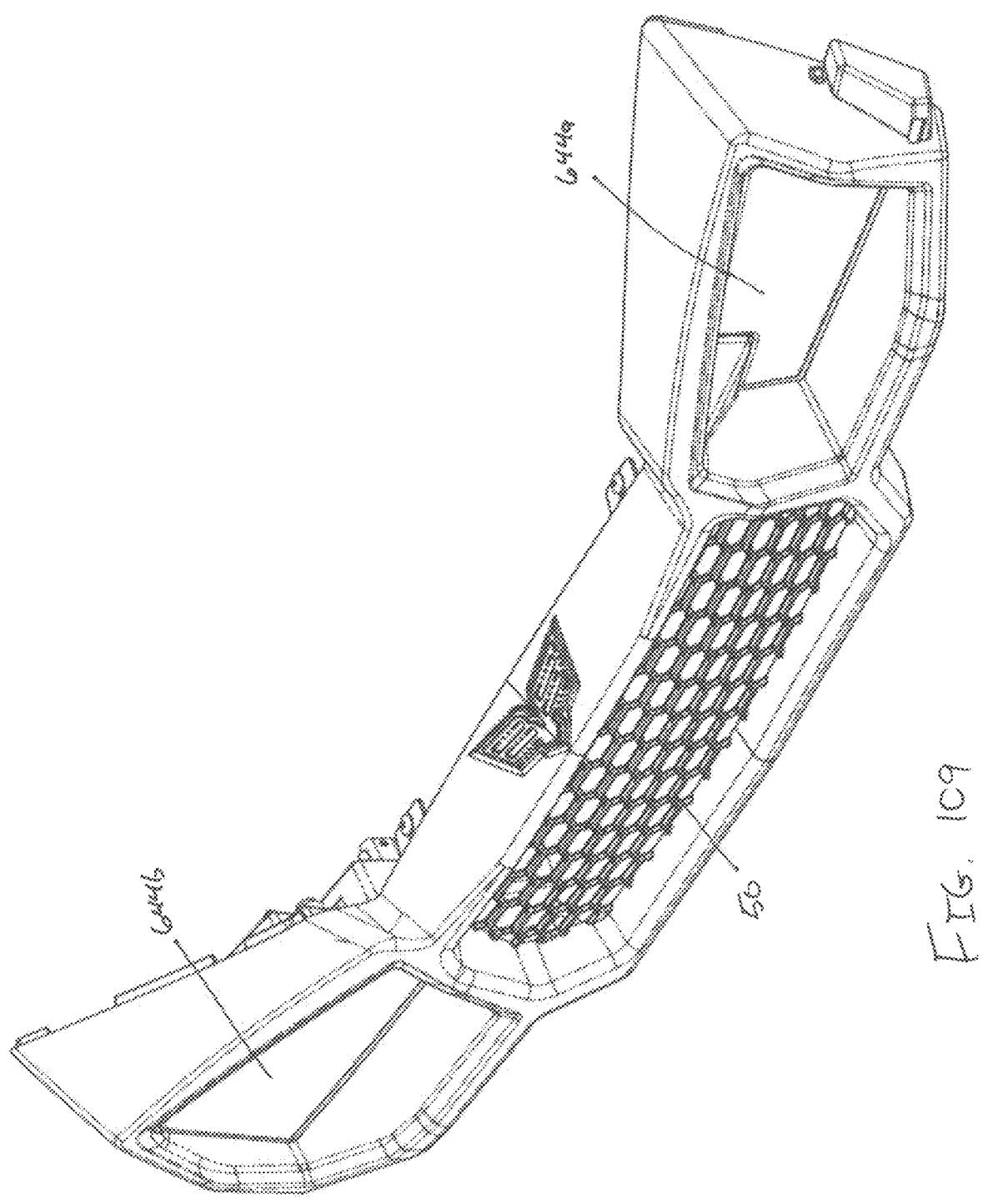
FIG. 109 is an orthogonal view of the front fascia according to some embodiments.

FIGS. 106-108 illustrate the attachment of front fascia 24 to frame 14 as well as the attachment of headlight assemblies 636 to front fascia 24. In the embodiments shown in FIG. 107, front fascia 24 includes on a rear (e.g., vehicle facing side) mounting brackets 630a, 630b for mounting to frame 14. In some embodiments, mounting brackets 630a, 630b are attached to front upper vertical support 228 via a plurality of fasteners and/or weldments. In some embodiments, mounting bracket 632a, 632b, located on a top portion of front fascia 24, is also utilized to secure front fascia 24 to frame 14. In this embodiment, fasteners are directed downward through mounting brackets 632a, 632b and into frame 14 (e.g., forward support member 229).

Figure 103:
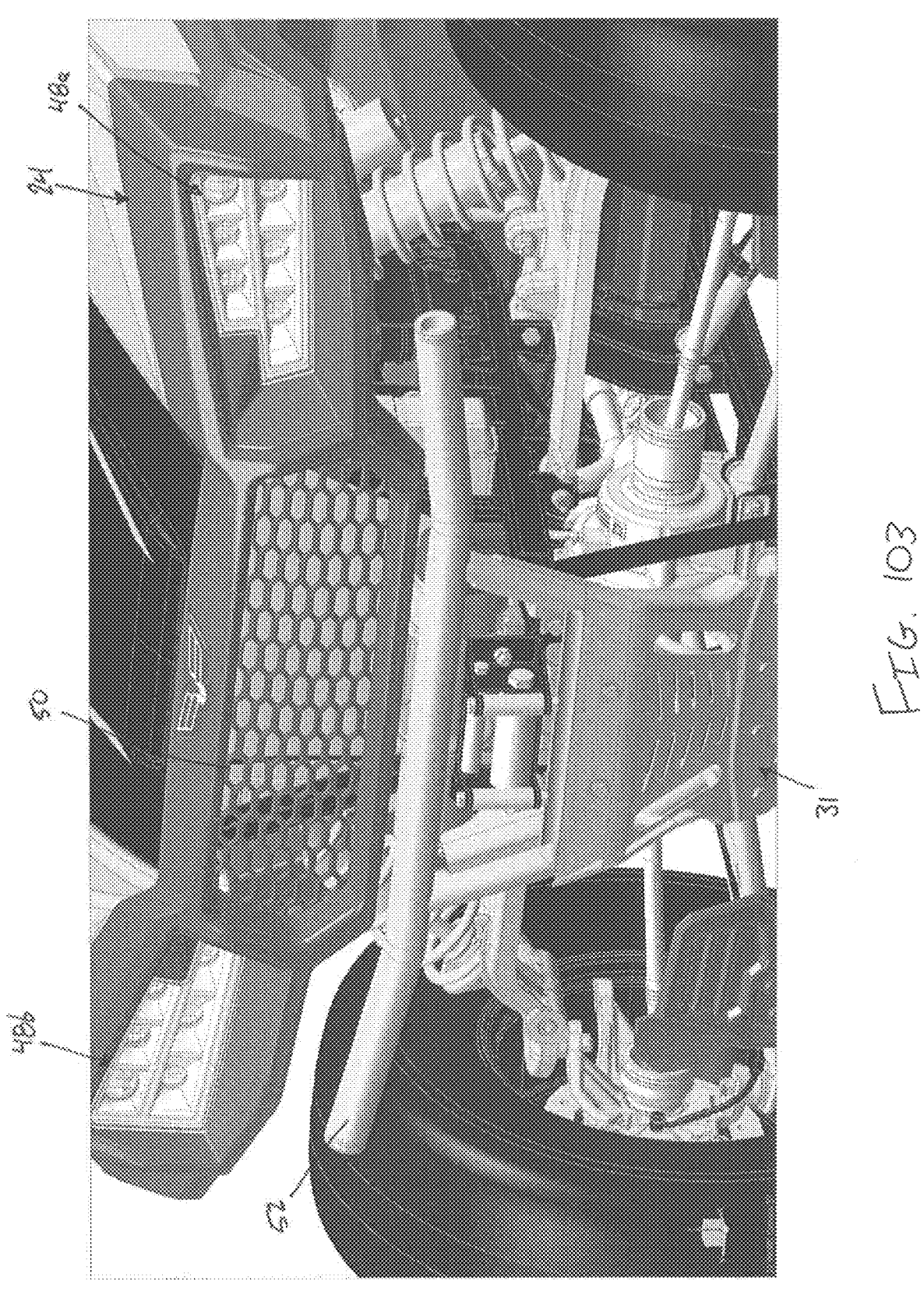
FIG. 103 is an orthogonal view of the front of the vehicle including front fascia according to some embodiments.
Figure 110:
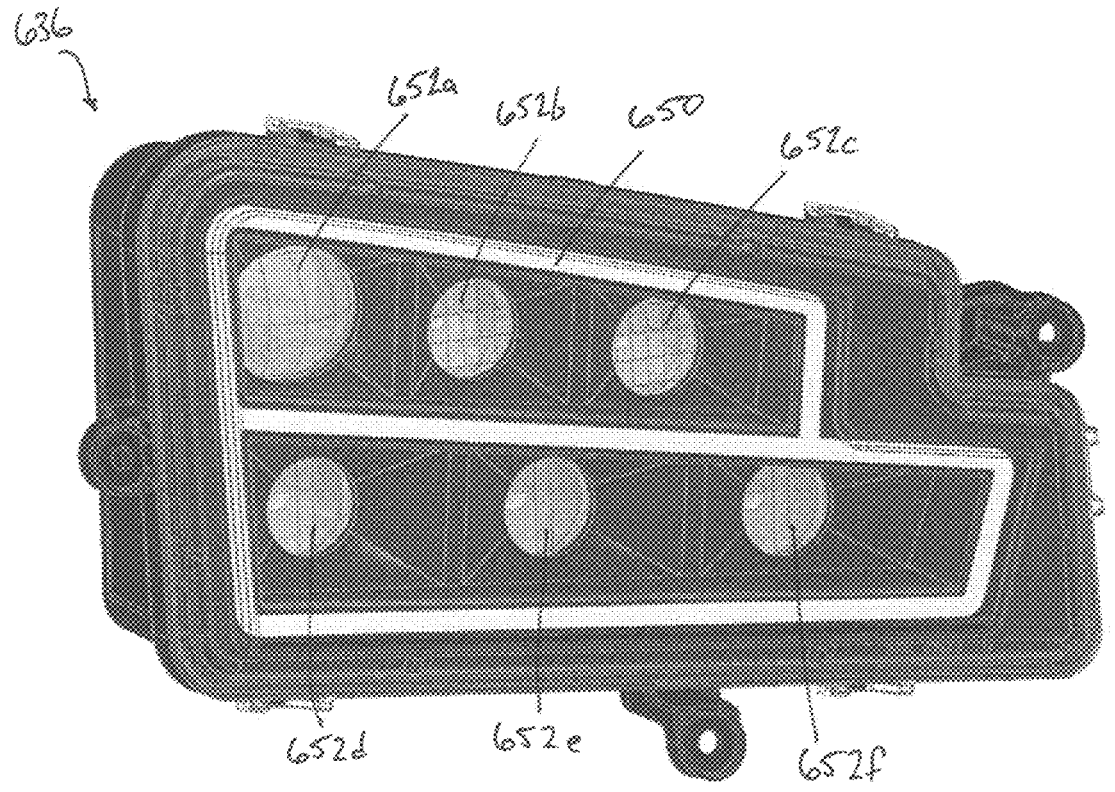
FIG. 110 is an orthogonal view of a headlight assembly according to some embodiments.

As shown in FIG. 110, headlight assemblies 636a, 636b are located on either side of grill 50. As shown in FIGS. 103, 110, and 111, headlights 48 may include a plurality of separate headlights 652a-652f. In addition to separate headlights 652a-652f, headlight assemblies 636a, 636b may also include accent lights 650. In one embodiment, accent lights 650 extend in substantially rectangular shapes around the top row of headlights and bottom row of headlights. In some embodiments, accent lights 650 are angled slightly to provide a similar geometry to that found on the logo located on the front fascia 24. In one embodiment, the geometry of accent lights 650 is obtained by utilizing LED lights to illuminate the interior of headlight assembly 636, wherein light escapes through the portion of headlight assembly 636 that defines the accent light geometry. In this way, the geometry of the accent lights 650 is provided.

In some embodiments, the light provided to the interior of headlight assembly 636 (and therefore the intensity of light emitted as part of accent lights 650) is maximized when headlights 652a-652f are Off, and dim when one or more of headlights 652a-652f are turned On. In this way, accent lights 650 are visible when headlights 652a-652f are Off, but are dimmed once headlights 652a-652f are turned On.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An off-road vehicle comprising:
a frame;
a plurality of ground engaging members;
a seating area including one or more seats;
an engine located rearward of the one or more seats;
a front suspension connected between the frame and first and second front ground engaging members, the front suspension including first and second front lower control arms, first and second front upper control arms, first and second front anti-roll bar (ARB) links, and a front anti-sway bar connected to the first and second front upper control arms via the first and second front ARB links, respectively, the front anti-sway bar including a lateral portion and first and second bends located on opposite ends of the lateral portion that extend generally forward to first and second ends of the front anti-sway bar;
a rear suspension connected between the frame and first and second rear ground engaging members, the rear suspension including first and second rear lower control arms, first and second rear upper control arms, first and second rear anti-roll bar (ARB) links, and a rear anti-sway bar connected to the first and second rear upper control arms via the first and second rear ARB links, respectively;
an exhaust system including a muffler located rearward of the engine and supported by the frame, wherein the lateral portion of the rear anti-sway bar is located rearward of at least a portion of the muffler; and
a radiator connected to a front portion of the frame at a point lower than the front anti-sway bar.

2. The off-road vehicle of claim 1, wherein the front suspension includes:
first and second front shocks connected to the first and second front upper control arms and the frame, wherein the lateral portion of the front anti-sway bar is attached to the frame rearward of the first and second shocks.

3. The off-road vehicle of claim 2, wherein the first and second front shocks are positioned outward of the first and second front ARB links.

4. The off-road vehicle of claim 3, wherein the first and second front ARB links each comprise an upper ARB link portion and a lower ARB link portion.

5. The off-road vehicle of claim 4, wherein the first and second rear ARB links each comprise an upper ARB link portion and a lower ARB link portion.

6. The off-road vehicle of claim 3, wherein the lateral portion of the front anti-sway bar is connected to the frame at one or more points inward of the front shocks.

7. The off-road vehicle of claim 1, wherein the rear suspension includes:
first and second rear shocks connected between the first and second rear lower control arms and the first and second rear upper control arms, respectively, wherein the lateral portion of the rear anti-sway bar is located rearward of the first and second rear shocks.

8. The off-road vehicle of claim 7, wherein the first and second rear shocks are connected to the frame at a point forward of the lateral portion of the rear anti-sway bar.

9. The off-road vehicle of claim 8, wherein the first and second rear shocks are connected to the frame at a point forward of the muffler.

10. The off-road vehicle of claim 1, wherein the frame includes: first and second control arm vertical supports, wherein the first and second rear ARB links are attached to the first and second control arm vertical supports, respectively, wherein the rear anti-sway bar is located rearward of the first and second control arm vertical supports.

11. An off-road vehicle comprising:

a frame including a rear upper frame for supporting a cargo box;

a plurality of ground engaging members including a first rear ground engaging member and a second rear ground engaging member;

a seating area including one or more seats;

an engine located rearward of the one or more seats;

a rear suspension connected between the frame and first and second rear ground engaging members, the rear suspension including:

first and second rear lower control arms;

first and second rear upper control arms;

first and second rear anti-roll bar (ARB) links secured to the first and second rear upper control arms; and a rear anti-sway bar secured to the first and second rear ARB links, respectively, the rear anti-sway bar including a lateral portion that is positioned under the rear upper frame;

a rear differential positioned rearward of the engine; and a half-shaft extending from the rear differential, the half-shaft is connected to the rear differential forward of the lateral portion of the rear anti-sway bar.

12. The off-road vehicle of claim 11, wherein a cargo box frame is pivotally secured to the rear upper frame of the vehicle.

13. The off-road vehicle of claim 11, wherein a cargo box comprising a bed assembly is attached to an upper frame member of the vehicle rearward of the seating area.

14. The off-road vehicle of claim 11, wherein the rear suspension includes:

first and second rear shocks including a first end and a second end, respectively, wherein the first end is secured to the first and second rear lower control arms, respectively, and the second end is secured to the frame.

15. The off-road vehicle of claim 14, wherein the rear anti-sway bar includes first and second arms that extend forward from the lateral portion of the rear anti-sway bar to the rear ARB links, and wherein a portion of the first and second arms are positioned between a centerline of the vehicle and the first and second rear shocks.

16. The off-road vehicle of claim 11, wherein a receiver hitch assembly has a first end connected to the rear upper frame and a second end extending therefrom, wherein a muffler is positioned at least partially rearward of the first end of the receiver hitch assembly.

17. The off-road vehicle of claim 16, wherein the lateral portion of the rear anti-sway bar is located rearward of at least a portion of the muffler.

\* \* \* \* \*